(12) United States Patent
Cuk

(10) Patent No.: US 6,304,460 B1
(45) Date of Patent: *Oct. 16, 2001

(54) SWITCHING DC-TO-DC CONVERTER UTILIZING A SOFT SWITCHING TECHNIQUE

(76) Inventor: Slobodan Cuk, 27682 Gold Dust, Laguna Hills, CA (US) 92653

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 12 days.

(21) Appl. No.: 09/566,045

(22) Filed: May 5, 2000

(51) Int. Cl.[7] .......................... H02M 3/335; H02M 1/12; H02M 1/14
(52) U.S. Cl. ............................. 363/16; 363/41; 363/55; 363/131
(58) Field of Search ................... 363/16, 40, 55, 363/95, 97, 131, 41

(56) References Cited

U.S. PATENT DOCUMENTS

| | | |
|---|---|---|
| 4,184,197 | 1/1980 | Cuk et al. . |
| 4,257,087 | 3/1981 | Cuk . |
| 5,027,264 * | 6/1991 | DeDoncker et al. ................. 363/16 |
| 5,038,267 * | 8/1991 | DeDoncker et al. ................. 363/89 |
| 5,166,869 | 11/1992 | Hesterman . |
| 5,313,382 * | 5/1994 | Farrington ............................. 363/16 |
| 5,416,387 * | 5/1995 | Cuk et al. ........................ 315/209 R |
| 5,539,630 | 7/1996 | Pietkiewicz et al. . |
| 5,790,005 | 8/1998 | Santi et al. . |
| 5,838,552 * | 11/1998 | Fraidlin et al. ....................... 363/16 |
| 5,999,417 * | 12/1999 | Schlecht ............................... 363/16 |

OTHER PUBLICATIONS

R.D. Middlebrook and Slobodan Cuk, A General Unified Approach to Modelling Switching–Converter Power Stages, California Institute of Technology, PESC 76 Record, pp. 18–34 No date.

Akio Nakamura, Junpei Ohta, "A New Reverse–Biased Choke Coil", TDK–Electronics Company Ltd., Tokyo, Japan, Proceedings of Powercom 9, 1982, pp. 1–7 No month.

Satoshi Frank Shiraki, "Reducing Magnetic Component Size with Reversed Biased Ferrite Core," Hitachi Magnetics Coporation, Edmore, Michigan, pp. 1–5 No date.

* cited by examiner

Primary Examiner—Peter S. Wong
Assistant Examiner—Bao Q. Vu
(74) Attorney, Agent, or Firm—A. M. Fernandez

(57) ABSTRACT

Soft switching DC-to-DC converter achieves simultaneously ultra high efficiency and very small size owing to a new magnetic circuit structure and a corresponding novel converter circuit configuration with special properties. Unique magnetic design also provides an overload current capability of several times the nominal load current. Despite its simple implementation requiring only proper drive timing of the switching devices, the unique soft-switching methods result in nearly complete elimination of switching losses over the entire operating range. This, in turn, permits operation at even higher switching frequencies, and leads to further reduction in size and weight.

82 Claims, 73 Drawing Sheets

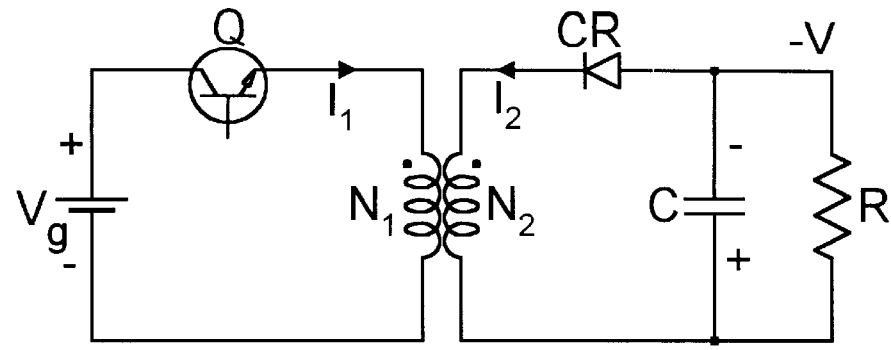
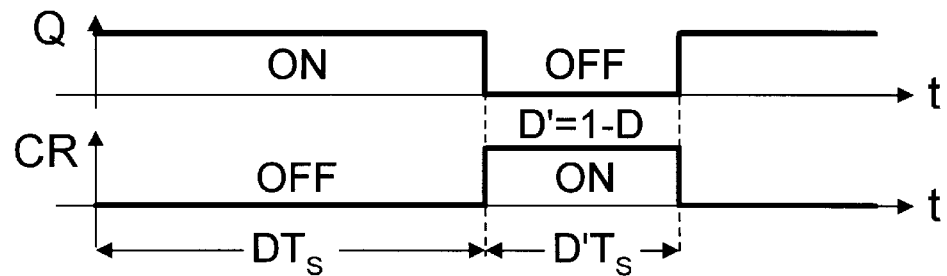
Fig. 4a (Prior Art)
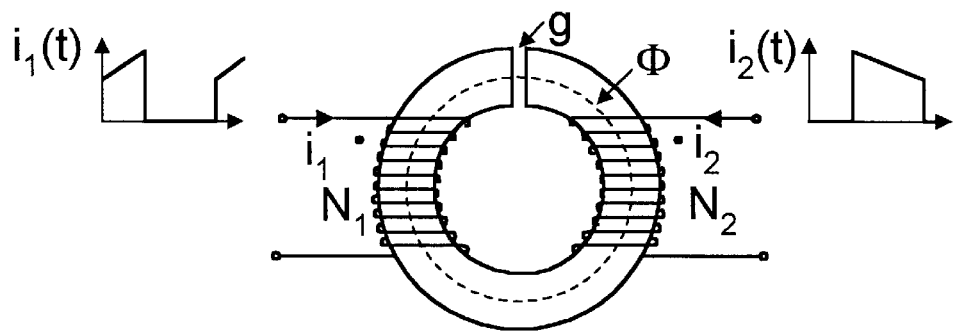
Fig. 4b (Prior Art)
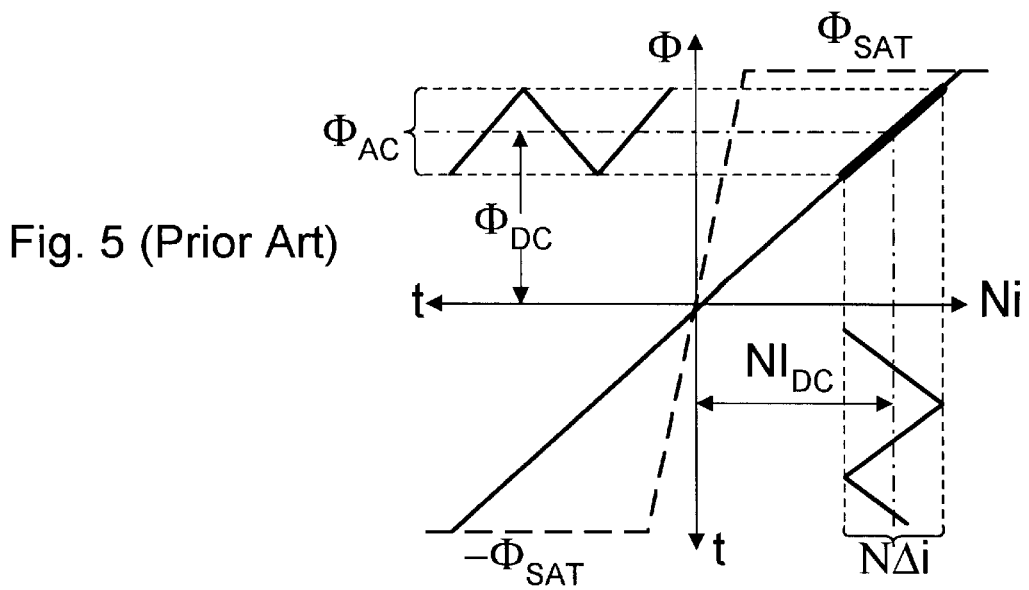
Fig. 5 (Prior Art)

$$\Delta v = v_{L1} - v_{L2} = 2v_{L1} = 2v_{L2}$$

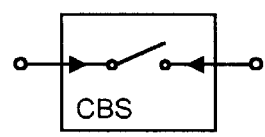
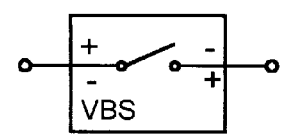
Fig. 15d            Fig. 15g
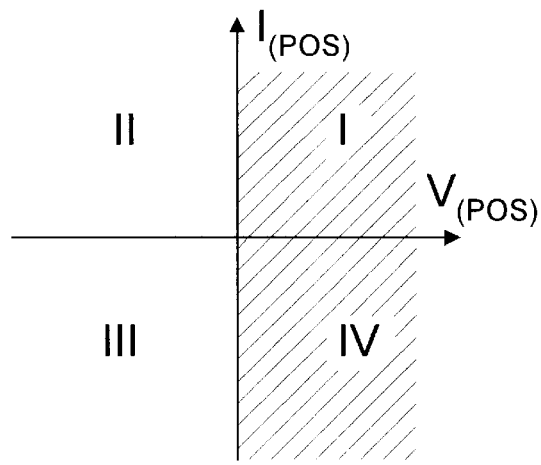
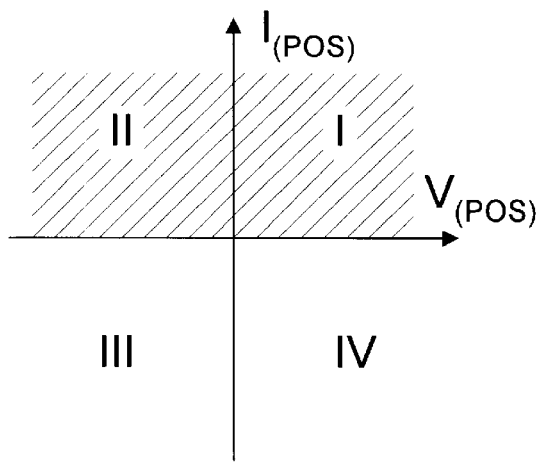
Fig. 15e            Fig. 15h
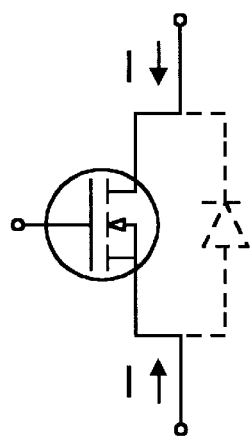
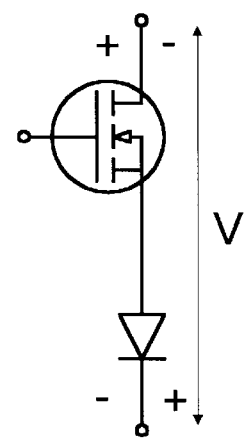
Fig. 15f            Fig. 15i

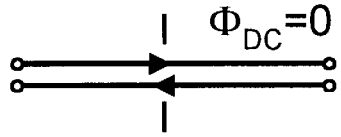
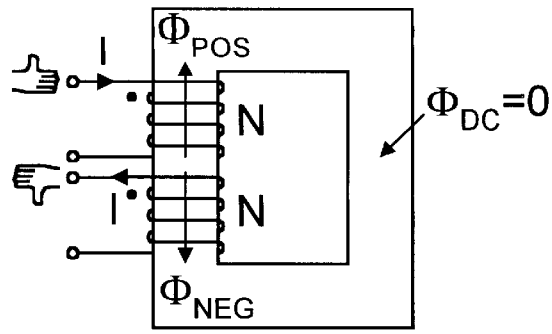
Fig. 19a
Fig. 19b
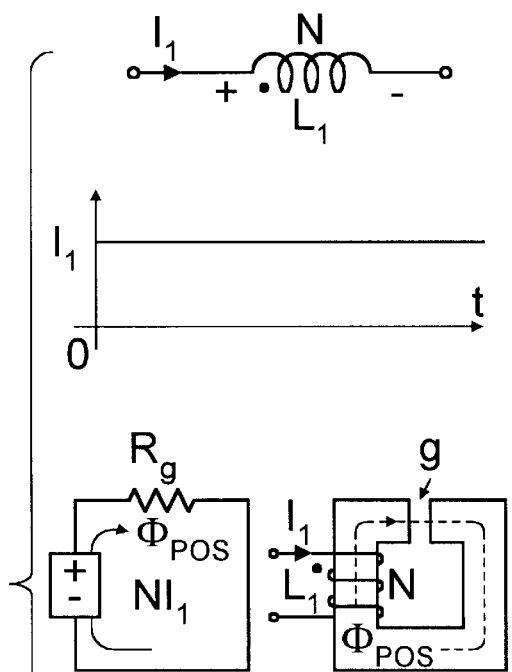
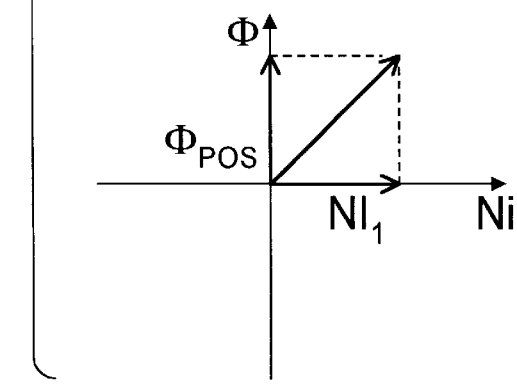
Fig. 19c
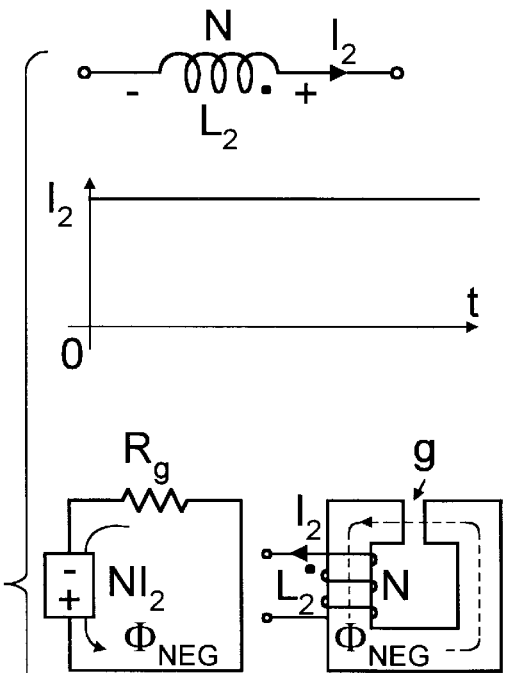
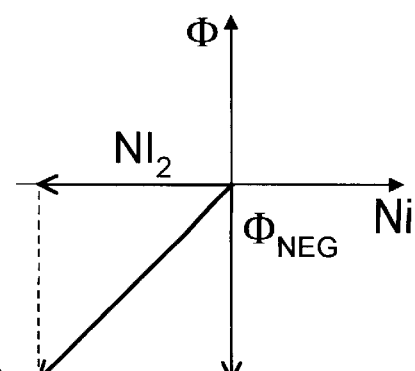
Fig. 19d

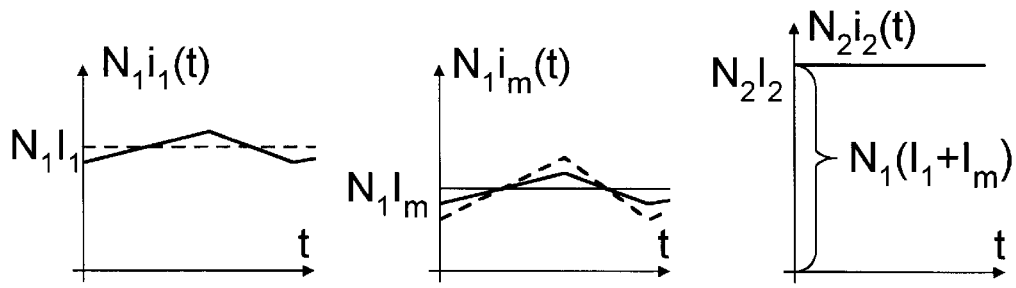
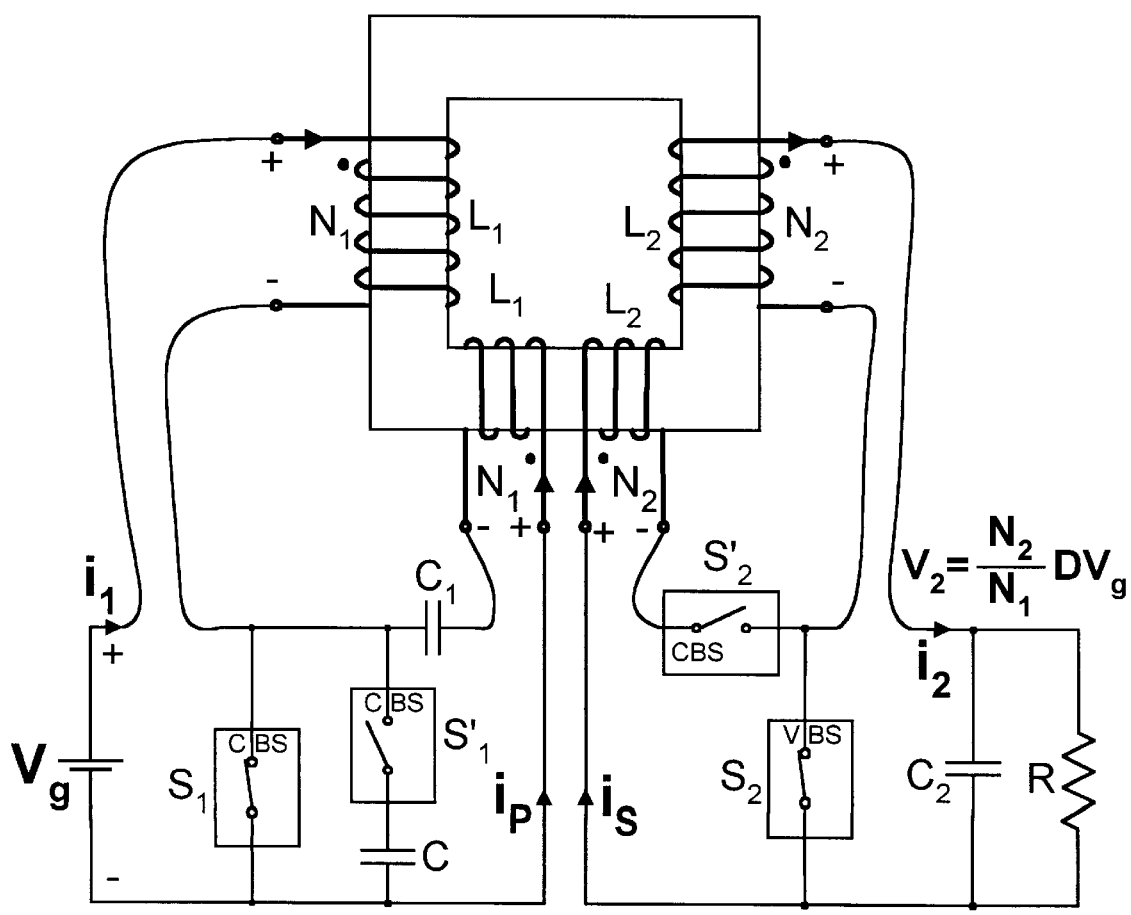
Fig. 36a

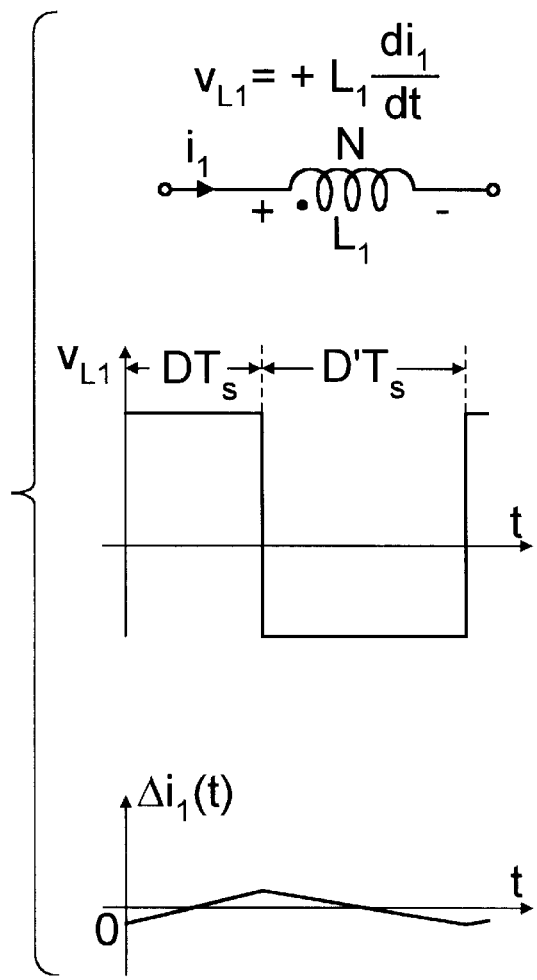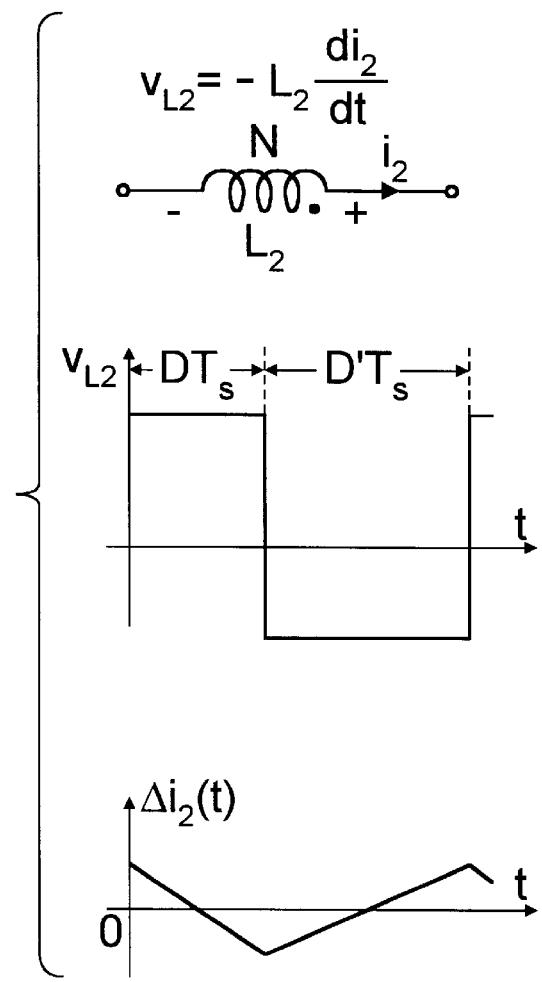
Fig. 44a                    Fig. 44b

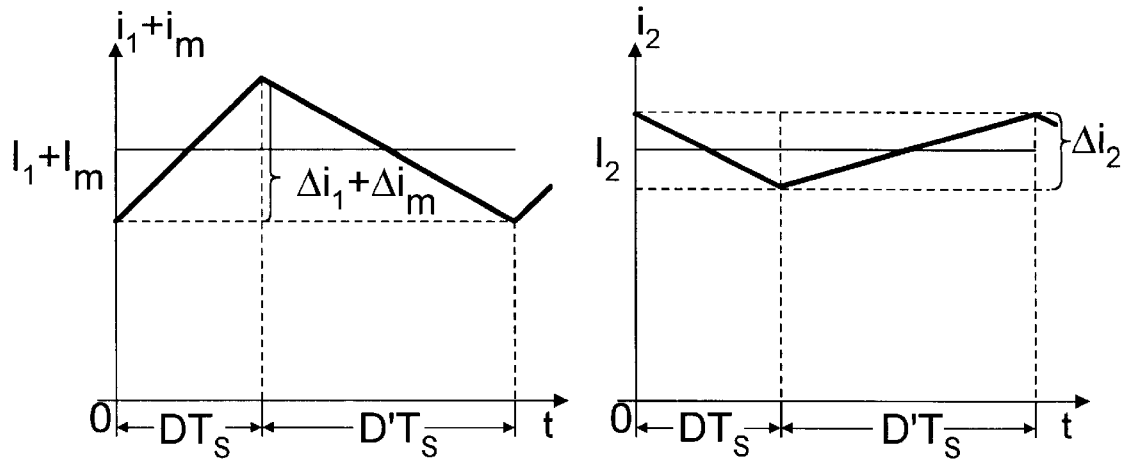
Fig. 45a  Fig. 45b
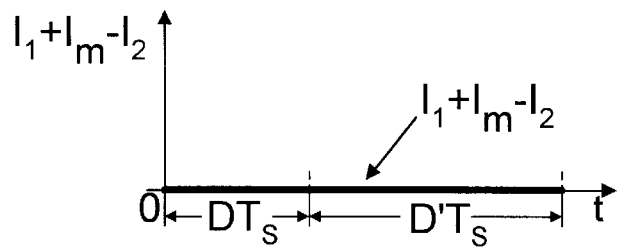
Fig. 45c
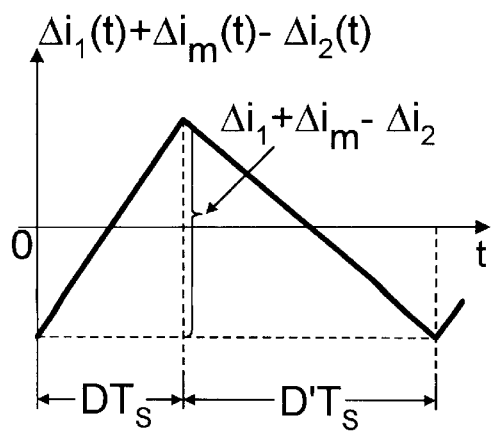 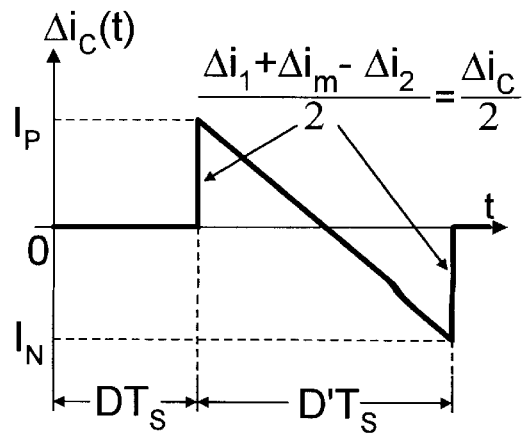
Fig. 45d  Fig. 45e

SWITCHING DC-TO-DC CONVERTER UTILIZING A SOFT SWITCHING TECHNIQUE

FIELD OF THE INVENTION

This invention relates to the field of switching DC-to-DC power conversion and in particular to the class of switching converters employing soft-switching methods and distinguished by ultra high efficiency, high overload capability, small size and weight, and high power density at a moderate to high switching frequencies.

BACKGROUND OF THE INVENTION

The following notation is consistently used throughout this text in order to facilitate easier delineation between various quantities:

1. DC—shorthand notation historically referring to Direct Current but now has wider meaning and refers to all Direct electrical quantities (current and voltage);
2. AC—shorthand notation historically referring to Alternating Current but now has wider meaning and refers to all Alternating electrical quantities (current and voltage)
3. The instantaneous time domain quantities are marked with lower case letters, such as $i_1$ and $v_2$ for current and voltage. Often these instantaneous quantities contain a DC component, which is designated with corresponding capital letters, such as $I_1$ and $V_2$.
4. The difference between instantaneous and DC components is designated with Δ, hence $\Delta i_1$ designates the ripple component or AC component of current $i_1$.
5. Duty ratio D of the input switch $S_1$ is defined as $D=t_{ON}/T_S$ where $t_{ON}$ is ON time of the switch, and $T_S$ is the switching period defined as $T_S=1/f_S$ where $f_S$ is a constant switching frequency. Switch $S_1$ is closed (turned ON) during $DT_S$ interval;
6. Complementary duty ratio D' of the input switch $S_1$ is defined as $D'=1-D$ and $D'T_S$ is interval during which input switch $S_1$ is turned OFF.

Over the last two decades a large number of switching DC-to-DC converters had been invented with the main objective to improve conversion efficiency and reduce the converter size. The past attempts to meet both of these objectives simultaneously have been hampered by the two main obstacles, which up to now seemed to be inherent to all switching DC-to-DC converters:

1) The large DC current bias present in the filtering inductors at either input or output of the converters (as well as the DC-bias current present in the isolation transformer of some of the isolated converters) resulted in a big size of the magnetic components, since an air-gap proportional to the DC current bias must be inserted in the AC flux path in order to prevent magnetic core saturation. This also resulted in a very inefficient use of the magnetic material, which was largely wasted. Even a relatively small air-gap on the order of 1 mm (40 mils), drastically reduces the total inductance. This loss of inductance was compensated by either an inordinately large increase of the switching frequency (hence increase of losses) or by increasing the size of the magnetic cores, or both.
2) Prior-art soft-switching methods, while helping to reduce switching losses, suffered from a number of disadvantages, which led to only partial reduction of the switching losses, and depending on the soft-switching type, any of the following efficiency reduction problems appeared, such as:

a) Large output inductor AC current ripple is required (larger than twice the magnitude of the maximum DC load current) for soft-switching operation thereby increasing conduction losses;
b) Soft-switching depends on the resonant inductor and thus is not effective over the whole operating duty ratio D range;
c) Only partial soft-switching is achieved on the primary side of the isolated converter with high voltage devices, which for practical switching devices dominate the switching losses.

Magnetic Saturation with DC Current Bias

First, the problem associated with the DC-bias of magnetic components (inductors and transformers) can be best understood with reference to the classical buck converter shown in prior art FIG. 1a and the accompanied output inductor current waveform of FIG. 1b. Since the converter output supplies DC power to the load, the inductor in the buck converter must pass the DC component of the load current, which is $I_{DC}$. Hence, it clearly cannot be designed as an ordinary inductor used in alternating current (AC) applications such as the inductor in FIG. 2a.

Several quantities which are used throughout the text are now described with their defining relationship:

Flux linkage λ is the total flux linking all N turns and is $\lambda=N\Phi$ where Φ is the flux in the magnetic core;
Flux density B is the flux per unit area defined by $B=\Phi/S$ where S is a magnetic core cross-section area.
Inductance L is defined as the slope of λ-i characteristic, i.e., $L=\lambda/i$;

An AC inductor is wound on magnetic core material in order to dramatically increase its inductance value. For example, typical ferrite core material has at room temperature a relative permeability on the order of $\mu_r\approx 3{,}000$. Hence the inductance of the coil is magnified by a factor of 3,000 simply by inserting the magnetic core material without any air gap as in FIG. 2a. The corresponding flux linkage "λ" versus current "i" characteristic is as in FIG. 2b with a high slope illustrating the high inductance value L (maximum attainable with that core material). The flux linkage excursions (caused by the AC current) are symmetrical around the center of the magnetic core operating characteristic. Even if a very small DC current $I_{DC}$ shown in FIG. 2b were to pass through this coil, the magnetic core material would saturate and instead of the desirable large inductive impedance, the inductor would look like a short circuit. Thus, to avoid core saturation, all present switching converters "solve" this DC-bias problem in a "brute-force" way by inserting an air-gap in the magnetic flux path as illustrated in FIG. 3a. This clearly reduces the inductance value proportionally to the inserted air-gap size (the larger the DC current, the bigger air-gap is needed, hence the smaller is the resulting inductance value), as seen by the flux linkage characteristic of FIG. 3b for an un-gapped and gapped core and their corresponding inductances L and $L_g$. Clearly three very detrimental factors did occur:

1. By insertion of the air-gap, the inductance value is drastically reduced. It is not uncommon to see the original un-gapped inductance L reduced by a factor of 100 to 1000 to the inductance $L_g$ with the air-gap included. In order to compensate for this loss of inductance, the switching frequency is radically increased or a much bigger core size is used, or both.
2. The already small AC flux linkage excursions due to the finite and relatively low saturation flux density $B_{SAT}$ of 0.3 T (tesla) for ferrite material, is further significantly reduced due to the presence of the DC-bias in the core. For example, in typical applications, the DC-bias might correspond to a flux density of 0.25 T thus leaving only 0.05 T for the superimposed AC flux excursions. This in turn results in either larger core size requirements or increased switching frequency, or both.

3. The waste of ferromagnetic material is even larger, since the negative part of the saturation characteristic is not utilized at all, and thus another $\Delta B=B_{SAT}=0.3$ T is also wasted.

The DC-bias problem is not only limited to all inductors used up to now in DC-to-DC converters but is also present in many isolation transformers, such as for example in the popular flyback converter shown in FIG. 4a. This transformer does provide galvanic isolation and the ability to step-up or step-down the voltage through the transformer turns ratio, but contrary to the ordinary AC line transformer, it has a large DC-bias and requires a correspondingly big air-gap as shown in FIG. 4b. Hence the magnetic core is biased in one direction thus limiting the superimposed AC flux excursions as seen in FIG. 5.

Up to now, the detrimental effect of the large DC-bias and hence the large air-gap was introduced qualitatively. Let us now also quantify these effects on an output inductor design example for a 5V, 100 W buck-like converter, having a DC load current $I_2=20$ A, and number of winding turns $N=6$, which is implemented on a ferrite core having a saturation flux density $B_{SAT}=0.3$ T (tesla) out of which $B_{DC}=0.2$ T is available for the DC-bias and the remaining 0.1 T is allocated for the superimposed AC flux excursions. To support $NI=120$ ampere-turns the required air-gap is given by formula $l_g=\mu_0 NI/B_{DC}=30$ mils=0.75 mm where $\mu_0=4\pi 10^{-7}$H/m is the permeability of free space. If L is the inductance without air-gap, and $L_g$ is the inductance with air-gap $l_g=30$ mils, then the ratio of the two inductances is given by $L/L_g=\mu_r l_g/l_m=50$ where $\mu_r$ is the relative permeability of the ferrite material, which for typical materials used in switching converters is $\mu_r=3000$, and $l_m=4.5$ cm is the magnetic path length of the core used. Thus, even at a relatively modest DC current level of only 20 A, the maximum available inductance of a given core is reduced by a factor of 50. The factor by how much presence of ferrite increases the coil inductance above that of an air-core is $\mu_r$ which is 3000 in our example. Then, the ratio of 3000/50=60 is how much the addition of the ferromagnetic material with air-gap increases the inductance of the inductor built with no ferromagnetic material but with the same cross-section. At higher power and especially DC load current levels this becomes progressively much more severe. It is not uncommon for some high power DC converter applications in the kilowatt range to see that after ferromagnetic material was inserted, the inductance increased only by a factor of 2 or 3 over the inductance without any magnetic material due to the large air-gap needed to prevent saturation. Clearly, this is a tremendous waste of the magnetic material, which has the ability to increase the inductance 3000 times over that of an air-core coil. This is also the reason, why in switching converters in which isolation transformer has no DC bias, such as in the isolated Cuk converter, the transformer size is several times smaller in size and weight in comparison with the size and weight needed for the input and output inductors, which by far dominate the size and weight of the switching converter and also result in increased losses.

In the above typical example, the loss of the inductance due to insertion of the air-gap in the flux path is compensated either by increasing the core cross-section thus making the converter size substantially bigger, or by increasing the switching frequency by an order of magnitude, or a combination of both. This clearly would rapidly degrade the overall efficiency, even in the presence of soft-switching. Thus, it would be very desirable to either substantially reduce the DC-bias in the magnetic core, or, if possible, to eliminate it entirely.

In the past, there had been a number of attempts to correct this fundamental limitation of DC-to-DC converters, but with a very limited success. One approach was followed by magnetic manufacturers, such as Hitched and TDK. In the article "Reducing Magnetic Component Size with Reverse Biased Ferrite Core" published in the Proceedings of the Powercon 6 conference, May 1979, author Shiraki (of Hitachi) proposed to add a permanent magnet to the air-gap and hence by proper orientation of the permanent magnet reverse bias the core in the direction opposite to the DC-bias created by the current of the magnetics winding as shown in FIG. 6a. The net effect is that the AC flux excursions are now extended into the negative core flux swing area as seen in FIG. 6c and would allow the core cross-section and volume reduction by up to 50%. The TDK corporation developed a line of PCH cores based on their reverse biased core modification as reported in the Proceedings of Powercon 9, July 1982 in article "A New Reverse Biased Choke Coil" by Nakamura and Ohta of TDK corporation.

Note, however, that both approaches are operated with additional air-gap, that is along the reduced, "heavy line" slope as shown in FIG. 6b and FIG. 6c. Hence, the large inductance reduction from its maximum inductance capability of the un-gapped core (dashed line in FIG. 6b and FIG. 6c) is still present. Clearly, the core can only support the designed-in maximum DC-ampere-turns. If that is exceeded, the core will saturate and the overload capability will be lost. Since the permanent magnet provides a fixed reverse bias independent of the DC load current, at no-load current, the core flux is entirely along the negative part of the core flux saturation characteristic (FIG. 6c). In fact, the permanent magnet generates the maximum allowable bias but in the negative (reverse) direction. This will be compared later with the novel DC Transformer switching converter in which there is an automatic self-balancing, such that at any DC load current there is no net DC-bias and no DC flux in the core.

In addition to the above limited performance improvements, the other practical limitations, such as increased cost of the special cores with inserted permanent magnets, the extra loss due to added core loss of the permanent magnet, etc., rendered this approach unattractive, which by now seems to be abandoned by both of these companies.

Another attempt was made to use a special converter circuit configuration instead of a special magnetic core structure to reduce or eliminate the DC-bias problem. Such an approach is disclosed in U.S. Pat. No. 5,166,869 issued to Bryce L. Hesterman for "Complementary Electronic Power Converter" in which a "complementary transformer" is introduced. This transformer combines the input and output inductors into a coupled-inductor configuration in which the DC flux generated by the input inductor DC current is canceled by the flux generated by the output inductor DC current. The main drawback of the proposed converter is that it is capable of producing only the fixed input to output voltage conversion ratio determined by a fixed turns ratio of the two windings. Hence it cannot provide a regulated voltage through pulse-width modulation of the switches even over a limited input voltage range.

From another point of view, there are other fixed conversion ratio converters such as 50% driven bridge type converters, which do not need inductors with DC-bias current for either input or output filtering, hence the DC-bias problem is not present.

Thus, a highly desirable objective is to have a switching converter with a variable conversion ratio, capable of handling a wide range of input voltages and provide regulated output, and at the same time either completely eliminate the DC-bias or reduce it substantially.

Another possible approach is to combine input and output inductor windings into a common coupled-inductor structure as shown in FIG. 7a and as was disclosed in U.S. Pat. No. 4,184,197, "DC-to-DC Switching Converter" by S. Cuk and R. D. Middlebrook and U.S. Pat. No. 4,257,087, "DC-to-DC Switching Converter with Zero Input and Output Current Ripple and Integrated Magnetics Circuits" by S. Cuk. As described in the above patents, the basic prerequisite for combining the two windings on a common core is to have identical AC voltages across the two inductors before the coupling, and that the AC voltage matching is maintained over a wide operating range of duty ratio D as illustrated by the identical AC voltage waveforms in FIG. 7b (duty ratios $D_1$ and $D_2$) for the converter of FIG. 7a. In practical applications, a small mismatch of the AC voltages could be absorbed gracefully due to the ever-present leakage inductance between the two windings as explained below.

Since the AC voltages are identical, the placement of the two windings on the same core in a coupled-inductor structure imposes the requirement for equal number of turns N (AC voltage ratio equal to turns ratio as in an ideal transformer), because in the simplified model the leakage inductance is not included. The proper understanding of the AC voltage polarity marking in coupled-inductor and integrated magnetic structures (polarity markings with dot-marked ends as in FIG. 7a) and the actual directions of the instantaneous and DC currents relative to these dot markings (currents $i_1$ and $i_2$ and their DC components $I_1$ and $I_2$ in FIG. 7a) is of critical importance for understanding not only previous inventions but is crucial for understanding the present invention.

Note the difference of this coupled-inductor structure and a transformer. The output inductor instantaneous current $i_2$ in the coupled-inductors of FIG. 7a flows into the dot-marked end, whereas in an AC transformer, the secondary current $i_2$ flows out of the dot-marked terminal. Clearly, the air-gaps $g_1$ and $g_2$ of the two corresponding separate inductors of FIG. 8a and FIG. 8b add, resulting in larger total air-gap $g_1+g_2$ for the coupled-inductor core structure of FIG. 9a. Thus, the corresponding DC component $I_2$ of the load current in the coupled-inductor structure also flows into the dot-marked end. Consequently, the generated DC fluxes $\Phi_1$ and $\Phi_2$ add together (FIG. 9a) resulting in a combined flux vs. ampere-turns characteristic of FIG. 9b. Note that due to the larger total air-gap, the total effective permeance P in FIG. 9b (and hence corresponding inductance) is still further reduced from permenaces of the separate cores in FIG. 8c and FIG. 8d.

The main advantage of the coupled-inductor structure is that it can reduce the ripple current on the output side dramatically and even produce zero output ripple current, as first disclosed in U.S. Pat. No. 4,184,197. As disclosed in U.S. Pat. No. 5,790,005 "Low Profile Coupled Inductors and Integrated Magnetics", the inventors E. Santi and S. Cuk have shown that the air-gap position plays the key role in zero ripple current adjustment. When the air-gap is solely placed on the side of input inductor as in FIG. 10a, the total leakage inductance $L_L$ effectively appears solely on the output inductor side as in the model of FIG. 10b. Since the converter of FIG. 7a generates identical AC voltages on the input and output inductors, the net AC voltage across this leakage inductance is zero ($\Delta v=v_{L1}-v_{L2}=0$) leading to zero ripple current ($\Delta i_2=0$) in the output inductor.

Note that the ripple current on the input inductor remains relatively large due to presence of the air-gap. The only way to reduce that ripple would be to reduce the air-gap. Thus, one might be tempted to connect on purpose the coupled-inductors of FIG. 9a into the converter of FIG. 7a so that the output inductor dot-marked end is reversed and connected as in FIG. 11a to the junction between diode $CR_1$ and capacitor $C_1$. Note that with such connection the output inductor DC current $I_2$ will flow out of the dot-marked end. Hence, at least for one duty ratio D=0.5, and provided equal number of turns are used on both windings, a complete DC flux cancellation could be accomplished in the coupled-inductors magnetic core. Thus, the air-gap could be eliminated since the DC-ampere-turns of the two windings cancel. However, elimination of the ripple current is not possible even for this single operating point, since the model in FIG. 11b clearly points out that the small residual leakage inductor would now be subject to an AC voltage, which is two times larger than the input inductor AC voltage $v_{L1}$ resulting in huge circulating ripple current for both input and output inductors.

Clearly, what is needed is a special switching converter which inherently has the opposing flow of the DC currents in the input and output inductor windings (into the dot-marked end and out of dot-marked end respectively) and yet the respective AC voltage waveforms at the two inductors windings should be in phase with each other. Further constraint is to have identical or closely matching magnitudes of both AC voltages and DC currents. Yet an additional constraint is to maintain the above relationship over a wide operating range, that is a wide change of the duty ratio D. Note that even the first constraint of opposing DC current flows (for the net DC-ampere-turn reduction, if not complete cancellation) and the in-phase waveforms of the respective AC voltages is not realized in the converter of FIG. 7a as well as in all other Coupled-inductors and Integrated Magnetics structures proposed in the past.

Out of a large number of possible switching converters, with input and output inductors, only a handful of them even meet the pre-requisite for coupling them on a common magnetic core, that is to have identical voltage waveforms. Thus, imposing the additional even more severe constraints, such as opposing DC current flows as well as their matching magnitudes, may appear at first too restrictive and impossible to achieve at all. This, however, is not the case, as this invention will demonstrate.

Soft-switching Advantages and Drawbacks

Another critical performance characteristic of the switching converters is how well switching losses are reduced, since the drive toward smaller size converters has inevitably pushed switching frequencies to very high levels, such as 100 kHz and beyond, even up to 1 MHz. The resulting increase of the switching losses as well as the generated Electromagnetic Interference (EMI) noise have led to the invention of soft switching methods to keep both of these deficiencies under control.

One of the prior-art methods which provides soft-switching in basic DC-to-DC converters is explained by C. Henze, H. C. Martin and D. W. Parsley, in "Zero-Voltage Switching in High-Frequency Power Converters Using Pulse-Width Modulation", *IEEE Applied Power Electronics Conference*, (IEEE Publication 88CH2504–9) pp33–40, 1988 record, using the buck converter as an example.

In order to obtain loss-less zero-voltage switching at a constant switching frequency, the common transistor-diode pair is replaced with composite, current bidirectional switches S and S' (when one switch is ON the other is OFF and vice versa) realized in practice with MOSFET transistors. MOSFET switches include an anti-parallel "body" diode and a parasitic drain-to-source capacitor, thus they can be modeled as ideal switches S and S' with a diode and capacitor in parallel as in FIGS. 12a–d. The total switching cycle is broken down into 4 intervals by proper drive timing of the two switches S and S' as shown in FIG. 13. Note that with two controllable switches, two well defined transition intervals are introduced during which both switches are OFF. The first transition interval ($t_N$ in FIG. 13), starting when switch S is turning OFF (as in FIG. 12a) is also known as the "natural" transition ($DT_S$ to $D'T_S$ transition, or simply D to D' transition, where D'=1–D), since just by turning OFF the switch S, the naturally positive inductor current (represented by the current source on FIG. 12a) charges the parasitic capacitor $C_S$ of switch S and discharges parasitic capacitor $C'_S$ of switch S' until capacitor $C'_S$ is fully discharged at which time the body diode of switch S' clamps the voltage at zero and prevents reverse charging of capacitor $C'_S$ of switch S'. At that instance, the switch S' can be turned ON with zero switching losses (FIG. 12b), since the charge of $C'_S$ was already relocated to capacitance $C_S$ of the switch S (charged to $V_g$). Now in order to perform the reverse process during the D' to D transition, the reversal, that is a negative inductor current is needed. The simplest method to accomplish this is to design the output inductor to have a large ripple current, such that its peak-to-peak ripple current is at least 2.5 to 3 times the maximum DC load current. As seen in the inductor current waveform in FIG. 13, the instantaneous inductor current will at some point reverse direction (see FIG. 12c) and look like a negative current source with magnitude $I_N$. Just before the end of complementary interval D' the switch S' is turned OFF initiating the so-called "forced" transition (since the inductor current was intentionally forced by the circuit design to become negative). During this forced transition interval ($t_F$ in FIG. 13) the opposite occurs: this negative inductor current charges capacitor $C'_S$ of switch S' and discharges capacitor $C_S$ of switch S until its voltage $V_S$ reaches zero. At that instant body diode clamps the voltage on switch S to zero making it possible for switch S to turn ON at zero voltage in a loss-less manner. Hence recycling of the charge stored in the parasitic capacitors $C_S$ and $C'_S$ is provided instead of being dissipated each cycle as in "hard-switching".

Even though loss-less switching can be achieved in this very simple manner, and the voltage stresses on the switches are the same as in a basic PWM converter without soft switching, the big disadvantage is that the magnitude of the output inductor ripple current must be at least more than two times greater than the maximum DC load current in order to achieve the soft switching for all operating conditions. Clearly, this soft switching method suffers from the need to create a large ripple current so that a negative instantaneous inductor current is obtained before the end of $D'T_S$ interval in order to accomplish the forced transition. This, in turn, increases the conduction losses and thus diminishes the savings obtained by reduced switching losses. In addition, an increased output capacitor size is needed to absorb this large ripple current and to reduce the output ripple voltage.

An alternative soft switching method which eliminates the need for a large inductor ripple current was proposed by A. Pietkiewicz, S. Cuk, and M. Brkovic in a U.S. Pat. No. 5,539,630 "Soft-Switching Converter DC-to-DC Isolated with Voltage Bi-directional Switches on the Secondary Side of an Isolation Transformer" for bridge type converters. In their soft switching half-bridge converter, the primary, high voltage switching transition is aided by the DC load current reflected to the primary and hence does not need any ripple current to implement soft switching on the primary side. This method, however, requires two voltage bi-directional switches on the secondary side (each implemented by a series connection of a MOSFET transistor and a diode), which are, due to higher voltage drops and excessive conduction losses, not well suited for low output DC voltage applications.

A large number of various resonant converters and their derivatives, such as quasi-resonant and multi-resonant converters, have been proposed in the prior art. A resonant converter is a power converter in which one or more switching waveforms (either switch-voltage or switch-current) is distorted into sinusoidal ringing waveform, with either zero-voltage or zero-current crossing, which enables a corresponding zero-voltage or zero-current switching, thereby reducing switching losses. Even though these resonant converters are effective in reducing switching losses, the very nature of their operation substantially increases either RMS currents or voltage stresses on the devices, and hence ultimately increases conduction losses thereby diminishing savings due to reduced switching losses.

From the above review, it is clear that a new soft switching method is needed which reduces the switching losses without introducing all the other undesirable features associated with prior art soft switching methods and thereby preserves the high overall efficiency. This invention introduces such novel soft-switching methods, which despite their simplicity, requiring only proper drive sequence and timing of the switching devices to result in nearly complete elimination of the switching losses. Furthermore, such low switching loss is maintained throughout the whole duty ratio operating range.

Although much progress has been made in the past, two fundamental problems needed to be solved before further substantial improvements in efficiency and size reductions could be made:

1. Presently, switching DC-to-DC converters utilize magnetic components with a large air-gap in order to avoid saturation due to DC currents in their windings and the presence of DC flux. Large loss of inductance is compensated either by an increase of the switching frequency or by an increase of magnetic core size, or both, with consequent direct reduction of efficiency and increase of the magnetic core and consequently the converter size and weight. A converter with a new magnetic circuit is needed that will eliminate DC flux in the core and thus enable magnetics to be built on a ferromagnetic core without any air-gap and without any wasteful DC energy storage. In that case, the ferromagnetic material will be fully utilized in its ability to generate large inductances and effectively provide filtering, even with small size magnetics and at moderate switching frequencies.

2. A number of soft switching methods proposed in the past, while producing beneficial zero voltage switching and reduction of switching losses, typically suffer from increase of conduction losses, or significantly higher voltage or current stresses on the devices compared to their Pulse Width Modulation (PWM) drive, thus ultimately resulting in diminished savings. Therefore, soft switching methods are needed without such detrimental side loss mechanisms.

Novel DC Transformer Soft-switching Converter and Isolated DC Transformer Soft-switching Converter described below successfully solve both of the above problems.

SUMMARY OF THE INVENTION

A primary objective of this invention is to provide a soft-switching DC-to-DC converter that, through the use of a new magnetic device, namely a DC Transformer, and the novel soft-switching methods, achieves simultaneously high efficiency, high overload capability, small size and weight, low input and output ripple currents and low EMI noise.

Another objective is to provide a soft-switching DC-to-DC converter using a special magnetic device, a DC Transformer, which combines all magnetic components of the converter onto a single magnetic core to enable zero total DC-ampere-turns, zero DC flux and hence no air-gap in the magnetic core. Conventional separate inductors or Coupled-inductors and Integrated Magnetic structures have large DC flux and thus need to include a large air-gap to prevent saturation of the magnetic core with consequent large loss of inductance and corresponding performance degradation. This DC Transformer without an air-gap in its magnetic path, has high DC output current overload capability, small size and weight, and provides desirable ripple-free DC input and DC load currents. The DC stored energy is also reduced to zero leading to corresponding increase in efficiency.

Yet another objective is to provide further increase in efficiency and reduction of the size of a DC-to-DC switching converter through the use of three novel soft-switching methods. All three novel soft-switching methods are distinguished by unique performance characteristic not present in any of the prior-art switching converters: zero-voltage switching and loss elimination is effective for any operating point, i.e., any duty ratio D. This, in turn, leads to highest efficiency over the wide input voltage range in regulated power supply applications. Two of the novel soft-switching techniques are applicable to the non-isolated converter version and are designated as "symmetrical" and "asymmetrical" soft switching, with only timing adjustments of the drives for the three current bidirectional switches and one voltage bidirectional switch (all four could be MOSFET-like semiconductor switches) providing substantial switching loss reduction. The third novel soft-switching method implemented in the isolated converter version, requires only proper drive sequence and timing of the switching devices and results in nearly complete elimination of switching losses over entire operating range. The leakage inductance of the isolation transformer is only used to further enhance already low-loss soft-switching operation.

These and other objectives are achieved in a DC Transformer soft-switching converter having input, middle and output inductor windings placed on a common magnetic core to form an effective non-isolated DC Transformer.

The standard AC voltage test is then performed to determine the ends of the DC Transformer windings at which AC voltages are in phase, and these ends, designated as dot-marked ends, are connected as follows: input inductor dot-marked end to the input DC source terminal, output inductor dot-marked end to the output DC load terminal, and the middle inductor dot-marked end to the common input terminal and common output terminal. An input capacitor is connected between unmarked ends of the input inductor and the middle inductor. An input switch periodically connects the unmarked end of input inductor to the common input terminal, and operates in phase with an output switch which connects the unmarked end of output inductor to the common output terminal, i.e., both switches are ON for an interval $DT_S$ and OFF for a complementary switching interval $D'T_S=(1-D)T_S$. A complementary output switch periodically connects the unmarked end of the output inductor to the unmarked end of the middle inductor. A branch comprising the complementary input switch (operating in-phase with the complementary output switch) and an auxiliary capacitor in series is then connected to the converter so that the current through the auxiliary capacitor during complementary interval $D'T_S$ is equal to the sum of the input inductor current and the middle inductor current reduced by the output inductor current, with input inductor and middle inductor currents flowing into their dot-marked ends and output inductor current flowing out of its dot-marked end. The implementation of identical number of turns for all three windings will insure zero total DC-ampere-turns and insure that the DC Transformer, which has no air-gap in its magnetic flux path, will provide high DC overload capability. The foregoing precise connections of the DC Transformer to the remaining switching converter circuitry is necessary for full DC Transformer performance.

Galvanic isolation between the source and the load is required in many practical applications. This is accomplished in another embodiment of the present invention by replacing the middle inductor with an isolation transformer, which provides both galvanic isolation as well as an additional voltage-scaling factor of the output DC voltage equal to the ratio of turns of isolation transformer secondary to its primary number of turns. In addition, a leakage inductance of the isolation transformer further improves the efficiency of the novel soft switching operation of the Isolated DC Transformer Converter.

This Isolated DC Transformer retains all of the properties of its non-isolated DC Transformer counterpart, provided the isolation transformer windings retain the dot marking polarity of the middle inductor winding and provided that the number of turns are chosen as follows: input inductor number of turns equal to transformer primary number of turns, and output inductor number of turns equal to transformer secondary number of turns. This will insure that the total DC ampere-turns are zero and that a new magnetic component, the Isolated DC Transformer which has no air-gap in its magnetic flux path, provides the high DC overload capability. The foregoing precise connection of the Isolated DC Transformer to the remaining switching converter structure is necessary, for full performance of the Isolated DC Transformer.

Another embodiment of the present invention has additional magnetic leg with no windings on it but with proper air-gap to increase the effective leakage inductance of the output inductor winding and thereby reduce the output inductor ripple current.

In yet another embodiments of the present invention, a non-isolated DC Transformer soft-switching converter uses only the drive sequence and timing of MOSFET-like switching devices to accomplish either "symmetrical" or "asymmetrical" soft-switching to completely eliminate the switching losses of the input high voltage switches which dominate the converter's switching losses and substantially reduce the switching losses of the output low-voltage switching devices. The drive sequence and timing is so adjusted as to provide two transition intervals in each switching period $T_S$. The first so-called "natural" transition interval (D to D') in symmetrical soft-switching implementation is initiated when output switch $S_2$ is turned OFF (contrary to the conventional methods in which soft-switching in D to D' transition is initiated by turning OFF first the input switch $S_1$). When the respective voltages of the complementary output switch $S'_2$ and complementary input switch $S'_1$ reduce to zero, these switches are turned ON with ideally zero switching losses. The second transition interval (D' to D), usually called "forced" transition, is initiated when the complementary input switch $S'_1$ is turned OFF. When the voltage of the input switch $S_1$ is reduced to zero, this switch is then turned ON with zero switching losses while the voltage of the output switch $S_2$ is reduced to the level of $-V_g$ (negative input voltage) and then turned ON with significantly reduced switching losses and a symmetrical soft-switching cycle is completed. Both soft switching transitions are independent of the DC load current and dependent only on auxiliary capacitor AC current, thus resulting in equal transition intervals and symmetrical voltage waveforms across said output switch hence termed symmetrical soft switching. In contrast to conventional soft-switching methods, this symmetrical soft-switching is equally effective in eliminating switching losses for any operating duty ratio D.

In the case of asymmetrical soft-switching implementation, the first so-called "natural" transition interval (D to D') is initiated when input switch $S_1$ is turned OFF. When the respective voltages of the complementary output switch and complementary input switch reduce to zero these switches are turned ON with ideally zero switching losses. The second transition interval (D' to D) is obtained in the same way as in the case of symmetrical soft switching thus resulting in zero switching losses of the input switch $S_1$ and significantly reduced switching losses of the output switch $S_2$. D to D' transition is dependent on both the DC load current and said auxiliary capacitor AC current, while the D' to D transition is dependent only on auxiliary capacitor AC current, thus resulting in unequal transition intervals with asymmetrical voltage waveform across said output switch and hence termed asymmetrical soft switching. This asymmetrical soft-switching is just as symmetrical soft-switching equally effective for any operating duty ratio D.

In still another embodiment of the present invention, the novel soft switching method is implemented in the isolated DC Transformer soft-switching converter. Once again, the soft-switching implementation relies only on the proper drive sequence and timing of the three current bi-directional switches and one voltage bi-directional switch to accomplish complete zero-voltage soft-switching of all three current bi-directional switches, and reduced and negligible losses on the voltage bidirectional switch.

As distinct from all other soft-switching methods which include leakage inductance in their operation, this soft-switching method, and in particular its D' to D transition, does not depend on the resonance of the leakage inductance with the parasitic capacitances of the switches to accomplish soft-switching, since D' to D transition depends on the proper drive sequence and timing of the switches and the auxiliary capacitor AC ripple current only, and not on any particular value of the leakage inductance. Resonance of the leakage inductance is effectively prevented by having the output switch open during that D' to D transition interval.

However, the presence of the leakage inductance in this new soft-switching operation helps to further improve the soft-switching performance through:

a) reduction of the losses due to the reverse recovery time of the body diode of the complementary output switch;

b) limiting switching losses to hard-switching losses of the output switch only and eliminating hard-switching losses of the complementary output switch;

c) the reduction of the D to D' transition from two-subintervals (present in both symmetrical and asymmetrical soft-switching of the non-isolated converter) to a single interval with a fast voltage rise on the input switch $S_1$, thus making this transition considerably shorter than in either symmetrical or asymmetrical soft-switching of the non-isolated converter.

Finally, the novel soft-switching operation of the Isolated DC Transformer Converter is ensured for any operating duty ratio D and, thus, is effective for the wide range of input DC voltage change. Similarly, this novel soft-switching operation does not depend on the leakage inductance for its basic operation. Because of this feature, this soft-switching operation is very effective over the wide range of switching frequencies. This, in turn, makes possible to increase the switching frequency and reduce the size accordingly, without the adverse effect on the efficiency. However, to obtain all these benefits, the specific sequence and timing of the drives for all four switches must be implemented.

The drive sequence and timing is so adjusted as to provide two transition intervals in each switching period $T_S$. The first transition interval is initiated by turning-OFF of the input switch. When the respective voltages of the complementary output switch and complementary input switch reduce to zero these switches are turned ON with ideally zero switching losses. This transition interval depends only on DC load current. The second transition interval is initiated when the complementary input switch is turned OFF. When the voltage of the input switch $S_1$ is reduced to zero, this switch is turned ON with zero switching losses while the voltage of the output switch $S_2$ was reduced to the negative voltage level given by $V_g/n$, where $V_g$ is input voltage and n is the isolation transformer step-down ratio, and then turned ON with significantly reduced switching losses. This transition interval depends only on auxiliary capacitor AC current, which is relatively small, hence this transition is longer than D' to D transition.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 2a demonstrates that a pure AC inductor with no DC current component is implemented with no air-gap in its magnetic core material path and FIG. 2b shows the flux linkage vs. current characteristic of the AC inductor of FIG. 2a.

FIG. 4a is a prior-art fly-back converter and FIG. 4b demonstrates that the transformer of the fly-back converter must have an air-gap.

FIG. 5 shows the large reduction of the transformer's magnetizing inductance of the fly-back converter of FIG. 4a due to the needed air-gap in the magnetic core.

FIG. 17b shows the variable duty ratio D provided by electronic control for the regulation of the output DC voltage of the converter in FIG. 17a.

FIG. 19a illustrates that two DC currents of opposing directions result in zero DC flux and FIG. 19b illustrates a magnetic circuit with two windings with opposing DC currents resulting in zero DC flux in the core, while FIG. 19c illustrates how a DC current flowing into a dot-marked end generates positive DC-ampere-turns and positive DC flux. FIG. 19d illustrates how a DC current flowing out of dot-marked end generates negative DC-ampere-turns and negative DC flux.

FIG. 24b is a graph showing operation on the positive part of magnetics material saturation characteristic for the magnetics of FIG. 24a.

FIG. 29a Another embodiment of the DC Transformer of the present invention of FIG. 21 utilizing the DC Transformer with a small air-gap to adjust for zero ripple current in the output inductor and FIG. 29b shows a simplified equivalent magnetic circuit model for the DC Transformer circuit of FIG. 29a, while

FIG. 36a illustrates the preferred embodiment of the present invention showing an isolated converter and an Isolated DC Transformer with zero total DC-ampere-turns in a single-loop magnetic core. FIG. 36c illustrates the actual placement of the windings on the Isolated DC Transformer for the isolated converter of FIG. 36a.

FIG. 37b shows a new symbol of the Isolated DC Transformer model of FIG. 37a.

FIG. 40 illustrates another embodiment with two-MOSFET implementation of the VBS output switch of the converter in FIG. 36a.

FIG. 41 illustrates another embodiment with P-channel MOSFET/diode implementation of the VBS output switch of the converter in FIG. 36a.

FIG. 44a is a graph of the AC voltage and ripple current waveforms for inductor L$_1$ described by $v_{L1}=L_1 di_1/dt$ and FIG. 44b is a graph of the AC voltage and ripple current waveforms for inductor L$_2$ described by $v_{L2}=-L_2 di_2/dt$.

FIG. 45a illustrates the time domain waveform of the sum of input and middle inductor currents of the converter in FIG. 18$_a$, FIG. 45b illustrates the time domain waveform of the output inductor current of the converter in FIG. 18a, FIG. 45c illustrates the total of the three inductors' DC currents of the converter in FIG. 18a, which is equal to zero, and FIG. 45d is a time domain waveform of the three combined ripple currents, while FIG. 45e is a graph of the current in auxiliary capacitor C of the converter in FIG. 18a which is only present during the D'T$_S$ time interval and consist only of an AC ripple component with a negative part I$_N$ at the end of D'T$_S$ time interval.

FIG. 46b illustrates a MOSFET/diode implementation of the same, while

FIG. 63b shows oscilloscope traces with enlarged display of D' to D transition (trailing edge) of the FIG. 63a.

DETAILED DESCRIPTION OF THE INVENTION

Switching Converter and Theory of Operation

Figure 14A:
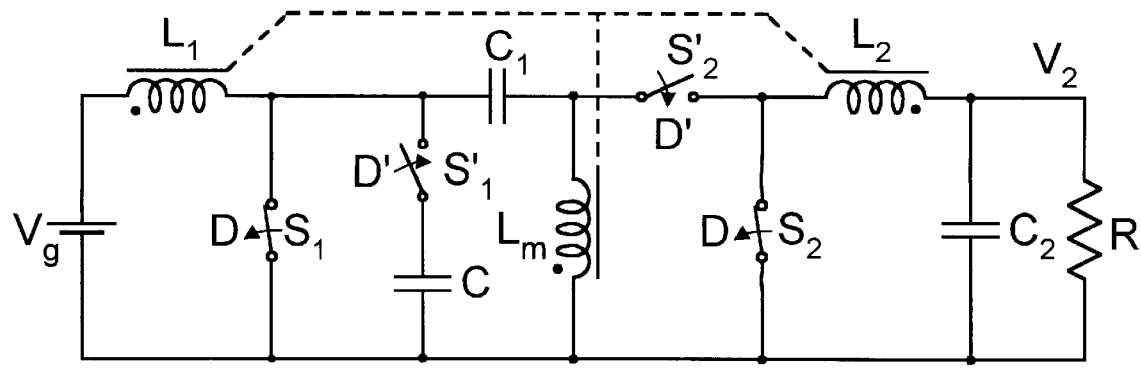
FIG. 14a is a simplified circuit diagram of the present invention using ideal switches as an input switch $S_1$, complementary input switch $S'_1$, an output switch $S_2$ and a complementary output switch $S'_2$.

The unique DC transformer configuration and novel soft-switching feature of the present invention provide together a switching DC-to-DC converter which overcomes the problems of the prior-art converters and results in high efficiency, extreme overload capability, and high power density. However, for purposes of easier understanding, the basic operation of the switching converter is first introduced in FIG. 14a without a detailed novel DC Transformer structure and with four ideal single-pole, single-throw switches, $S_1$ and $S'_1$, and $S_2$ and $S'_2$, where "prime" designates the complementary switch. As seen in FIG. 14a, the $S_1$ and $S_2$ switches are operated in-phase, that is, in this idealized version, they are operated so that both are turned ON at the same time and kept on for time interval $DT_S$ and then turned OFF at the same time and kept OFF for complementary interval $D'T_S$, where $D'=1-D$ is the complementary duty ratio. Complementary switches $S'_1$ and $S'_2$, as the name suggests, are operated in a complementary way, that is out-of-phase with respect to their counter-parts, switches $S_1$ and $S_2$ respectively as also reinforced with the timing diagram of FIG. 14c. Note that this idealized switching will result in "hard-switching" operation of the converter. Nevertheless, this simplified form is sufficient to expose the unique properties of the new converter, which are at the root of its outstanding performance characteristics: high efficiency and high power density with extreme overload capability.

The new converter of FIG. 14a consists of the input inductor $L_1$ and output inductor $L_2$ which maintain the continuity of the input and output currents at all operating conditions and hence result in non-pulsating input and output currents. In addition, in the middle of the converter, there is another so-called middle inductor $L_m$ (given that name for easier distinction and since it is in the middle of the converter). Its role will be explained later after some analysis reveals its properties. The converter also features three capacitors, an input capacitor $C_1$, an auxiliary capacitor C, and an output capacitor $C_2$. Note that the output capacitor $C_2$ is directly across the output voltage and is included only to make a more effective second-order output filter to further reduce the switching ripple. Thus, while capacitor $C_2$ is always included in the practical implementation for ripple voltage reduction, it is not essential for the converter switching operation and is therefore left out from this analysis and in further discussions. This leaves the auxiliary capacitor C and input capacitor $C_1$, which are involved in the switching process.

Figure 15A:
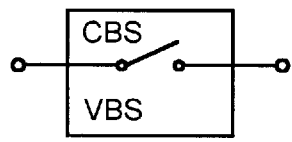
FIG. 15a shows a symbol for the four-quadrant switch, which is both current bidirectional and voltage bidirectional as illustrated in FIG. 15b.
Figure 15B:
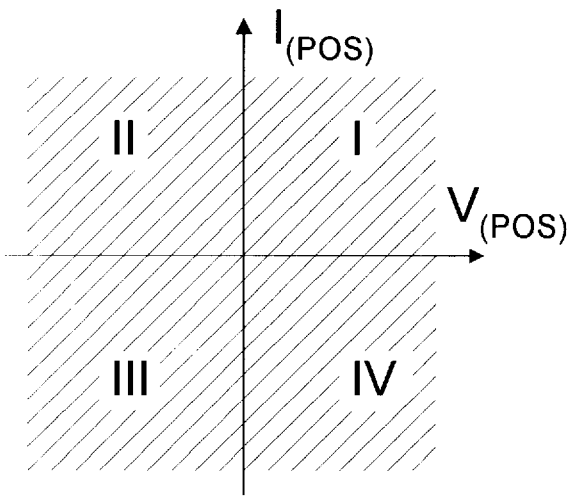
FIG. 15c shows one possible realization of this switch with two MOSFET-like devices.
FIG. 15d shows a symbol for the two-quadrant current bi-directional switch (CBS), which conducts current in either direction but blocks the voltage of only one polarity as illustrated in FIG. 15e.
FIG. 15f shows one possible realization of this switch using a single MOSFET-like device.
FIG. 15g shows a symbol for the two-quadrant voltage bi-directional switch (VBS), which blocks the voltage of either polarity, but conducts the current in only one direction as illustrated in FIG. 15h.
FIG. 15i shows one possible realization of this switch using a single MOSFET-like device in series with rectifier diode.
Figure 15C:
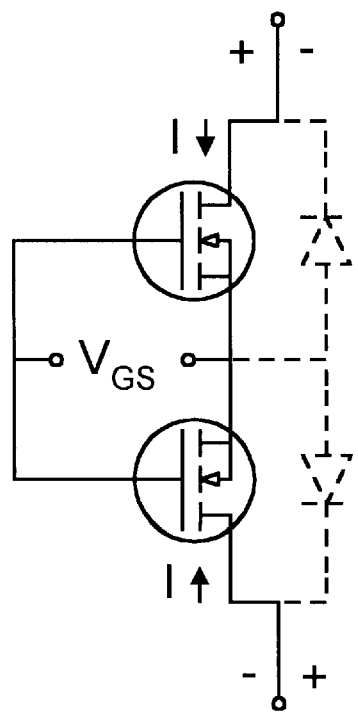

Each of the four ideal switches in FIG. 14a, has the most general property: when the respective switch is closed (turned ON) it is capable of conducting the current of either direction, and when the switch is open (turned OFF) it is capable of blocking the voltage of either polarity, thus it operates as a four-quadrant switch as shown by its current/voltage (I–V) characteristic in FIG. 15b. At the present state of the semiconductor switching technology, the semiconductor four-quadrant switch does not exist as a single component (although that might change in the near future), but instead a composite switch must be used, which is comprised of two or more semiconductor switching devices, such as MOSFET transistors and/or diodes. One such practical realization is shown in FIG. 15c, where two N-channel MOSFET devices are put back-to-back, with their source terminals connected together, and with their gate terminals connected together to form an effective four-quadrant switch. In this particular composite switch realization, only one drive signal imposed between common gate and common source terminals is needed to control the switch. Nevertheless, this is still considerably more complex solution than would be the implementation using single-quadrant semiconductor switches such as bipolar transistor or diode (Current Rectifier) for each of the four switches. However, such simple implementation would result in heavy penalty in the performance, since each switching device would incur heavy switching losses and efficiency would be substantially degraded due to the corresponding "hard-switching" operation of the converter and the inability of the converter to operate in "soft-switching" mode.

In addition to the reduction in size and efficiency improvement due to special magnetic structure utilized in this converter, another concurrent objective of the present invention is to provide a complete elimination of the switching losses on almost all switching devices, with substantial reduction of switching losses on the remaining switching devices through an effective "soft-switching" operation. As will be shown in later section "Reduction of Switching Losses", this requires the special and rather unconventional implementation and operation of electronically controllable semiconductor switches.

The classical "soft-switching" can be implemented by using Current Bidirectional Switches (CBS) for all switches in the converter. Current Bidirectional Switch is depicted with a symbol in FIG. 15d, with a rectangular box around ideal switch symbol marked CBS to clearly delineate the limitation in its operation to the two-quadrant region (quadrants I and IV) as shown in FIG. 15e: when switch is closed it can conduct current in either direction, hence the name current bi-directional switch, and when the switch is open it can block the voltage of only one polarity.

It is interesting to observe, that a single MOSFET switch shown in FIG. 15f, which is normally expected to operate as a single-quadrant switch, actually operates as a two-quadrant switch for two reasons:

a) due to its particular semiconductor implementation, the MOSFET switch has a built-in parasitic (body) diode drawn in dotted lines in FIG. 15f, which provides the path for the current opposite to the Drain-to-Source current;

b) MOSFET switching device is inherently current bi-directional, since channel can conduct the current of either direction. The second feature is, in fact, used in most low voltage applications to eliminate large conduction losses due to the body diode, by directing the current through the low ON-resistance MOSFET conducting channel, which by-passes the body diode conduction in this so called synchronous rectifier implementation of the MOSFET.

The first feature, however, turns out to be the real limitation, since it limits the MOSFET switch operation to block the voltage of only one polarity.

This is the reason why the Voltage Bidirectional Switch (VBS) depicted with the symbol of FIG. 15g, and represented by a two-quadrant characteristic of FIG. 15h in its practical implementation in FIG. 15i consists of a composite switch comprised of a series connection of a MOSFET switch and a current rectifier (diode). Note that the addition of diode provides now the voltage bi-directional feature of the composite switch, but at the same time limits the otherwise current bidirectional feature of the MOSFET to a single current direction. Clearly, such a Voltage Bidirectional Switch (VBS) will have higher conduction losses since it consists of a series connection of two switches, each one having its own conduction losses, with diode dominating total conduction losses.

Another practical implementation of the Voltage Bidirectional Switch was already shown in FIG. 15c with two back-to-back MOSFET switching devices, which is really a true four-quadrant switch since it is simultaneously a Voltage Bidirectional Switch as well as a Current Bidirectional Switch (VBS and CBS) and designated as such with a symbol in FIG. 15a.

Figure 14B:
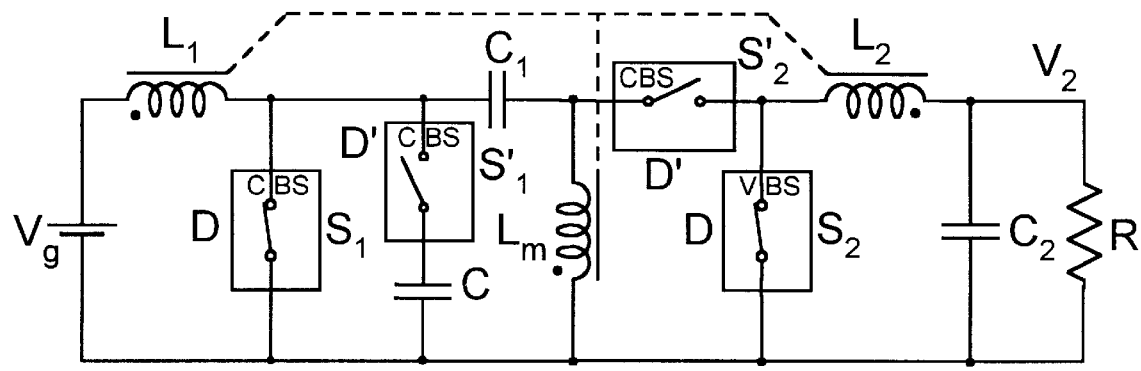
FIG. 14b shows those switches implemented as current bidirectional switches (CBS) and voltage bidirectional switch (VBS), the synchronized operation of which is shown in FIG. 14c in a timing diagram defining the relative states of the ideal switches in the circuit diagram of FIG. 14b.

Thus, in order to simultaneously satisfy the simplest switch implementation with the highest performance through a "soft-switching" operation, the converter of FIG. 14a is realized as shown in FIG. 14b: input switch, complementary input switch and complementary output switch are Current Bidirectional Switches (CBS), but, in a radical departure from any known soft switching implementation the output switch $S_2$ is implemented by Voltage Bi-directional Switch (VBS). This unique "soft-switching" implementation enables unprecedented performance advantages such as complete elimination of the switching losses on all three CBS switching devices for any operating duty ratio D and without the need to employ additional components, such as resonant inductor as required in conventional "soft-switching" methods. Note that this crucial VBS switch is included in all embodiments of the present invention and represented with the symbol of FIG. 15g but could be implemented at present in many different ways, for example as MOSFET/diode composite switch of FIG. 15i or two MOSFETs configuration of FIG. 15c. Note also, that future semiconductor switch research could bring about a single switching device with bidirectional voltage blocking capabilities, which could immediately be implemented as output switch $S_2$ in FIG. 14b further reducing conduction losses, converter size and cost.

Figure 1A:
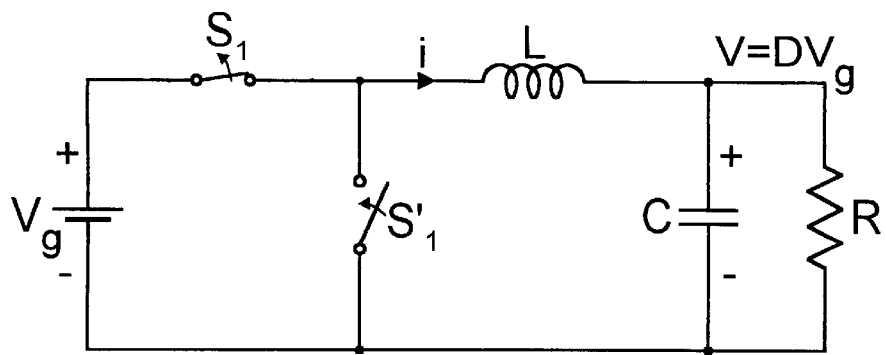
FIG. 1a illustrates prior-art buck converter topology and FIG. 1b illustrates an example of the buck converter, which demonstrates that the inductors in switching DC-to-DC converters have DC-bias current $I_{DC}$ in addition to the triangular AC ripple current component.
Figure 1B:
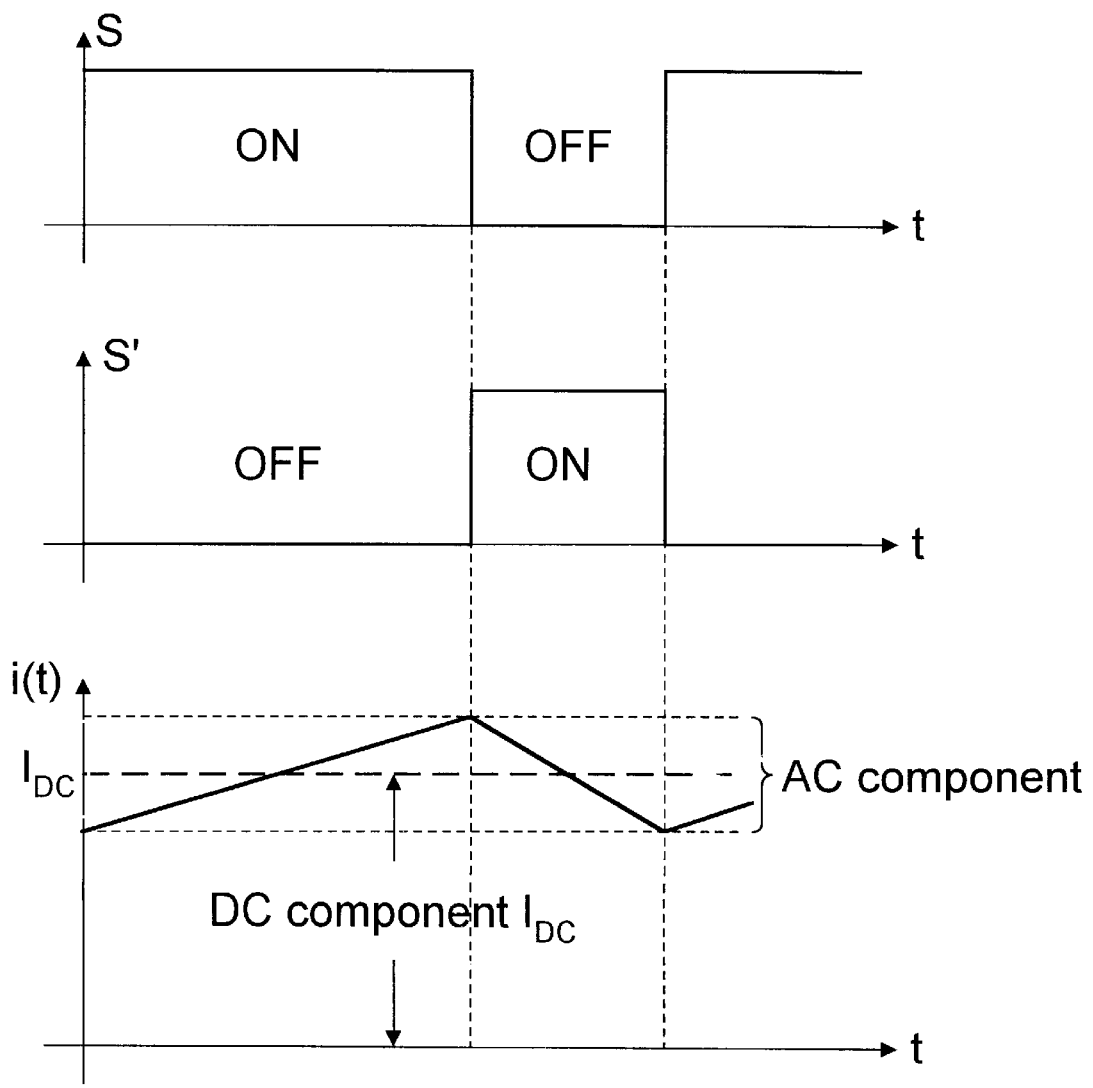
Figure 2A:
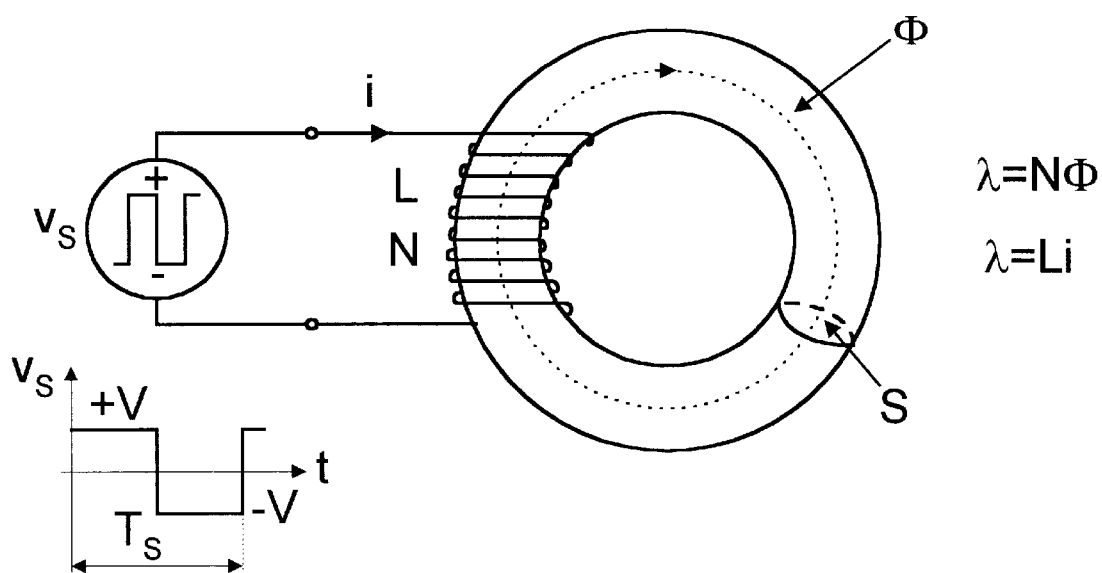
Figure 2B:
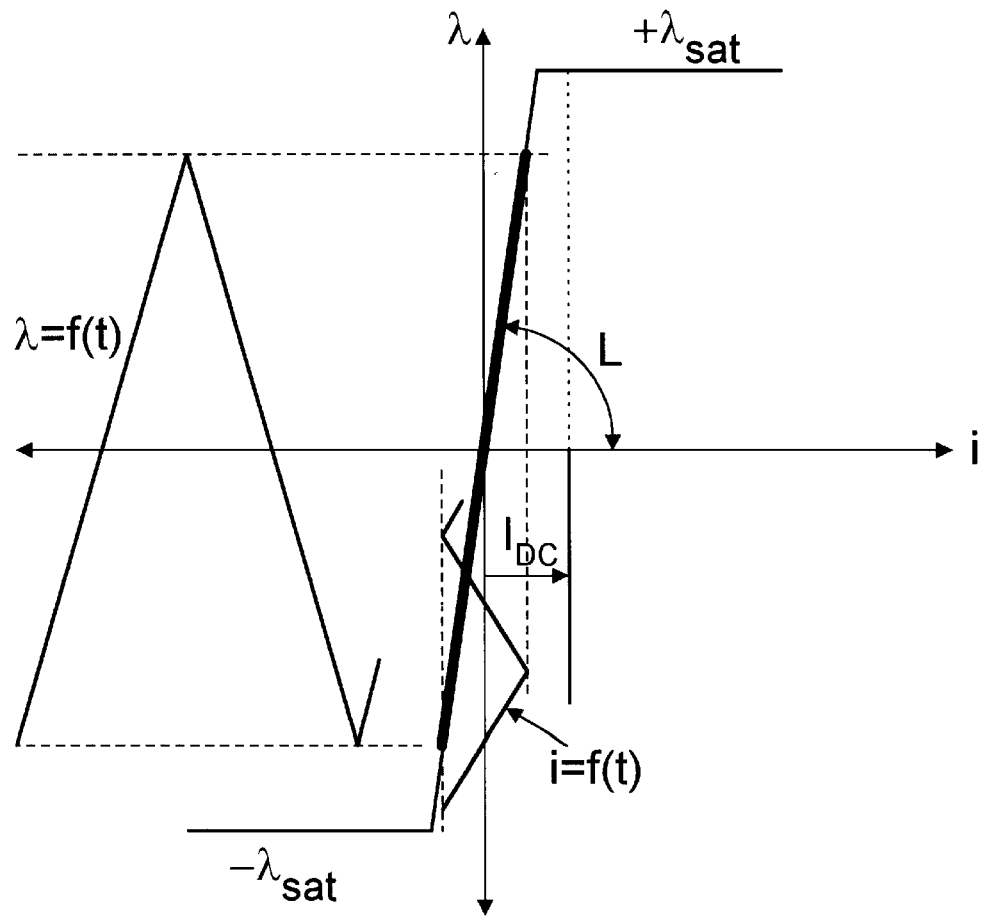
Figure 3A:
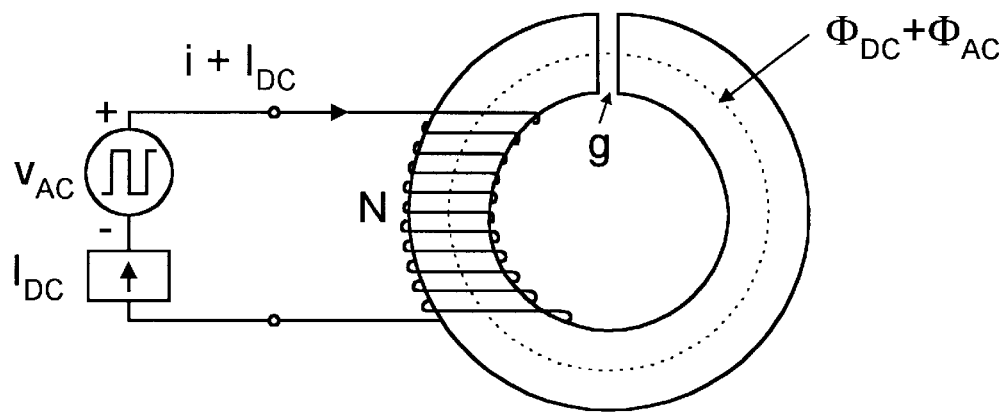
FIG. 3a illustrates that an inductor with a DC-bias current must have an air-gap in the magnetic flux path in order to prevent saturation of the ferromagnetic core material and FIG. 3b shows the large reduction of the un-gapped core inductance L to the inductance $L_g$ with the air-gap g.
Figure 3B:
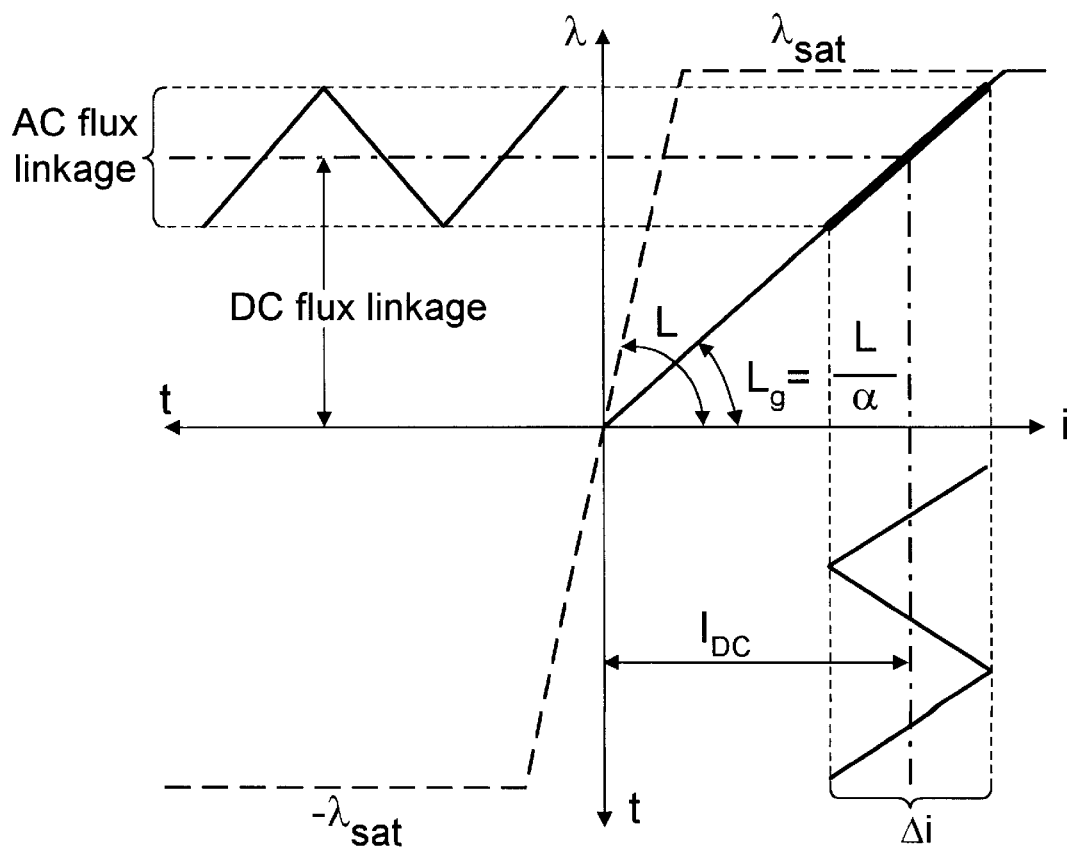

A simple switching converter such as the prior-art buck converter of FIG. 1a was easy to analyze and understand. The new converter even in its simplified form of FIG. 14a is obviously much more complex. As the first step, the existence of steady-state operation must be proved; that is after a number of repetitive switching at constant switching frequency $f_S$, all capacitors in the circuit must be charged to finite DC voltages and all inductors must conduct corresponding finite DC currents. Thus, in order to prove the existence of such a steady state operation, and find the actual DC voltages on capacitors and DC currents in inductors as a function of the steady-state duty ratio D, the input voltage $V_g$, and DC load current $I_2$, the state-space averaging method is employed as described in more details in the book "Advances in Switched-Mode Power Conversion", vol. I, vol. II, and vol. III, by S. Cuk and R. D. Middlebrook, or in the technical paper, "A General Unified Approach to Modeling Switching Converter Power Stages", by the same authors and published in Proceedings of Power Electronics Specialists Conference (PESC), June 1976.

The proper mutual coupling of the three inductors windings in FIG. 14a and FIG. 14b is an integral part of the converter and largely responsible for its unique performance. However, for the purpose of calculating steady-state (DC) quantities by use of the state-space averaging method, the actual mutual coupling between the windings is not needed.

Figure 16A:
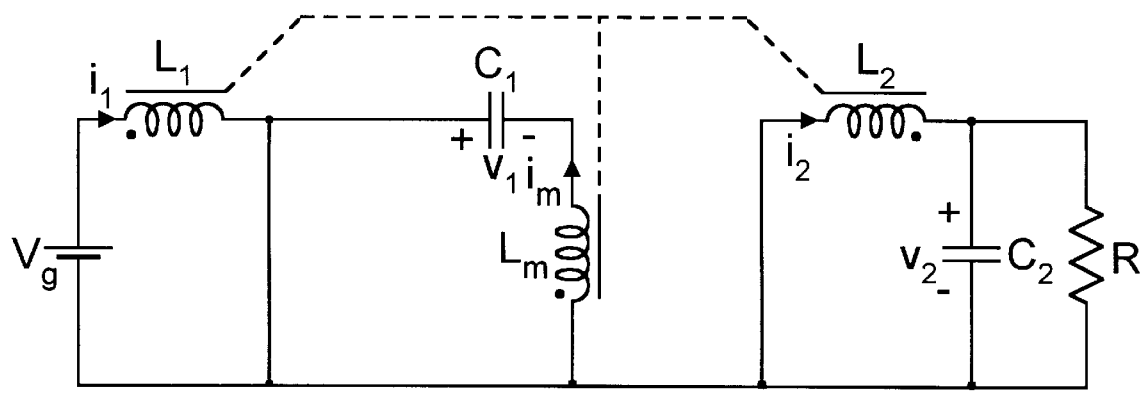
FIG. 16a illustrates the switched network obtained for an interval $DT_S$ for the converter of FIG. 14b
Figure 16B:
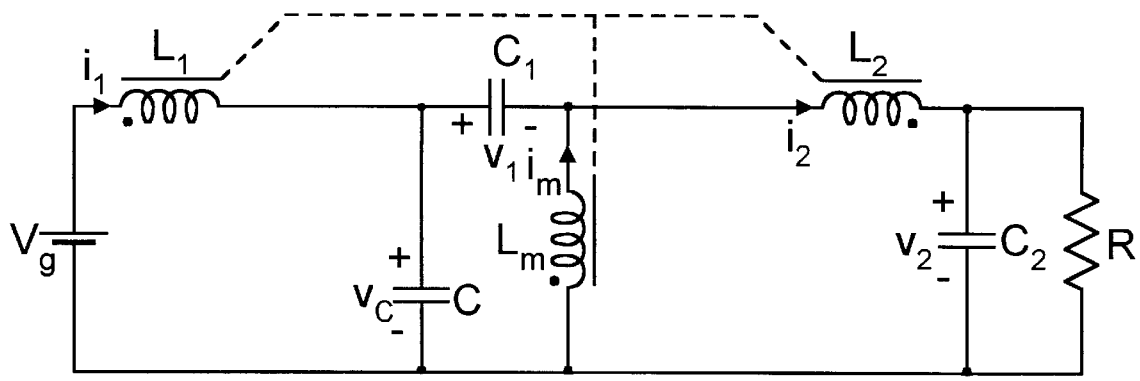
FIG. 16b illustrates the switched network obtained for a complementary interval $D'T_S$ for the converter of FIG. 14b.

The analysis starts with writing the complete state-space equations for the two switched networks obtained: one for the ON time interval $DT_S$ as shown in FIG. 16a and another one for the OFF time interval $D'T_S$ as shown in FIG. 16b. In both switched networks of FIG. 16a and FIG. 16b, the assumed directions of the inductor currents and polarity of the DC voltages on capacitors are as marked. If the actual calculations result in, for example, DC voltages with a negative sign, then the above assumed polarity is not correct and the opposite voltage polarity is the actual capacitor voltage polarity. The state-space equations are then averaged with respective duty ratios D and D' as the weighting factors and the steady-state criterion imposed. The resulting five equations with five unknowns, DC voltages $V_1$, $V_2$, and $V_C$ and DC currents $I_1$ and $I_m$ are then solved in terms of the known quantities, duty ratio D, input voltage $V_g$, and the load current $I_2$ to result in the following steady-state solution:

$$V_1 = V_g \quad V_C = V_g/(1-D) \quad V_2 = DV_g \tag{1}$$

$$I_1 = DI_2 \quad I_m = (1-D)I_2 \tag{2}$$

Figure 16C:
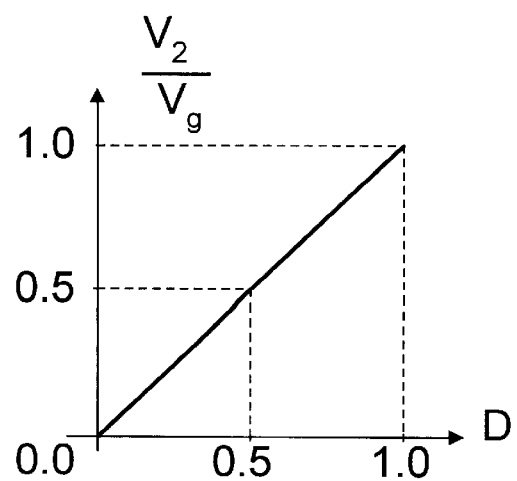
FIG. 16c is a graph showing the linear DC voltage conversion ratio of the present invention of FIG. 14b.

The steady-state solution given by equations (1) and (2) also confirms that this converter does have a finite steady-state, as it was also confirmed by building experimental prototypes and verifying the above steady-state conditions. Note also that since all solutions in (1) and (2) came out with the positive sign, the directions of the inductor currents and polarity of the capacitor voltages assumed as in FIG. 16a and FIG. 16b also correspond to actual direction of inductor currents. The same holds true for the capacitor voltages so that the actual polarity of the capacitor DC voltages is as originally assumed, so that the positive DC voltage source between input terminal and common input terminal results in the positive DC output voltage between the output terminal and common output terminal, where input and output common terminals in this case of the non-isolated converter are connected together to a common point, usually designated as ground. Thus, the converter of FIG. 14b is polarity non-inverting and has the same DC conversion ratio as the conventional buck converter of the prior art, that is $V_2/V_g = D$. This DC conversion ratio is a linear function of duty ratio D as shown in FIG. 16c. In many practical applications the galvanic isolation between DC input voltage source and output DC load is not required and a simpler non-isolated configuration is often preferred. However, in the majority of applications where a non-isolated converter is adequate, positive input to positive output voltage conversion is required, so that the polarity non-inverting feature of the present invention is a distinct advantage. For comparison, the prior art converter of FIG. 4a is the flyback converter which in its basic non-isolated configuration is inherently polarity inverting, thus limiting the scope of its application as a non-isolated converter.

It appears that the present invention has the same limitation as the buck converter, that the converter is only capable of the step-down conversion and could not provide a voltage higher than the input DC voltage. This is, however, not the case, and this constraint will be later removed by the introduction of the isolated extension of the present invention as well as the autotransformer extension.

Figure 17A:
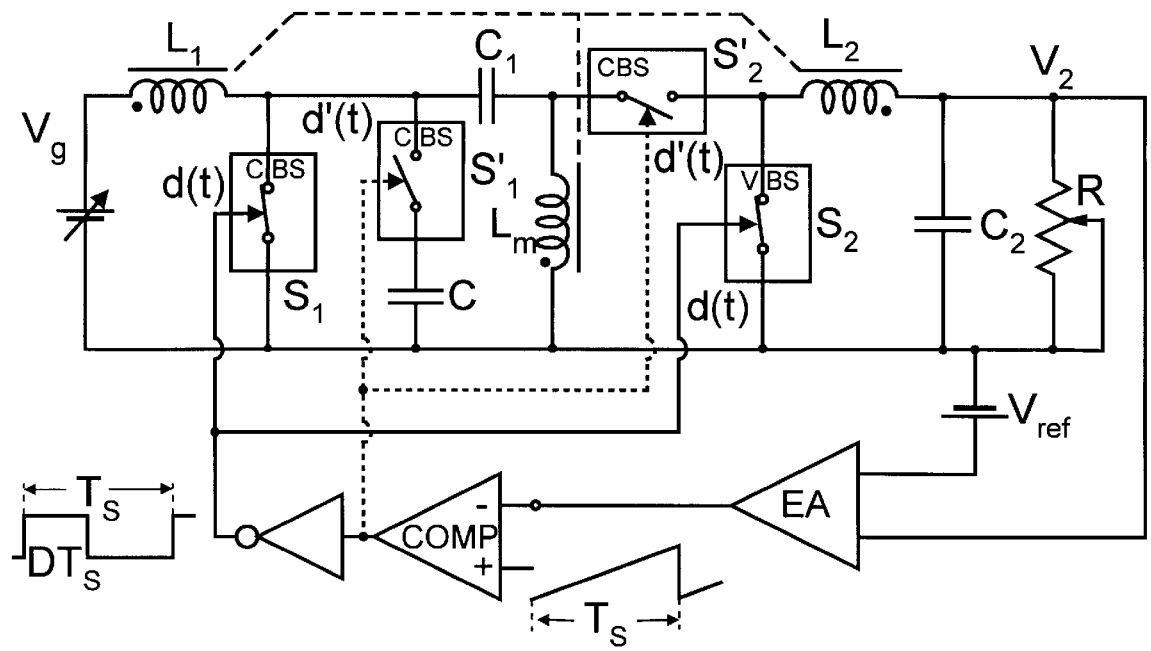
FIG. 17a illustrates a closed loop regulator for the converter of FIG. 14b
Figure 17B:
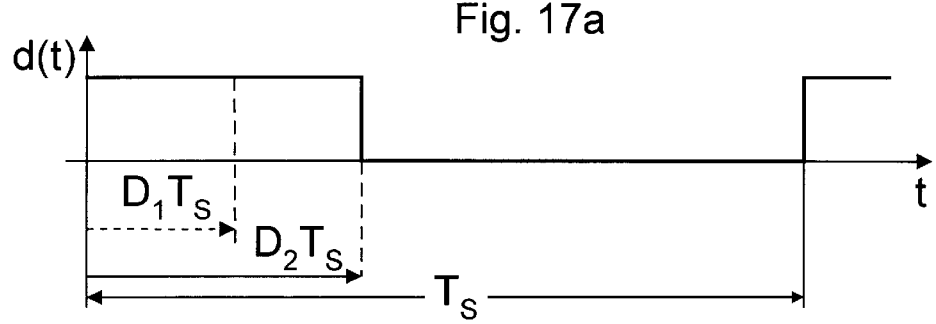

In most practical applications, the output voltage is required to be regulated and kept constant despite a large variation of the input DC source voltage and a large variation of the output DC load current. Both of these variations can be absorbed and the output voltage regulated by closing the conventional feedback control loop around DC-to-DC converter to obtain a regulated DC supply as in FIG. 17a. The feedback control loop modulates the duty ratio D shown in FIG. 17b as needed to provide the regulated output voltage. Thus, it is important that the switching converter operation and its key features are effective over the wide range of operating duty ratio D such as, for example, from D=0.33 to D=0.66 for a 2:1 input DC voltage range. The three fundamental properties of the present invention described below and related to novel magnetics structures are indeed preserved over the full operating range. The fourth fundamental property described in later section on "Reduction of Switching Losses" is related to the novel soft-switching methods and is also preserved over the full operating range.

Three Fundamental Properties

Relationship Among DC Currents of the Three Inductors

From the two DC current equations in (2) one can derive easily a very simple and most remarkable relationship among the three DC inductor currents, which is at the root of the unique performance of this converter. Namely by adding DC currents of the input inductor $I_1$ and the middle inductor $I_m$ from (2) we obtain this key relationship among input inductor, middle inductor and output inductor DC currents:

$$I_1 + I_m = I_2 \tag{3}$$

A quite unexpected result is obtained: the fundamental relationship (3) is independent of the operating duty ratio D, even though both the input inductor DC current $I_1$ and middle inductor DC current $I_m$ are each strongly dependent on operating duty ratio D as per (2). Note also the essential role played by the middle inductor, which provides just the needed duty ratio dependent DC current so that relationship (3) would hold true for any duty ratio D. Without the recognition of this relationship neither a very compact and highly efficient magnetics could be realized nor the natural soft switching improvement could be made.

Figure 17C:
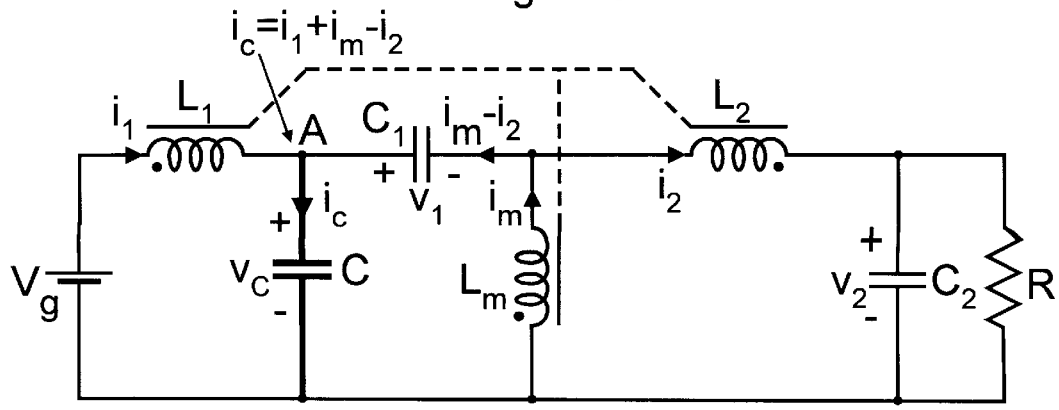
FIG. 17c illustrates the switched network for a complementary interval $D'T_S$ used to establish the fundamental relation among the currents of the three inductors.

This very unique and crucial relationship can also be verified in an alternative and simple way by just inspection of the switched-network during complementary OFF time interval $D'T_S = (1-D)T_S$ displayed in FIG. 17c. The summation of the instantaneous currents (both DC currents and superimposed AC ripple currents) at the node A in FIG. 17c leads to the instantaneous auxiliary capacitor current $i_C(t)$ expressed in terms of the three inductor currents $i_1$, $i_m$ and $i_2$ as:

$$i_C(t) = i_1(t) + i_m(t) - i_2(t) \quad (4)$$

This equation can be further separated into two relationships, one relating the DC components of the inductor currents (which are denoted here and elsewhere in the text with capital letters) and the AC ripple components (which are denoted here and elsewhere in the text with $\Delta$ sign). Thus we have:

$$I_C = I_1 + I_m - I_2 \quad (5)$$

$$\Delta i_C(t) = \Delta i_1(t) + \Delta i_m(t) - \Delta i_2(t) \quad (6)$$

Note, however, that the DC component $I_C$ of the current in auxiliary capacitor C must be zero:

$$I_C = 0 \quad (7)$$

since the auxiliary capacitor C is not connected to the converter circuit during the ON time interval $DT_S$, but only during the OFF time complementary interval $D'T_S = (1-D)T_S$ through the complementary input switch $S'_1$. Thus, the auxiliary capacitor during OFF time interval $D'T_S$ must have a net zero DC current $I_C = 0$. Otherwise, a positive DC current $I_C$, for example, would every cycle charge this capacitor and thereby would keep increasing its DC voltage $V_C$ up to infinity. Yet, the state-space averaging confirms that this capacitor will have a finite DC voltage given by $V_C = V_g/(1-D)$ as in (1). Thus, with (7), equation (5) reduces to the same result as equation (3).

Relationship Among the AC Voltages of the Three Inductors

Figure 18A:
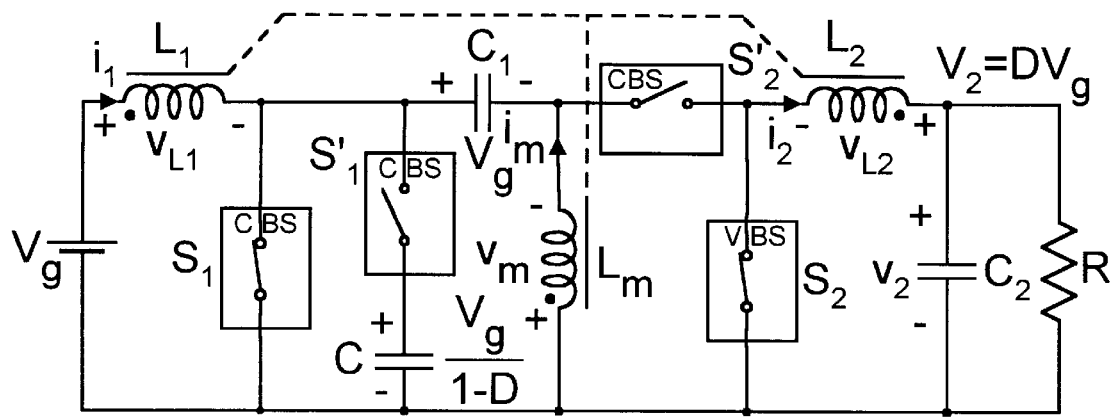
FIG. 18a illustrates the converter of FIG. 14b with directions of the inductor currents and positive polarities of the inductor voltages during interval $DT_S$ and FIG. 18b shows the AC voltages present on the three inductors of FIG. 18a during a complete cycle of $T_S$.
Figure 18B:
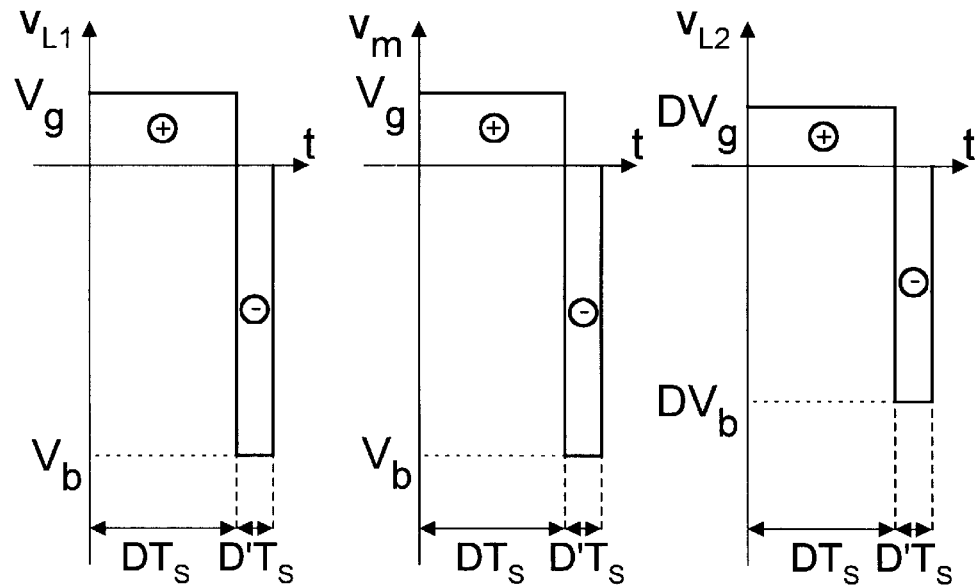

The actual direction of all DC inductor currents is already established by equations (2) and is as in FIG. 18a. Of critical importance for fully understanding the unique performance features of this converter is to also establish the actual polarity of the AC voltages on three inductors. Then the correlation of these actual AC voltages of three inductor windings with the actual directions of their respective DC currents will lead to some really very surprising results. To facilitate the polarity determination of AC voltages on inductors, the DC voltages of all three capacitors are explicitly shown in terms of $V_g$ and duty ratio D in FIG. 18a. The AC voltages on the inductors are designated as $v_{L1}$, $v_{L2}$, and $v_m$ and their positive polarity marked with positive (+) sign as shown in FIG. 18a, which also coincide with their dot-marked designations. The actual time domain voltage waveforms on these inductors can be deduced to be as in FIG. 18b, by simply looking at inductor voltage levels during the time when input switch $S_1$ and output switch $S_2$ are closed ($DT_S$ interval) and when they are open (complementary $D'T_S$ interval) in the schematic of FIG. 18a. Thus one can easily establish that all three inductor AC voltages are in-phase relative to the positive polarity designations marked in FIG. 18a (and the corresponding dot-marked designations). Furthermore, one can ascertain the following important relationship among their magnitudes:

$$v_{L1} = v_m \quad (8)$$

$$v_{L2} = Dv_m \quad (9)$$

The first relationship (8) is also easily seen from the loop consisting of $V_g$, $L_1$, $C_1$, and $L_m$, in which input capacitor $C_1$ and DC voltage source $V_g$ are short for alternating current (AC), which AC-wise puts input inductor $L_1$ in parallel with middle inductor $L_m$ hence they share the identical AC voltage. Furthermore, it is important to observe that this relationship holds true for any operating duty ratio D, since (8) is independent of D.

The relationship (9) can likewise easily be deduced from the voltage waveforms during interval $DT_S$ when input switch $S_1$ and output switch $S_2$ are closed. For $S_1$ closed, $v_{L1} = V_g$; for $S_2$ closed $v_{L2} = DV_g = Dv_{L1}$, hence $v_{L2} = Dv_{L1} = Dv_m$ for interval $D'T_S$. Since both voltages $v_{L1}$ and $v_{L2}$ must be volt-second balanced, their magnitudes in $D'T_S$ interval are respectively $V_b$ and $DV_b$, where $V_b$ is given by:

$$V_b = V_g D/(1-D) \quad (10)$$

DC Currents and AC Voltages Relationship of the Three Inductors

The previous two sections have dealt with two fundamental relationships among the three inductors:

1. Relationship among the magnitudes of the DC currents of the three inductors;
2. Relationship among the magnitudes of the AC voltages of three inductors as well as their relative phase relationships (whether they are in phase or out of phase relative to each other).

Clearly, the relationship between the magnitudes of physical quantities of the same kind, such as between DC currents or between AC voltages, is an obvious and a well-defined relationship. When a relationship is invoked between physical quantities of a different kind, such as between DC currents and AC voltages, as suggested by the subtitle, a more subtle relationship exists. At first, this subtitle may appear ill-defined: what kind of relationship could exist among dislike physical quantities, DC and AC quantities, which are heretofore used in separate DC and AC analysis in circuit theory?

As shown before in equations (1) and (2), the new switching converter imposes not only the magnitude of DC currents in each inductor winding of the converter, but also the actual direction of the DC currents in the inductor windings (the positive directions of DC currents are shown by the arrow in the converter of FIG. 18a). In addition, the switching converter also imposes both the magnitude of the DC voltages on all capacitors as in (2), and magnitude of AC voltages on inductors including the specific polarity of the AC voltages as established by the waveforms in FIG. 18b.

Let us now separate the consideration of the DC currents in the windings from the AC voltages of the same windings placed on a common single-loop magnetic core. For simplicity of the discussion, we will at first limit the considerations to just the input inductor and output inductor in FIG. 18a and assume that they carry DC currents only. The presence of the AC voltage will then be taken into account afterwards. What links the DC currents and their direction in the winding to the DC flux orientation around a straight current carrying conductor goes back to the basic electromagnetic laws and Oersted's discovery in 1820 establishing a direct connection between the constant electric current and magnetism. The orientation of the DC flux established around the conductor is uniquely dependent on the direction of the DC current in the wire. If another straight conductor is placed right adjacent to the first conductor, but carrying the current in opposite direction such as shown in FIG. 19a, the two opposing DC currents produce DC fluxes which cancel each other and result in zero DC flux in the space around the conductors.

The same holds true, if the two conductors are arranged as in FIG. 19b as two windings on a common core made out of ferromagnetic material. Due to much higher permeability of the magnetic material than the air, almost all DC flux generated by the DC current in each winding is contained in the magnetic core, and thus the leakage flux in the air can be neglected in the first approximation. If each winding in FIG. 19b has the same number of turns N and carries the same DC current I but, as a direct analogy to FIG. 19a, the DC currents flow in opposite directions so that the total DC flux in the magnetic core is zero. However, how do we know, what is opposing current direction? Here we can invoke the classical right hand rule. By placing the fingers of the right hand around the winding in the direction of the current flow through the winding turns, the thumb will point the actual direction of the DC flux. Let us now chose the flux direction of the top winding of FIG. 19b to be positive and let us also designate with dot-mark the particular end of this winding into which the current flows. If a current in another winding placed on the same core generates the DC flux in the same direction, then the end of second winding into which the DC current is flowing will also be designated as dot-marked end. Thus, after determining the dot-marked ends of the windings, we can establish the following simple rule:

The DC current flowing into dot-marked end generates positive DC flux, while the DC current flowing out of the dot-marked end generates negative DC flux.

This rule only correlates the direction of the DC currents and the generated DC fluxes, but not their magnitudes. However, the Ampere's Circuital Law gives also quantitative relationship as well as directional relationship. From Ampere's law the DC flux is directly proportional to DC-ampere-turns NI, i.e., the product of number of turns N and DC current I. Thus, equal number of turns N of the two windings of FIG. 19b will result in equal magnitude but opposing direction of generated DC fluxes and in zero DC flux in the core of FIG. 19b.

We can now apply these criteria to the input and output inductor windings of the converter of FIG. 18a, which are shown in FIG. 19c, and FIG. 19d respectively. The input inductor DC current flows into dot-marked end and generates positive DC ampere-turns $N_1I_1$ and results in positive DC flux in the core as seen in FIG. 19c. The output inductor DC current flows out of dot-marked end and thus generates negative DC-ampere-turns $-N_2I_2$ and results in negative DC flux in the core. The same can be observed from reluctance models of FIG. 19c and FIG. 19d. If the two inductor windings are placed on the common core analogous to FIG. 19b, the total DC-ampere-turns are given by:

$$\Sigma NI = NI_1 - NI_2 = -N(1-D)I_2 \quad (11)$$

where (2) was used to eliminate $I_1$ dependence. Clearly from (11) the total DC-ampere-turns are reduced, but still not eliminated. In addition they depend on duty ratio D.

Note that the above analysis was entirely based on DC currents alone and did not yet invoke AC voltages on the inductor windings. However, in order to get the DC-ampere-turns subtraction as described above, the input and output inductors have to be placed on a common core. However, once the two windings are on a common core, since they have AC voltages imposed on them by the converter switching operation, the AC voltages must in addition obey the Faraday's Law of Electromagnetic Induction, imposing an additional requirement of identical AC voltages per turn of each winding. Since to meet the DC flux criteria equal number of turns are already selected for two windings, this would require that the AC voltages of two windings are matching each other in magnitude as well as in polarity relative to the dot-marked ends (hence, are in phase). However, this was already established by three inductor waveforms in FIG. 18a except for a slight mismatch of the output inductor and input inductor AC voltage magnitudes, which will be discussed later.

Figure 20A:
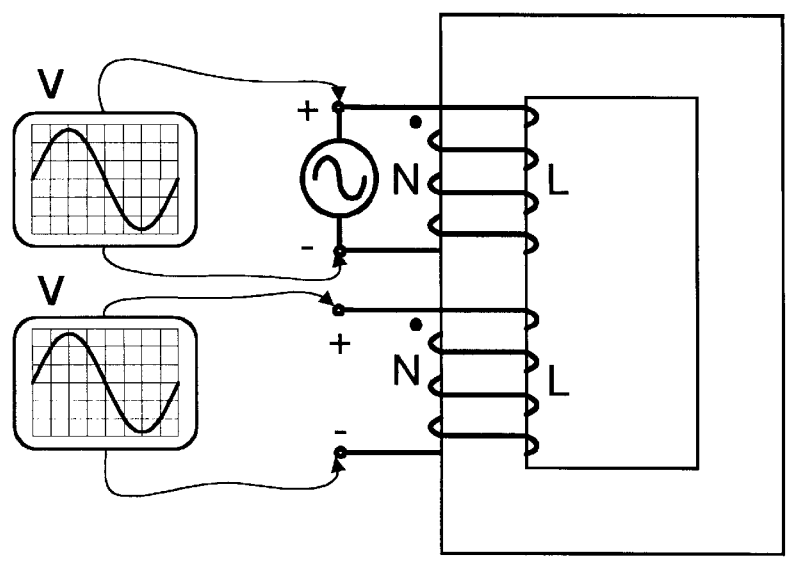
FIG. 20a illustrates the electrical test determining dot-marked ends at which AC voltages are in phase and FIG. 20b illustrates dot-marked end determination for the DC Transformer windings of the present invention of FIG. 21.

The previous right hand rule already determined the dot-marked ends of the windings. We can now confirm those markings by an alternative approach based on simple AC electrical test as per FIG. 20a. One winding in FIG. 20a is excited with an alternating voltage waveform, such as sinusoidal voltage as the simplest test signal, and the voltage of both windings measured at their dot-marked ends. The measured voltages will be in phase confirming dot-marked ends as in FIG. 20a. This now provides the answer for the looked upon correlation suggested in the subtitle between the DC currents and AC voltages of the inductors. This has turned out to be the relationship of the directions of the DC currents relative to the dot-marked ends of the respective windings, and through that directly related to their respective AC voltage polarities. Thus, this AC voltage test can be used to determine dot-marked ends in a simple way and without any reference to right-hand rule.

Figure 20B:
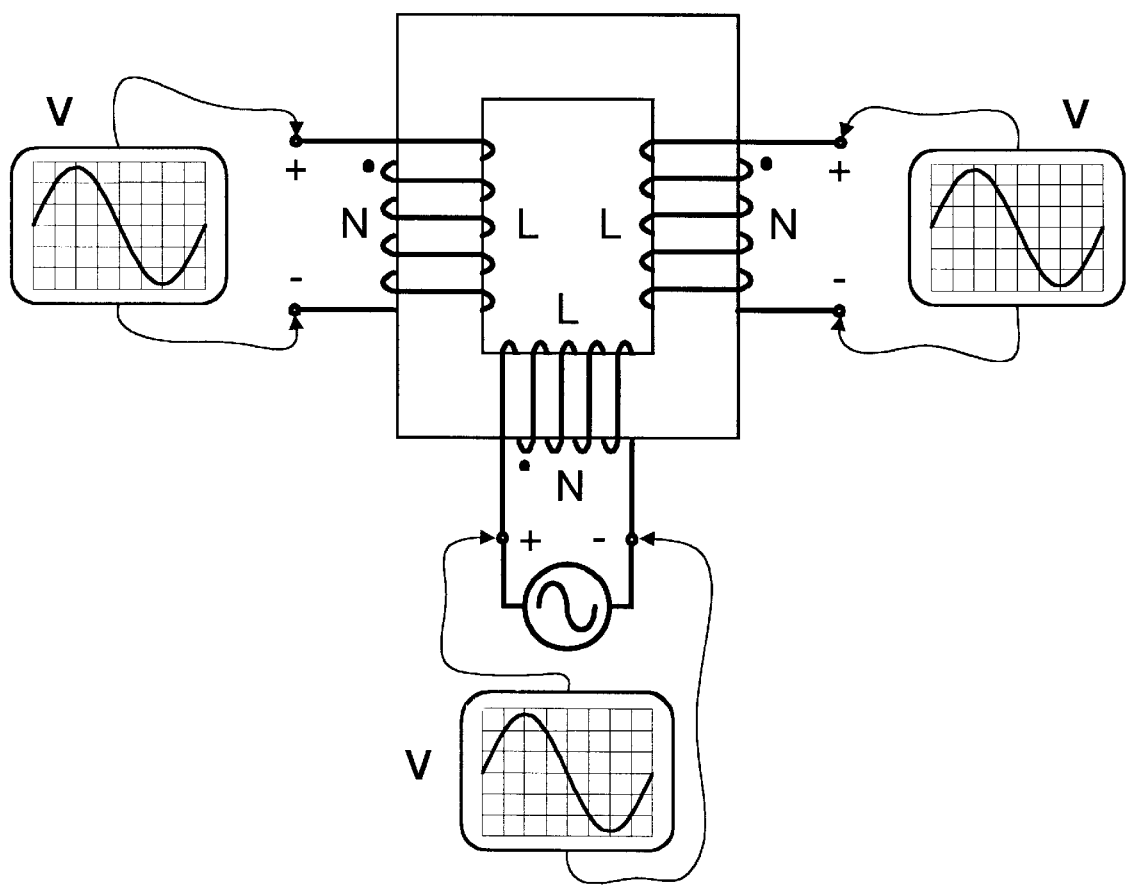

Note, however, that there is still middle inductor winding with its DC current $I_m$ as in FIG. 18a. From (8), the middle inductor has the AC voltage waveform identical to the input inductor and hence when placed on the common core will directly satisfy Faraday's Law. In that case, all three windings of the converter of FIG. 18a with the same number of turns N can be placed on the common core to result in the DC transformer of FIG. 20b. FIG. 20b shows also the AC voltage test to determine the dot-marked ends for all three inductors of FIG. 18a. The middle inductor DC current however, is thus, also flowing into dot-marked end, and from above rule contributes positive DC ampere-turns and from (2) they are equal to:

$$NI_m = N(1-D)I_2 \quad (12)$$

which exactly cancels the negative DC ampere-turns of the combined input inductor and output inductor given by (11) to result in total DC ampere-turns equal to zero and thus in the total DC flux zero in the common magnetic core. Note how the middle inductor DC current, although dependent on the operating duty ratio D supplies just the right DC current to insure that total DC-ampere-turns and total DC flux are zero for any operating duty ratio.

DC TRANSFORMER

Referring back to FIG. 18b, the AC voltages of the input inductor $L_1$ and middle inductor $L_m$ are identical (perfectly matching), while the AC voltage of the output inductor $L_2$ at duty ratio D=0.9 is 90% matching in magnitude, thus slightly mismatched from the other two. As shown earlier all three inductor voltages are also in-phase relative to their positive polarity designation in FIG. 18a, and all three windings have the same number of turns N. Since all three voltages are in-phase and nearly matching in magnitude, thus resulting in nearly matching volts/turn, we can couple them into a single magnetic circuit structure without any air-gap as indicated in FIG. 20b, which forms an entirely new magnetic component, named here DC-to-DC Transformer or simply DC Transformer because of its unique operation when subjected to DC currents in all three windings as explained below.

First Step—Determination of Dot-Marked Ends

From the above discussions, the absolute polarity of the AC voltages of the three inductors is critical. The first step is, therefore, to determine the absolute polarity of these voltages by applying the test AC voltage to the middle inductor and then measuring the AC voltages on all three windings as shown in test set-up of FIG. 20b. Note that the input inductor and output inductor windings are open, that is there are no loads attached to them. The simplest and most common test AC voltage is a sinusoidal voltage source, which will induce sinusoidal AC voltages in the input and output inductor windings. The inductor winding ends at which said ac voltages are in phase are designated as dot-marked ends and are so marked with round dot symbols, and will be considered as a winding end at which referenced AC voltage is positive, and also the DC current flowing into that dot-marked end will be considered of positive direction. The other end of each winding will from hereon be referred to as unmarked end of the respective winding and will be considered as the winding end at which a referenced AC voltage is negative. Note that for simplicity of testing, the number of turns of the input, output and middle inductor windings are chosen to be equal resulting in equal induced voltages in FIG. 20b. The importance of the particular choice of identical number of turns for the operation of the converter is established below.

Second Step—Connection to Input and Output Terminals

The next step is to properly connect the DC Transformer to the terminals: input DC source, output DC load and common terminal, with a special care given to the winding polarities. Note that each winding has two ends, thus, there are eight possible different connections, out of which only two are correct. Thus, in order to make sure that correct winding ends are connected properly, the following simple procedure should be followed: connect the dot-marked end of the input inductor to the positive terminal of input DC voltage source, the dot-marked end of the output inductor to the positive terminal of the output DC load, and finally, the dot-marked end of the middle inductor to the common terminal of the DC input source and common terminal of the output DC load. Clearly, if all these windings are connected in an opposite way (that is, make the same connections as above using the unmarked ends), that connection will be also correct.

The proper connection of the DC Transformer to the input source and output load terminals will insure that the DC-ampere-turns of the input inductor and middle inductor are positive, since their respective DC currents flow into the dot-marked ends of their respective windings, and thus result in positive DC fluxes in the magnetic core. On the other hand, the output inductor DC current flows out of the dot-marked end, and thus will contribute negative DC ampere-turns and result in negative DC flux in the core. Therefore, the potential for the reduction of the DC flux in the magnetic core is established.

Third Step—Choose Equal Number of Turns

Figure 21:
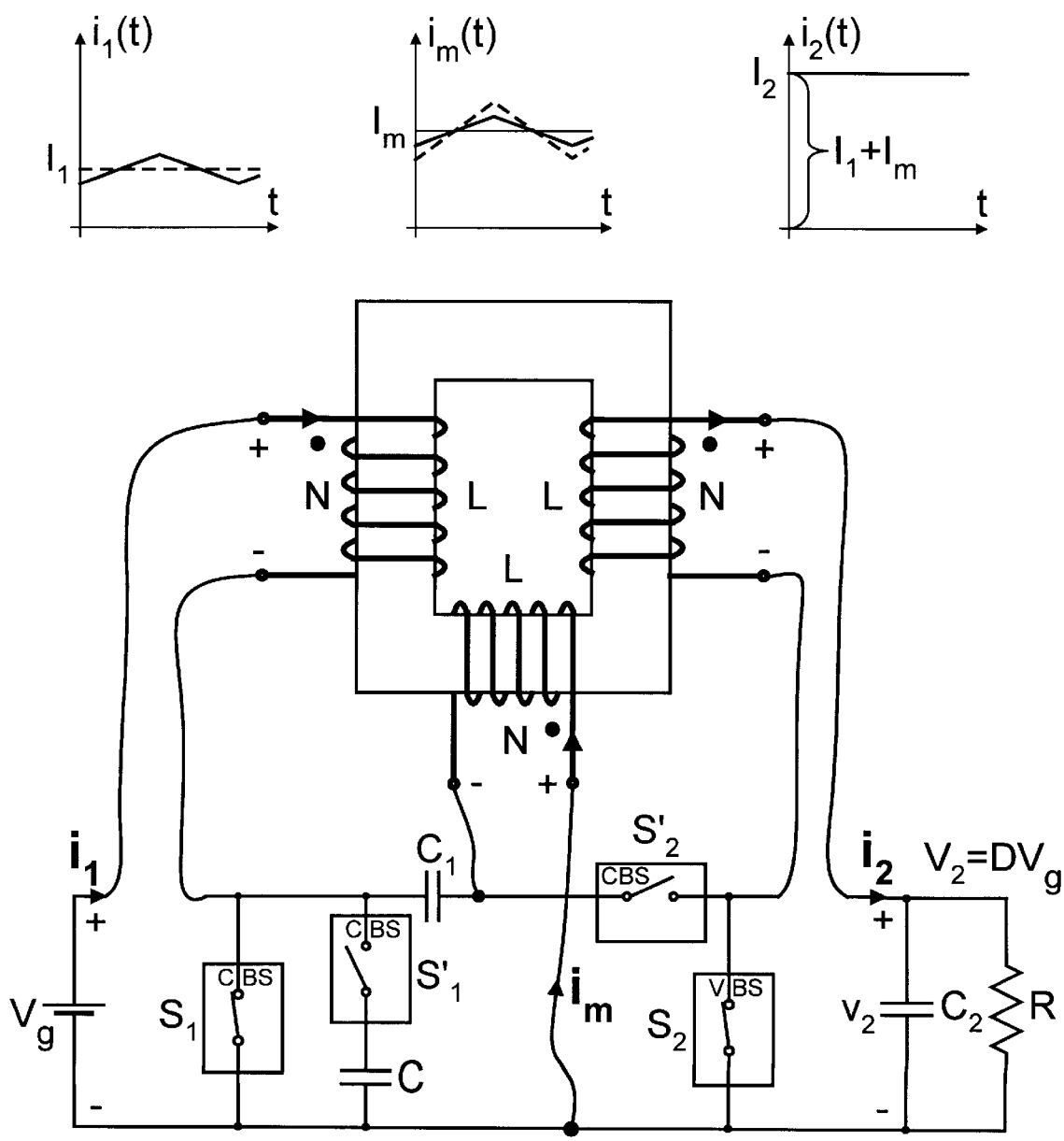
FIG. 21 illustrates a first embodiment of the present invention.

This step is the most crucial, since the first two steps have only established the necessary pre-requisites, but are in themselves not sufficient to guarantee the successful implementation and operation of the DC Transformer into the completed switching converter. This third and crucial requirement is:

The input inductor, the middle inductor and output inductor must have identical number of turns N as shown in the working model of the present invention in FIG. 21 and as given by:

$$N_1 = N_2 = N_m = N \tag{13}$$

Together with the fundamental relationship given by (3), (13) results in:

$$\Sigma NI = N_1 I_1 + N_m I_m - N_2 I_2 = N(I_1 + I_m - I_2) = 0 \tag{14}$$

From (14), the net DC ampere-turns in the single-loop magnetic circuit of the present invention in FIG. 21 is zero, resulting in zero DC flux in the magnetic core and therefore in full utilization of the magnetic material since the air-gap in the flux path is completely eliminated. Note that this complete cancellation of the DC ampere-turns is valid for any operating duty ratio D, since from (3) the relationship (14) is independent of the duty ratio D. In fact, the DC flux cancellation is also valid for any number of turns N, as long as all three windings have the same number of turns N.

Note that the equal number of turns condition (13) simultaneously satisfied two necessary requirements:
1. The net DC-ampere-turns in the magnetic core without air-gap must be zero;
2. The external AC voltages on the three windings of the DC Transformer, imposed by the switching action, should stand in the same ratio as their respective number of turns as per Faraday's Law of electromagnetic induction.

The second condition is clearly readily satisfied between the input inductor and middle inductor which stand in 1:1 voltage ratio (see FIG. 18b) just as their windings turns ratio requires. The output inducto r AC voltage is somewhat mismatched, since for duty ratio D=0.9, for example, the output inductor winding should have 0.9N turns for perfect match. However, the mismatch in the AC voltages by using also N turns for the output inductor winding will be compensated by the proper placement of that inductor in the single-loop magnetic core structure of the DC Transformer as explained below.

Fourth Step—Optimum Placement of DC Transformer Windings

Figure 24A:
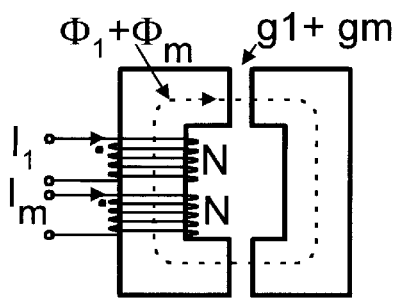
FIG. 24a illustrates an input inductor and a middle inductor for the converter of FIG. 14b combined into one magnetic element which must have an air-gap.
Figure 24B:
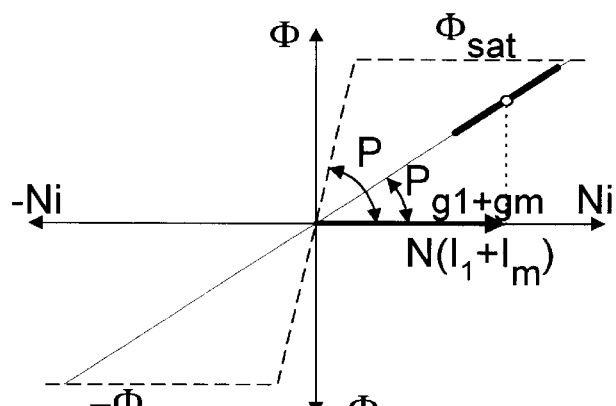
Figure 24C:
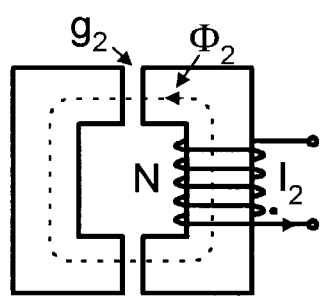
FIG. 24c illustrates that a separate output inductor for the converter of FIG. 14b must have an air-gap and FIG. 24d is a graph showing that the direction of the load current $I_2$ is such that the negative ampere-turns lead to the operation on the negative part of magnetic material saturation characteristic.
Figure 24D:
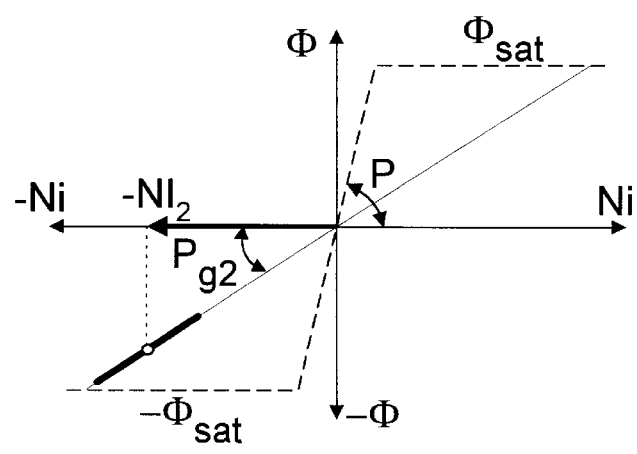
Figure 24E:
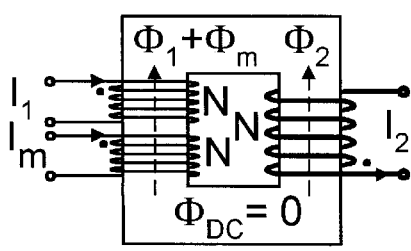
FIG. 24e illustrates another embodiment of the present invention using single-loop magnetic core DC Transformer implementation without any air-gap and FIG. 24f is a graph of the flux vs. ampere-turns characteristic for the DC Transformer of FIG. 24e showing the large slope of the un-gapped material and is centered in the middle of the magnetic material saturation characteristic.

To accommodate the mismatch in their AC voltages, the out put inductor and middle inductor windings are best placed on the opposite legs of a UU-like magnetic core as seen in FIG. 24e so as to obtain the high relative leakage inductance between those two windings and hence reduce the output inductor ripple current. This and several other methods to minimize this ripple current in the output inductor and to even achieve near zero ripple current at one operating duty ratio, are introduced in a later section. Similarly, the input inductor and middle inductor are placed side-by-side as in FIG. 24e also to increase the relative leakage between those two windings. However, since their AC voltages are already perfectly matched, the ripple current in the input inductor will be the same as in the middle inductor. By slightly increasing the number of turns of the input inductor winding the input current ripple can be steered into the middle inductor. This situation is shown as dashed lines in the current diagram of FIG. 21. The amnpere-turns imbalance due to the increased number of turns is very small and can readily be neglected.

Figure 22:
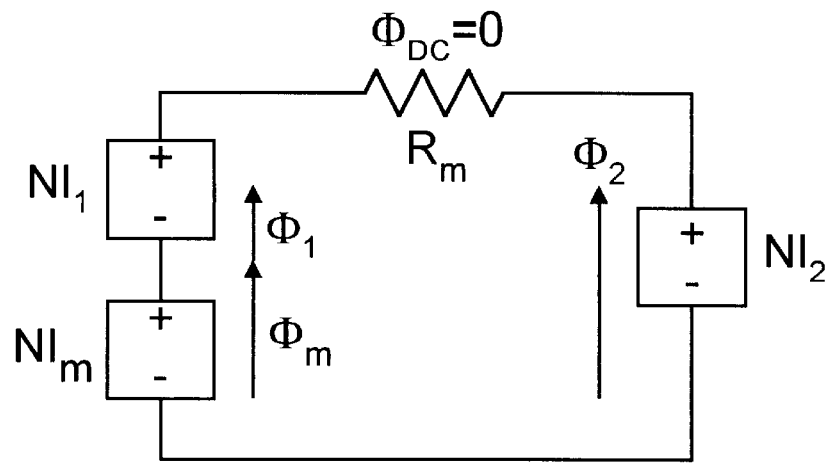
FIG. 22 is a diagram of the DC reluctance model of the DC Transformer in FIG. 21.

The DC reluctance model of the DC Transformer in FIG. 21 is shown in FIG. 22 to lead to zero net DC flux, since positive DC flux generated by input inductor and middle inductor is exactly canceled by the negative DC flux of the output inductor as predicted by (14).

The crucial importance of the recognition of the following two important conditions cannot be overemphasized:
1. All windings must have the same number of turns;
2. Recognition of the critical importance of the directions of the flow of the DC currents in the windings relative to the AC voltage polarity.

Figure 23A:
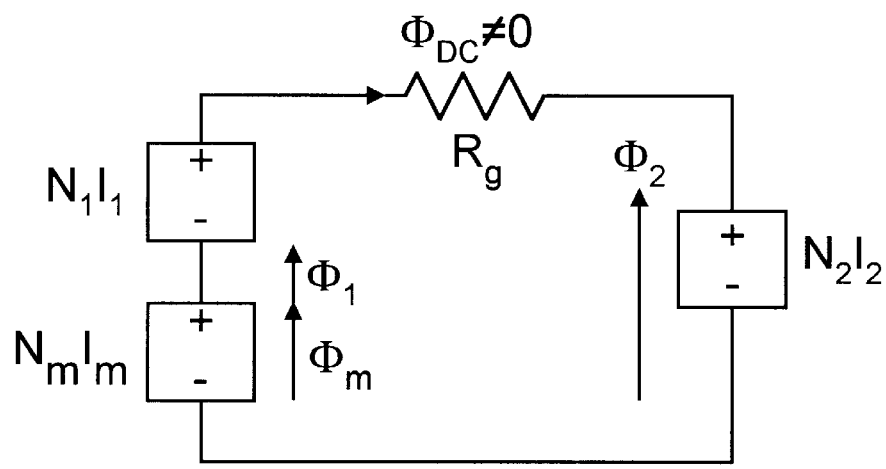
FIG. 23a is a diagram of the DC reluctance model for the case of unequal number of turns of the inductor windings and substantial DC flux in the magnetic core of FIG. 23b which has large air-gap due to the windings' turns mismatch.
Figure 23B:
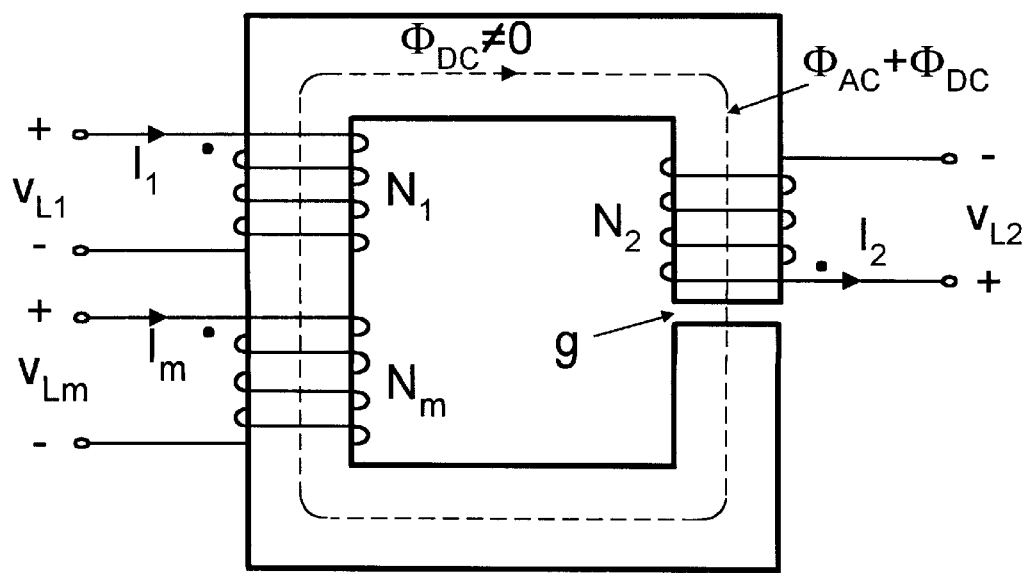

For example, if one were to use different number of turns $N_1$, $N_2$, and $N_m$ for the three inductors, despite the special relationship (3), there will be a potential great mismatch of the DC-ampere-turns as seen in model of FIG. 23a, and a large gap in the magnetic circuit implementation as in FIG. 23b must be used to prevent saturation due to large total DC-ampere-turns. Clearly, such potentially large mismatch in the turns ratio would also lead to a large mismatch of the AC voltages and hence could result in huge ripple currents on all windings making it completely impractical.

Let us now show an alternative way to assemble the DC Transformer step-by-step, as outlined in FIGS. 24a–f. First as in FIG. 24a the inductors $L_1$ and $L_m$ with identical number of turns N, are placed side-by-side into common Coupled-Inductor structure. Since the DC currents $I_1$ and $I_m$ in FIG. 21 are both flowing into the dot-marked ends of their respective windings, their DC-ampere-turns $NI_1$ and $NI_m$ are adding, resulting in the flux vs. ampere-turns characteristic of FIG. 24b, displaying the combined DC flux. Note also that due to the DC currents flowing into the dot-marked ends (positive DC-ampere-turns), the core is biased along the positive-half of the magnetic material saturation characteristic (toward positive saturation end). The corresponding individual air-gaps for each separate winding $g_1$ and $g_m$ are also added to result in a total core air-gap $g_1+g_m$ as shown in the core of FIG. 24a. The separate core for the output inductor $L_2$ is shown to have an air-gap $g_2$ in order to support the total DC-ampere-turns $NI_2$. It is now critically important to observe that the corresponding DC flux in this case will be along the negative-half of the flux vs. ampere-turns magnetics material saturation characteristic. This is because the output inductor DC current $I_2$ is flowing out of the dot-marked end of its winding.

It is now easy to understand why the cores of FIG. 24a and FIG. 24c can be replaced with a single core of the DC Transformer of FIG. 24e without any air-gap. As seen in the combined flux vs. ampere-turn characteristic of FIG. 24f, the positive DC-ampere-turns $N(I_1+I_m)$ exactly cancel the negative DC-ampere-turns $NI_2$ to result in net zero DC flux in the core. Note also that the AC flux excursion will now be along the original steep slope of the characteristic, indicating high permeance of the magnetic core material and high inductance of windings on the magnetic core with no air-gap.

Figure 6A:
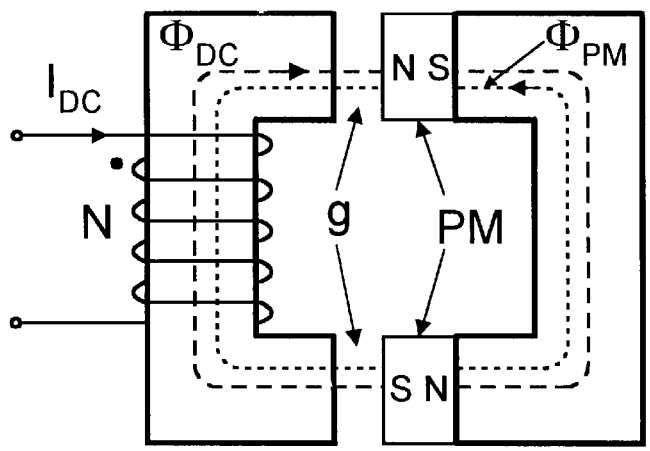
FIG. 6a shows an inductor implemented on a special magnetic core structure which, in addition to the air-gap and ferromagnetic material, has also a small permanent magnet inserted in its flux path in order to provide a fixed reverse bias.
Figure 6B:
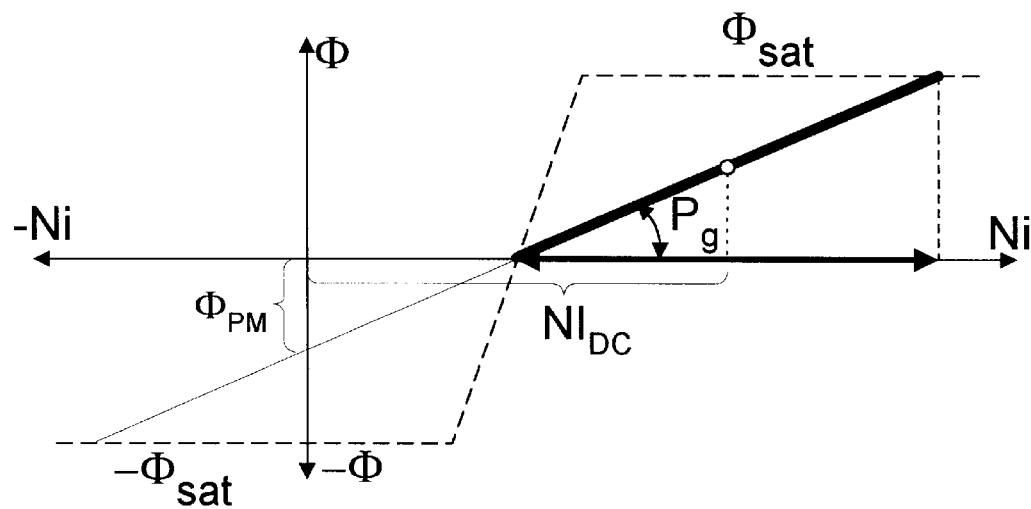
FIG. 6b illustrates the effect of the permanent magnet reverse bias on a positive DC-bias due to high DC current in the winding.
Figure 6C:
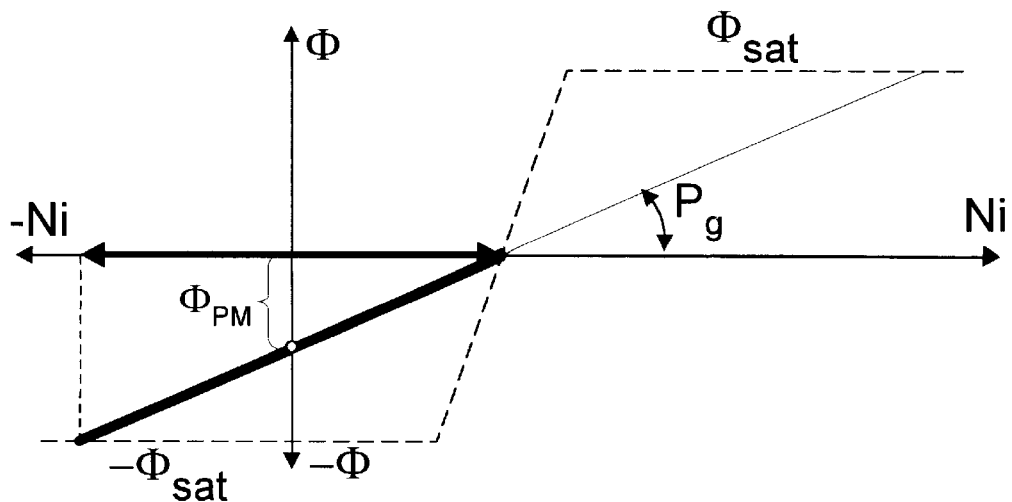
FIG. 6c demonstrates that the flux excursions are constrained to the negative part of the flux saturation characteristic for small or zero DC current in the inductor winding.
Figure 24F:
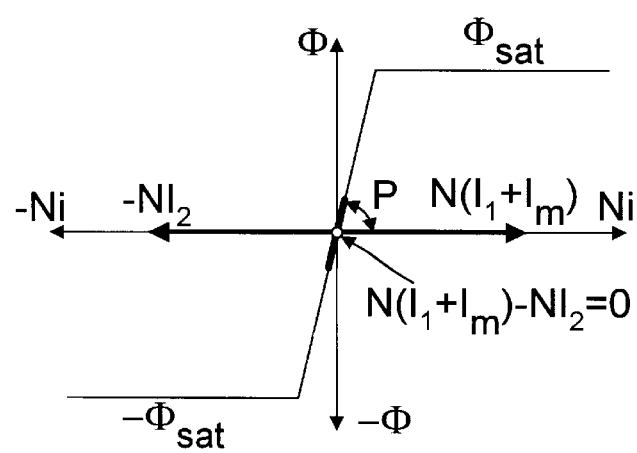

It is now interesting to compare this result with the previous prior-art efforts to reduce the DC flux bias in the core using the permanent magnet inserted in the core structure as was shown in FIG. 6a, FIG. 6b, and FIG. 6c. Note that in that case, the same much reduced winding inductance is obtained due to the still present substantial air-gap. Furthermore this special magnetic core could only support a pre-determined maximum DC current (based on inserted air-gap) and could not handle any amount of overload DC current without saturation. To the contrary, in the DC Transformer case, the maximum permeance of the magnetic core is preserved as seen in FIG. 24f. In addition, theoretically, any amount of the DC overload current could be supported without saturation, since there is an automatic compensation by the windings themselves. In this idealized picture of the single-loop magnetic circuit in which any leakage flux is neglected, the increased DC load current $I_2$ causes proportionally increased DC currents $I_1$ and $I_m$ to compensate for it and to still keep the operation at zero DC-bias and zero DC flux in the core. In reality, the ever present built-in leakage flux will limit the maximum DC overload capability in the DC Transformer in the same manner as it does in an AC transformer. However, experimental data presented in later section indicate that this maximum limit is extremely high.

DC Transformer Model

The magnetic structure of FIG. 21 is justifiably named a DC Transformer because:

1. The absence of the air-gap in the AC transformer indicates that no energy is stored in the magnetic core; similarly the absence of the air-gap in the DC Transformer of FIG. 21 indicates the absence of any DC energy storage. This elimination of DC energy storage is the fundamental reason why the new DC Transformer results simultaneously in substantially reduced size of magnetics, increased efficiency and much increased overload capability.
2. The input inductor winding takes input DC power and converts it through the output inductor into output DC power, much like the AC transformer which absorbs AC input power on the input winding and transforms it into AC output power on the output winding to deliver to AC load.
3. This DC Transformer tolerates large DC currents in all windings without saturation, much like the AC transformer tolerates large AC currents in its windings without saturation.
4. Just as the AC transformer does not require any air-gap for its operation, since the AC ampere-turns of the output winding are opposing the AC ampere-turns of the input winding to result in small magnetizing AC current, the DC Transformer, likewise, results in the cancellation of DC-ampere-turns of all windings and operates without any air-gap.

Figure 25:
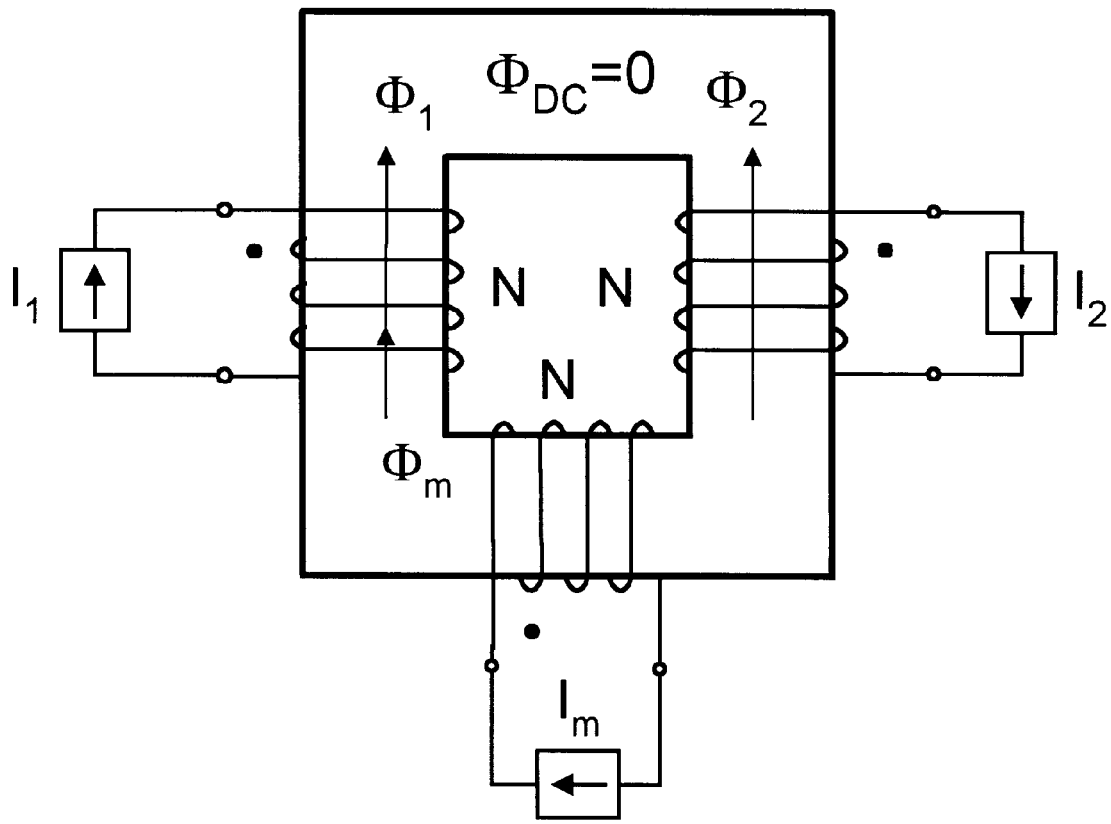
FIG. 25 illustrates a model of the DC Transformer of FIG. 21 with each inductor winding conducting respective DC-bias currents.

The fundamental property of the DC Transformer is once again displayed in FIG. 25 in which each inductor winding is shown excited with the respective DC current source. Together with the designated equal number of turns N, zero DC flux in the core is obtained.

Figure 26:
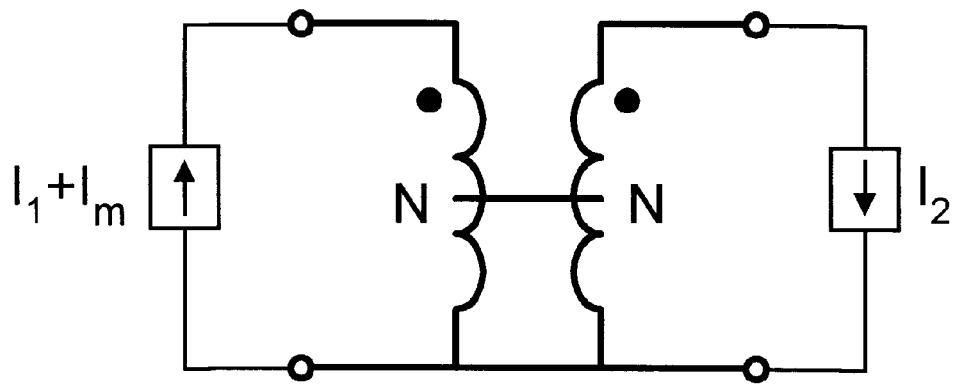
FIG. 26 shows a new symbol of the DC Transformer model of FIG. 25.

This new magnetic component, the DC Transformer, needs also a new symbol, which should reflect its basic property. The symbol should in a simple graphic form remind of its basic function to alert the user of its properties. The symbol of FIG. 26 has an input winding absorbing a DC current of magnitude $I_1+I_m$ and an output winding delivering the DC current $I_2$. The placement of the dots and the directions of these currents is such to lead to DC-ampere-turns cancellation with designated number of turns N. To signify that the DC power is transferred from input to output winding, a straight line through both windings is drawn as in FIG. 26. This also will come in handy to quickly distinguish this DC Transformer symbol from the classical AC transformer symbol. Finally, to indicate the difference with its later isolated counter-part of FIG. 37b and the lack of galvanic isolation, the common (bottom) terminals are connected together.

Alternative Configurations

Note that the fundamental relationship (4) and its consequence (3) will all be maintained even if numerous configuration rearrangements are made to the original converter of FIGS. 14a and 14b. The branch with the series connection of the auxiliary capacitor C and complementary input switch S'$_1$, shown highlighted with heavy lines, can be connected in many different ways as illustrated in FIGS. 27a–l without altering the fundamental properties (3) and (4) and hence having same DC Transformer and converter operation. For example, this branch can be connected in parallel with the middle inductor $L_m$ as in FIG. 27a or in parallel with the input inductor $L_1$, as in FIG. 27b. In both cases, the DC voltage on the auxiliary capacitor C will be changed to the new steady-state value $V_b$ given by (10). Another alternative is to connect this branch between the positive terminal of the input voltage source and the unmarked end of the middle inductor $L_m$, as shown in FIG. 27c. Still two other possibilities are as in FIG. 27d and FIG. 27e.

Figure 27A:
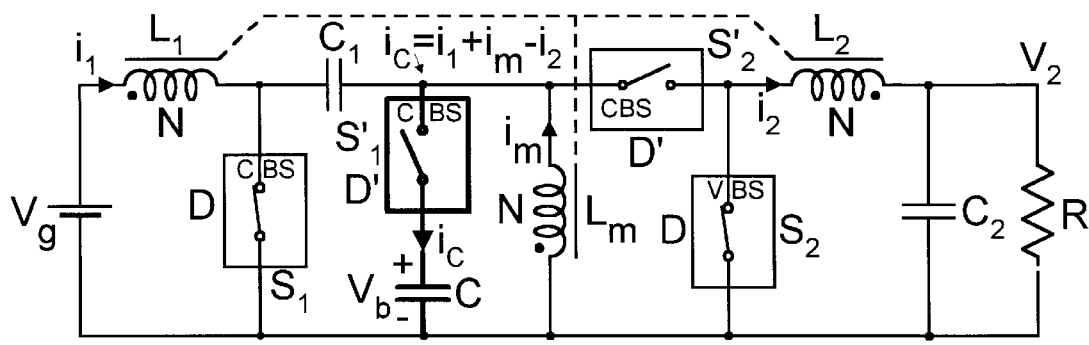
FIGS. 27a–l illustrate twelve equivalent transformations of the present invention shown in FIG. 21, all of which share a common property: the current in auxiliary capacitor C always equals $i_1+i_m-i_2$, where the directions of the three inductor currents are designated in FIG. 21. Note: the branch with the auxiliary capacitor and complementary input switch S'$_1$ is highlighted with heavy lines in each figure.
Figure 27B:
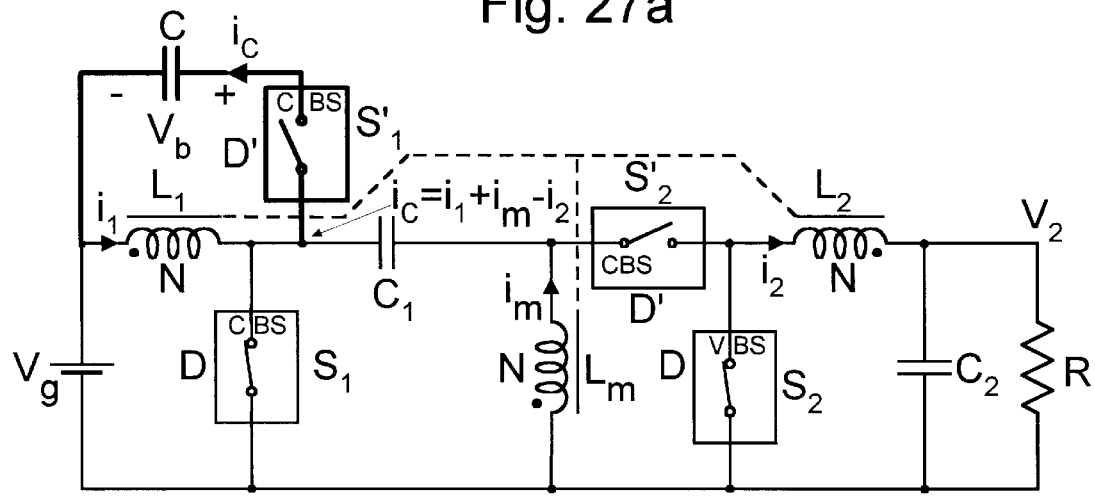
Figure 27C:
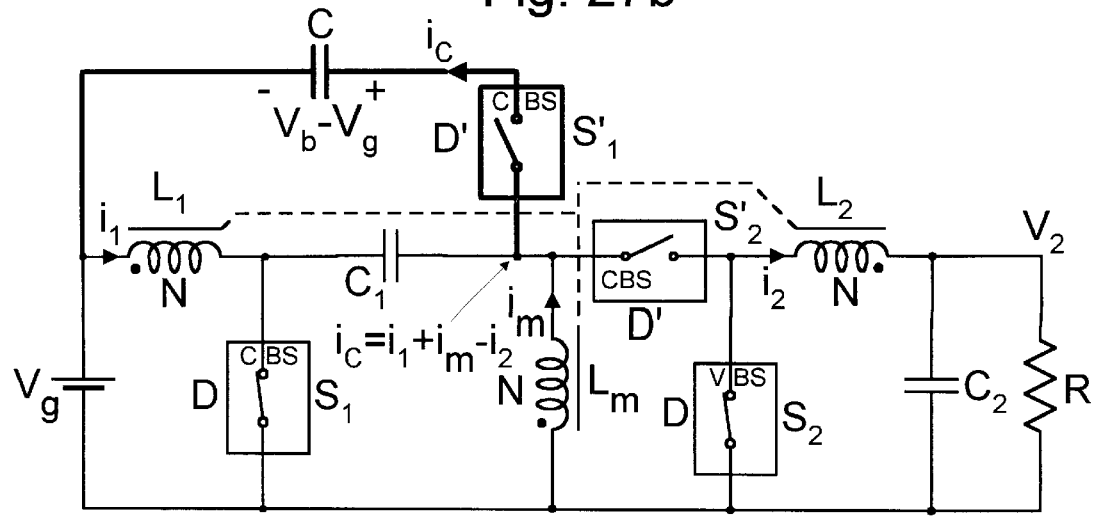
Figure 27D:
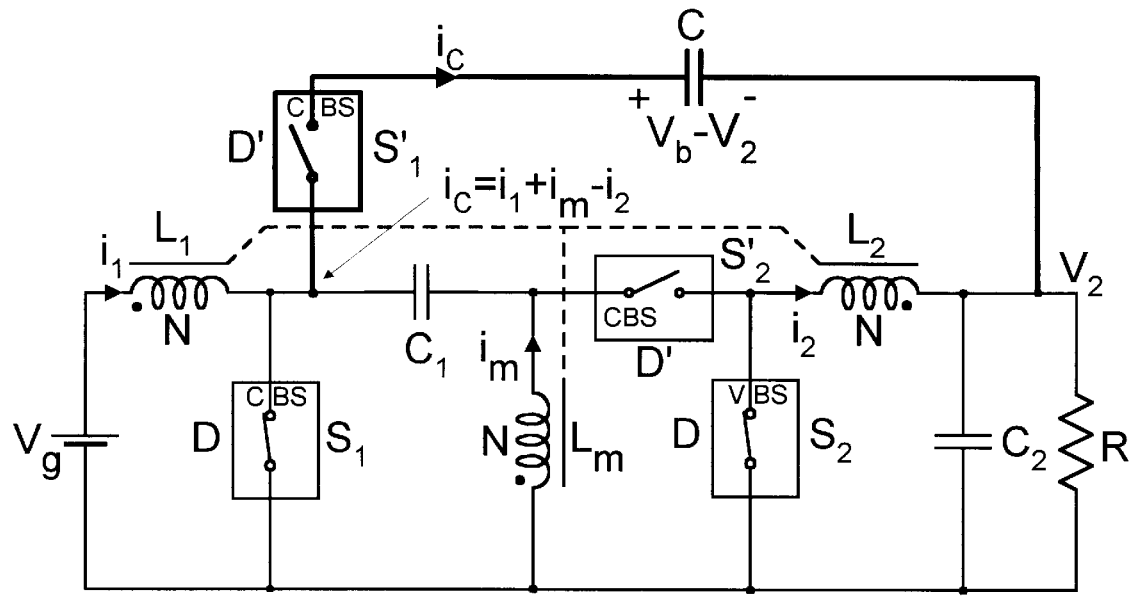
Figure 27E:
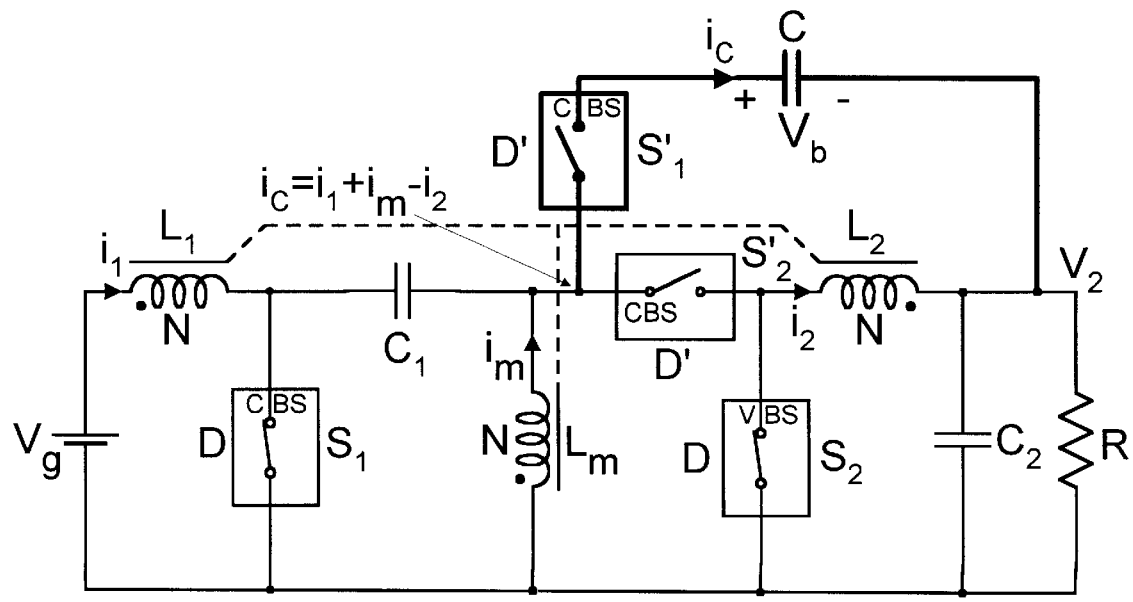
Figure 27F:
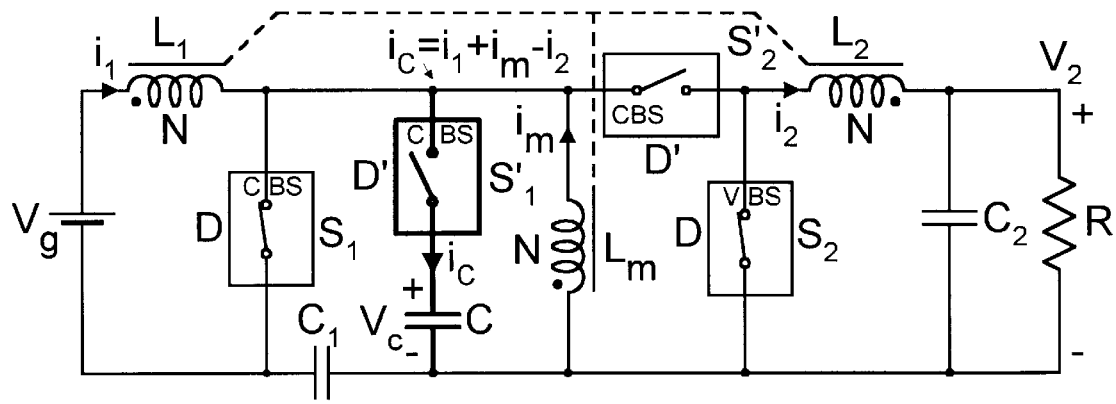

Further modifications can be obtained after moving input capacitor $C_1$ to the bottom return current path as in FIG. 27f. This would have a clear disadvantage that the common ground between input and output is lost and either the source or the load would be floating. Nevertheless, the isolated version obtained from such non-isolated converter would rectify that deficiency, as seen later in section on Isolated DC Transformer switching converter. Then the branch with auxiliary capacitor C and complementary input switch $S'_1$ can be connected in parallel with middle inductor as in FIG. 27f. The advantage of this configuration is that the auxiliary capacitor has reduced DC voltage $V_b$ given by (10), while at the same time, switches $S_1$ and $S'_1$ are in a preferable position for the so-called high-side driver implementation as described later. Other viable transformations of the basic converter configuration are shown in FIGS. 27g–l. In all these equivalent transformations of the basic converter configuration, irrespective of different positions of the auxiliary capacitor C, it always has a DC voltage which is linear combination of voltages $V_g$, $V_b$, $V_C$, and $V_2$.

Besides those variants shown in FIGS. 27a–l, there is still a large number of ways this branch with auxiliary capacitor C and complementary input switch $S'_1$ can be placed between other nodes of the basic converter circuit and still satisfy fundamental relationship (4). There are literally hundreds of other equivalent transformations of the basic converter configuration shown in FIG. 14a and FIG. 14b, which are obtained by relocation of the other components, such as, for example, the input inductor and/or the output inductor from the top to the bottom leg (return current path) of the converter such as in FIG. 27j. Just as in the case of relocation of input capacitor to the bottom leg, the desirable feature of the common ground between the source and the load will be lost in this non-isolated converter case. Nevertheless, the isolated counterpart will rectify that and result in isolated version with two separate grounds.

Figure 27G:
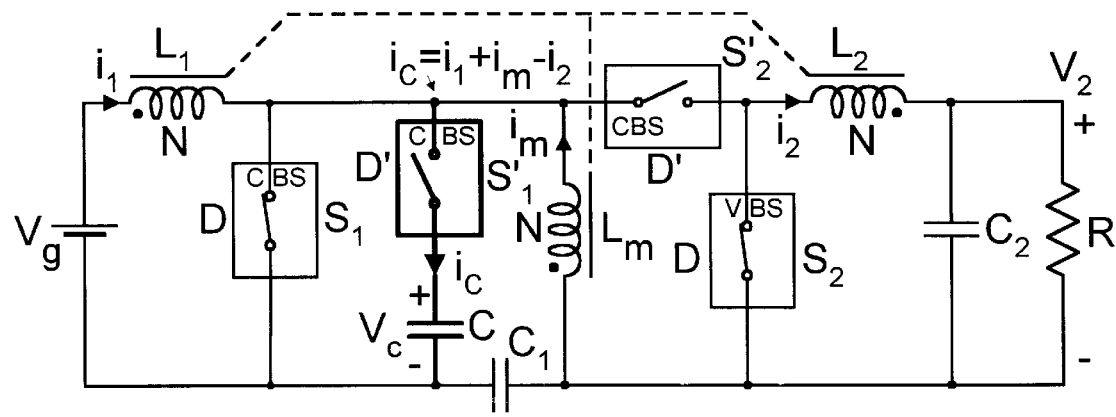
Figure 27H:
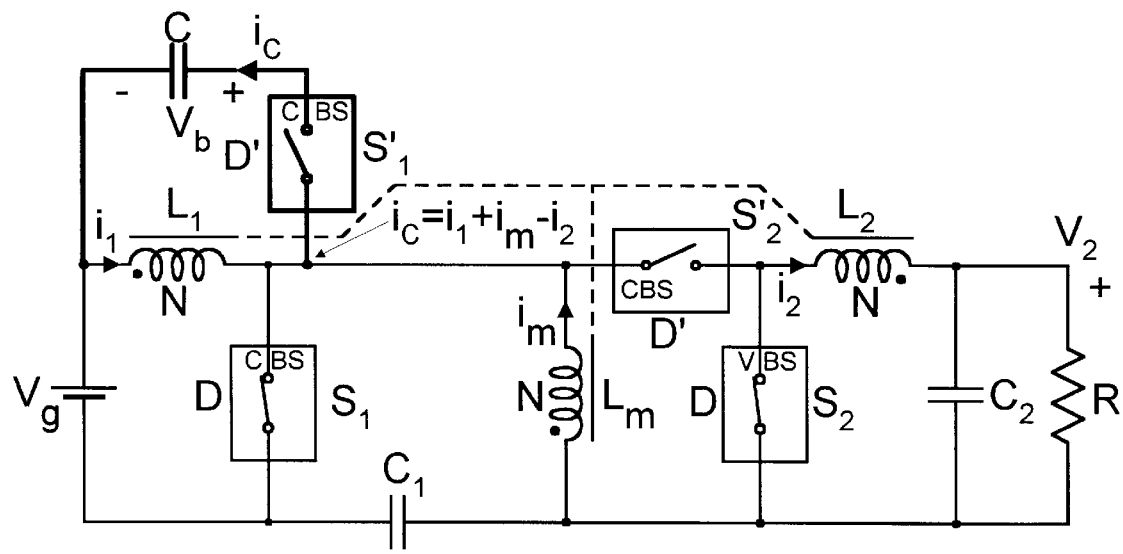
Figure 27I:
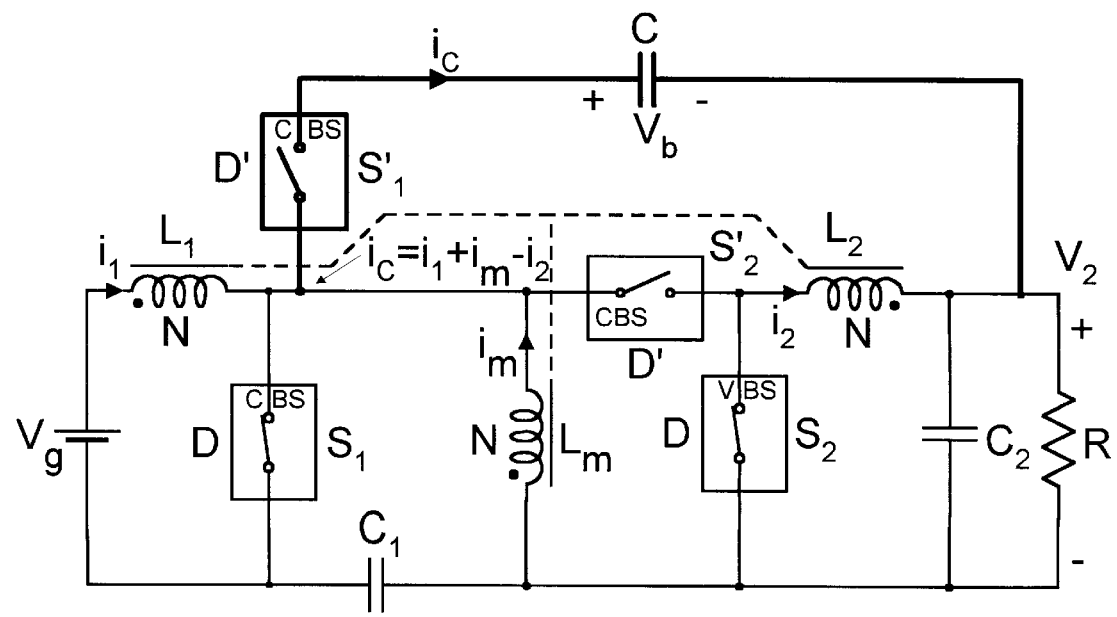
Figure 27J:
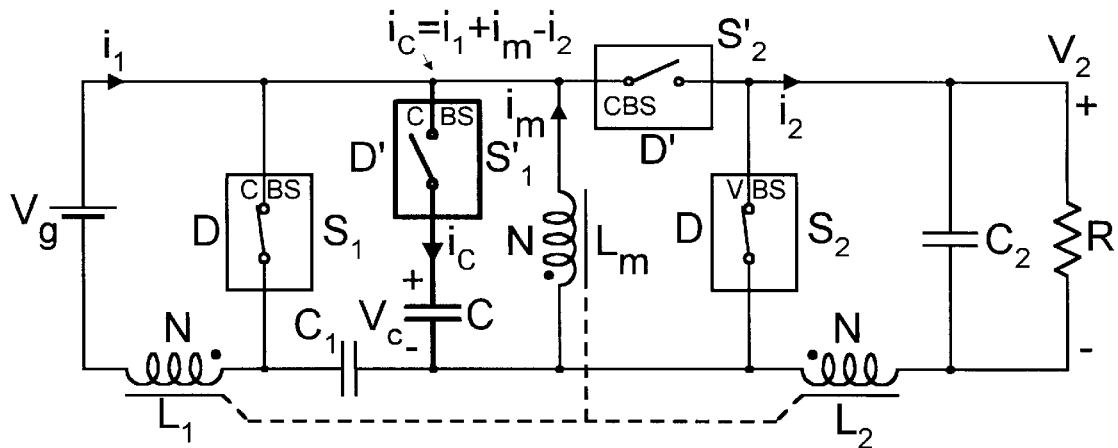
Figure 27K:
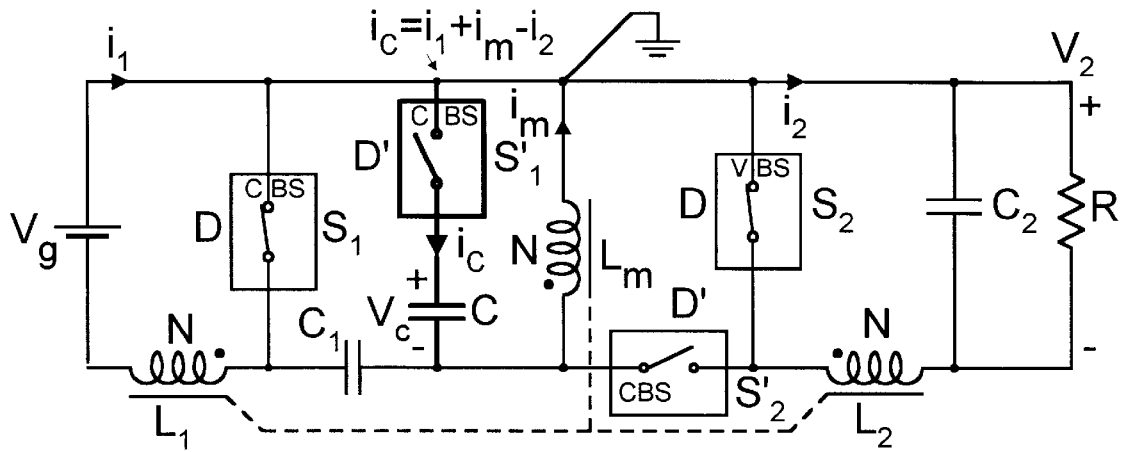
Figure 27L:
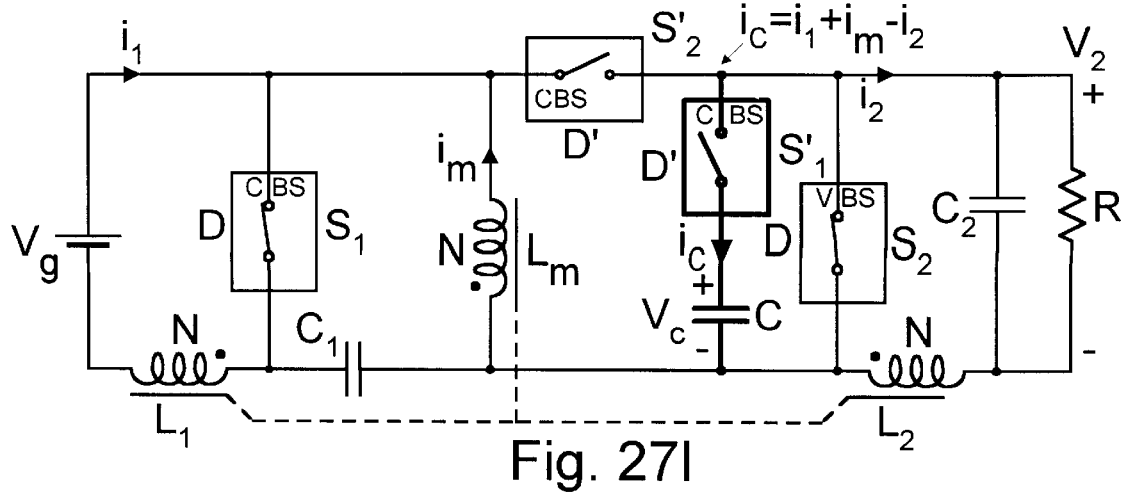

Furthermore, when the complementary output switch $S'_2$ is also relocated to the bottom leg of converter in FIG. 27j, the non-isolated converter of FIG. 27k is obtained. Note that in this converter, the positive terminals of input DC source and output DC load can have a common ground as shown in FIG. 27k, to result in negative input to negative output converter. Yet another variant is shown in FIG. 27l in which branch with auxiliary capacitor and complementary input switch is placed in parallel with output switch.

Note however, that all these relocations of components within same branch are just the variants of the very same basic new switching converter of FIG. 14a and FIG. 14b. This is easily proved by the state space averaging analysis method (introduced by Cuk as mentioned earlier). The state-space equations for all these converter variants are identical to the state-space equations of the basic new switching converter of FIG. 14a and FIG. 14b, thus, all these converter variants result in identical responses, both dynamic as well as steady-state. For example, the relocation of input inductor $L_1$ to the bottom leg as in FIG. 27j and FIG. 27k, results in the same two loop equations (for $DT_S$ and $D'T_S$ intervals) as for the basic converter of FIG. 14a and FIG. 14b.

Note that all these alternative connections of the branch with auxiliary capacitor C and complementary input switch $S'_1$ and repositioning of other components such as input inductor, input capacitor, output inductor, complementary output switch, etc., as described above would all have one thing in common: the auxiliary capacitor current $i_C(t)$ during complementary interval $D'T_S$ is given by (4). Since this relationship (4) is preserved, all the unique properties of the basic new converter are preserved and present in any of its numerous equivalent transformations of FIGS. 27a–l as well as in many other not shown but satisfying condition (4). We will thus use condition (4) as a fundamental description of means for connecting the branch with auxiliary capacitor C and complementary input switch $S'_1$ in all variety of possibilities. The skilled in the art might find some other alternative converter's modifications, whose operation would encompass the same relationship (4), hence they all will be exactly other variants of this original converter configuration.

It should be emphasized that in all the above variants, the current through the branch with the complementary input switch $S'_1$ and auxiliary capacitor C is AC only, since $I_C=0$ as per (7). Thus, the complementary input switch $S'_1$ will also carry only the ripple current AC component, which is small compared to DC load current. Hence the complementary input switch $S'_1$ conduction losses will be very small and negligible in comparison to the conduction losses of the input switch $S_1$ which is the power switch whose current is directly dependent on the DC load current. Just like the complementary input switch $S'_1$, the auxiliary capacitor C is also a comparatively small size and low loss component, since it also carries the same small AC ripple current component only. Hence the auxiliary capacitor has negligible losses even when a relatively small capacitance with larger ESR is used. Thus, the branch with the auxiliary capacitor and complementary input switch $S'_1$ contributes very little to the total converter losses but is critically important, since it enables existence of the two fundamental relationships (3) and (4).

Figure 28A:
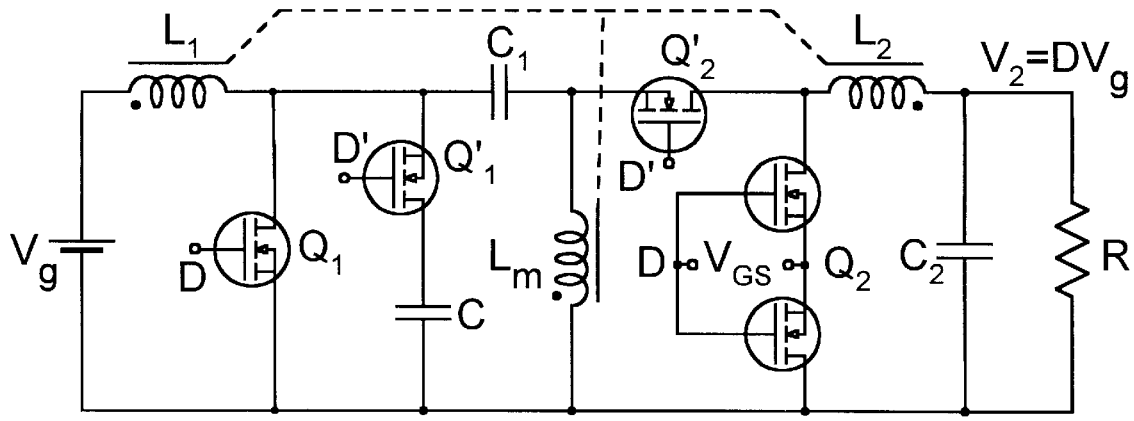
FIG. 28a illustrates an all-MOSFET transistor implementation of the invention in FIG. 21 with the high side driver configuration of two N-channel MOSFET transistors Q$_1$ and Q'$_1$ and the VBS output switch S$_2$ of FIG. 21 implemented using a composite switch Q$_2$ consisting of two MOSFET-like devices.

However, since this branch current is AC only, the complementary input switch $S'_1$ must be implemented with a current bidirectional switch, such as, for example, N-channel MOSFET transistor as in FIG. 28a. The input switch $S_1$ is also implemented with current bi-directional switch, such as N-channel MOSFET switch $Q_1$ in FIG. 28a. The added benefit is that the diode is already built into the MOSFET switch $Q_1$, and no external diode is needed. Furthermore, the body diode in the input MOSFET switch $Q_1$ will prevent discontinuous conduction mode at light load currents, since the input front end is current bidirectional as a whole.

While the complementary input switch $Q'_1$ requires a floating drive, this is still preferred in many applications due to the availability and effectiveness of special Integrated Circuit (IC) driver chips, the so called "high-side drivers", which are designed for just such drive conditions and even provide the necessary timing delays for soft switching implementations.

Figure 28B:
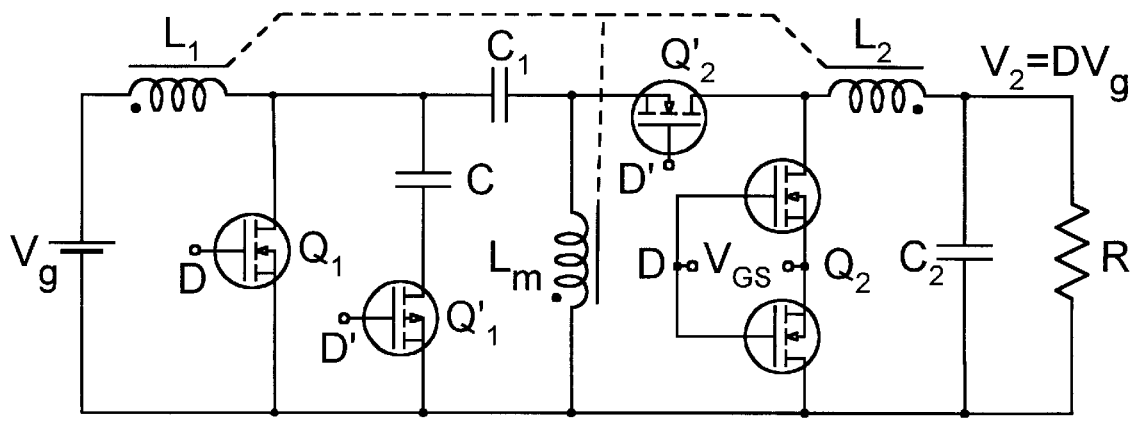
FIG. 28b illustrates P-channel MOSFET transistor Q'$_1$ with grounded source in a direct drive configuration.

Another alternative is to implement the complementary input switch $Q'_1$ with a P-channel MOSFET, which is in a preferable grounded source configuration suitable for direct drive, as shown in FIG. 28b. Note that input switch $Q_1$ is also in a grounded source configuration, thus a simpler direct drive can be used for both switches, instead of more complex and lower performance floating drive.

Furthermore, the use of all MOSFET devices enables an effective implementation of the soft switching. Some applications might favor the configurations in FIG. 27a or FIG.

27f which have a lower DC voltage on auxiliary capacitor C given by $V_b=DV_g/(1-D)$ compared to its voltage $V_C=V_g/(1-D)$ in configuration of FIG. 18a. The ratio of their DC voltage ratings is given by:

$$V_b/V_C=D \quad (15)$$

Thus, at duty ratio D=0.5, the voltage rating of the auxiliary capacitor is 2 times lower when placed in position as in FIG. 27a in comparison to its position as in FIG. 18a. Later the isolating embodiment will take advantage of both: low voltage rating of auxiliary capacitor C and high-side-drive configuration. Other positions of auxiliary capacitor lead to even lower voltage ratings of capacitor C.

AC Voltages Mismatch

In addition to many similarities described earlier, there is one important difference between the classical AC transformer and the DC Transformer of FIG. 21. In the AC transformer, the AC power is applied to the input winding and the output winding is acting as a voltage source, sourcing the current to the load. In the DC Transformer, the same would be the case if the AC voltage induced on the output inductor winding through magnetic coupling is exactly the same as AC voltage applied to output inductor winding. Then a perfect AC voltage matching would take place and zero ripple current in the output would be obtained. However, when there is some substantial AC voltage mismatch between internally induced voltage on the winding and externally applied AC voltage, a ripple current will occur proportional to the voltage mismatch and inversely proportional to the inherent leakage inductance.

Figure 29A:
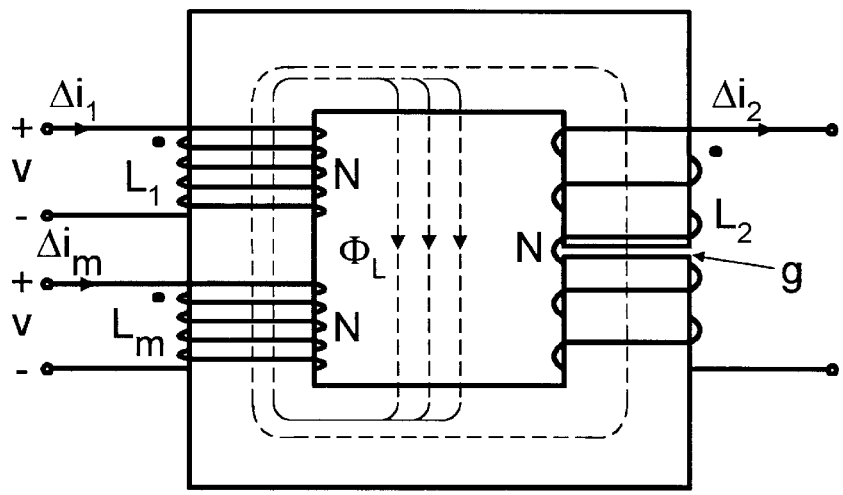

Another embodiment of the present invention is the DC Transformer of FIG. 29a with equal number of turns N as in FIG. 24e but with a small air-gap placed in the flux path to better match the AC voltages and further reduce the ripple current in the output inductor. In the DC Transformer of FIG. 29a, through the magnetic coupling between the inductor windings, the induced voltage in the output inductor is $v_m$, while the AC voltage generated by switching action of converter and applied to the same output inductor winding is $Dv_m$. Let us now show how this AC voltage mismatch on the same output inductor winding can be absorbed gracefully thanks to the intentionally increased leakage flux in the magnetic core of FIG. 29a and by strategically placing the three windings on the magnetic core of FIG. 29a.

The windings for inductors $L_1$ and $L_m$ of FIG. 29a are placed on the same leg of the UU-like magnetic core structure, and intentionally placed side-by-side (not on top of each other) to achieve some leakage inductance between the two. Since their AC voltages are identical over the whole operating range, a near-zero ripple current in input inductor can be obtained by slightly adjusting the turns ratio of the input inductor winding as discussed earlier, and therefore Electromagnetic Interference (EMI) noise will be reduced.

On the other hand, the output inductor winding $L_2$ is placed intentionally on the opposite leg of the UU-like magnetic core of FIG. 29a, to take the advantage of the large leakage flux $\Phi_L$ so created between the output inductor winding and the two windings on the opposite leg of the UU-like magnetic core. This leakage flux will then provide substantial built-in leakage inductance to reduce output inductor AC ripple current as explained below.

Figure 29B:
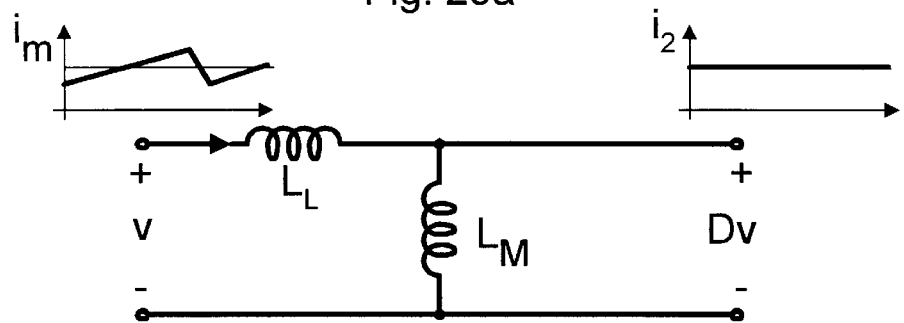
Figure 29C:
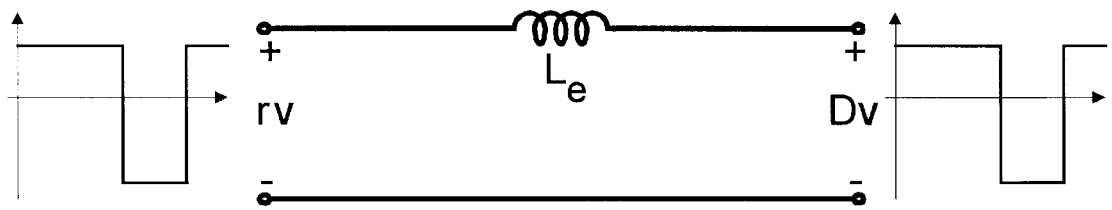
FIG. 29c illustrates a model of FIG. 29b further simplified and FIG. 29d illustrates an equivalent circuit model demonstrating zero-ripple current on the output.

To maximize the benefit of the leakage flux on the reduction of the output ripple current, a small air-gap is placed on the side where the output inductor $L_2$ is as shown in FIG. 29a. Let us for the moment assume that input inductor winding is not energized (excited). This air-gap placement will result in most of the leakage flux associated with winding $L_m$ and small or negligible leakage flux associated with winding $L_2$, resulting in the equivalent circuit model with large leakage inductance $L_L$ on the side of $L_m$ as shown in FIG. 29b. Thus, the winding $L_m$ is being excited with voltage v in the model of FIG. 29b. The voltage divider composed of $L_L$ and $L_M$ ($L_M$ is a magnetizing inductance of inductor $L_m$, where $L_m=L_L+L_M$) steps down the input voltage v by an inductive divider ratio $r=L_M/L_m$ to voltage rv. Thus, for r=0.8 and D=0.8 the input and output AC voltages in the model of FIG. 29c are identical presenting a zero net AC voltage to equivalent inductance $L_e=L_L\|L_M$, and hence result in very desirable zero ripple current on the output inductor side. The voltage divider ratio r=0.8 is easy to obtain since the small air-gap can be adjusted until the $L_M$ is just 4 times larger than the built-in leakage inductance $L_L$. Near-zero ripple current however can be obtained in the output inductor only at one operating point.

Figure 7A:
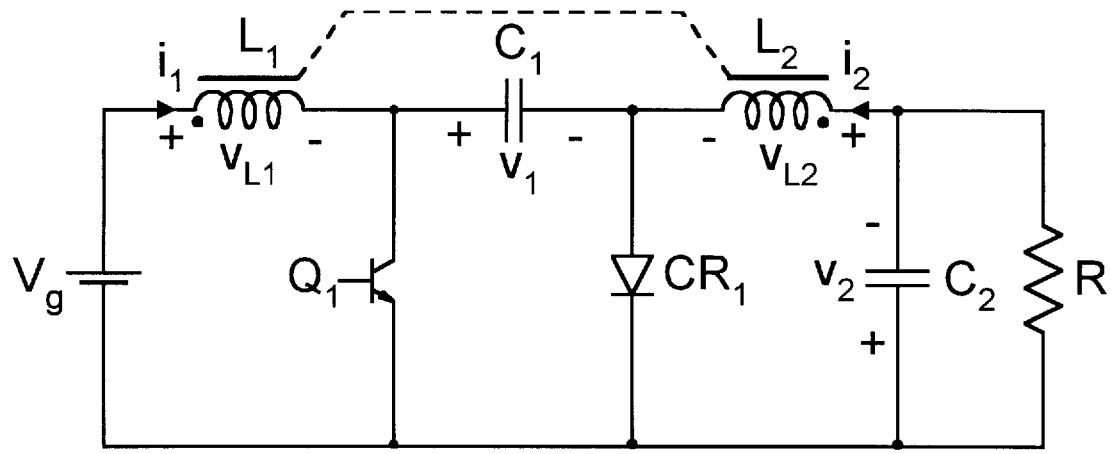
FIG. 7a is the prior-art Coupled-inductor Cuk converter and FIG. 7b displays the identical AC voltage waveforms on the two inductors prior to the coupling (for two different duty ratios $D_1$ and $D_2$), as a condition for their integration onto a common magnetic core.
Figure 7B:
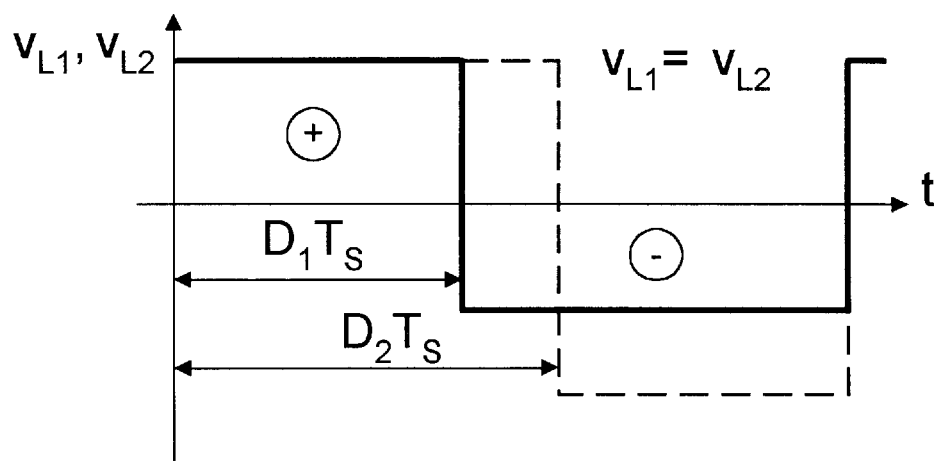
Figure 8A:
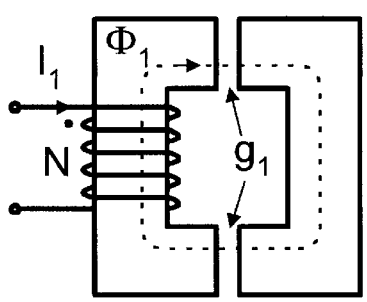
FIG. 8a and FIG. 8b show that each inductor in FIG. 7a, when used separately, must have appropriate air-gap and FIG. 8c and FIG. 8d reflect the inductance value degradation of each inductor due to their respective air-gaps.
Figure 8C:
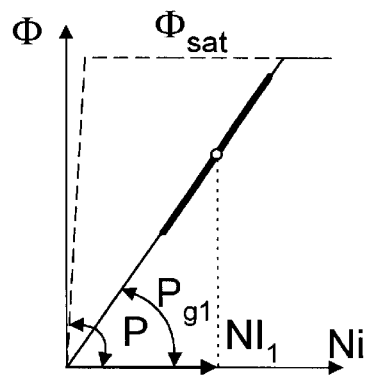
Figure 8B:
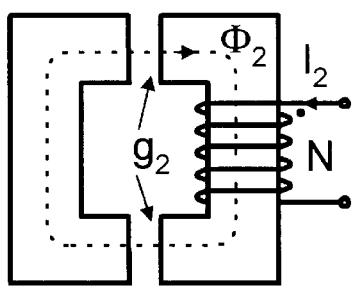
Figure 8D:
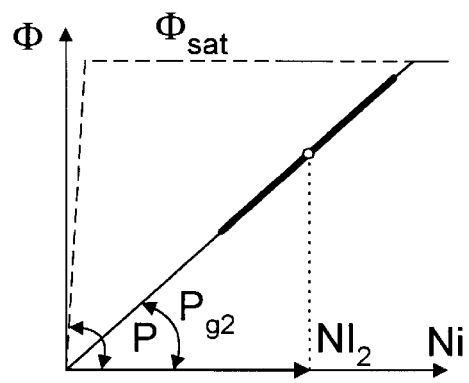
Figure 9A:
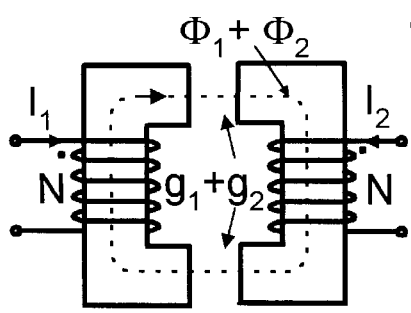
FIG. 9a demonstrates that the coupled-inductor implementation must have an air-gap, which is the sum of the two air-gaps of the original separate inductors of FIG. 8a and FIG. 8b
Figure 9B:
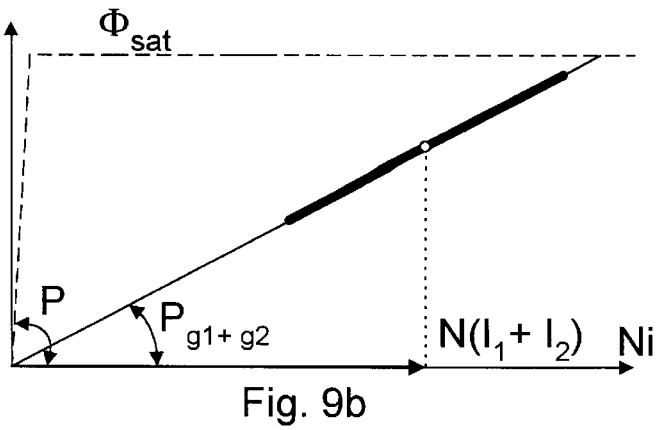
FIG. 9b shows combined flux vs. ampere-turns characteristic, which has an even higher inductance value degradation due to the increased air-gap.
Figure 10A:
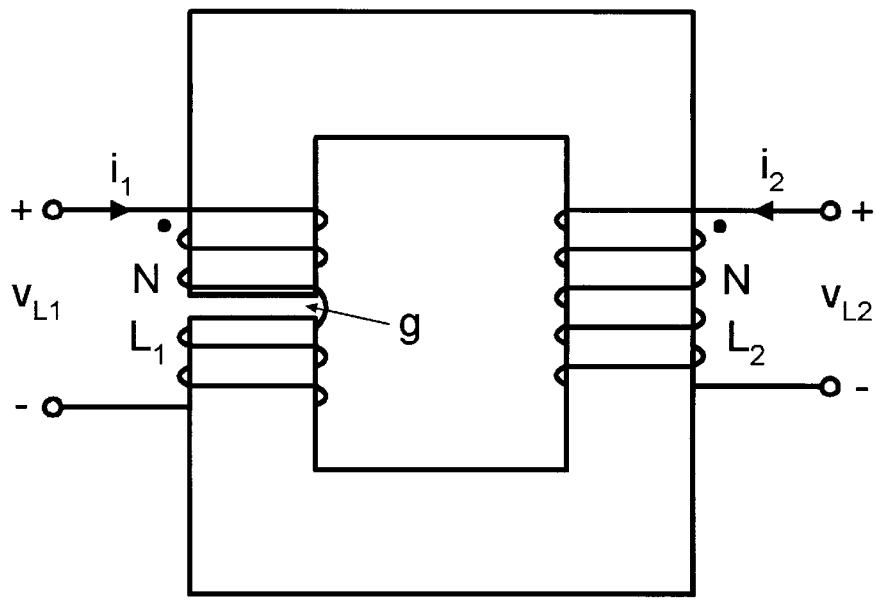
FIG. 10a shows a coupled-inductor implementation with the air-gap concentrated on the side with the input inductor winding, which leads to the circuit model of FIG. 10b with leakage inductance concentrated entirely on the output inductor winding side, thus demonstrating the zero-ripple current in the output inductor winding.
Figure 10B:
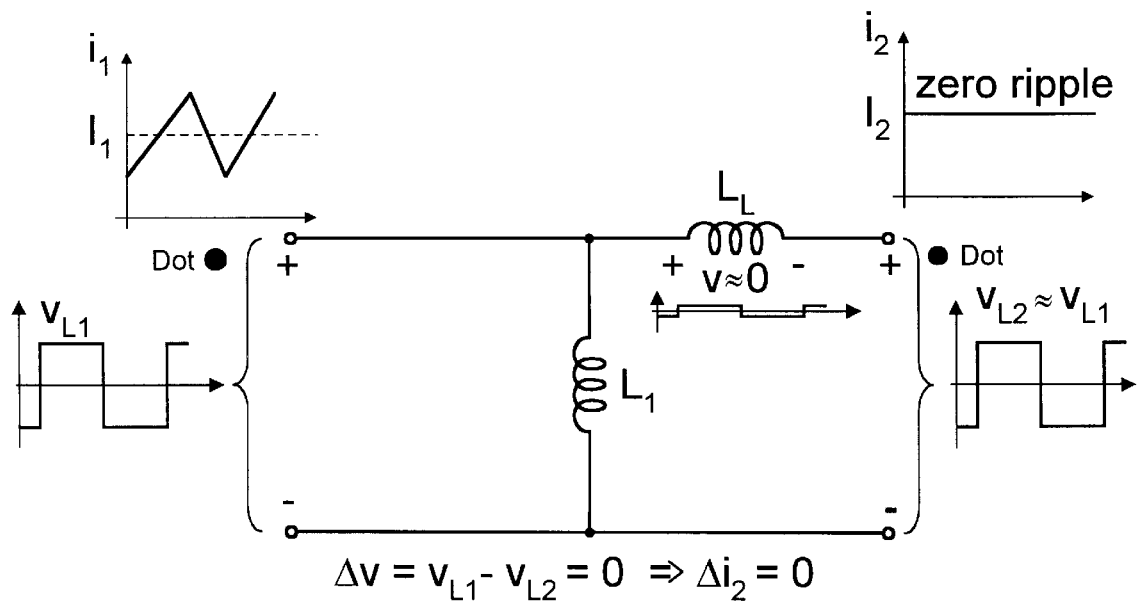
Figure 11A:
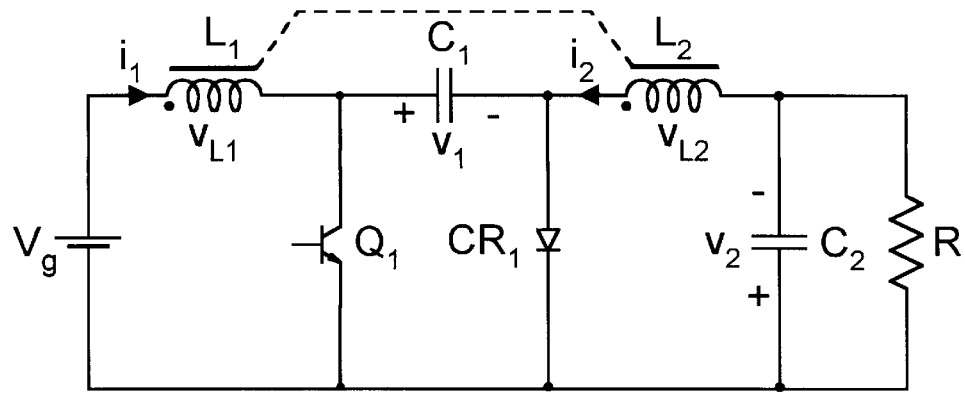
FIG. 11a shows a coupled-inductor magnetics connected with the output inductor winding polarity opposite to the one of FIG. 7a to cause DC-ampere-turns subtraction and FIG. 11b shows that a large voltage mismatch of connection in FIG. 11a leads to a huge ripple currents on both input and output inductors.
Figure 11B:
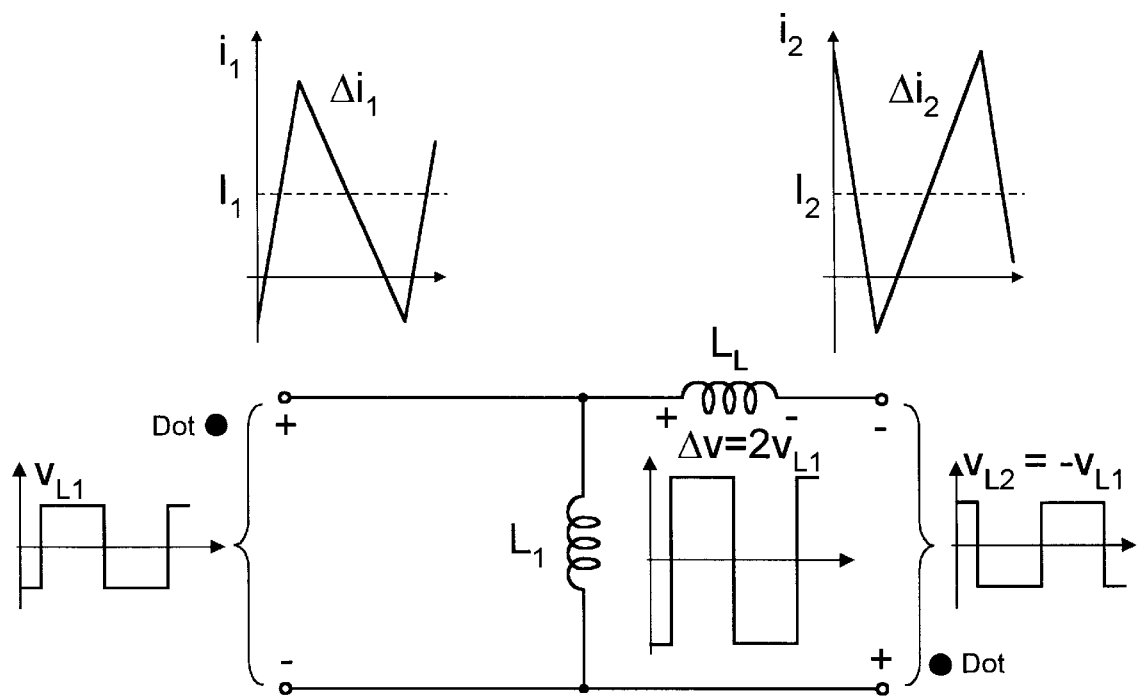
Figure 12A:
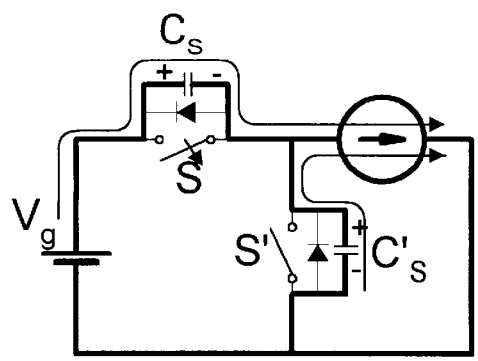
FIGS. 12a–d illustrate the four circuit models of the prior-art, soft-switching buck converter.
Figure 12C:
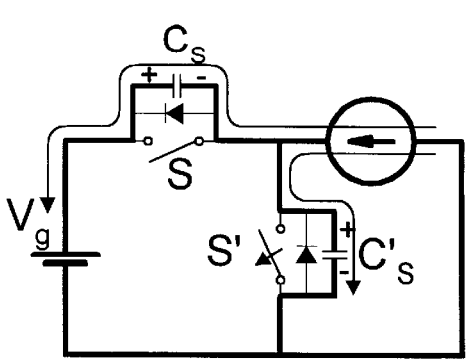
Figure 12B:
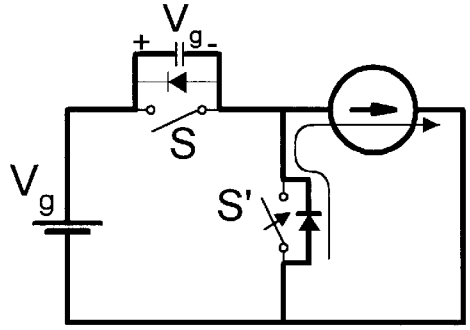
Figure 12D:
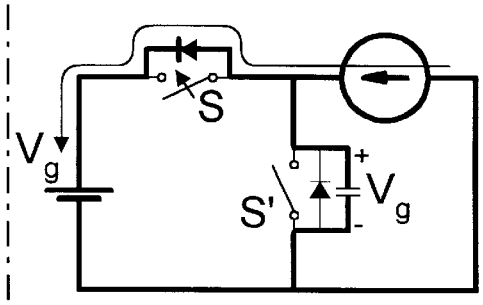

Note that at the same time, due to the very small total air-gap in this structure, the residual ripple current on the input side is also reduced by large factor, since the middle inductor inductance $L_m$ is very large. For comparison purposes, the coupled-inductor implementation of FIG. 7a would also result in near zero ripple current in the output inductor but the ripple current in the input inductor would be larger by an order of magnitude (10 times or more) than is the case with the DC Transformer of FIG. 29a. Thus, both zero-ripple current in output inductor as well as very small ripple current in middle inductor $L_m$ are achieved simultaneously. In addition, due to voltage on input inductor $L_1$ identical to the voltage on the middle inductor $L_m$, its ripple current can also be steered away into the middle inductor winding thus resulting in the ideal zero or near-zero ripple current in both input and output inductors and small residual ripple in the middle inductor as illustrated in the current waveforms of FIG. 21 obtained under this matching condition. Note, however, that unlike output ripple current, the input ripple current will be near zero throughout the operating range, due to identical AC voltage excitation of input inductor and middle inductor. This leakage flux will also lead to second-order DC flux in the magnetic core leg with windings $L_1$ and $L_m$, thus establishing DC-bias in that leg. By increasing cross section of that leg, DC flux density in said leg can be reduced as desired.

To provide even better matching of the AC voltages, the number of turns of output inductor winding can also be changed slightly from the matching number of turns N, since the already existing small air-gap could tolerate small DC-ampere-turn mismatch. In some practical designs, especially in which large number of turns is used, this design alternative may give some advantages.

Evaluation of the Output Inductor Ripple Current

Figure 29D:
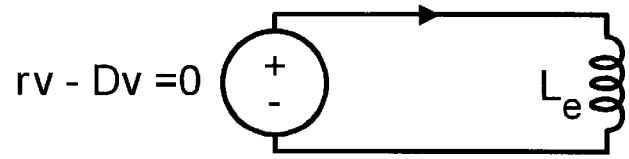

From the model in FIG. 29d, the output ripple current clearly depends on the very small equivalent leakage inductance L and not on the large inductance $L_2$ of the output inductor. Thus, it would appear that the ripple current magnitude increases rapidly when operating duty ratio is away from the zero-ripple condition. However, this is not the case. Despite the small value of the equivalent leakage inductance L, the voltage across it is not the full output voltage $V_2$, but instead, as in FIG. 29d, the small mismatch voltage, which is quantified in the formula for the maximum output inductor ripple current at duty ratio D given by:

$$\Delta i_{2M}=(D-D_{ZR})V_2T_S/L_l \quad (16)$$

where $D_{ZR}$ is the duty ratio at which zero ripple current is obtained, V is the regulated output DC voltage, $T_S$ is the switching period, and Ll is the effective leakage inductance reflected to the output inductor side. Clearly the voltage mismatch is given by $(D-D_{ZR})V_2$ and is only the fraction of the output DC voltage $V_2$.

Note that $D_{ZR}=0.8$ is already obtained owing just to inherent leakage inductance of the given core and with small air-gap placed on output inductor side as discussed earlier. If the output inductor turns are also adjusted accordingly, it is relatively easy to move duty ratio for zero-ripple current to $D_{ZR}=0.5$ with some trade-off in an increased DC flux in core and a small air-gap introduction. If an input voltage change from 40V to 60V (1.5:1 dynamic range) is needed, this would correspond to duty ratio change from 0.6 to 0.4. Thus, (16) would reduce to $\Delta i_{2M}=0.1V_2T_S/L$ in which the voltage mismatch is 10% of the output DC voltage. For example, if the converter is regulated at $V_2=5V$, and for $T_S=10$ $\mu$sec (switching frequency of 100 kHz), even a very small leakage inductance of only $L_l=1$ $\mu$H, would result in acceptable maximum ripple current of 5 A. Since the converter is capable of delivering high DC load currents of 40 A, 60 A and higher without saturation, this ripple current is relatively small and has little impact on the overall efficiency.

Figure 30:
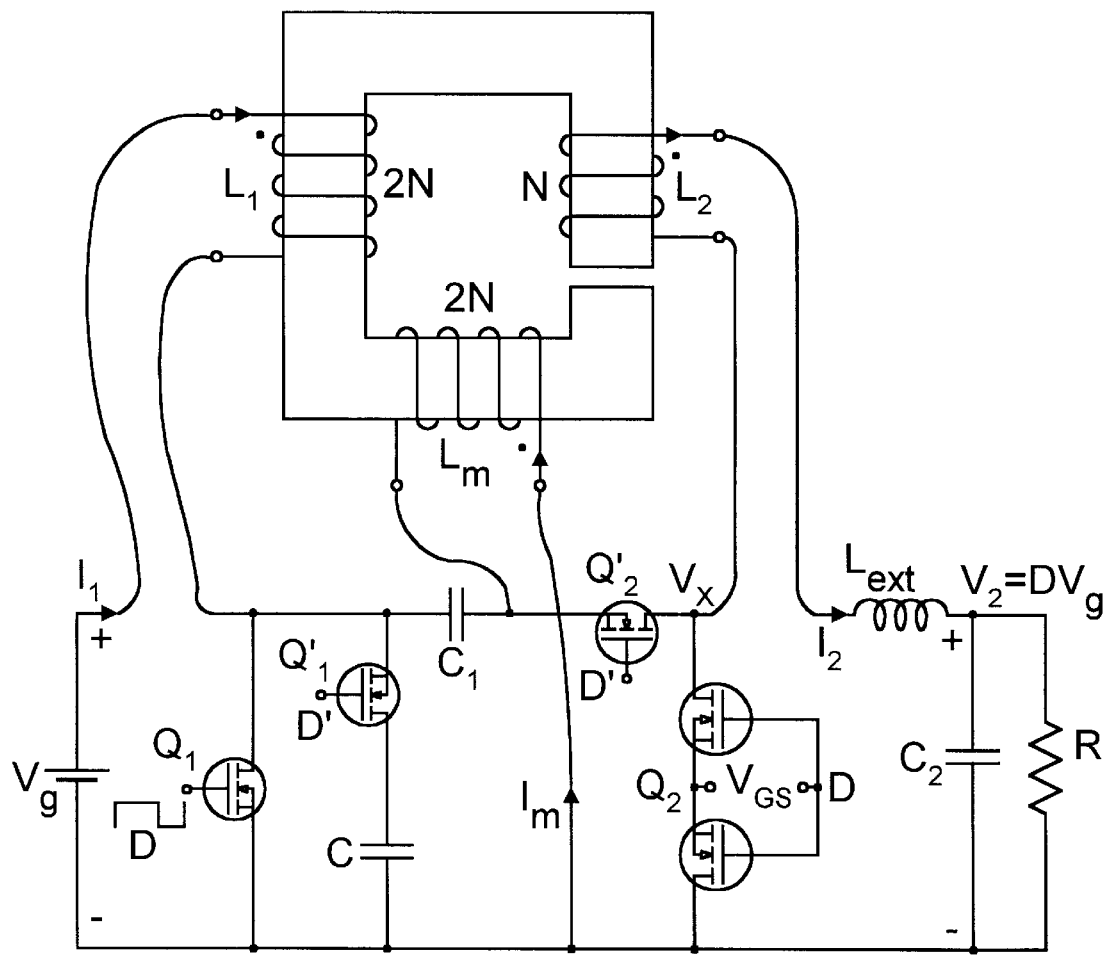
FIG. 30 illustrates another embodiment of the present invention, which utilizes the small external inductor L$_{ext}$ to reduce the output inductor ripple current. Note that the number of turns of the input and middle inductors are twice that of the number of turns of the output inductor.
Figure 31:
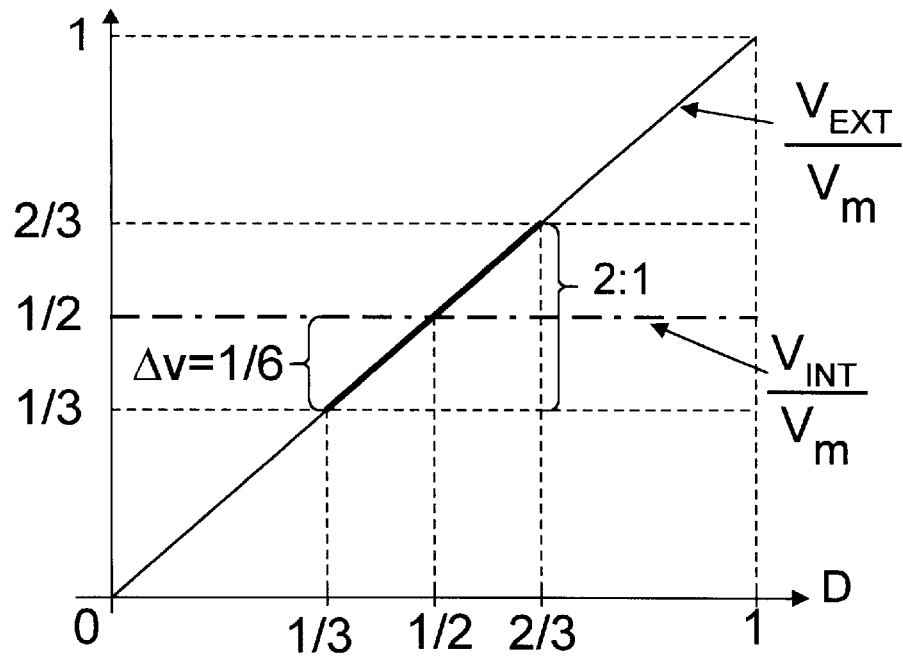
FIG. 31 is a graph of the operating range of the converter in FIG. 30 centered around the duty ratio D=1/2 with zero output ripple current at D=1/2.

Yet another embodiment of the present invention is shown in FIG. 30 in which the output inductor number of turns are adjusted relative to the middle inductor and input inductor number of turns so that zero ripple current is obtained at a lower duty ratio such as for example at D=0.5 as seen in FIG. 31 for a 2:1 turns ratio of middle to output inductor windings. This is because $v_{EXT}=Dv_m$ is plotted as linear function in FIG. 31, while $v_{INT}=0.5$ $v_m$ is a constant dotted line in FIG. 31 since 2:1 ratio of middle to output inductor is used. Their intersection at D=0.5 shows matching internal AC voltage $v_{INT}$ and external AC voltage $v_{EXT}$, hence zero ripple. Clearly, since identical number of turns are not used as discussed before, zero DC flux feature will be lost, but partial DC-bias cancellation will be in effect. Nevertheless, this would still lead to a substantial reduction of the air-gap from that of the conventional designs in which DC-ampere-turns add, rather than subtract as in this case. Still substantial reduction of the ripple currents in input and middle inductor would be obtained. The DC Transformer implementation would be as in FIG. 30. As shown in FIG. 31 such an arrangement would place zero-ripple current in the output inductor close to the D=0.5 operating point. The main benefit of such an arrangement is that for a 2:1 voltage range, the AC voltage mismatch on the output inductor would be at maximum ⅙ of the output DC voltage. In some applications, the built-in leakage inductance of the magnetic core may be sufficient to result in acceptable ripple currents at the ends of the operating range, from duty ratio D=1/3 to duty ratio D=2/3 or 2:1 conversion ratio. However, even if that is not the case, the ripple currents can be reduced in half for example by the addition of a small external inductor $L_{EXT}$ equal to the leakage inductance inherent to the magnetic core, as illustrated in FIG. 30. Note that such inductor will have much reduced AC volt-second requirements, since it will be subject to only 16% of the total AC flux of the middle inductor. In addition its inductance value needs to be only a fraction, such as 10% of the inductance of the output inductor. This would directly translate into a much smaller magnetic core and relatively negligible copper and core losses of such an external inductor in comparison to the main DC Transformer magnetic core. Another benefit of such implementation is that high design goals can be met with standard magnetic core types and core sizes without resorting to special custom magnetics cores as described next.

A further embodiments of the present invention (shown in FIG. 32 and FIG. 33) is especially suitable for applications in which the regulation of the output voltage over a wide range of the input voltage change, such as 2:1 or even 4:1 is needed and yet reduced ripple current at the output is also needed as well as efficiency improvement and further size reductions desired. The DC Transformer of FIG. 33 has an additional leakage magnetic leg without windings and with a large air-gap in its magnetic flux path to divert some of the AC flux from the main flux path and reduce the AC voltage induced in output inductor winding to the same value as the AC voltage generated by converter on the same winding $v_{EXT}=Dv_m$. For example, if a chosen nominal operating duty ratio is D=0.7, we would design the leakage leg so that 30% of the transformer flux is bypassed into this leg. Then the internally induced voltage on the output inductor will be 70% of the AC voltage on the middle inductor $L_m$ due to diversion of the 30% of AC flux into the leakage leg. But this is exactly what is needed to match this internally induced voltage to the AC voltage generated on the same winding by the switching action and thus obtain zero ripple current in the output inductor. This additional magnetic leakage leg performs a twofold function:

1. Diverts 30% of the main flux into the leakage leg and thereby the remaining 70% of the main flux induces in the output inductor the same AC voltage as the AC voltage applied to it through the converter. This would then result in zero-ripple output inductor current at that particular nominal operating duty ratio.
2. The leakage leg will substantially increase the total leakage inductance and thereby reduce substantially the output ripple current when the duty ratio D is moved away from the nominal value and zero-ripple case.

Figure 32:
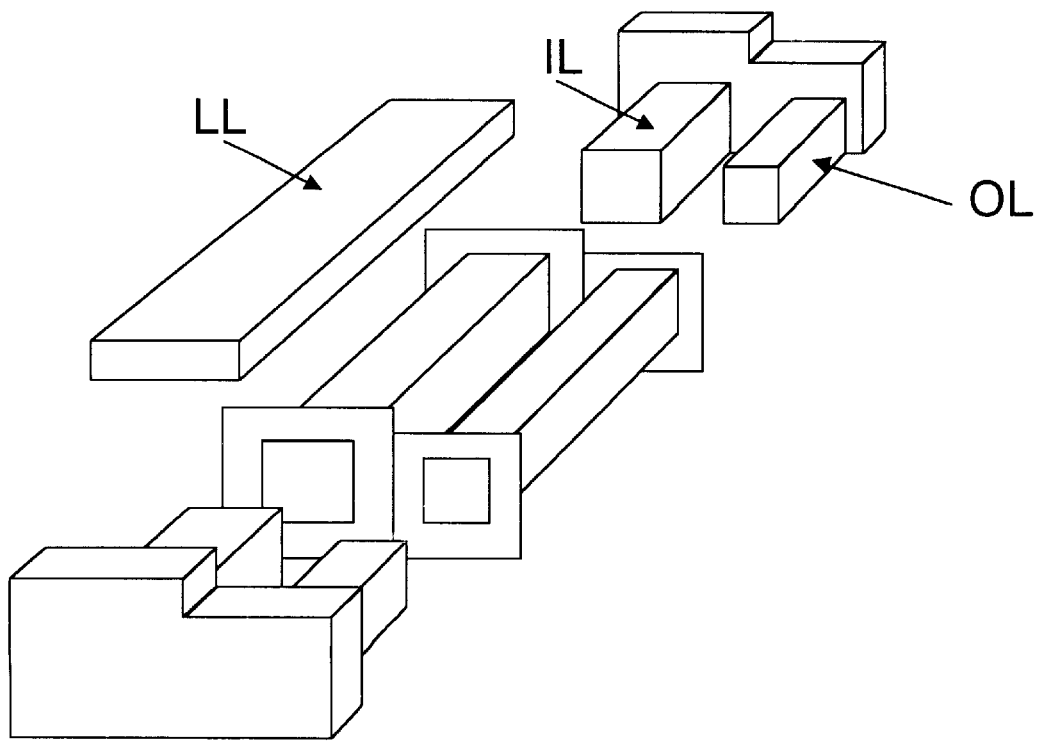
FIG. 32 illustrates in an isometric view an embodiment of the magnetic core structure for the present invention in which the leakage leg LL is built using a custom core configuration for the converter of FIG. 33.
Figure 33:
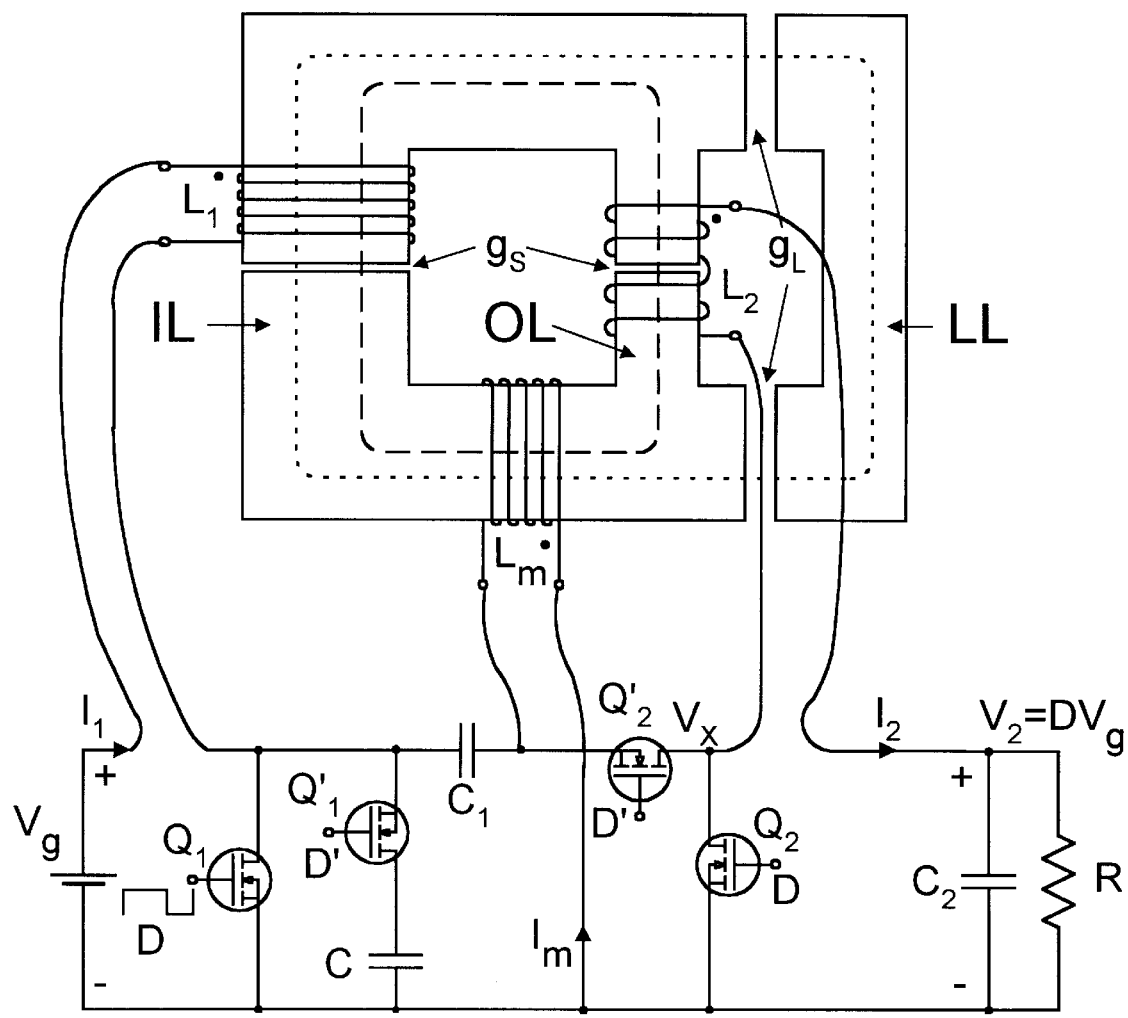
FIG. 33 is a circuit diagram of an embodiment of the present invention, in which the DC Transformer is built with an additional magnetic leakage leg LL.

The needed AC flux diversion from the main AC flux path can be easily accomplished by using a proportionally larger air-gap in the leakage path as illustrated in the conceptual custom DC Transformer core of FIG. 32. Due to smaller AC flux in this leakage leg, it could also be made of a smaller cross-section, which would further increase the air-gap needed in the leakage path relative to the one in the main flux path. An alternative method to reduce the induced voltage at the output inductor winding to match the voltage imposed by the converter is to reduce the number of turns at the output inductor winding. This is particularly useful for higher output voltages, where the number of turns are large. Either method, implementing a leakage leg or using a reduced number of turns, or combination of both, causes some DC flux imbalance. Therefore, there will be no complete DC flux cancellation and some net DC-bias will be introduced. In practical implementation the leakage leg may take only a small portion of the total volume of the DC Transformer core structure as shown in practical custom DC Transformer core of FIG. 32 in which the leakage leg took only approximately 15% of the total magnetics volume. In FIG. 32, LL designates the leakage leg, IL designates the input inductor and middle inductor leg, and OL designates the output inductor leg.

Figure 34:
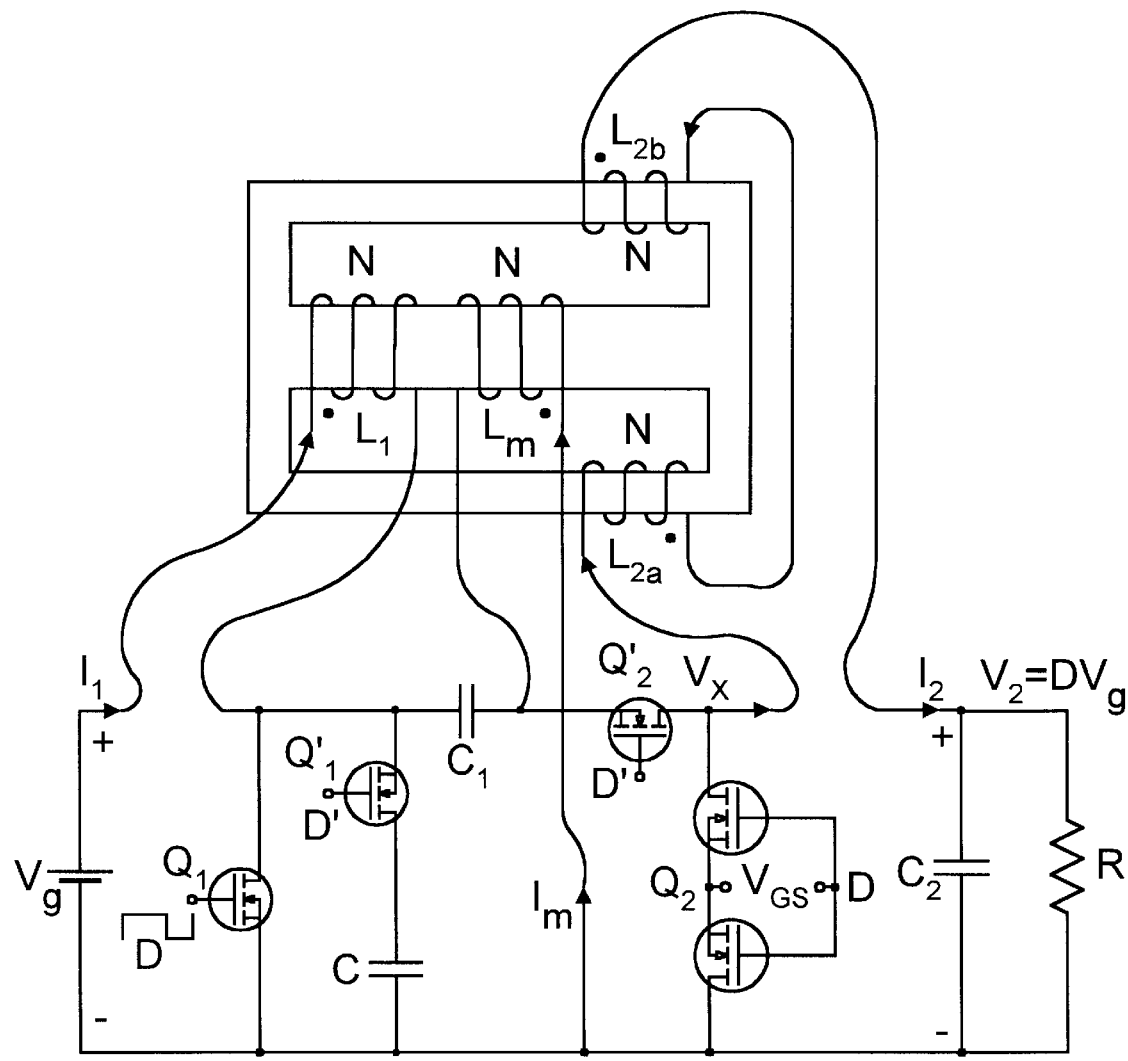
FIG. 34 is a circuit diagram of another embodiment of the present invention in which the output inductor L$_2$ is split into two identical windings L$_{2a}$ and L$_{2b}$ with N turns in series for use with a DC Transformer on an EE-like magnetic core with no air-gap.

Yet another embodiment of the present invention is shown in FIG. 34 in which the DC Transformer is built using the multiple-loop, EE-like magnetic core structure. As before, the input inductor and middle inductor are placed side-by-side on the same leg, that is the center leg of the EE-like magnetic core structure as seen in FIG. 34 and have equal number of turns N. The output inductor is split into two windings in series, each with the same number of turns N so that their AC voltages add. Then each of these output inductor windings is placed on a separate outer magnetic leg of the EE-like magnetic core, with dot-marked ends positioned to enable that the DC fluxes in both outer magnetic loops are zero. Thus, as before, a magnetic core without air-gap may be used. One of the main benefits of the EE-like magnetic core structure is that the leakage inductance is further increased and ripple currents further reduced in comparison with the equivalent single-loop, UU-like magnetic core structures. A further practical benefit is that the assembled EE-like magentic core with windings tends to have a substantially lower profile than UU-like cores.

Other variations of the DC Transformer might be envisioned by those skilled in the art which would utilize the unique advantages of the present invention and its key features based on the recognition of the relationships (3) and (4). Those variations will be just alternative extensions based on the disclosure of the present invention.

ISOLATED EXTENSIONS

In the majority of practical applications galvanic isolation between the input DC source and the output DC load is often required either for safety reasons or from a system point of view. Once an isolated version of the converter is obtained, additional benefits accrue such as: the output DC voltage could be scaled up or down with the transformer turns ratio, negative as well as positive DC output voltages can be provided, multiple outputs with different DC voltages and polarities can be easily obtained, etc.

Figure 35A:
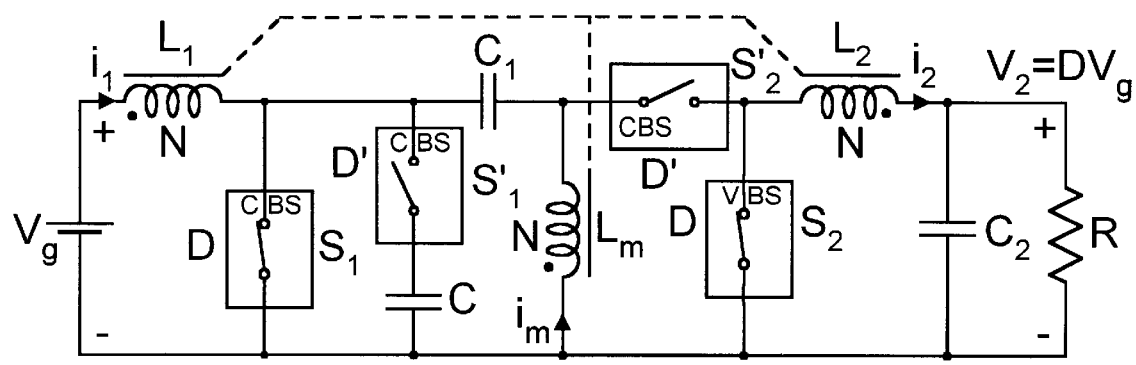
FIG. 35a illustrates another embodiment of the present invention and in FIG. 35b another embodiment is shown in which the middle inductor in FIG. 35a is replaced with a 1:1 turns ratio isolation transformer.
Figure 35B:
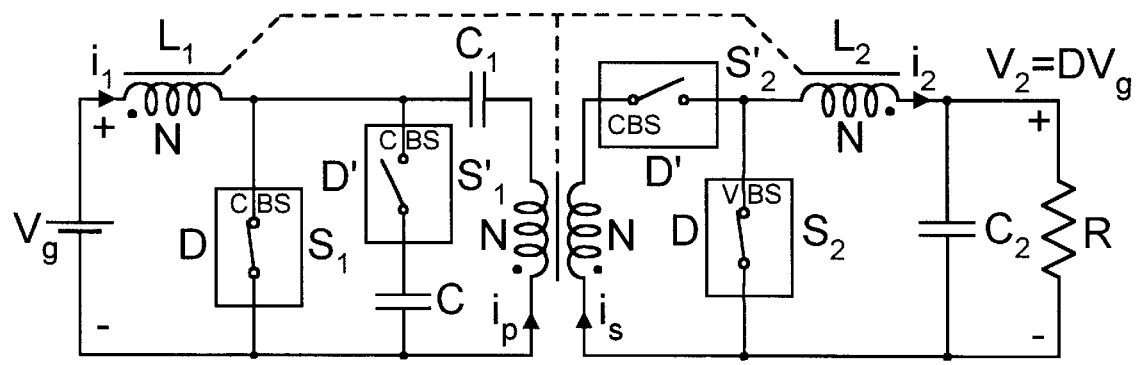

However, the existence of a non-isolated DC-to-DC converter does not guarantee at all the existence of a galvanic isolated counter-part. In fact, many non-isolated converters do not have a galvanic isolated extension. Some, which do, actually have a rather non-obvious extension, such as the forward converter, which is derived from the prior-art buck converter of FIG. 1a. Yet other converters, such as prior-art flyback converter, have isolated version, which are obtained simply by replacing the inductor of the non-isolated version with an isolation transformer. The present invention belongs to that category. One of the non-isolated versions of the present invention is shown in FIG. 35a. The corresponding isolated extension of FIG. 35b is obtained by simply substituting the original middle inductor with an isolation transformer with the same number of turns N for both primary and secondary winding while keeping the input and output inductor windings with the same number of turns N as well. Thus, all the properties of the non-isolated converter of FIG. 35a are carried over to the isolated counterpart of FIG. 35b.

The next modification is to use the isolation transformer to provide additional DC voltage scaling by its secondary to primary turns ratio $N_2:N_1$ as shown in another embodiment of the present invention in FIG. 36a, which will change the output DC voltage to $$V_2 = D\ V_g N_2/N_1 \qquad (17)$$

While the non-isolated converter was capable only of a voltage step-down function, the isolated extension of FIG. 36a is also capable of step-up as well as step-up/step-down function. Also in many applications a very large step-down is required, such as when the rectified AC line is used as primary DC source, and low voltage outputs such as 5V, 3.3V and lower, are required. In such applications, additional voltage step-down through the transformer turns ratio is essential, as is also the galvanic isolation feature.

Figure 36B:
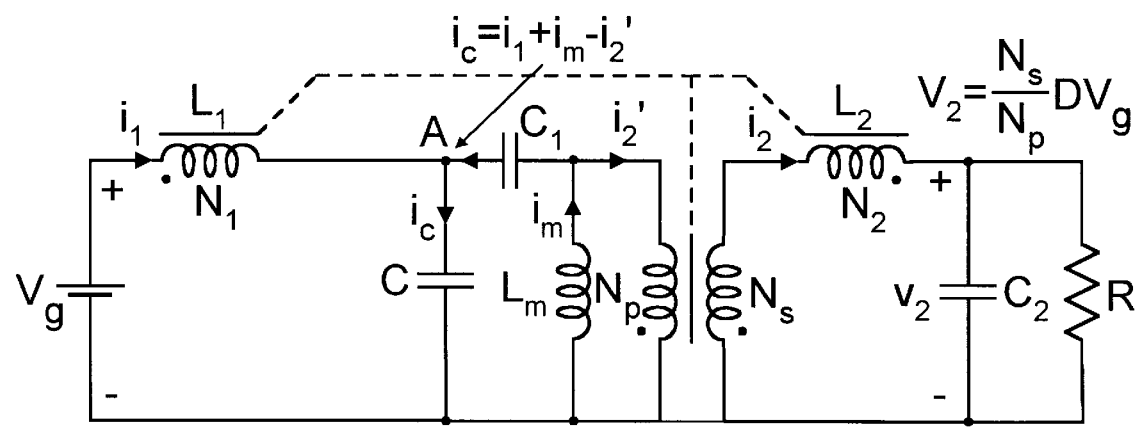
FIG. 36b illustrates an equivalent circuit model for the converter of FIG. 36a during the complementary interval D'T$_S$.

It is important to note that the isolated extension of FIG. 36a now also includes an isolation DC transformer without any air-gap, which is, as before, an integral and inseparable part of the converter. In order to distinguish this magnetic structure from the DC Transformer in FIG. 21, which does not provide galvanic isolation, this new magnetic component is termed Isolated DC-to-DC Transformer or simply Isolated DC Transformer since it does provide galvanic isolation. This indicates also, that as in the non-isolated versions, the total DC flux in the single loop magnetic core must be zero, which is indeed the case, provided that, as shown in FIG. 36b, the input inductor number of turns is chosen to be $N_1$, that is the same as number of turns of the primary winding, and the output inductor number of turns is chosen to be $N_2$, that is the same as the number of turns of the secondary winding, so that:

$$N_P = N_1 \text{ and } N_S = N_2 \qquad (18)$$

where $N_P$ and $N_S$ are primary and secondary number of turns of the isolation transformer.

Let us now prove that (18) is indeed a necessary and sufficient condition for complete DC flux cancellation for any duty ratio D. During the complementary time interval $D'T_S$, the isolated converter reduces to the circuit model shown in FIG. 36b, in which the isolation transformer is modeled with its magnetizing inductance $L_m$ and the ideal transformer with $N_S:N_P$ turns ratio. The load current $i_2$ is reflected to the primary side by the turns ratio $N_S/N_P$ and becomes $i_2'$ given by:

$$i_2' = (N_S/N_P) i_2 \qquad (19)$$

The summation of the currents at node A results in:

$$i_C = i_1 + i_m - i_2' \qquad (20)$$

Since, as before, $I_C = 0$, we get from (19) and (20):

$$I_1 + I_m = (N_S/N_P) I_2 \qquad (21)$$

Let us now find the total DC ampere-turns. For the purpose of calculating its DC-ampere-turns contribution, the isolation transformer can be represented by its magnetizing inductance $L_m$, with $N_P$ number of turns and with DC current $I_m$, hence DC ampere-turns contribution of isolation transformer is $N_P I_m$. Since the dot-marked ends of the middle inductor and its replacement, the isolation transformer, were kept the same, the isolation transformer DC-ampere-turns add to the input inductor DC-ampere-turns, while DC-ampere-turns of the output inductor subtract to result in total DC-ampere-turns given by:

$$\Sigma NI = N_1 I_1 + N_P I_m - N_2 I_2 = (N_1 - N_P) I_1 + (N_S - N_2) I_2 \qquad (22)$$

Note that (22) can be zero for any currents $I_1$ and $I_2$ if, and only if, the following two equations are satisfied simultaneously:

$$N_1 - N_P = 0 \text{ and } N_S - N_2 = 0 \qquad (23)$$

which is clearly the same as postulated by (18). Thus, the condition (18) or (23) is both necessary and sufficient for complete cancellation of the DC-ampere-turns in an isolating DC Transformer. Note also that for preservation of zero net DC-ampere-turns, it was not only necessary that the ratio of the output inductor to input inductor number of turns matches the secondary to primary turns ratio of the isolation transformer, but, in fact, a much more restrictive condition is needed, that is equality of the isolation transformer primary winding number of turns and input inductor number of turns, and also equality of the isolation transformer secondary winding number of turns with output inductor number of turns. Due to the DC-ampere-turns cancellation condition from (22) and (23), the air-gap can either be eliminated completely or reduced by an order of magnitude in comparison with conventional solutions.

From another point of view, in the previous state-of-the-art converters employing Coupled-Inductors such as Coupled-Inductors Cuk converter, it was sufficient just to match the ratio of turns of output to input inductor with the isolation transformer secondary to primary turns ratio, since the Coupled-Inductors was only concerned with the AC voltage matching and Coupled-Inductors and isolation transformer were on separate magnetic cores. To the contrary, in the Isolated DC Transformer case, in addition to the matching of the AC voltages, an additional requirement is to have also DC-ampere-turns cancellation. For the latter to take place the absolute number of turns must be matched as per (18) and not just the turns ratio. This is also required by their coupling on the common single-loop magnetic core.

In addition, this result (18) is also ideally desired for low ripple current in the input inductor. Note that the AC voltages on the input inductor and primary of the isolation transformer are identical. Since now the same number of turns is used for input inductor and primary of the isolation transformer, the same volts/turn is preserved, thus leading to their direct 1:1 coupling. Hence due to perfect matching of the AC voltages and finite leakage inductance, near zero-ripple input inductor current and substantial reduction of the conducted EMI noise are achieved by slightly increasing the number of turns in the input inductor. The DC-flux imbalance due to this increase is negligible. This holds over a wide range of operating duty ratio D.

Of course, if one has assumed the special relationship (18) a priori, then (21) would directly prove that DC-ampere-turns cancellation holds. However, that would only prove that (18) is a sufficient condition, but will not reveal that the same condition (18) is also a necessary condition as well. The DC-ampere-turns cancellation is also displayed by the instantaneous ampere-turns waveforms in the Isolated DC Transformer of FIG. 36a. Once again, under condition (18) the isolation transformer in this case provides just the right DC-bias current $I_m$ for any operating duty ratio, that is for any input DC voltage $V_g$ and any DC load current 12, so that total zero net DC-ampere-turns are obtained in the single-loop magnetic core of the Isolated DC Transformer. This, once again demonstrates that the Isolated DC Transformer is at the heart of the operation of the converter. Thus, the Isolated DC Transformer with a very restricted but well defined choice of number of turns (18) and positioning of the windings around a single-loop magnetic core is at the root of the unprecedented performance of the converter. The many variants of converter configurations, in fact, have the same purpose to provide the needed DC currents as well as necessary AC voltages to the windings so that current directions and voltage polarities are firmly defined and referenced to the dot-marked ends of respective windings, so that either the Isolated or Non-isolated DC Transformer could function as envisioned and offer the same described performance improvements.

Figure 36C:
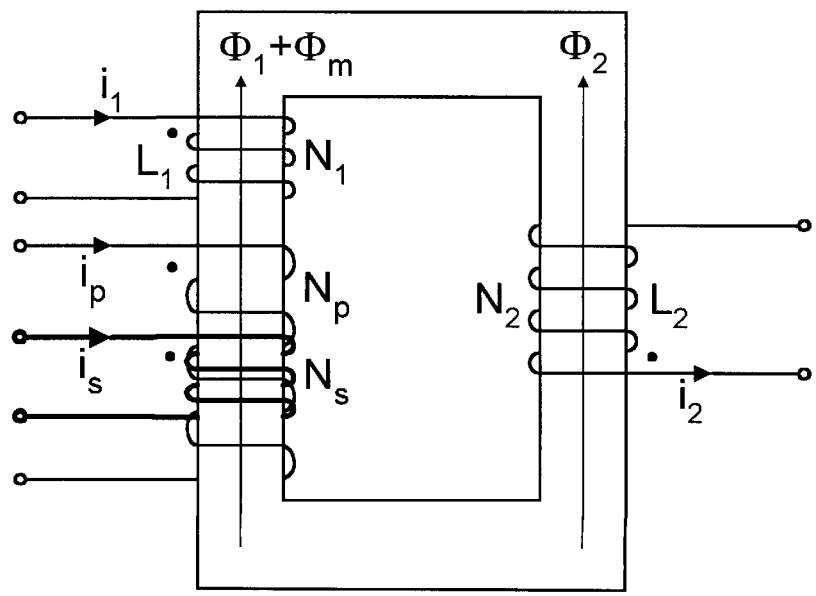

As before for the non-isolated converter of FIG. 21, the isolated converter was shown with the winding placements as in FIG. 36a only for better visualization of the Isolated DC Transformer winding connections, and not to indicate the actual winding placement. FIG. 36c shows such a relative placement. Note that as before, the input inductor and the isolation transformer are placed side-by-side (to promote some leakage between them), while the output inductor is placed on the opposite leg of the UU-like magnetic core structure to substantially increase the leakage between the transformer and output inductor. Finally, the primary and secondary windings of the isolation transformer are shown in FIG. 36c interleaved to minimize the leakage inductance between them, thus using the same techniques as for any other isolation transformer with tight coupling.

Figure 37A:
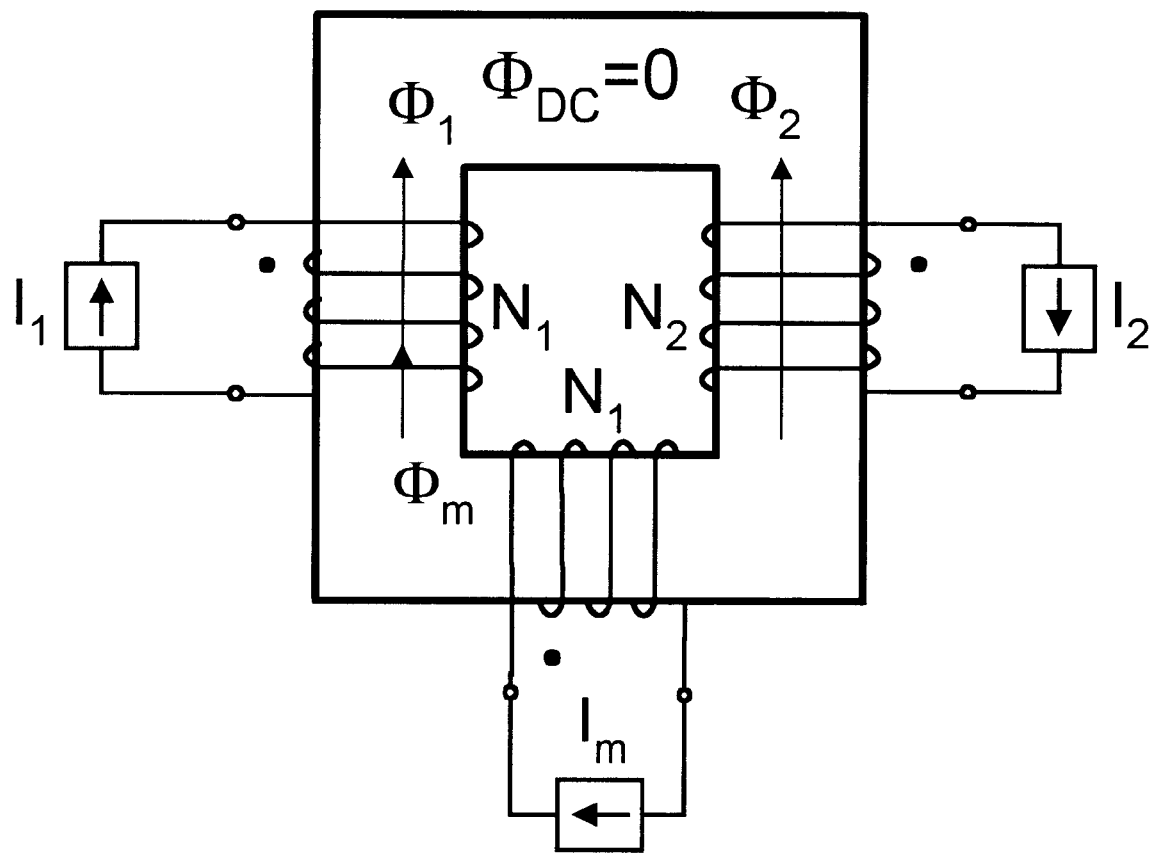
FIG. 37a illustrates a model of the Isolated DC Transformer of FIG. 36a with isolation transformer represented by its magnetizing inductance and DC-bias current I$_m$.
Figure 37B:
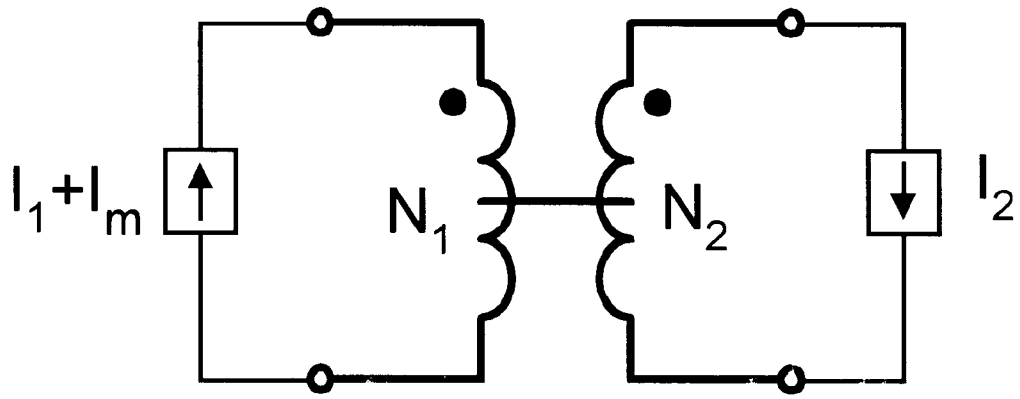

The Isolated DC Transformer as a new magnetics component has the same characteristics as the non-isolated counter-part of FIG. 21, with the exception that it brings added galvanic isolation and voltage scaling capability. Note that the isolation transformer is represented with its magnetizing inductance, which carries DC current $I_m$ flowing into dot marked terminal and has $N_1$ turns as shown in FIG. 37a. Thus, the Isolated DC Transformer could be represented by a new symbol illustrated in FIG. 37b in which the magnetizing current $I_m$ and input inductor current $I_1$ are combined into a single input DC current source $I_1+I_m$ flowing into dot-marked end of the primary winding. The output DC load current $I_2$ is flowing out of the dot-marked end of the secondary winding, thus indicating once again net zero DC ampere-turns.

Just as we have converted the non-isolated converter of FIG. 35a into its counterpart in FIG. 35b, we can now replace the middle inductors of converters in FIGS. 27a–l with an isolation transformer in order to obtain their isolated counterparts. Note, however, that not all non-isolated converter variants will have their isolated counterparts. For example, FIG. 27d and FIG. 27i after such step would still not have the galvanic isolation, since the branch comprised of auxiliary capacitor C and the complementary input switch $S'_1$ is connected between one circuit node on the primary side and another circuit node on the secondary side. Thus, after exclusion of those converter configurations, still a large number of equivalents of the basic non-isolated converter of FIG. 14b is possible. Some of the isolated equivalents of the basic converter are shown in FIGS. 38a–h. Note that in the converters of FIG. 38g and FIG. 38h the branch with auxiliary capacitor C and complementary input switch $S'_1$ is completely on the secondary side. Thus, the original benefit when this branch was on the primary side is lost: the energy stored in the transformer leakage inductance is not recovered but is lost resulting in reduced overall efficiency. Furthermore, this extra energy loss is exhibited as an un-damped or very lightly damped ringing of the drain-to-source voltage of the input MOSFET-like switch. This, in turn leads to high voltage spikes on this device and its higher voltage rating, as well as much increased radiated EMI noise.

Figure 38A:
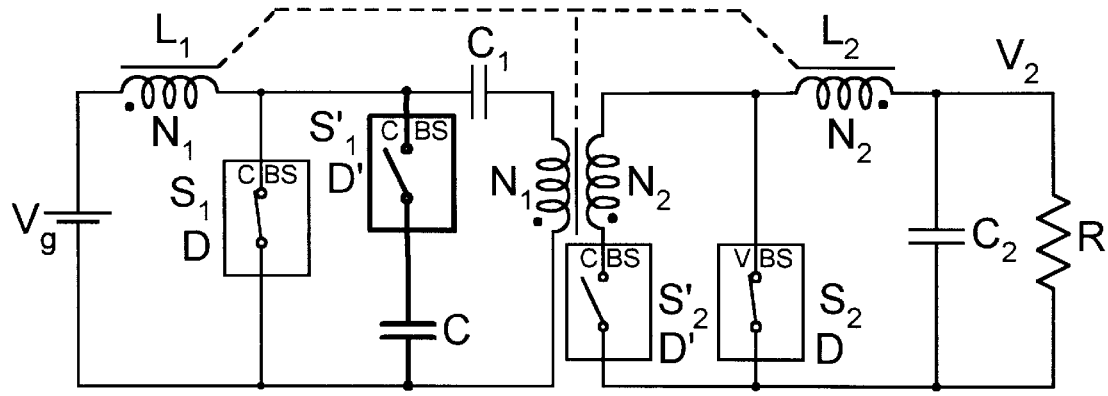
FIGS. 38a–h illustrate eight various isolated converter equivalents obtained from the non-isolated converters in FIGS. 27a–l.
Figure 38B:
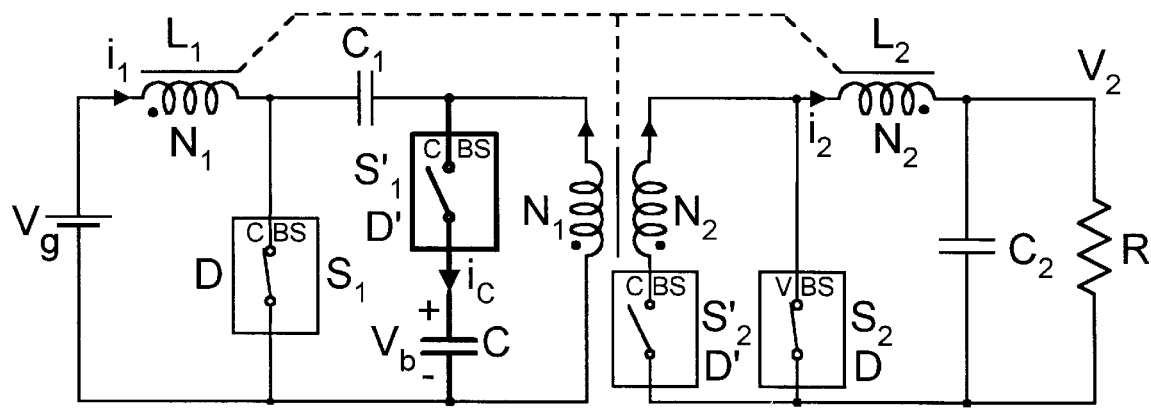
Figure 38C:
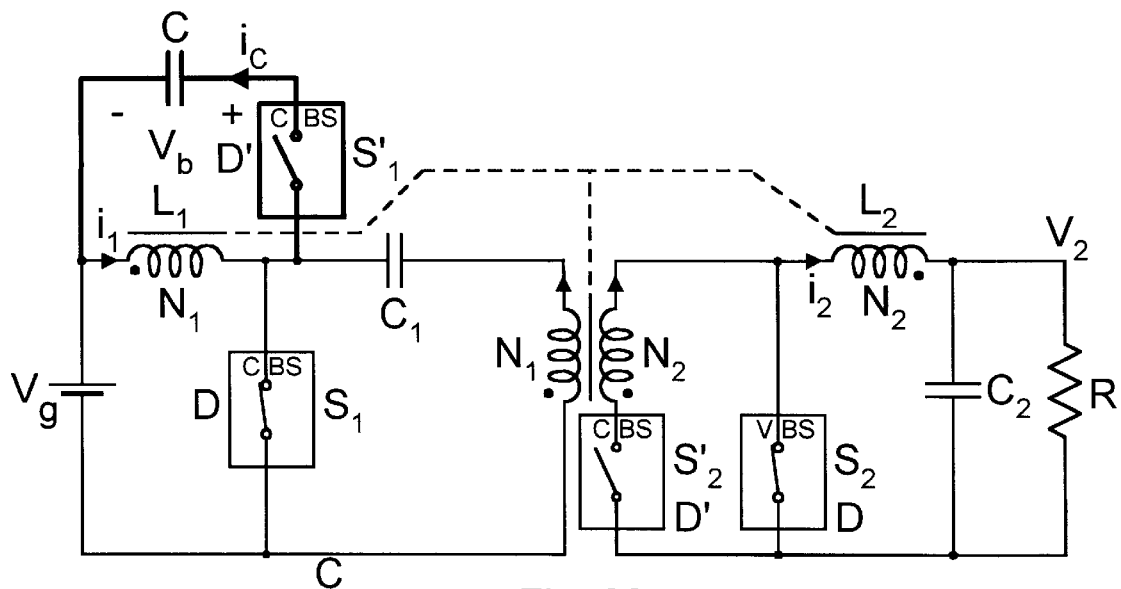
Figure 38D:
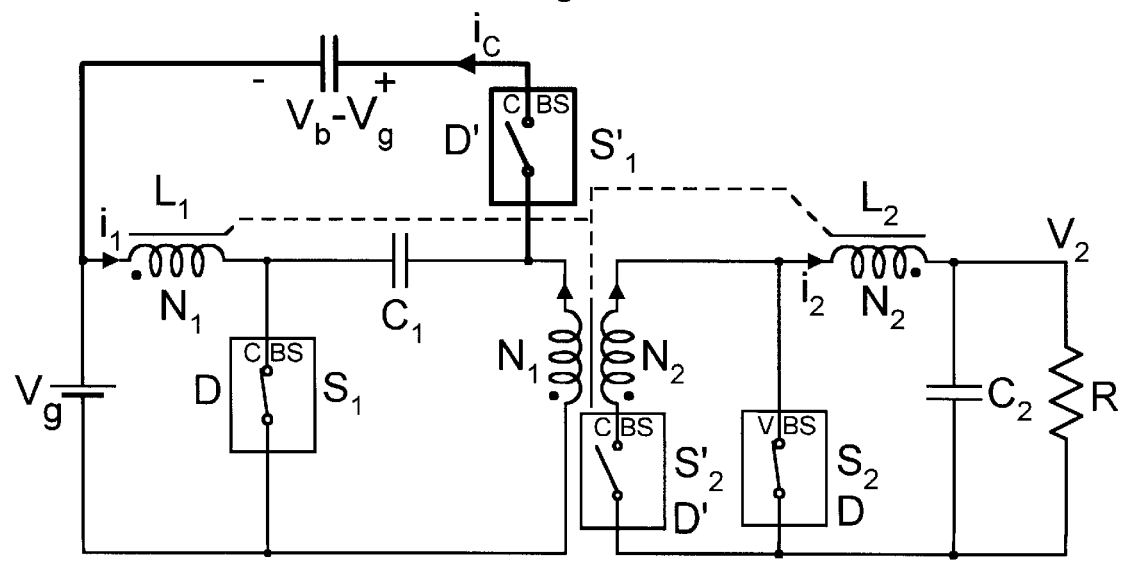
Figure 38E:
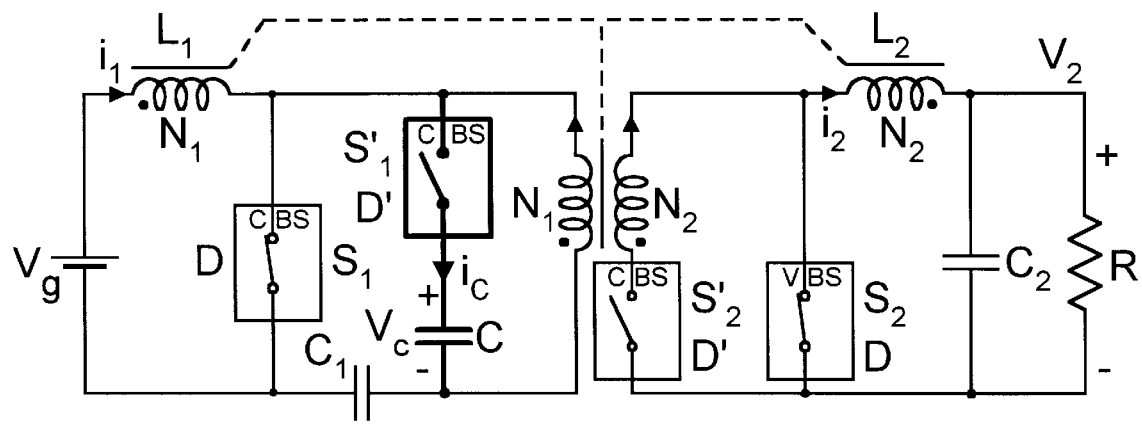
Figure 38F:
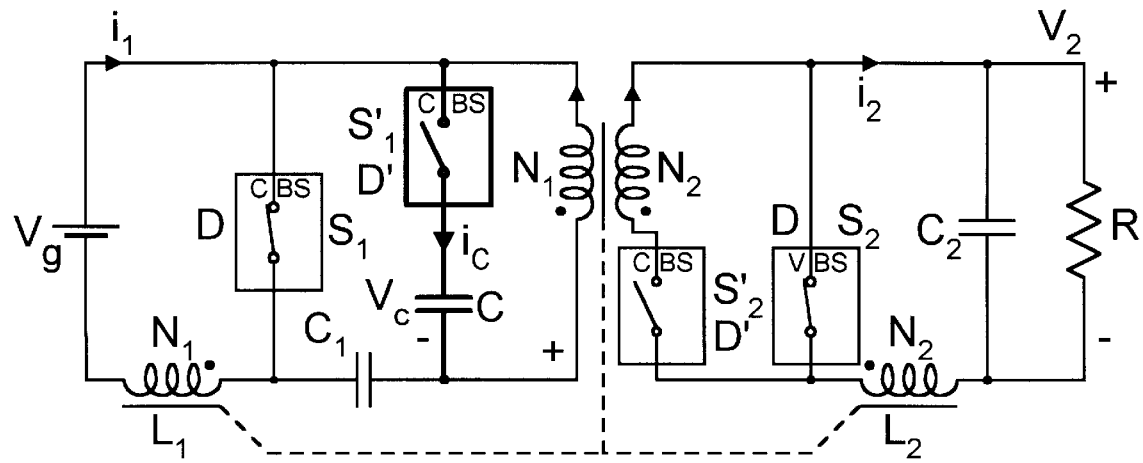
Figure 38G:
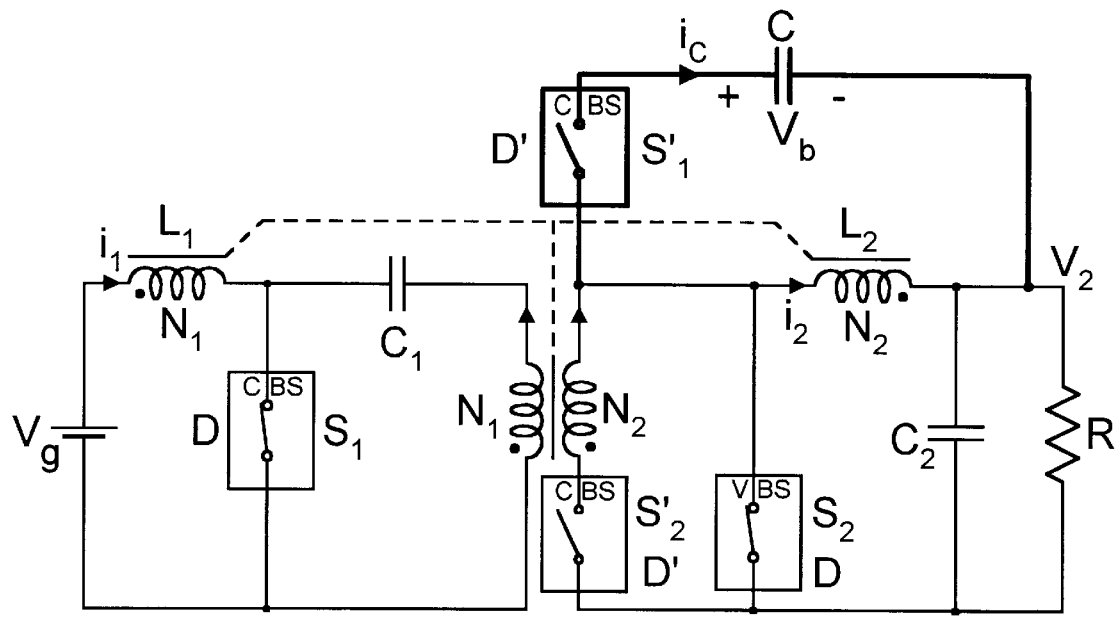
Figure 38H:
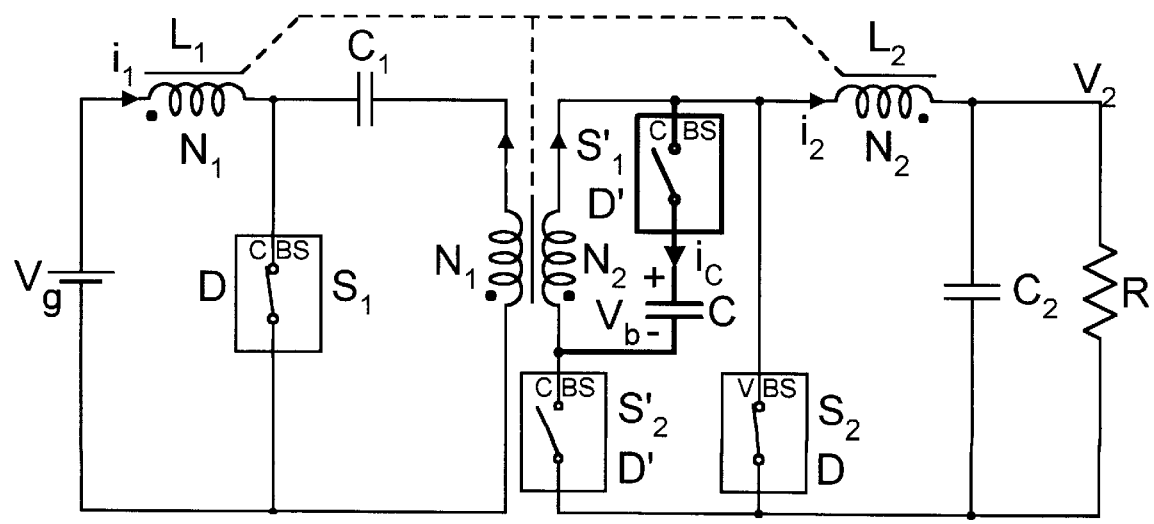
Figure 40:
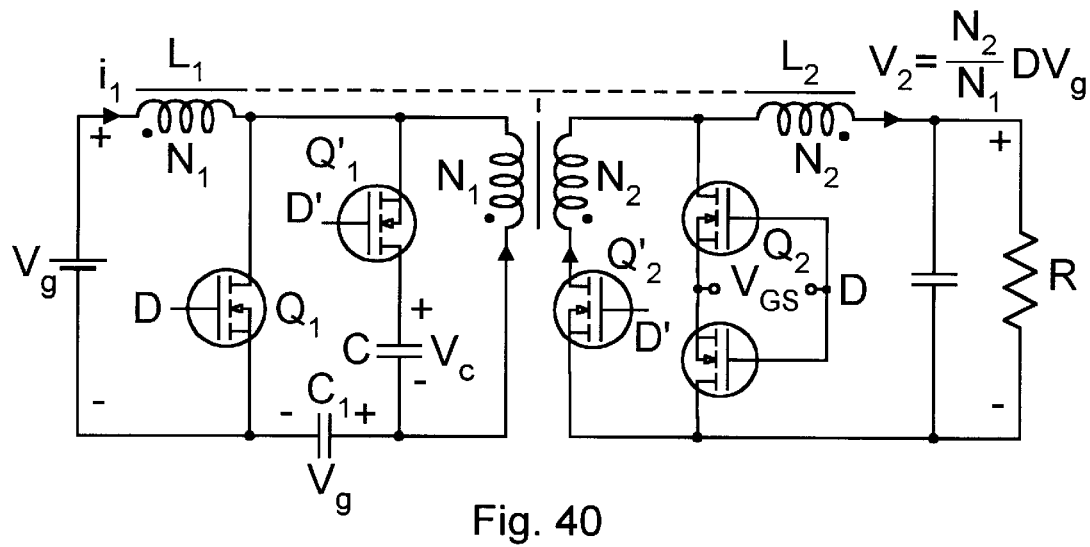

The absence of the common ground in the non-isolated configuration of FIG. 27f is resolved in its isolated counterpart of FIG. 38e in which the transformer is floating while source and load have separate grounds. This configuration has the added advantage that the primary side switches could be implemented with N-channel MOSFET devices in high-side configuration as shown in FIG. 40, while the auxiliary capacitor C has lower voltage rating $V_b$ as given by (10). The same advantage is retained in the isolated configuration of FIG. 38f, which is isolated version of its non-isolated counterpart in FIG. 27k. The isolated counterpart of converter in FIG. 27g is identical to the isolated converter in FIG. 38a except for the input capacitor $C_1$, which is in the top leg and complementary output switch $S'_2$ is in the output return leg. Clearly, both converters are obvious modifications of each other.

Just as the non-isolated case had literally hundreds variants obtained using equivalent transformations, so there is equally large number of isolated converters obtained by simply replacing the middle inductor with an isolation transformer. Only a very few of those, will turn out not to have isolation as explained for the converters of FIG. 27d and FIG. 27i.

Figure 39A:
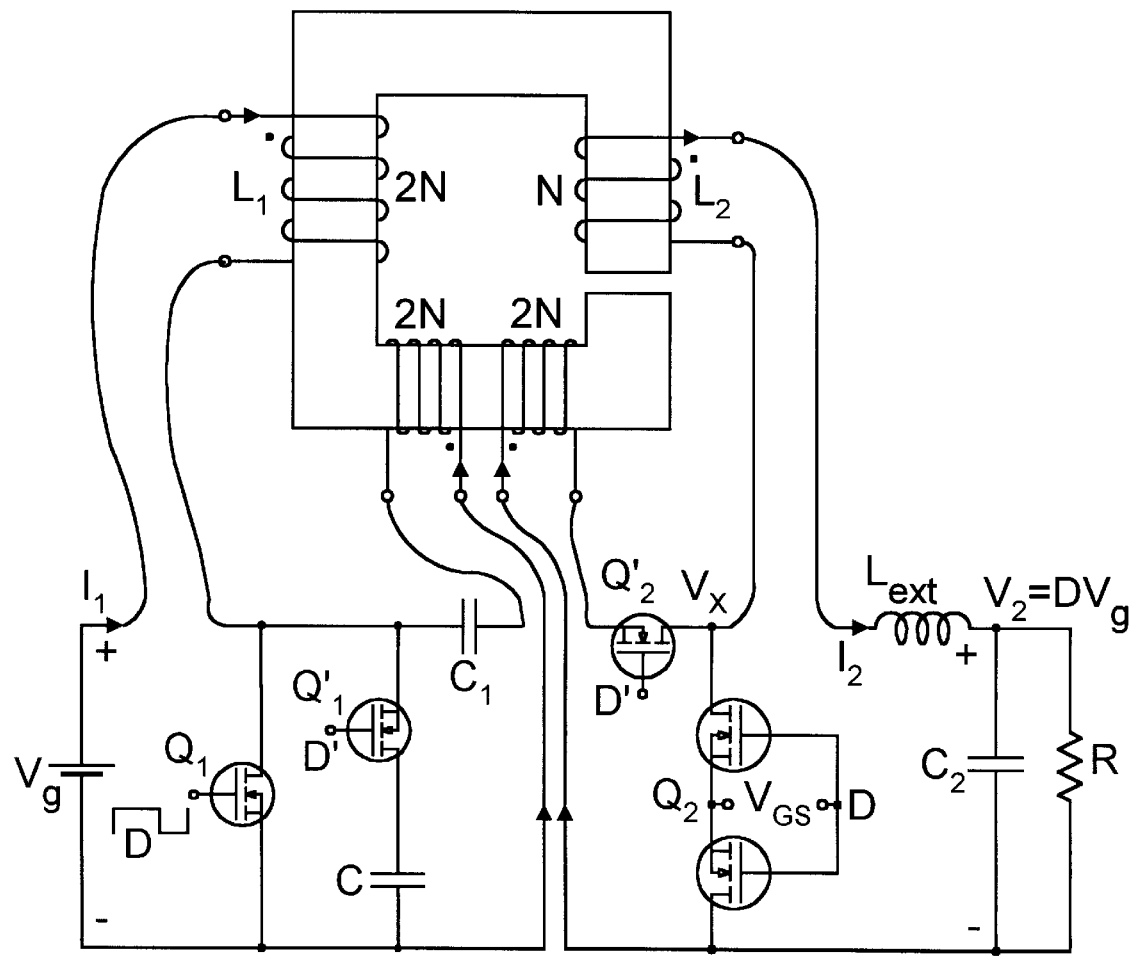
FIG. 39a illustrates the isolated version of the converter in FIG. 30.
Figure 39B:
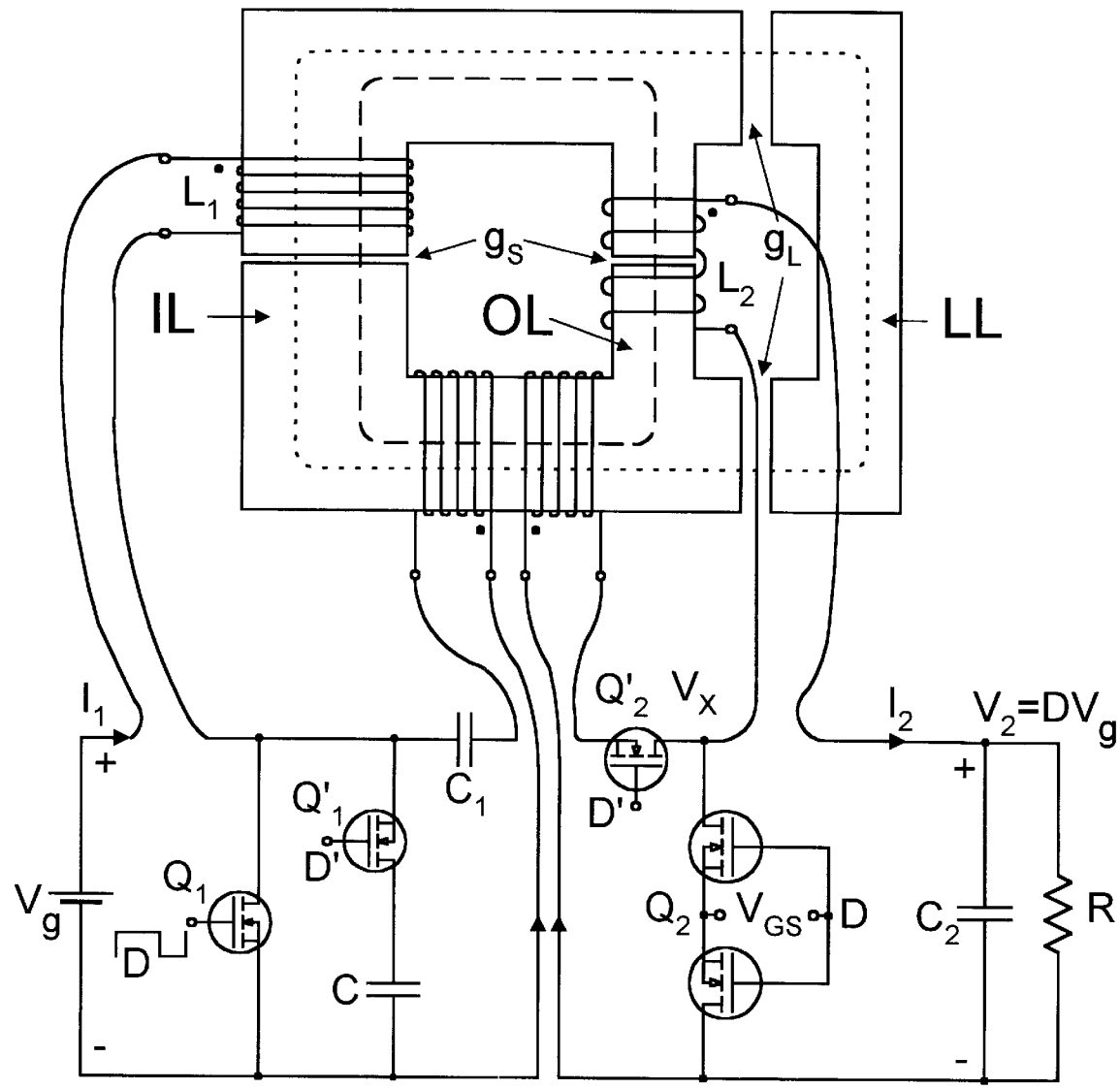
FIG. 39b illustrates the isolated version of the converter in FIG. 33.
Figure 39C:
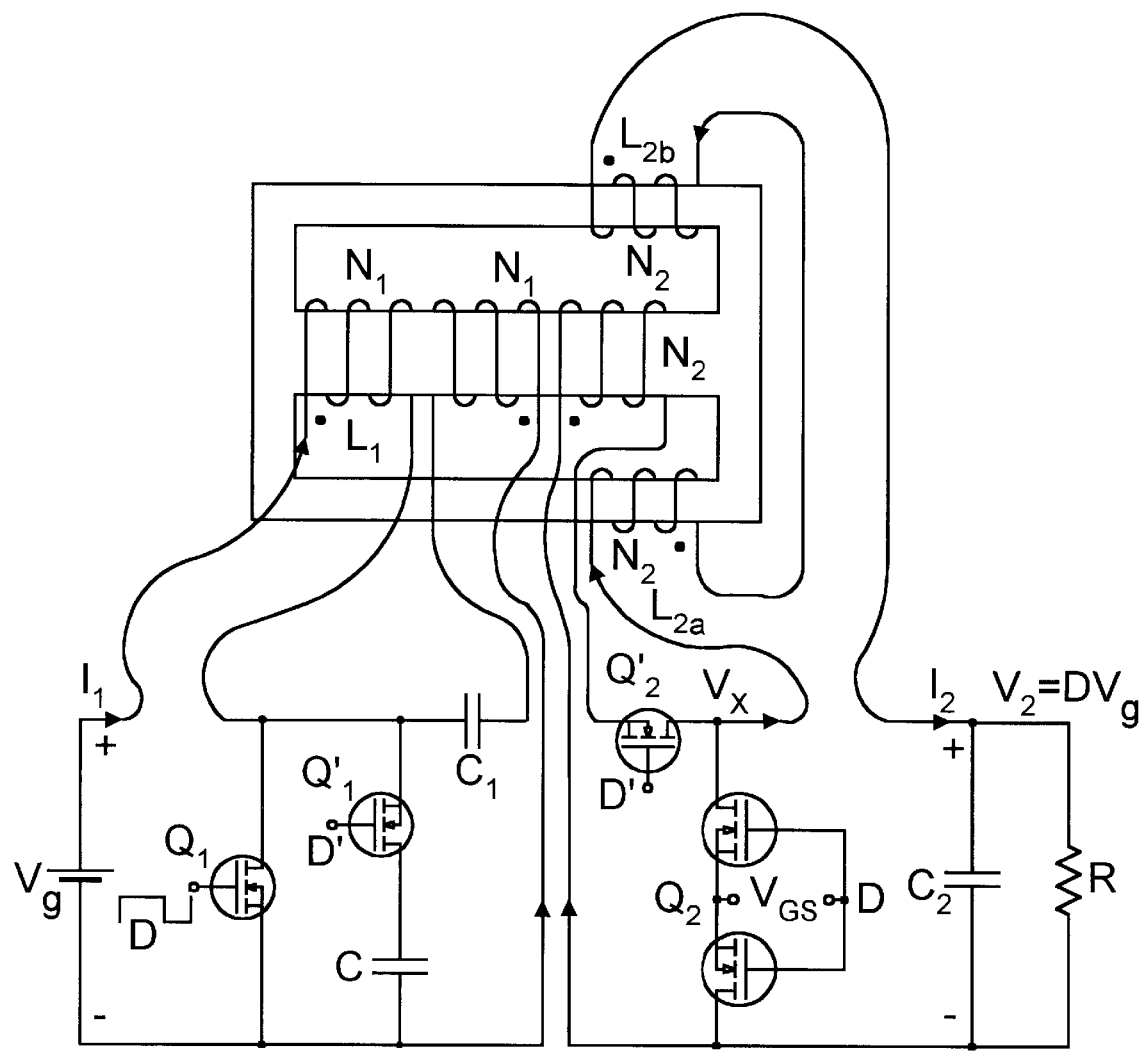
FIG. 39c illustrates the isolated version of the converter in FIG. 34.

The insertion of the isolation transformer did not change the fundamental properties of basic new non-isolated converter of FIG. 14b. Therefore, all magnetic realizations of the DC Transformer discussed at length relative to the non-isolated converter are equally applicable to the isolated counter-parts. For example, an external inductor can be added in series with output inductor as shown in FIG. 30, to result in the same benefits in the isolated counter-part of FIG. 39a. The isolated converter of FIG. 39b is implemented using the magnetic leakage leg in the same way as its non-isolated counter-part in FIG. 33. Finally, the EE-like core structure with no air-gap is implemented in isolated converter of FIG. 39c in the same way as in the non-isolated counter-part in FIG. 34.

From the above discussions it is obvious that the insertion of the isolation transformer did not change the fundamental operation or the key features and performance characteristics of the converter. However, those variants in which the branch with auxiliary capacitor is positioned between primary and secondary side, should be excluded. Nevertheless, there are several additional embodiments of the isolated extension of the present invention of FIG. 36a, which are either not available in the non-isolated configuration or have new interesting features.

Figure 41:
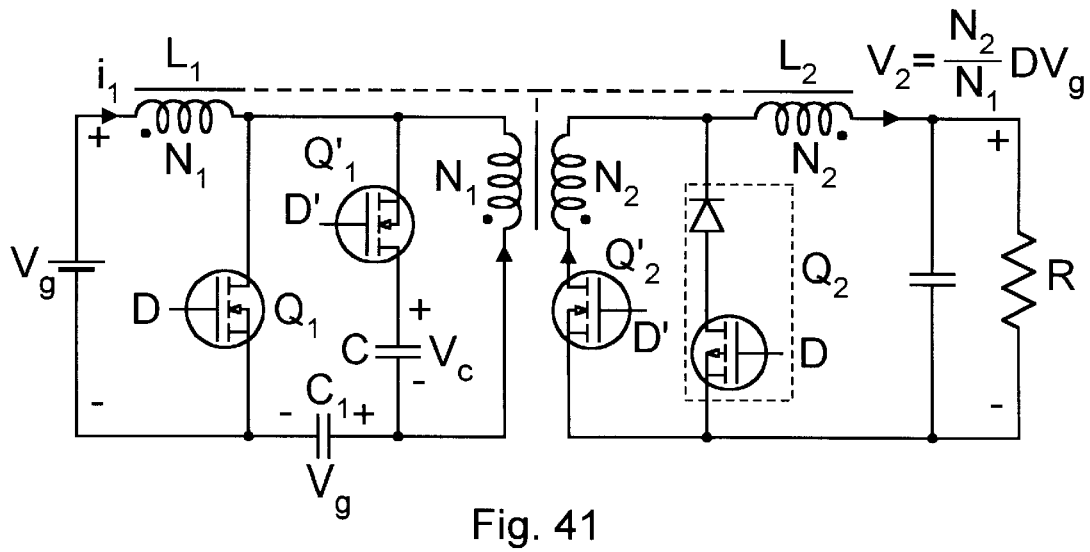

Shown in FIG. 40 is an embodiment of the isolated converter in which all four switches of FIG. 36e are replaced with N-channel semiconductor MOSFET-like switching devices. The primary side switches are so connected that a high-side driver IC circuit can be used, which is a distinct practical advantage. The complementary output switch $Q'_2$ is connected with its source grounded and ready for direct drive. However, the output switch implemented by two-MOSFET four-quadrant composite switch $Q_2$ requires floating drive. In FIG. 41, the voltage bi-directional output switch is implemented with a diode and a P-channel MOSFET with grounded source, which is configuration suitable for a direct drive. Note also that the auxiliary capacitor C is at the same time in a position in which it has a low DC voltage rating.

Note: The voltage on capacitor C is even lower if the branch consisting of switch $S'_1$ and capacitor C is connected in parallel with the input inductor $L_1$. However, in this solution the input current will contain the current flowing in this branch plus the input inductor current and thus, will no longer be ripple free.

Figure 42:
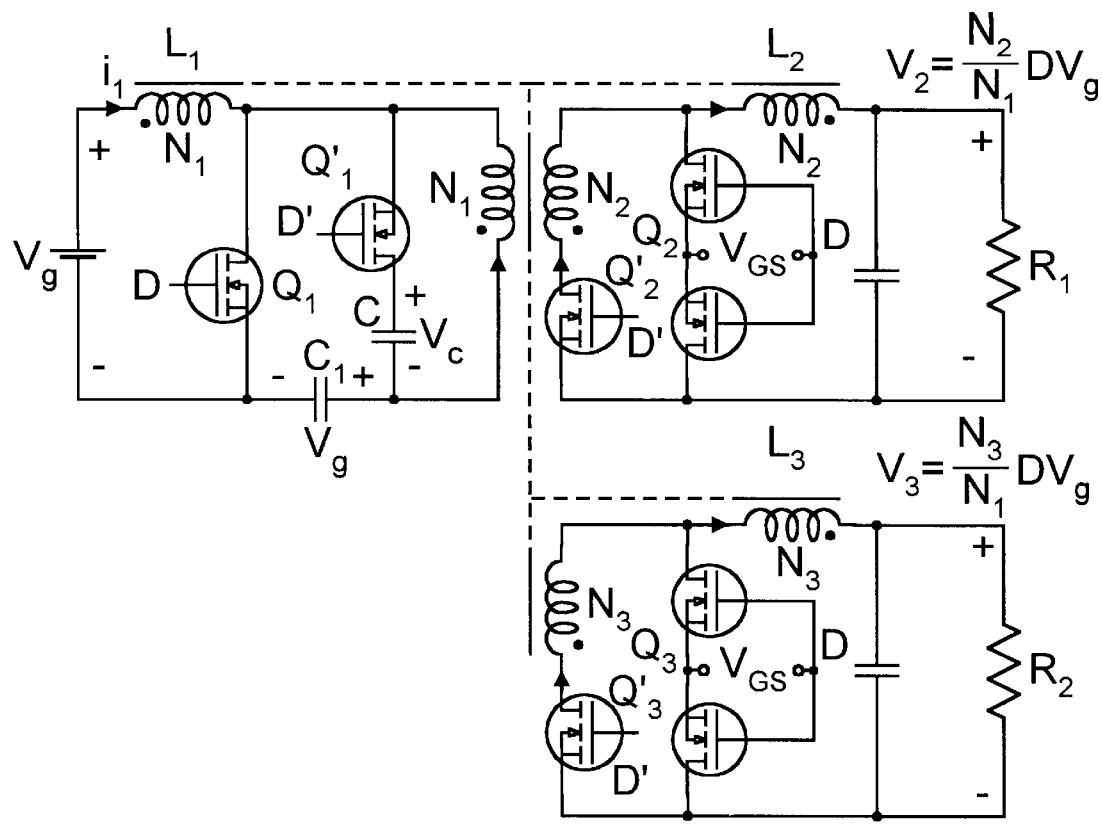
FIG. 42 illustrates a two-output embodiment of the converter in FIG. 40.

Once the isolation transformer is implemented, multiple outputs can be provided, and each separate output can be scaled by the corresponding transformer turns ratio, such as illustrated in FIG. 42. Note that, as long as the number of turns of the output inductor and the transformer secondary of the second output are the same, the net DC-ampere-turns are again zero. Thus, once again, the magnetic core without any air-gap can be utilized for this multiple output converter of FIG. 42. Finally, since each output is isolated, by choosing appropriately the output ground for the second output, a negative polarity output voltage can be obtained as well.

Figure 43:
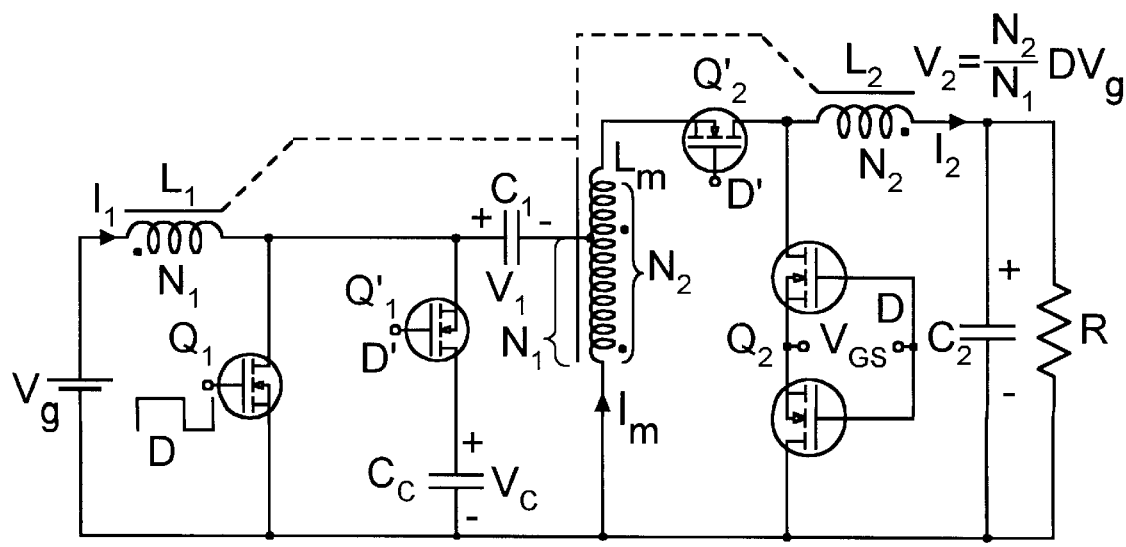
FIG. 43 illustrates another embodiment of the present invention using an autotransformer.

In some applications where isolation is not required and a positive output voltage polarity is needed from a positive input voltage source, it is beneficial to use another embodiment in which an autotransformer replaces isolation transformer, such as shown in FIG. 43. As in any autotransformer connection, primary and secondary windings share some common number of turns, such as $N_1$ in FIG. 43. This configuration is more efficient than the fully isolated version. As shown in FIG. 43, only one winding with total number of turns $N_2$ needs to be provided for the autotransformer, since primary winding is just using a tap at $N_1$ turns. In configuration shown in FIG. 43, $N_2>N_1$ and turns ratio provides a voltage step-up. However, when $N_2<N_1$ (secondary winding uses a tap on the primary winding), an additional voltage step-down is obtained. In addition the AC copper losses are reduced, since the single autotransformer winding has also lower rms current. An additional voltage scaling of output DC voltage is obtained, just as in the isolation transformer case. Note that zero total DC ampere-turns are also preserved in the autotransformer extension of FIG. 43 under analogous condition to the isolating case: the output inductor must have the same number of turns $N_2$ as autotransformer secondary, while the input inductor must have the same number of turns $N_1$ as the primary of the autotransformer.

In the majority of applications, such as in operation from the rectified AC line, a rather large overall step-down is required, from 400V to 5V or lower voltage, for example. In this case, an additional step-down is provided through the isolation transformer step-down turns ratio. The isolating extension of FIG. 40 and autotransformer extension of FIG. 43 perform in that case also an important practical function of complete decoupling of the converter input side from the converter output side. This desirable performance is due to the output side rectification. The complete decoupling means that the input side will only "see" its low currents and no reflected DC currents from the output side, which in low voltage, high current application could represent major additional current stress on the input side devices. Likewise, the output voltages will not reflect to the input side to increase the voltage rating of the input side devices. Similarly, the voltages on the input side will not reflect to the output side and increase the voltage rating of the output side components. Neither will the input current reflect through the autotransformer turns ratio to increase the total current seen by the output devices. Thus, the input switching devices will operate at low input current, while output devices will operate at low output voltages, without any additional voltage and/or current overhead.

This also reveals which of the MOSFET switching devices in FIG. 40 are most critical for the reduction of the switching losses in case of a large input to output step-down conversion. Input side MOSFET switches are in that case high voltage devices, while output side MOSFET devices are low voltage devices.

When the MOSFET switches are OFF their parasitic drain-to-source capacitance is charged to the OFF state voltage storing energy which is given by $\frac{1}{2}CV_{OFF}^2$ where $V_{OFF}$ is the device blocking voltage and C is the device drain-to-source parasitic capacitance. Due to quadratic dependence on the blocking voltage, the high voltage devices on input side have considerably higher stored energy than low voltage output devices. Each time the respective MOSFET switch is turned ON the parasitic capacitor is shorted and its stored energy is dissipated as heat, unless other measures are taken to eliminate this loss. Clearly, the high voltage devices on the input side are by far the most critical in terms of this loss contribution. Thus, the next section describes soft-switching embodiments of the present invention which completely eliminate the switching losses of the high-voltage MOSFET-like switches on the input side for any operating point.

REDUCTION OF SWITCHING LOSSES

Fourth Fundamental Property

The DC components of the input and output inductors and their effect on the DC flux in the single magnetic core of the DC Transformer were discussed earlier in reference to FIG. 19c and FIG. 19d. The AC components of the two inductors in the converter of FIG. 18a are displayed in FIG. 44a and FIG. 44b. Note that for the given chosen direction of the two inductor currents and for the positive AC voltage polarity of the two windings chosen as per FIG. 18a, the following equations apply:

$$v_{L1}=L_1 di_1/dt \text{ and } v_{L2}=-L_2 di_2/dt \qquad (24)$$

As the result of the difference in sign of these two circuit representations output inductor ripple current is of inverted polarity in comparison with input inductor ripple current as seen in FIG. 44a and FIG. 44b. The instantaneous inductor currents are then obtained by superposition of positive DC currents of FIG. 19c and FIG. 19d with the AC ripple currents of respective inductors of FIG. 44a and FIG. 44b.

Let us now fully explore the time domain interpretation of equations (5), (6), and (7). The sum of inductor currents $i_1(t)+i_m(t)$ is displayed in FIG. 45a, showing its DC current level $I_1+I_m$ and AC ripple current level. Note that since both $i_1(t)$ and $i_m(t)$ flow into the dot-marked winding ends (positive) in FIG. 18a, their AC ripple components are adding together and resulting in the total $\Delta i_1(t)+\Delta i_m(t)$ peak-to-peak ripple current which has positive polarity. On the other hand, the output inductor $i_2(t)$ flows out of the dot-marked winding end, thus resulting in the superimposed AC ripple current of opposite polarity (that is out of phase) to that of input and middle inductors, hence as shown in FIG. 45b. The output inductor DC current level $I_2$ is of equal magnitude as $I_1+I_m$, thus after subtraction the net DC current shown in FIG. 45c is zero at all times, demonstrating the relationship (5). The subtraction of the ripple current $\Delta i_2(t)$ of FIG. 45b from the ripple current $\Delta i_1(t)+\Delta i_m(t)$ of FIG. 45a results in the time domain total ripple current waveform of FIG. 45d. Note that since the output inductor ripple current is out of phase relative to the input inductor and middle inductor ripple currents, and since we are looking at the difference $\Delta i_1(t)+\Delta i_m(t)-\Delta i_2(t)$, this will result in actual addition of the magnitudes of all three ripple currents as shown in FIG. 45d. The time domain current $i_C(t)$ in auxiliary capacitor C coincides with the waveform of FIG. 45d during the complementary time interval $D'T_S$ and is obviously zero during the time interval $DT_S$ thus resulting in the time domain waveform of FIG. 45e. This auxiliary capacitor current has no DC component thus verifying the original assumption.

In the above analysis, the three inductors are at first assumed to be separate inductors. Note, however, that the same final ripple current waveforms of FIG. 45d and FIG. 45e will be obtained when the three inductors are coupled into a single-loop magnetic core of a DC Transformer. This is so, because, irrespective to relative phase of ripple currents in the three inductor windings, their total sum given by $i_1+i_m-i_2$ must at any duty ratio D be equal to the ripple current of the magnetizing inductance of the non-isolated DC Transformer with three inductor windings and will be as shown in FIG. 45d. Thus, even under coupling constraint of DC Transformer, current $I_N$ in FIG. 45e will always be negative for any duty ratio D, thus enabling the soft switching operation in the same way as without coupling. Clearly, the same holds true for the Isolated DC Transformer as well.

Figure 13:
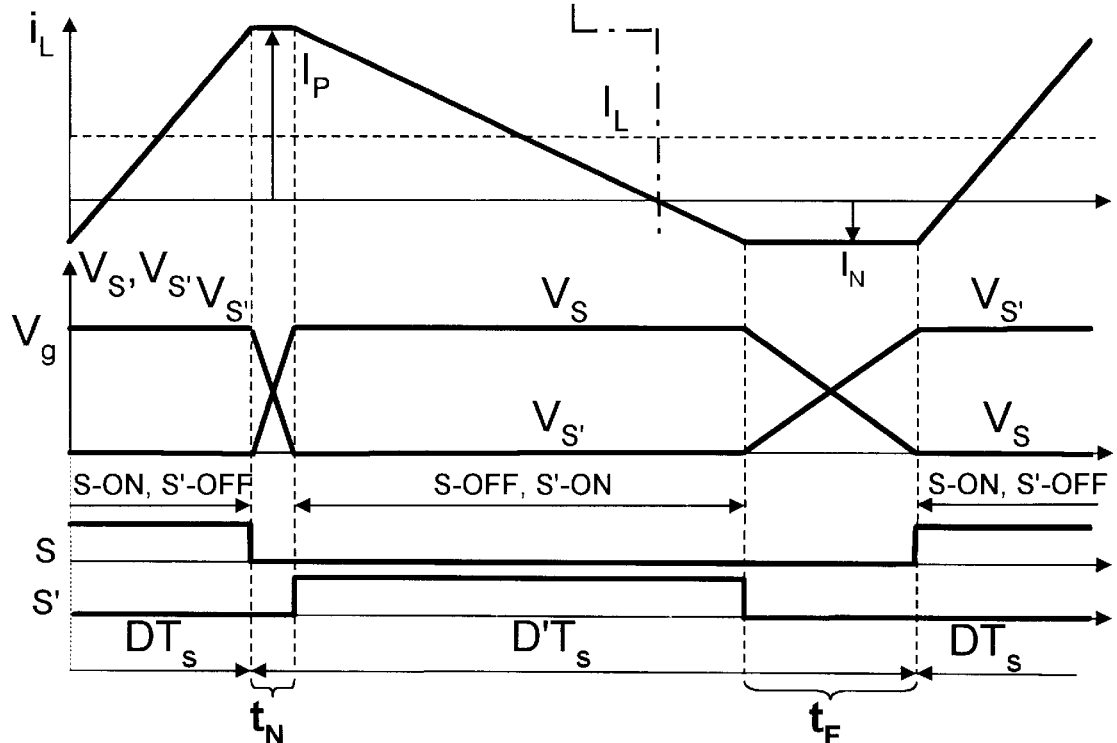
FIG. 13 is a timing diagram illustrating the need for a high ripple current with a required negative value to accomplish the soft switching in the buck converter of FIG. 12.

From the above detailed analysis, it follows that regardless of the magnitudes of the ripple currents in the three inductors, the auxiliary capacitor time domain current will always be of the same shape as shown in FIG. 45e: positive peak value $I_P$ at the transition from $DT_S$ to $D'T_S$ time interval and equal in magnitude but negative peak $I_N$ during the transition from $D'T_S$ to $DT_S$, where $I_P=|I_N|=\Delta i_C/2$. Note how this already provides automatically the negative peak current $I_N$ for the difficult to implement forced transition (D' to D transition) for soft switching. Common soft switching techniques, until present invention, had to somehow forcefully generate the negative instantaneous output inductor current by, for example, an inordinate increase of the output inductor ripple current as described and shown in FIG. 13.

We will now describe the three novel soft-switching methods, which are also made possible by the unique and special relationship of the present invention as disclosed in equation (4) and the waveforms of FIG. 45a, FIG. 45b, and FIG. 45e. Note in particular the negative part of the auxiliary capacitor current during the complementary interval $D'T_S$. This will enable the usually difficult forced switching transition to be carried out effortlessly. In addition, this waveform together with the implementation of the voltage bi-directional output switch will enable the three new soft-switching methods, which are based on using only the appropriate sequence and gate drive timing of the four switches to accomplish complete zero-voltage soft switching operation of input and complementary input switches, and, contrary to the conventional soft switching methods, will not require addition of any resonant elements, such as resonant inductors for its operation. All three novel soft-switching methods are effective in completely eliminating the switching losses of the input switch and complementary input switch for any operating duty ratio D, which is not the case with the conventional soft switching methods.

Soft-switching in the Non-isolated Converter

Two of the soft-switching techniques described below are suitable for the non-isolated DC Transformer converter shown in two versions: in FIG. 46a with the two MOSFET transistors, four-quadrant implementation of the Voltage Bidirectional Switch (VBS) of FIG. 15c, and in FIG. 46b with the MOSFET transistor/diode two-quadrant implementation of VBS switch as in FIG. 15i. For explanation of these two soft-switching methods, both converters will be represented with the converter circuit model of FIG. 46c in which MOSFET devices for current bi-directional switches, such as input switch complementary input switch, and complementary output switch, are represented by a composite switch consisting of the parallel connection of an ideal switch, a parasitic diode also called a body diode, and a parasitic drain-to-source capacitor, while the two-quadrant VBS switch or four-quadrant VBS switch is represented by a composite switch consisting of the parallel connection of an ideal switch, parasitic back-to-back diodes, and a parasitic capacitor (equivalent to the two parasitic drain-to-source capacitors of each device connected in series).

Figure 46A:
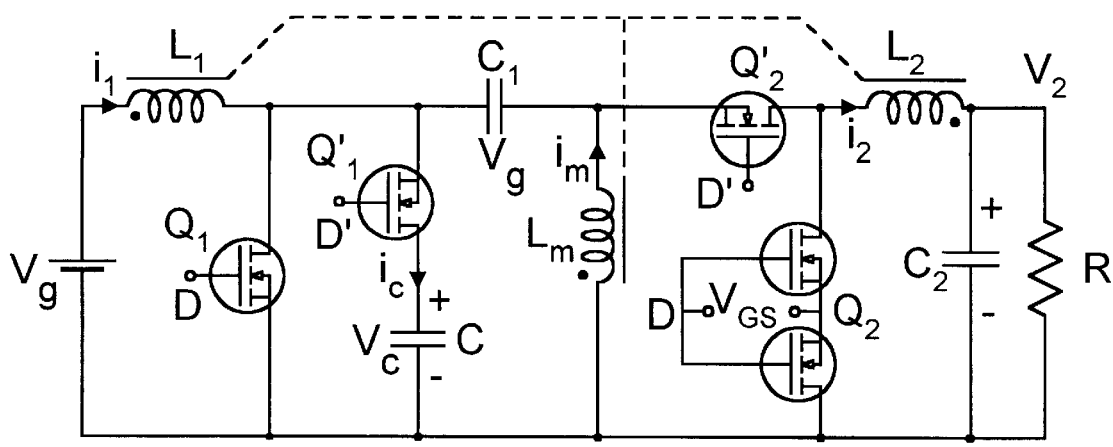
FIG. 46a illustrates an all-MOSFET implementation with a two-MOSFET implementation of the Voltage Bidirectional Switch.
Figure 46B:
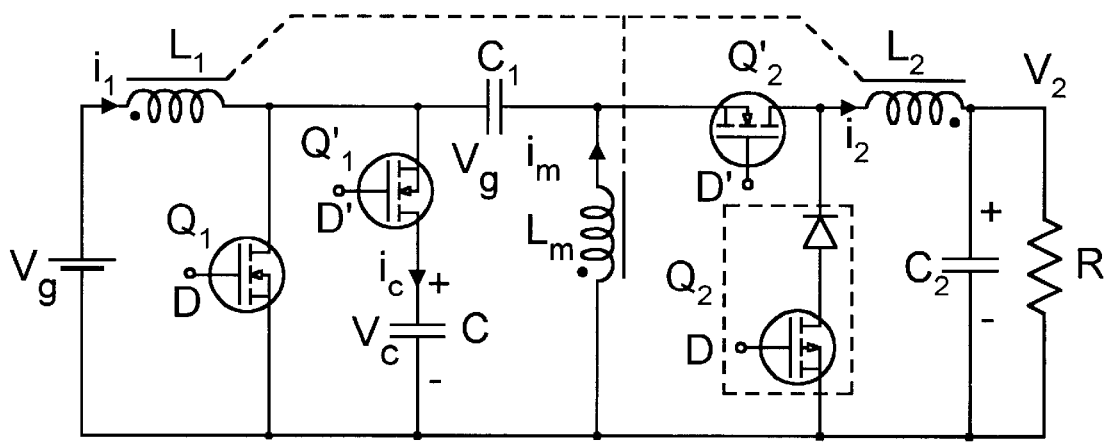
Figure 46C:
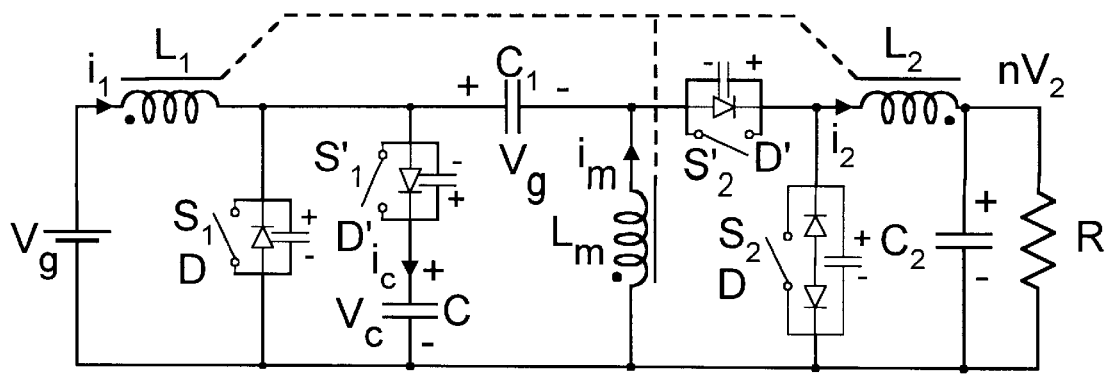
FIG. 46c represents a circuit model of converter in FIG. 46a in which each MOSFET Current Bidirectional Switch (CBS) is replaced by a composite switch consisting of the parallel connection of an ideal switch, a parasitic body diode and a parasitic capacitance, and output two-MOSFET Voltage Bidirectional Switch (VBS) is replaced by a composite switch consisting of the parallel connection of an ideal switch, a back-to-back parasitic body diodes and an equivalent parasitic capacitance.

The switch drive sequence and timing of the first soft-switching method results in the voltage waveform across the output switch with characteristic negative voltage peaks on both sides and the symmetrical leading and trailing edge. Due to such symmetry of the voltage waveforms of input and output switches as also seen in experimental measurements of FIG. 57b, this method is henceforth designated symmetrical soft-switching. Another pattern of the drive sequence and timing leads to the voltage waveform across output switch with negative peak on only trailing edge, as seen in the experimental measurements of FIG. 59b, and is henceforth termed asymmetrical soft switching. The third soft switching method described below is suitable for the isolated DC Transformer Converter of FIG. 46d. The circuit model of the isolated converter is shown in FIG. 46e with the secondary side reflected to the primary side by the primary to secondary turns ratio n. Note that the isolation transformer is represented by a simplified model with just a magnetizing inductance $L_m$ and the leakage inductance $L_l$. Note that the same circuit model will be obtained for the autotransformer version of FIG. 43. The replacement of the actual switches with their equivalent circuit models results in the circuit model of FIG. 46f, which is used for detailed description of the soft switching operation. The actual measured soft-switching voltage waveforms of the isolated converter shown in FIG. 61 resemble those of the asymmetrical soft-switching in non-isolated converter with differences noted in detailed analysis that follows.

Primary Side vs. Secondary Side Hard-switching of the Isolated Converter

In most practical applications, such as off-line switching power supplies, the AC input voltage is first rectified, resulting in high DC voltage and then by using isolated switching DC-to-DC converter with high step-down transformer turns ratio, this high input voltage is reduced to 5V DC or lower voltage for electronic applications. The following analysis reveals that primary side high voltage devices contribute by far most switching losses, even when partially soft-switched, compared to the secondary side low voltage devices, which even when fully hard-switched, contribute only negligible switching losses. This gives the primary motivation for the new type of soft-switching first introduced in the isolated extension of the present invention of FIG. 46d, in which complete soft-switching with zero switching losses of switches on the high voltage primary side, input switch and complementary input switch, is achieved and only negligible switching losses remain on the output switch due to its hard-switching operation. Of course, the gate drive losses of the respective devices still remain, but dominant switching losses due to parasitic drain-to-source capacitances of switching devices are practically entirely eliminated. Another clear advantage of this new soft-switching method in comparison with conventional soft-switching methods is that such performance is maintained throughout the entire operating range, that is for any operating duty ratio D. Equally important, it is only proper sequence and timing of the drives, which is needed for such superb operation. Hence, unlike other classical soft-switching methods which depend either on the transformer leakage inductance or additional resonant inductor and their resonance for soft-switching operation, here, the transformer leakage inductance is not essential for basic soft switching operation, although it does further improve soft-switching performance as described below.

Figure 46D:
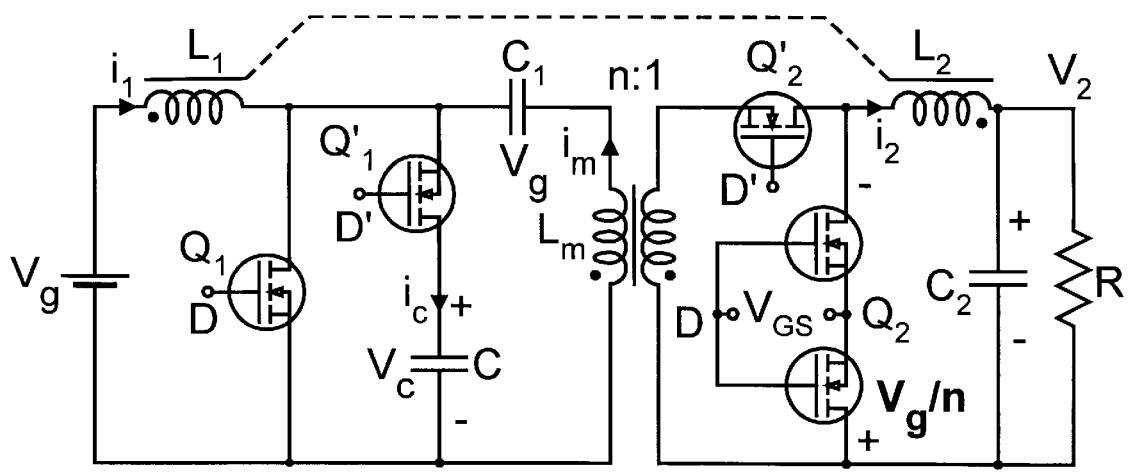
FIG. 46d illustrates the isolated converter used for soft-switching analysis and FIG. 46e represents the equivalent circuit model of FIG. 46d, in which the isolation transformer is replaced with its magnetizing inductance L$_m$ and leakage inductance L$_l$ on primary side, and secondary side reflected to primary side using transformer turns ratio n:1.
Figure 46E:
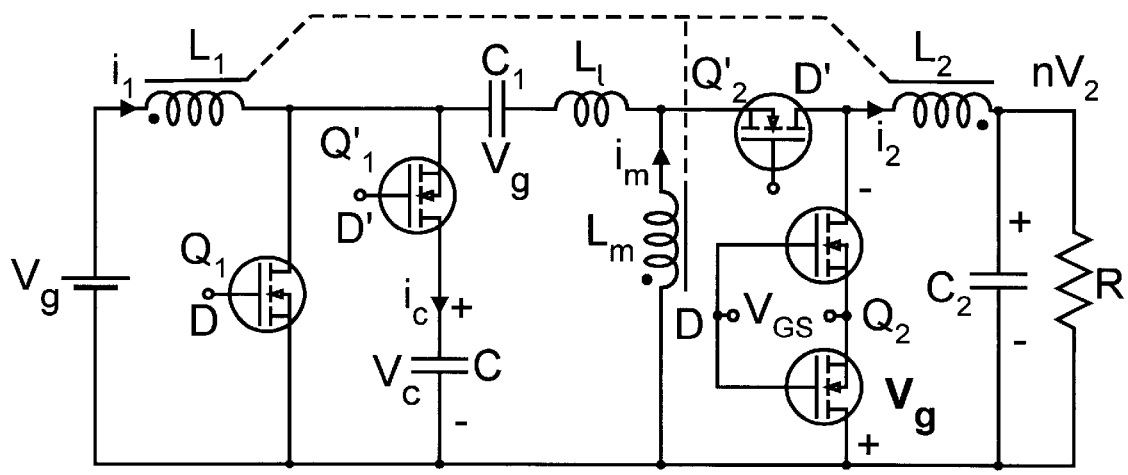
Figure 46F:
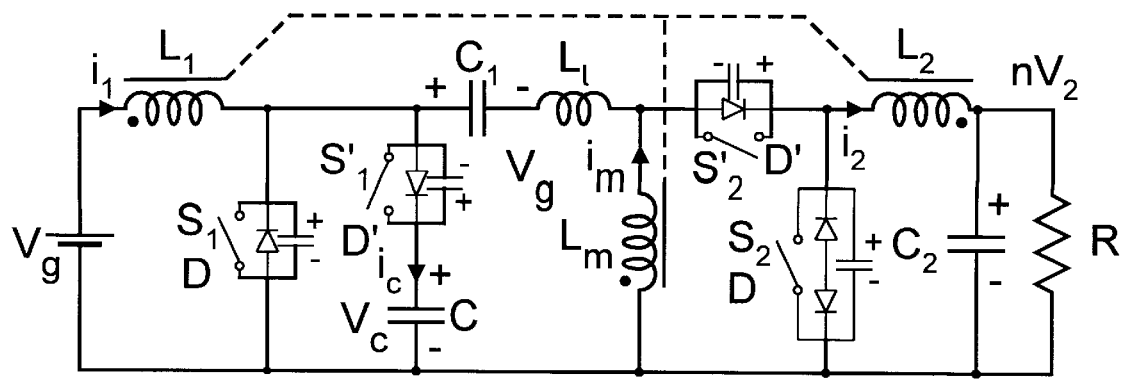
FIG. 46f represents the circuit model of converter in FIG. 46e with each semiconductor switch replaced with its respective circuit model.

To facilitate this comparison, the isolated converter of FIG. 46d is chosen with the following values used later in experimental section for measurement and waveform demonstrations: $V_g$=450V, n=27, $V_2$=5V, switching frequency $f_S$=200 kHz.

In so called "hard-switching" the energy stored in the parasitic capacitance of each switch when the switch is OFF (hence parasitic capacitor charged to the blocking voltage $V_{OFF}$) is dissipated each time the respective switch is subsequently turned ON thus resulting in switching losses directly proportional to the square of the blocking voltage $V_{OFF}$ and directly proportional to operating switching frequency according to formula:

$$P=\tfrac{1}{2}C_P V_{OFF}^2 f_S \qquad (25)$$

where $C_P$ is the parasitic capacitance and $V_{OFF}$ is the blocking voltage.

It is now instructive to compare the power loss due to the hard-switching of the high-voltage primary-side switches to the power loss of the hard-switching of the low-voltage secondary-side switches of the isolated converter in FIG. 46d at the same switching frequency of 200 kHz. The typical data for an off-line switching supply described in the experimental section is used here. The input switch $Q_1$ operates with $V_{OFF}$=750V and has $C_P$=350 pF which leads from (25) to rather large hard-switching loss of $P_1$=19.7 W. Even if one of the conventional soft-switching methods were used to reduce the voltage on the input switch to $V_{OFF}$=$V_g$=450V before it is hard-switched, the switching loss is reduced to $P_{1(450V)}$=7.1 W.

Suppose that another type of soft switching is capable of achieving a full soft switching of the input switch of the non-isolated converter model of FIG. 46e in exchange for having output switch hard-switched. For example, let us assume that the previous partial hard-switching of input switch in non-isolated converter of FIG. 46e at $V_{OFF}$=$V_g$=450V, is now replaced with the hard-switching of output switch at the same voltage level magnitude of $V_g$=450V but of a negative polarity as later detailed analysis demonstrates. If the switching device with the same parasitic capacitance $C_P$=350 pF (as above) is used for both input and output switch, the same large 7.1 W switching losses would now be contributed by the output switch and no improvement seems to have been made. Note, however, that the "hard-switching" of the output switch $Q_2$ at the voltage magnitude $V_g$ in the converter of FIG. 46e (non-isolated model of the isolated converter in FIG. 46d) would through the transformer turns ratio n translate into "hard-switching" on the output switch $Q_2$ in the isolated converter of FIG. 46d at a much lower voltage level $V_{NEG}$ given by:

$$V_{NEG}=V_g/n \qquad (26)$$

Thus, for n=27 the hard-switching voltage of $|V_g|$=450V of the output switch $Q_2$ in the non-isolated converter model of FIG. 46e reduces per (26) to an equivalent hard-switching voltage of only $V_{NEG}$=16.7V in the isolated converter of FIG. 46d. This characteristic negative voltage peak at the trailing edge of the voltage across output switch $Q_2$ is confirmed by the waveforms of FIG. 61 measured on an experimental prototype of an off-line converter with 450V input DC voltage with $V_{NEG}$=16.7V. Note that this negative voltage is also designated as $V_{NEG}$ on the measurements waveforms. Note also that the blocking voltage of the output switch in the isolated converter of FIG. 46d is also proportionally reduced, so that a low-voltage rated switch can be now used such as 30V device in experimental prototype. Since this switch has also proportionally increased current capability, it also results in increased parasitic capacitance $C_{2P}$. In the typical case used in experimental prototype, the low voltage output switch $Q_2$ of FIG. 46d has over 8 times larger parasitic capacitance than $Q_1$, i.e., $C_{2P}$=2950 pF. However, its hard-switching voltage is only $V_{NEG}$=16.7V, hence 27 times smaller (same as turns ratio n) than hard-switching voltage on the primary side. In addition, due to quadratic dependence of the switching losses on the blocking voltage as per (25), this results in extremely small hard-switching losses of the output switch in the isolated converter of FIG. 46d which are calculated from (25) to be $P_2$=0.082 W or 1.1% of the hard-switching losses on the primary side. Thus the conclusion is that the hard-switching losses of the practical low-voltage devices are negligible and the main source of the switching losses is in the hard-switching losses of the high-voltage switching devices on the primary side. Thus, with reference to FIG. 46d the switching losses of $Q_1$ and $Q'_1$ switches are by far the most critical and need to be reduced or eliminated by utilizing soft-switching methods, while switching losses of the output low-voltage switches $Q_2$ and $Q'_2$ are practically negligible. This is exactly what is accomplished in the novel soft-switching method applied in the isolated converter of the present invention.

The role of the Voltage Bidirectional Switch in the isolated converter in FIG. 46d is precisely to move any hard-switching from the primary side high-voltage switches to the secondary side low voltage switches, and in the process enables complete soft-switching of the high voltage switches on the input primary side and thereby eliminates most of the switching losses. Had the output switch been implemented by a single MOSFET only (CBS switch), its internal diode would by turning ON prevent the voltage of output switch to go negative and would therefore clamp the transformer voltage at zero, which in turn could soft-switch and discharge the parasitic capacitor of the input switch during D' to D transition only to voltage level $V_G$ at which point this input switch would have to be hard-switched. Voltage Bidirectional Switch, however, enables the discharge of the input switch parasitic capacitor during the difficult D' to D transition to continue all the way to zero voltage, thus leading to its zero switching losses. On the other hand, the output switch is now forced to hard-switch at much reduced voltage magnitude of $V_g/n$, which for the first time results in the hard-switching with a negative voltage across the switch.

Steady-state and Transition Intervals

Figure 14C:
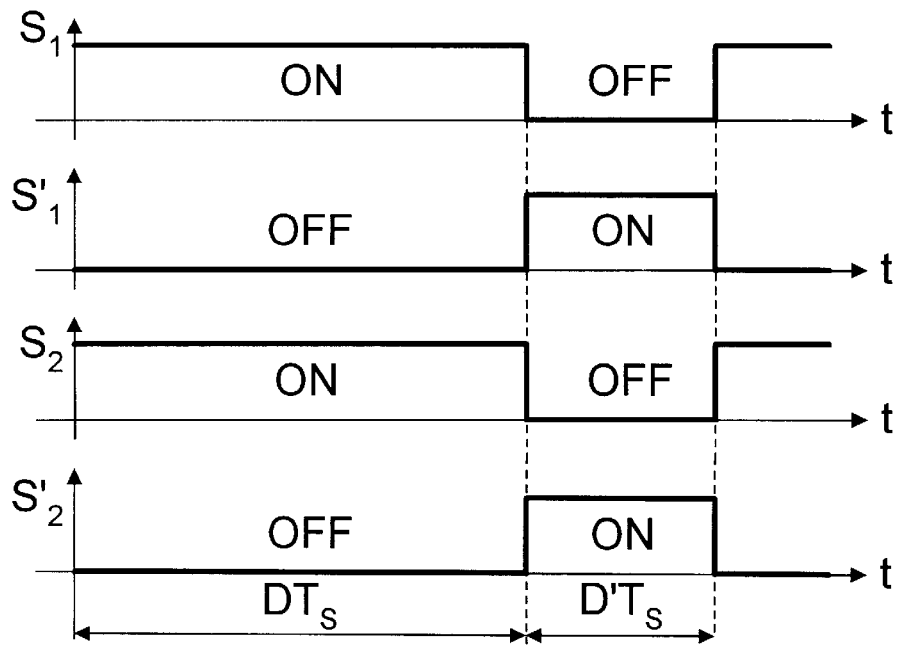

The hard-switching represented with a timing diagram of FIG. 14c clearly distinguished only two intervals, $DT_S$ interval and complementary interval $D'T_S$ with corresponding switch states as either ON or OFF. The two transitions from $DT_S$ interval to $D'T_S$ interval (called D to D' transition) and $D'T_S$ interval to $DT_S$ interval (called D' to D transition) also exist since real semiconductor switches are not infinitely fast. In the soft-switching case they are replaced with well-controlled and finite transition time intervals (already shown in prior-art FIG. 13), due to the specific relative timing of the switches. Note a rather large number of the drive sequence and timing possibilities of each of the four switches for either of the two transition intervals, but only a few very specific drive sequence and timing will in conjunction with converter operation result in desirable soft-switching operation as described by three novel soft switching methods. This rather large number of possible drive sequence and timing for four switches requires more precise definition of the two steady-state intervals and two transitions intervals. Thus, the steady-state intervals, $DT_S$ and $D'T_S$ and the steady-state duty ratio D are now defined only with respect to the input switch $S_1$: interval $DT_S$ lasts as long as the switch $S_1$ is closed (conducts current) and complementary interval $D'T_S$ lasts as long as the switch $S_1$ is open. In this way, the steady-state properties (DC voltages on capacitors and DC currents in inductors) can be uniquely determined with respect to so defined steady-state duty ratio D.

The two transition intervals are defined as follows: During the first transition interval ("natural" transition), termed hereafter D to D' transition, the state of the switches is changed from initial state in which $S_1$ and $S_2$ are ON and $S'_1$ and $S'_2$ are OFF to the final state in which $S_1$ and $S_2$ are OFF and $S'_1$ and $S'_2$ are ON. During the second transition ("forced" transition), the state of the switches is changed opposite to the above, from initial state in which $S_1$ and $S_2$ are OFF and $S'_1$ and $S'_2$ are ON to the final state in which $S_1$ and $S_2$ are ON and $S'_1$ and $S'_2$ are OFF. This definition covers all possible drive sequence and timing patterns of the four switches during these two transition intervals.

Thus, the beginning of the first transition interval (D to D' transition) will not any more necessarily coincide with turn OFF of the input switch $S_1$ at the end of $DT_S$ interval but will start with whichever switch was designated to initiate such transition. For example, in symmetrical soft switching, the first transition will start quite unexpectedly with turning OFF of the output switch $S_2$, while the input switch $S_1$ will be turned OFF later during same D to D' transition to initiate the second part of the same transition. In contrast to this timing sequence, the prior art D to D' transition interval always started with first turning OFF of the input switch $S_1$.

The circuit diagrams applicable during transition intervals are depicting the MOSFET switches, which are ON in bold face, and those which are OFF in light drawing. In order to easier follow the circuit operation during transition intervals, the MOSFET switches, which are OFF during $DT_S$ or $D'T_S$ intervals (outside of transition intervals) are omitted from circuit diagrams.

Figure 48A:
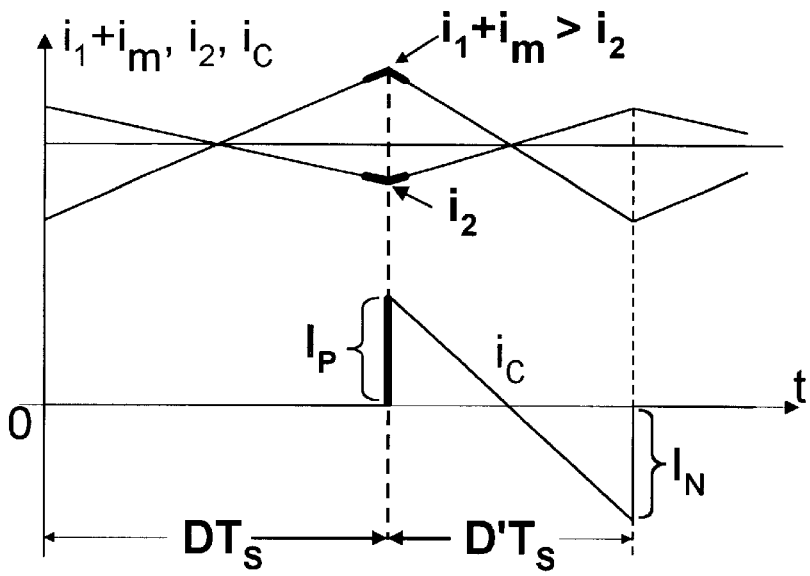
FIG. 48a is a graph of the inductor currents relation for DT$_S$ to D'T$_S$ transition in the circuit of FIG. 46a and FIG. 48b is a graph of characteristic waveforms of switch drive signals and voltages for the DT$_S$ to D'T$_S$ transition in the case of symmetrical soft-switching operation.

In the present invention, the negative current at the end of the $D'T_S$ time interval already exists as proved earlier in FIG. 45e and also shown in FIG. 48a. Thus neither the large output inductor ripple current is needed, nor even the addition of any resonant element, such as resonant inductor as in many classical soft switching schemes. In fact, as shown below, the unique switching configuration of the present invention, along with the recognition of the key relationship (4) and its consequence in the time domain waveforms of FIG. 48a (and FIG. 45e), makes for a unique possibility of practical soft switching with significantly reduced switching losses just by use of the proper drive sequence and timing of the four switches in FIG. 46c.

SYMMETRICAL SOFT SWITCHING

First we will look at the D to D' transition of the circuit in FIG. 46a.

The D to D' Transition

From the steady-state analysis and the waveforms in FIG. 48a it follows that at the end of the time interval $DT_S$, the instantaneous current $i_1+i_m$ is larger than $i_2$ (effectively their difference is equal to $I_P$ as in FIG. 48a). The transition from D to D' interval can be represented by the four equivalent circuits shown in FIGS. 47a, b, c, and d, and their corresponding time intervals $t_a$, $t_b$, $t_c$, $t_d$ shown in FIG. 48b.

Interval $t_a$

Figure 47A:
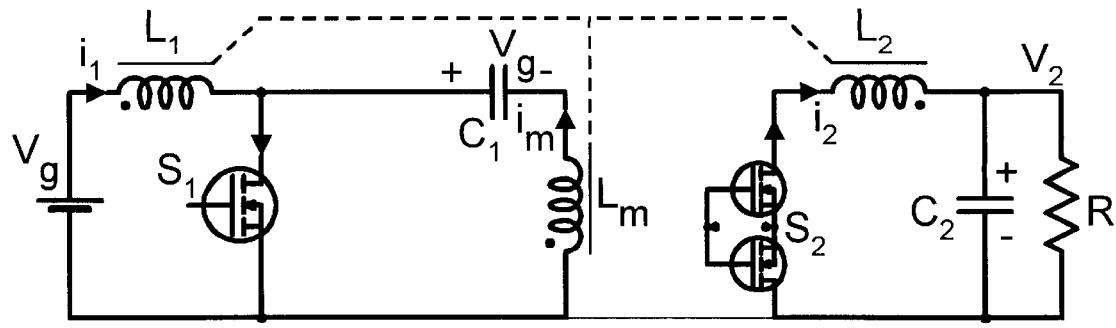
FIGS. 47a–d illustrate four converter circuit models relevant to the DT$_S$ to D'T$_S$ transition in the case of symmetrical soft-switching operation.
Figure 47B:
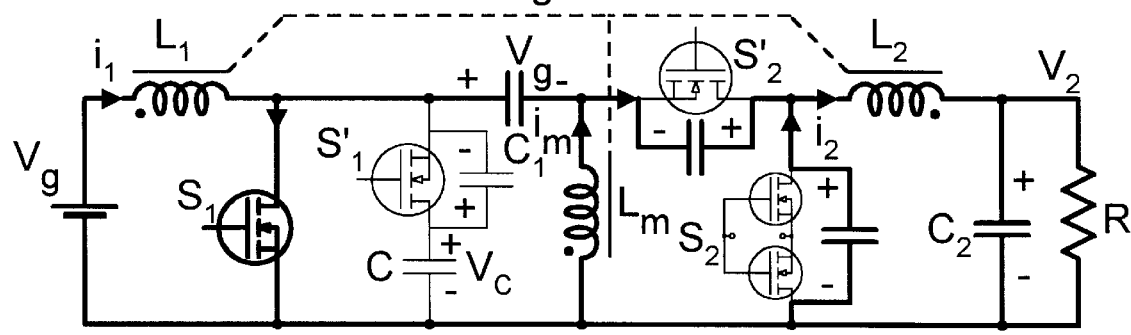
Figure 48B:
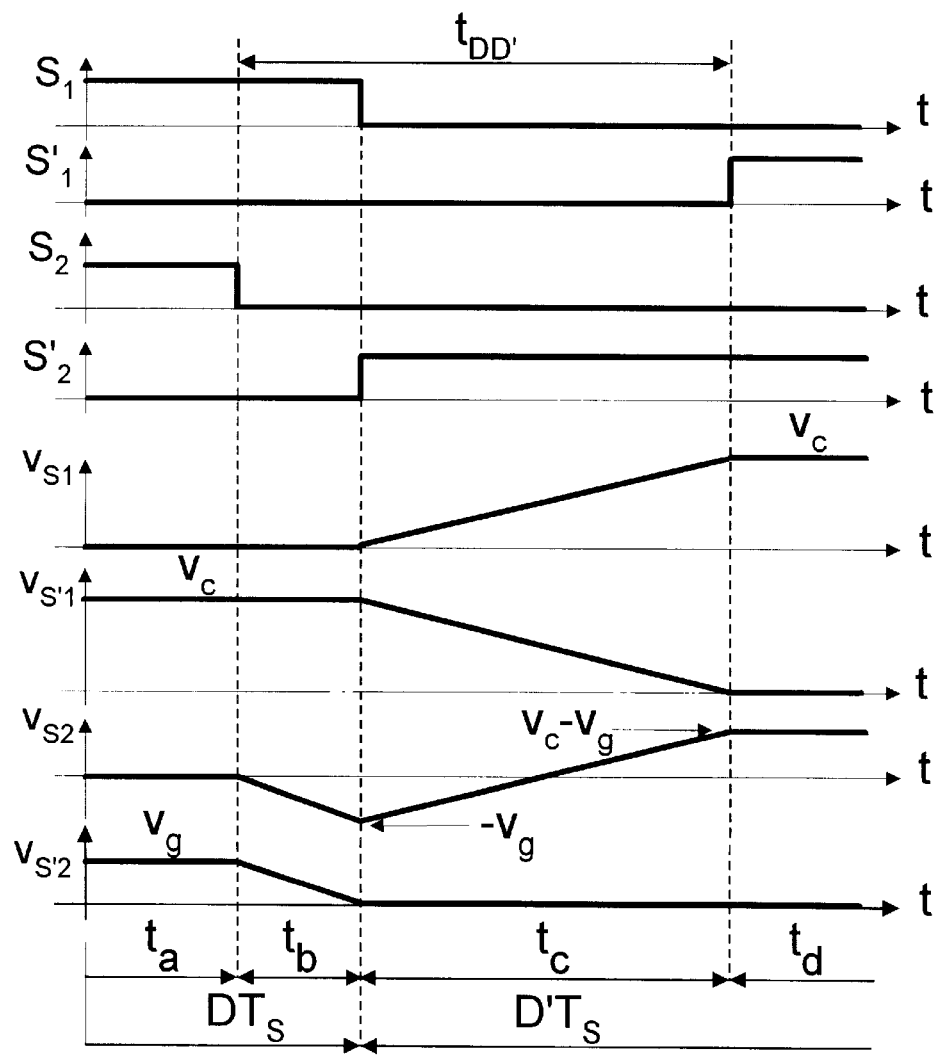

FIG. 47a and $t_a$ interval in FIG. 48b corresponds to the $DT_S$ time interval before the D to D' transition starts. Switches $S_1$ and $S_2$ are both ON and $S'_1$ and $S'_2$ are both OFF. This interval ends and the first, so-called "natural" transition is initiated when output switch $S_2$ is turned OFF, which results in the circuit of FIG. 47b.

Interval $t_b$

During the interval $t_b$ (first part of total D to D' transition interval $t_{DD'}=t_b+t_c$ as represented by FIG. 48b), the current $i_2$ quickly discharges the parasitic capacitor of $S'_2$ switch and charges with negative polarity the parasitic capacitor of $S_2$ switch. This interval is concluded when the voltage across switch $S'_2$, $V_{S'2}$ drops down to zero and the body diode of $S'_2$ starts to conduct. Hence, switch $S'_2$ is naturally turned ON at zero voltage (soft-switched) by its own parasitic diode. Since the diode conduction at low voltage is rather inefficient due to the high voltage drop across the diode, this is also the ideal time to turn ON switch $S'_2$ (or equivalently to turn ON the original $Q'_2$ MOSFET) in order to minimize the conduction losses. As $S'_2$ is turned ON, the input switch $S_1$ is simultaneously turned OFF, which results in the circuit model of FIG. 47c valid for interval $t_c$ in FIG. 48b. Note that if the turning OFF of switch $S_1$ was delayed, an intermediate interval would follow the interval $t_b$ with all the voltages clamped at the present value, $V_C$ and $-V_g$ for switches $S'_1$ and $S_2$ respectively. Clearly this interval is unproductive and unnecessary since it only delays the completion of the D to D' transition and should therefore be avoided by proper drive sequence and timing as in FIG. 48b.

Interval $t_c$

Figure 47C:
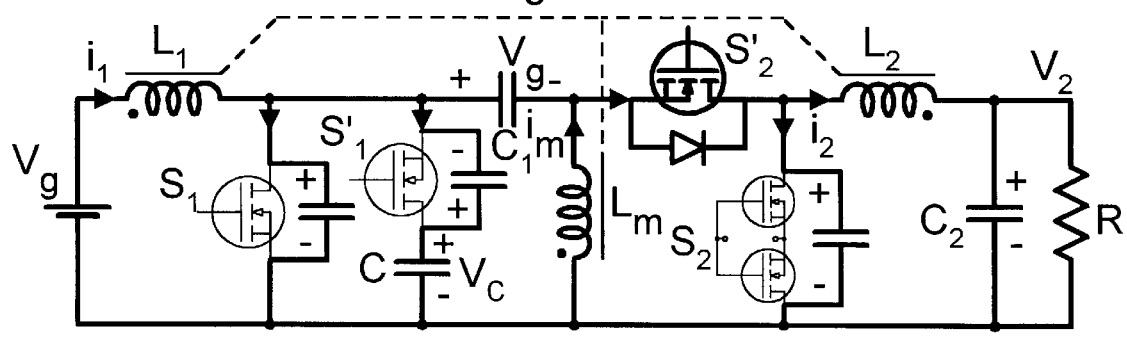

The interval $t_c$ in FIG. 48b (second part of the D to D' transition) is then characterized by the equivalent circuit of FIG. 47c during which three switches $S_1$, $S'_1$ and $S_2$ are OFF and only switch $S'_2$ is ON, by-passing its own body diode (shown also in FIG. 47c in bold to signify the fact that it started conduction first and triggered the turn-ON of $S'_2$, whose conduction resulted in this state). The current $i_1+i_m-i_2$ charges the parasitic capacitance of $S_1$, discharges the parasitic capacitance of $S'_1$ and discharges/charges parasitic capacitance of $S_2$. Note that due to the fundamental relation (4), where $I_1+I_m=I_2$, the current $i_1+i_m-i_2$ now consists only of their respective AC ripple components $\Delta i_1+\Delta i_m-\Delta i_2$ resulting in a reduced slope of the voltages on switches $S_1$, $S'_1$, and $S_2$ compared to slope of voltage changes on switches $S_2$ and $S'_2$ in previous interval $t_b$. This total AC ripple current $\Delta i_1+\Delta i_m-\Delta i_2$ starts to discharge the capacitance across $S_2$ from $-V_g$ to zero and then to charge it with positive polarity to $V_C-V_g$ while, at the same time, this AC ripple current charges the capacitance across $S_1$ to voltage $V_C$ and discharge the capacitance across $S'_1$ to zero. This interval $t_C$ ends when voltage on switch $S'_1$ reaches zero and the body diode of that switch starts to conduct (shown on FIG. 47d which shows the converter circuit at the beginning of interval $t_d$). This has the effect of clamping the voltage on switch $S_1$ at the $V_C$ level. At this point switch $S'_1$ can be turned ON at zero voltage hence with zero switching loss and also bypass the internal body diode to reduce the conduction losses.

Interval $t_d$

Figure 47D:
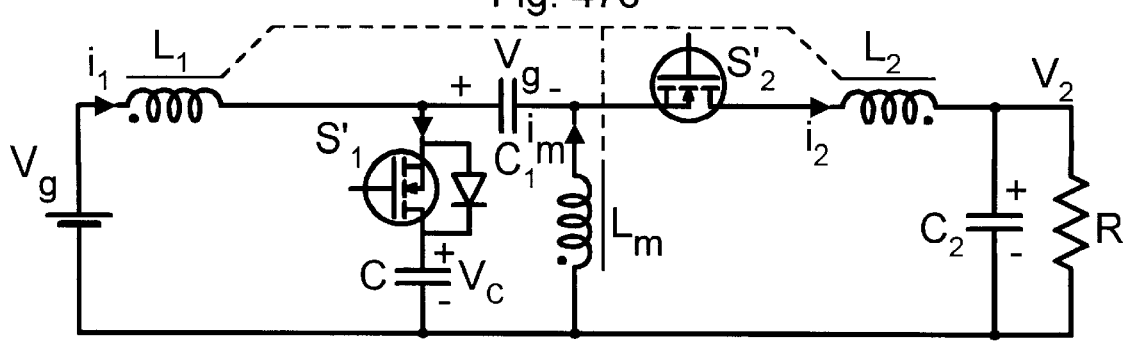

The circuit in FIG. 47d signifies that the D to D' transition has been completed and that now the switches $S'_1$ and $S'_2$ are simultaneously ON, as compared to the beginning state in FIG. 47a during which the switches $S_1$ and $S_2$ were simultaneously ON. In summary, during this first transition, all switches are turned ON at zero voltage and full soft-switching of the D to D' transition is achieved, hence without switching losses.

The D' to D Transition

Figure 49A:
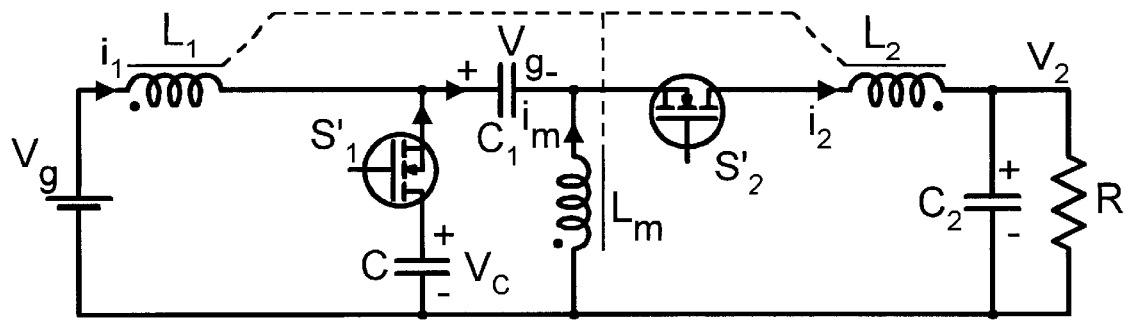
FIGS. 49a–d illustrate four converter circuit models relevant to the D'T$_S$ to DT$_S$ transition in the case of symmetrical soft-switching operation.
Figure 50A:
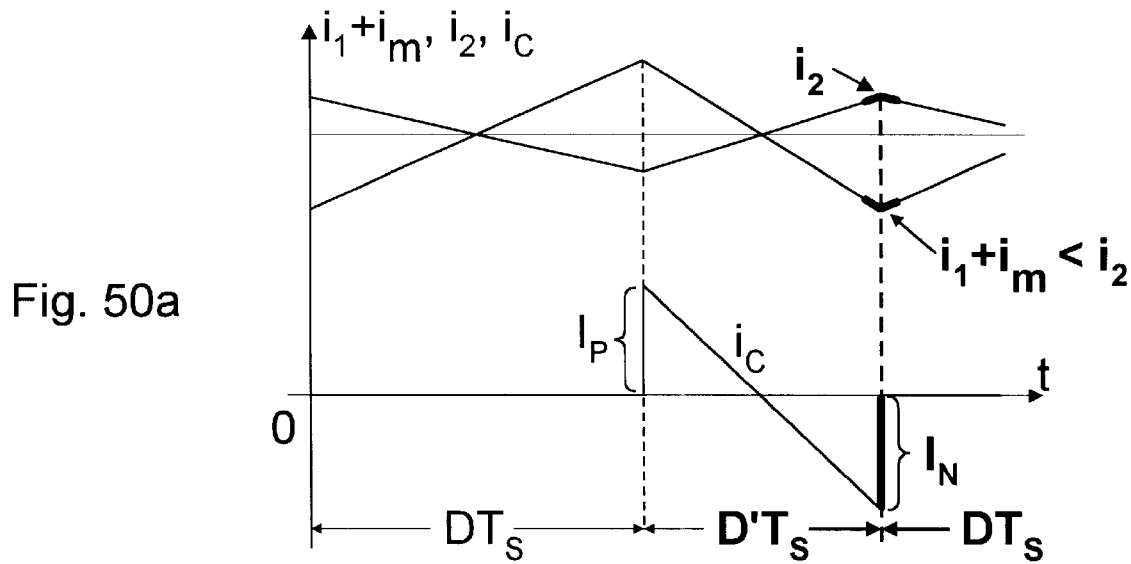
FIG. 50a is a graph of the inductor currents relation for D'T$_S$ to DT$_S$ transition in the circuit of FIG. 46a and FIG. 50b is a graph of characteristic waveforms of switch drive signals and voltages for the D'T$_S$ to DT$_S$ transition in the case of symmetrical soft-switching operation.

For this transition at the end of $D'T_S$ interval current $i_1+i_m$ is smaller than current $i_2$, as seen from the waveforms in FIG. 50a. The D' to D transition is thus represented by circuits in FIGS. 49a, b, c, d, and their respective intervals $t_a$, $t_b$, $t_c$, $t_d$ shown in FIG. 50b.

Interval $t_a$

Figure 49B:
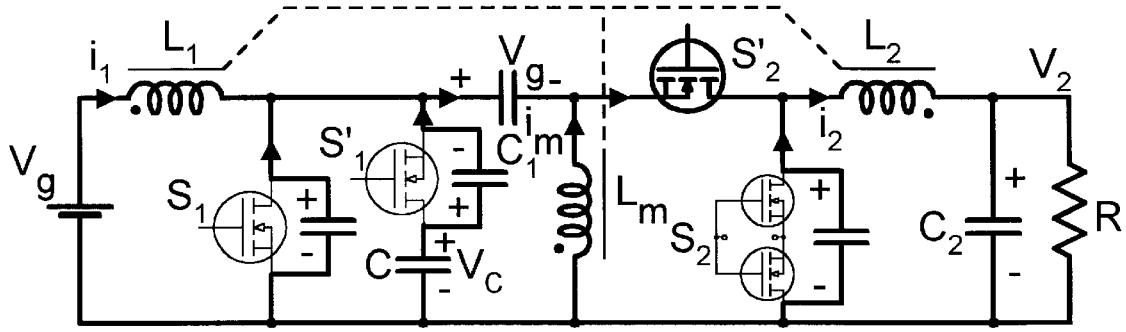
Figure 50B:
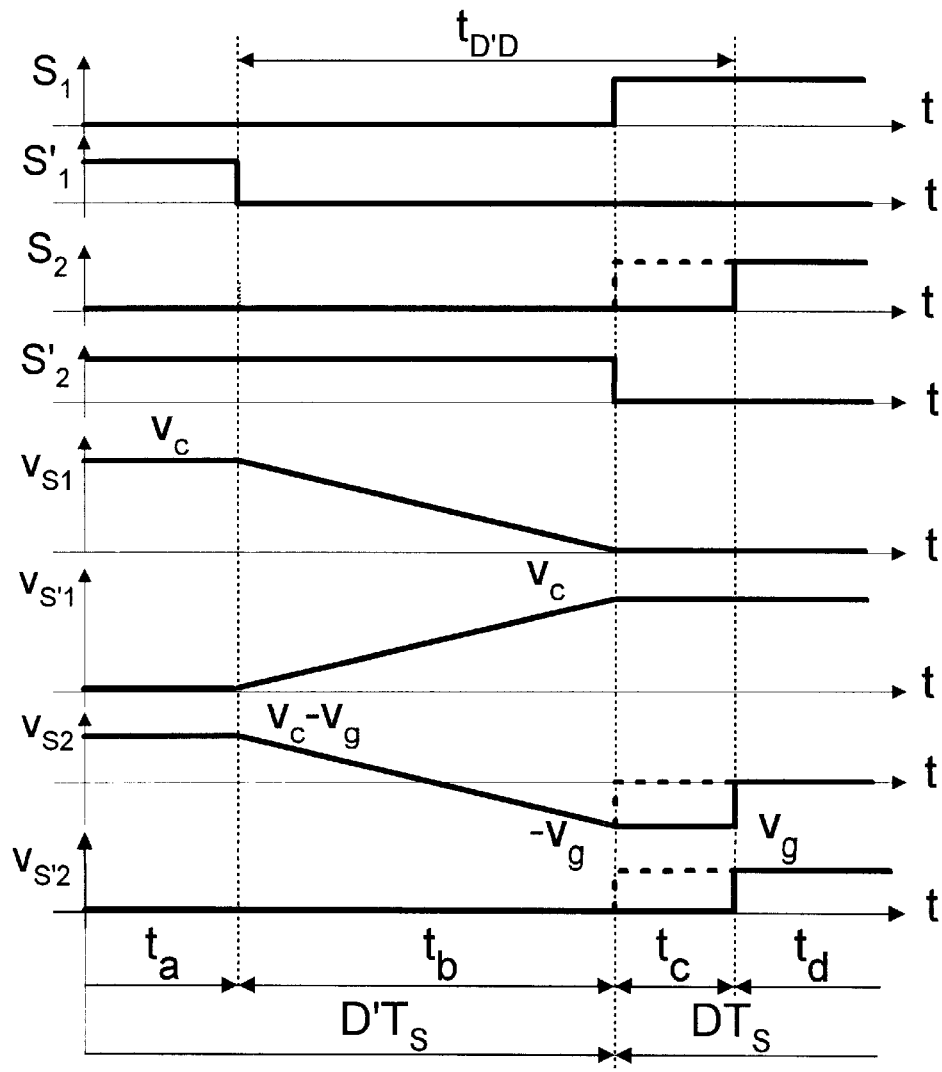

FIG. 49a and $t_a$ interval in FIG. 50b corresponds to the $D'T_S$ time interval just before the D' to D transition starts. The switches $S'_1$ and $S'_2$ are both ON and $S_1$ and $S_2$ are OFF. This interval ends and the second transition, usually called "forced" transition is initiated when the complementary input switch $S'_1$ is turned OFF, which results in the circuit of FIG. 49b representing the first part $t_b$ of the forced transition.

Interval $t_b$

During this interval $t_b$ (the first part of the total D' to D transition interval $t_{D'D}=t_b+t_c$ as represented by the circuit in FIG. 49b), the current $i_2-i_1-i_m$ is charging the parasitic capacitor across $S'_1$ and is discharging the parasitic capacitors across $S_1$ and $S_2$ as seen in the waveforms in FIG. 50b for interval $t_b$. Since the total DC component of this current is zero, only the total AC ripple component is left. Thus this results in a relatively slow charge and discharge of these parasitic capacitors, hence in a slow voltage rise on switch $S'_1$. Given the above assumptions (large inductances are replaced by current sources and large capacitances by voltage sources), these three capacitors are AC-wise connected in parallel. This interval is concluded when the voltage across switch $S_1$, $V_{S1}$ drops down to zero and the body diode of $S_1$ starts to conduct. Hence, switch $S_1$ is naturally turned ON at zero voltage (soft-switched) by its own parasitic body diode. Since the diode conduction at low voltage is rather inefficient due to the high voltage drop across the diode, this is the ideal time to turn ON switch $S_1$ (or equivalently to turn ON the original $Q_1$ MOSFET) in order to minimize the conduction losses.

A very crucial observation is now made, which clearly shows the importance of the Voltage Bidirectional Switch implementation for the output switch $S_2$. As seen in FIG. 50b for interval $t_b$, the voltage across switch $S_2$ changes from initial positive voltage $V_C-V_g$ to negative voltage $-V_g$. If the switch $S_2$ were implemented with Current Bidirectional Switch (CBS), the negative voltage across switch $S_2$ would be prevented and voltage on it would be clamped at zero voltage by the body diode of CBS switch. This in turn would prevent the complete discharge of the capacitor across input switch $S_1$ to zero. Instead, the voltage on $S_1$ would be clamped at $+V_g$ and this switch would have to be turned ON, accepting the resulting hard-switching losses. However, when Voltage Bidirectional Switch is used instead for switch $S_2$, this problem is eliminated, since the negative voltage across $S_2$ switch is now allowed. Thus, discharge of $S_1$ switch parasitic capacitor will continue unimpeded to zero voltage at which instant it will be turned ON with zero switching losses.

Interval $t_c$

Figure 49C:
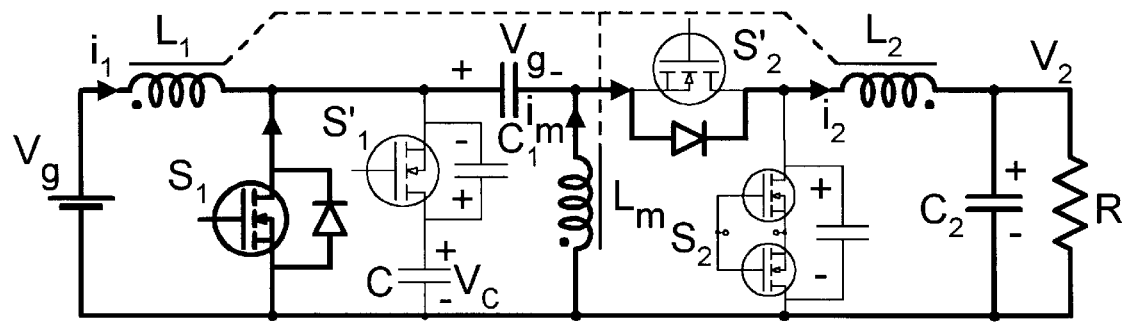

As switch $S_1$ is turned ON, switch $S'_2$ is simultaneously turned OFF, which results in the circuit model of FIG. 49c valid for interval $t_c$ in FIG. 50b. The remaining part of the transition interval cannot be completed in a soft switching manner. Thus, switch $S_2$ must be turned ON "hard" at reduced voltage $-V_g$ and its parasitic capacitor discharged abruptly. This third interval $t_c$ should ideally be eliminated, since it only delays the completion of the transition interval without having any useful function.

Interval $t_d$

Figure 49D:
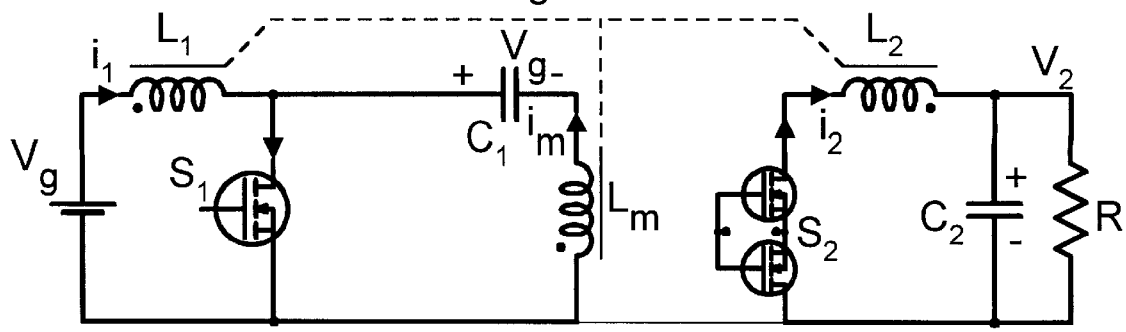

The losses associated with the hard turn-ON of switch $S_2$ are $\frac{1}{2}CV^2$ losses in the parasitic capacitor of switch $S_2$ whose effective voltage is $V_g$, and reverse recovery current losses in the body diode of switch $S'_2$. FIG. 49d hence shows the final stage after completion of D' to D transition in which switches $S_1$ and $S_2$ are turned ON. FIG. 50b also shows the final voltage of the parasitic capacitor of switch $S'_1$ to be $V_C$ and the final voltage of parasitic capacitor of switch $S'_2$ to be $V_g$, which are their starting values for the next D to D' transitions.

It is now interesting to see how effective this type of soft switching is. It is clear that the D to D' transition results in full soft switching, while the D' to D transition results in partial soft switching since at turn-ON the parasitic capacitor of switch $S_2$ is charged to the input $V_g$ voltage. A very simple analysis reveals that this partial soft switching during D' to D transition is also very effective, especially for operation at higher duty ratios. For example for D=0.8, $V_C=V_g/(-D)=5V_g$. Hence the parasitic capacitor across switch $S_1$ is discharged from a high voltage $V_C=5V_g$ down to the zero level and the parasitic capacitor of switch $S'_1$ is charged from zero to $V_C$ enabling full soft switching with zero losses for these two high-voltage switches, while the parasitic capacitor across low-voltage switch $S_2$ is discharged from $V_C-V_g$ (which is equal to $4V_g$ for this case of duty ratio D=0.8) to $-V_g$ level in a soft-switching manner, and then turned ON in hard-switching way but with significantly reduced switching losses. Hence, only the fraction of the energy stored on the switches is lost compared to the case of hard-switching when the turn-ON losses are given by $$\tfrac{1}{2}(5V_g)^2(C_{S1}+C_{S'1})+\tfrac{1}{2}(4V_g)^2C_{S2}+\tfrac{1}{2}V_g^2C_{S'2} \qquad (27)$$

When soft switching is implemented, the turn-ON losses are reduced to $\tfrac{1}{2}V_g^2(C_{S2}+C_{S'2})$. If the parasitic capacitances of the switches were the same, soft switching losses would have been less than 3% of the hard-switching losses (2 to 67 ratio!).

ASYMMETRICAL SOFT SWITCHING

First we will look at the D to D' transition of the circuit in FIG. 46a.

The D to D' Transition

Figure 51A:
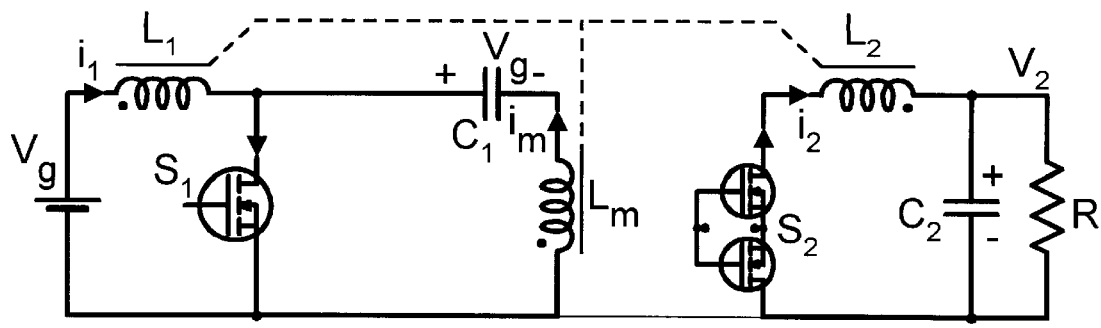
FIGS. 51a–d illustrate four converter circuit models relevant to the DT$_S$ to D'T$_S$ transition in the case of asymmetrical soft-switching operation.
Figure 52A:
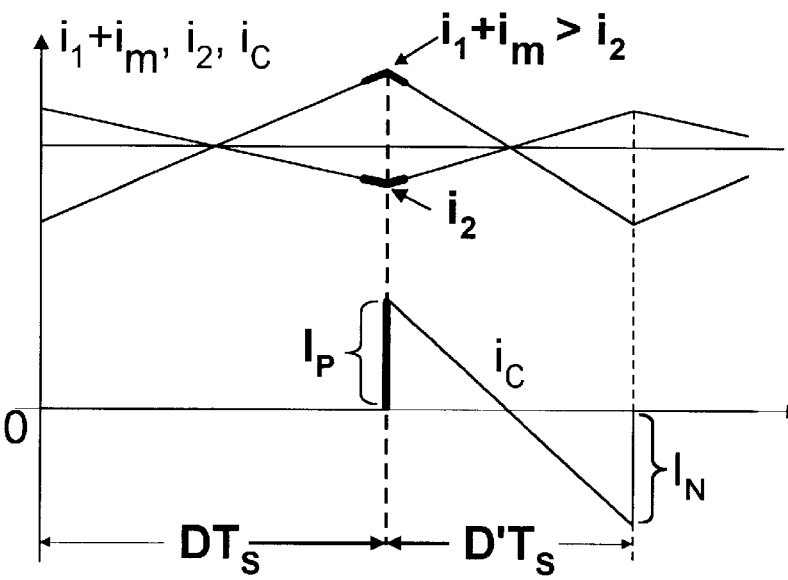
FIG. 52a is a graph of the inductor currents relation for $DT_S$ to $D'T_S$ transition in the converter of FIG. 46a and FIG. 52b is a graph of characteristic waveforms of switch drive signals and voltages for the $DT_S$ to $D'T_S$ transition in the case of asymmetrical soft-switching operation.

From the steady-state analysis and the waveforms in FIG. 52a it follows that at the end of the time interval $DT_S$, the instantaneous current $i_1+i_m$ is larger than $i_2$ (effectively their difference is equal to $I_P$ as in FIG. 52a). The transition from D to D' interval can be represented by the four equivalent circuits shown in FIGS. 51a, b, c, and d, and their corresponding time intervals $t_a$, $t_b$, $t_c$, $t_d$ shown in FIG. 52b.

Interval $t_a$

Figure 51B:
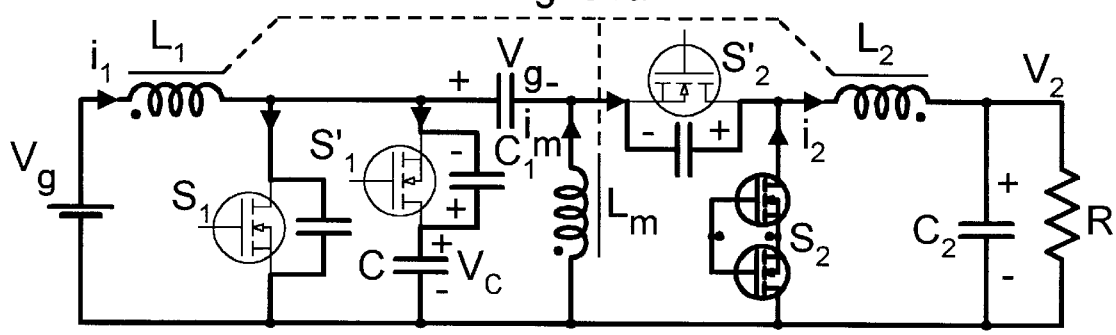
Figure 52B:
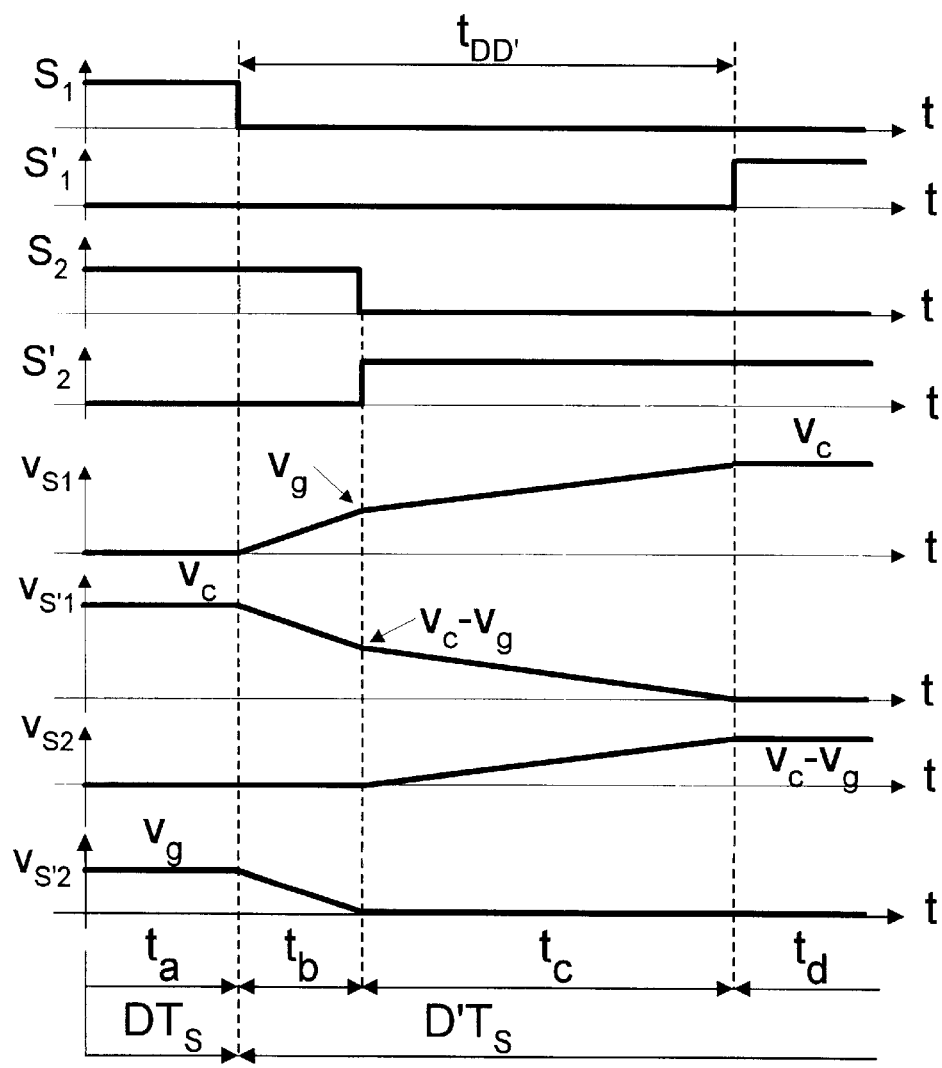

FIG. 51a and $t_a$ interval in FIG. 52b corresponds to the $DT_S$ time interval before the D to D' transition starts. Switches $S_1$ and $S_2$ are both ON and $S'_1$ and $S'_2$ are OFF. This interval ends and the first, so-called "natural" transition is initiated when $S_1$ is turned OFF, which results in the circuit of FIG. 51b.

Interval $t_b$

During the interval $t_b$ (first part of total D to D' transition interval $t_{DD'}=t_b+t_c$ as represented by FIG. 52b), the current $i_1+i_m$ is charging the parasitic capacitor of $S_1$ (which initially was fully discharged as switch $S_1$ was ON moments before) and discharging parasitic capacitor across $S'_1$ and $S'_2$ switches. Since this current contains DC component $I_1+I_m$, this results in relatively fast charge and discharge of these parasitic capacitors, hence in fast voltage rise on switch $S_1$. Given the above assumptions (large inductances are replaced by current sources and large capacitances by voltage sources), these three capacitors are AC-wise connected in parallel. This interval is concluded when the voltage across switch $S'_2$, $V_{S'2}$ drops down to zero and the body diode of $S'_2$ starts to conduct. Hence, switch $S'_2$ is naturally turned ON at zero voltage (soft-switched) by its own parasitic diode. Since the diode conduction at low voltage is rather inefficient due to high voltage drop across the diode, this is also the ideal time to turn ON switch $S'_2$ (or equivalently to turn ON the original $Q'_2$ MOSFET) in order to minimize conduction losses. As $S'_2$ is turned ON, switch $S_2$ is simultaneously turned OFF, which results in the circuit model of FIG. 51c valid for interval $t_c$ in FIG. 52b. Note that if the turning OFF of switch $S_2$ was delayed, an intermediate interval would follow the interval $t_b$ with all the voltages clamped at the present value, $V_g$ and $V_C-V_g$ for switches $S_1$ and $S'_1$ respectively. Clearly this interval is unproductive and unnecessary since it only delays the completion of the first transition interval and should therefore be avoided by proper drive sequence and timing as in FIG. 52b.

Interval $t_c$

Figure 51C:
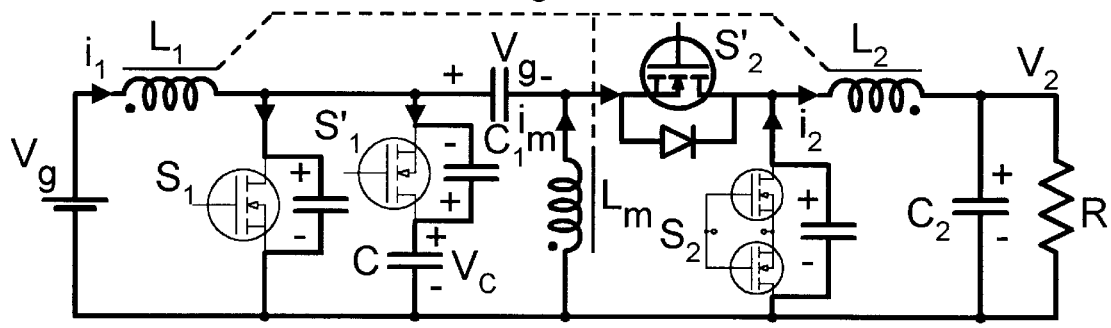
Figure 51D:
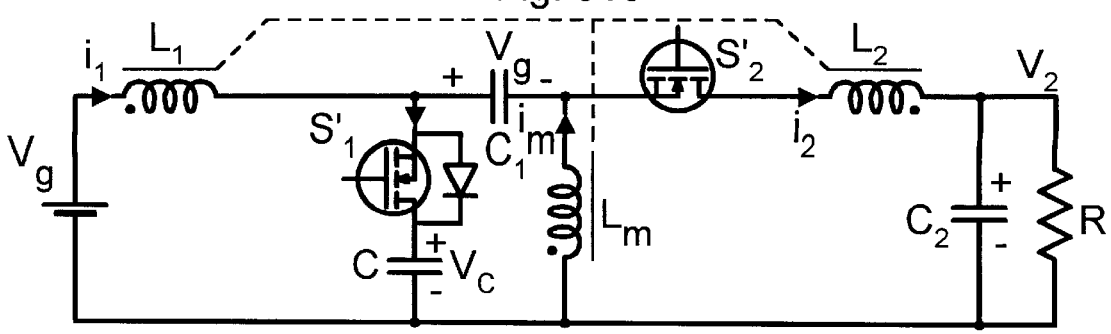

The interval $t_c$ in FIG. 52b (second part of the D to D' transition interval $t_{DD'}$) is then characterized by the equivalent circuit of FIG. 51c during which three switches $S_1$, $S'_1$ and $S_2$ are OFF and only switch $S'_2$ is ON, by-passing its own body diode (shown also in FIG. 51c in bold to signify the fact that it started conduction first and triggered the turn-ON of $S'_2$, whose conduction resulted in this state). Note that now due to the fundamental relation (4), where $I_1+I_m=I_2$, the current $i_1+i_m-i_2$ now consists only of their respective AC ripple components $\Delta i_1+\Delta i_m-\Delta i_2$ resulting in reduced slopes of voltage rise on switch $S_1$ compared to previous interval $t_b$. This total AC ripple current starts to charge the capacitance across $S_2$ while at the same time it continues to charge the capacitance across $S_1$ and discharge the capacitance across $S'_1$, albeit at a much slower rate than in the previous $t_b$ interval. This interval ends when voltage on switch $S'_1$ reaches zero and the body diode of that switch starts to conduct as shown in FIG. 51d which shows the converter circuit at the beginning of interval $t_d$. This has the effect of clamping the voltage on switch $S_1$ at the $V_C$ level. At this point switch $S'_1$ can be turned ON at zero voltage hence with zero switching loss and also bypass the internal body diode to reduce the conduction losses.

Interval $t_d$

The circuit in FIG. 51d signifies that the D to D' transition has been completed and that now the switches $S'_1$ and $S'_2$ are simultaneously ON, as compared to the beginning state in FIG. 51a during which the switches $S_1$ and $S_2$ were simultaneously ON. In summary, during this first transition, all switches are turned ON at zero voltage and full soft-switching of the D to D' transition is achieved, hence without switching losses.

The D' to D Transition

This transition is identical to the D' to D transition when symmetrical timing is implemented and was already explained and shown by circuits in FIGS. 49a–d, and their respective intervals $t_a$, $t_b$, $t_c$, $t_d$ shown in FIG. 50b.

SOFT-SWITCHING OF ISOLATED CONVERTER

The analysis of the novel soft-switching method implemented on the isolated converter of FIG. 46d is now undertaken. However, in order to simplify the explanations, the soft-switching analysis is carried out below on the non-isolated circuit model of FIG. 46e, obtained by reflecting secondary side of the converter in FIG. 46d to its primary side.

Thus, when the "hard-switching" of switch $Q_2$ in the converter of FIG. 46e takes place at magnitude $V_g$, as described in analysis below, the actual "hard-switching" of switch $Q_2$ in the original isolated converter of FIG. 46d is at much lower voltage magnitude $V_g/n$.

As observed earlier, this novel soft-switching method in the isolated converter moves the hard-switching from the high-voltage primary side to the low-voltage secondary side, where hard-switching is harmless and has negligible switching losses. In fact, the higher the conversion step-down ratio, the lower are the remaining hard-switching losses of the output switch. Hence, isolation transformer with its large step-down turns ratio actually improves the soft-switching performance.

This novel soft-switching is easily recognized from other soft-switching types by its "signature"—the negative voltage peak on the trailing edge of the voltage across output switch $S_2$. Linear slope of the trailing edge confirms the absence of any resonant discharge in the forced D' to D transition.

Another practical advantage of this soft-switching is that both high-voltage devices on the primary side are turned ON at zero voltage and hence without switching losses at any operating point. Thus, remaining negligible switching losses due to hard-switching at very low voltage across output low voltage devices permit operation at much higher switching frequencies of 500 kHz and higher with only a modest increase of the switching losses. The soft-switching analysis with respect to non-isolated model of FIG. 46e follows below. The same assumptions as in the previous analysis are made regarding the large inductors and large non-parasitic capacitors.

The D to D' Transition

Figure 53A:
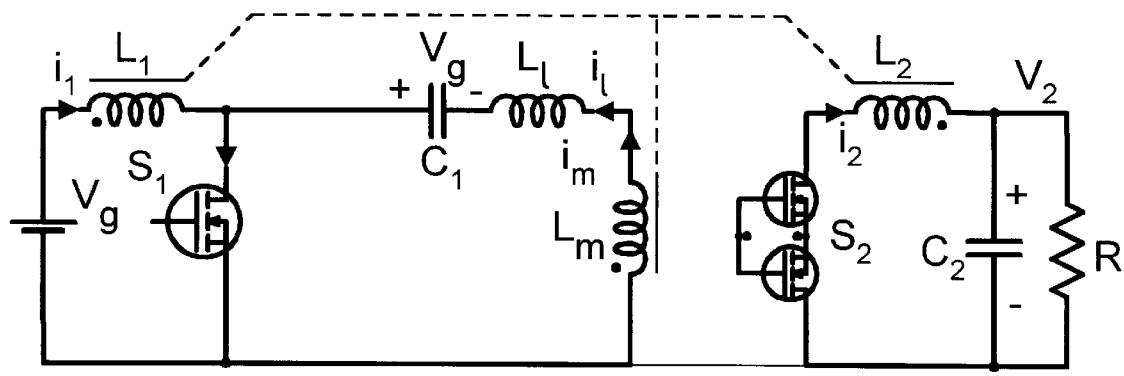
FIGS. 53a–e illustrate the five converter circuit models relevant for the $DT_S$ to $D'T_S$ transition in the case of soft-switching operation of the converter in FIG. 46e when a leakage inductance of the isolation transformer is included.
Figure 53B:
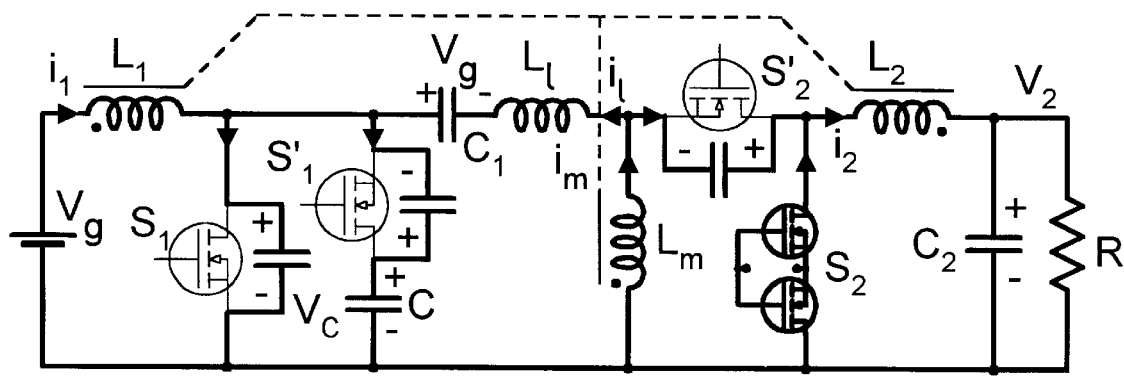
Figure 54A:
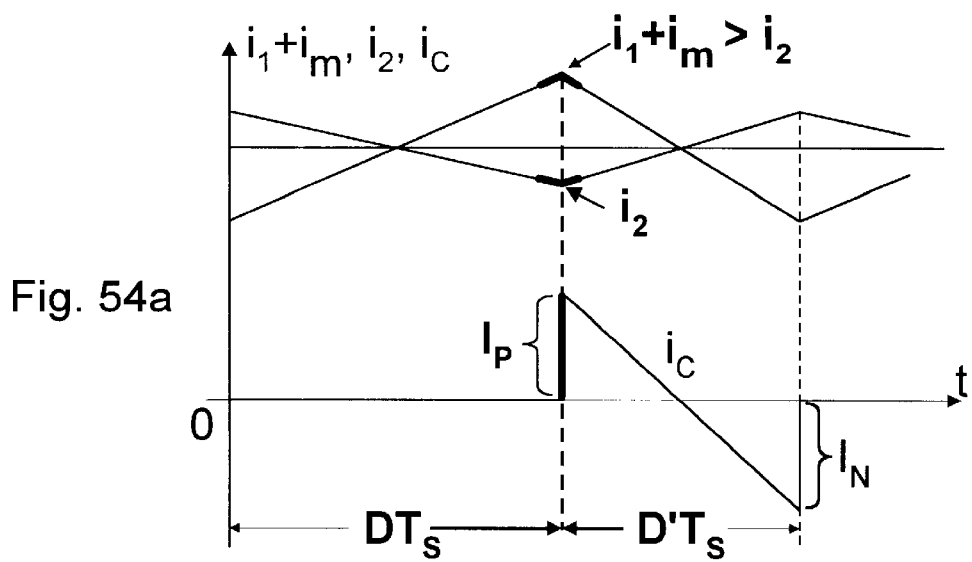
FIG. 54a is a graph of the inductor currents relation for $DT_S$ to $D'T_S$ transition in the converter of FIG. 46e
Figure 54B:
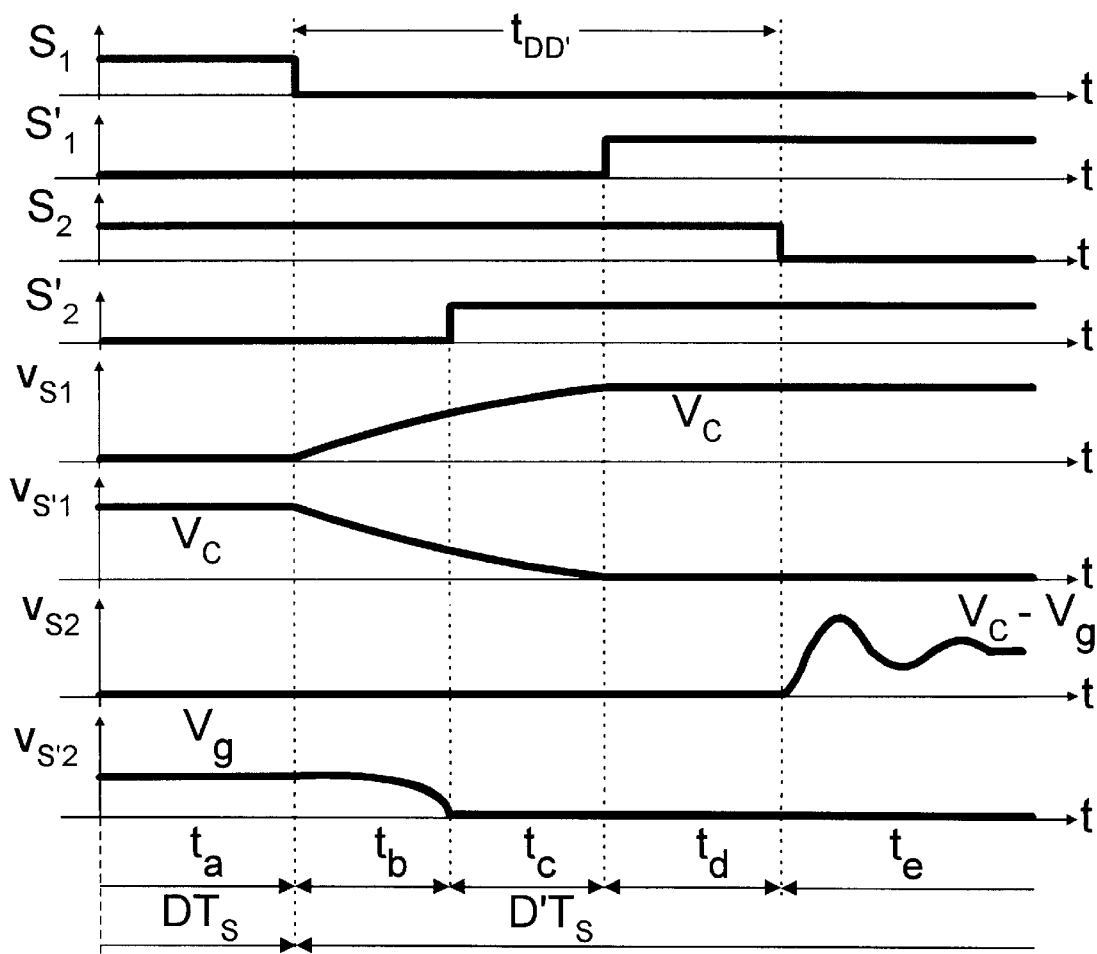
FIG. 54b is a graph of characteristic waveforms of switch drive signals and voltages for the $DT_S$ to $D'T_S$ transition in the case of soft-switching operation of converter in FIG. 46e when a leakage inductance of the isolation transformer is included.

The transition from the D to D' interval is represented by 5 characteristic circuits of FIGS. 53a, b, c, d, e, and corresponding waveforms of FIG. 54a and FIG. 54b. FIG. 54b has a timing diagram broken down into five intervals, $t_a$, $t_b$, $t_c$, $t_d$, $t_e$ with each interval corresponding to respective circuit model, such as $t_a$ to FIG. 53a, $t_b$ to FIG. 53b, etc. From the waveforms in FIG. 54a the following inequality applies:

$$i_1 + i_m > i_2 \quad (28)$$

The description of the circuit operation in each interval follows:

Interval $t_a$

This corresponds to end of $DT_S$ interval before the transition starts. $S_1$ and $S_2$ are ON and $S'_1$ and $S'_2$ are OFF as in FIG. 53a. This interval ends and the transition is initiated when $S_1$ is turned OFF.

Interval $t_b$

This transition is initiated by turning OFF $S_1$ and circuit of FIG. 53b applies. The sum of currents $i_1$ and $i_l$ is charging the capacitor across $S_1$ and discharging capacitor across $S'_1$. The initial value of the current $i_l$ is $i_m$, thus initially no current is flowing toward $S'_2$. As the voltage across $S_1$ rises also the voltage $v_l$ on leakage inductor starts to increase. This voltage causes $i_l$ to become smaller in magnitude. As a result the current in switch $S'_2$ can no longer be zero and the parasitic capacitor of that switch has also been discharged from its initial value $V_g$. The corresponding waveforms are shown in FIG. 54b interval $t_b$. This interval ends when this parasitic capacitor is completely discharged and the body diode of $S'_2$ starts to conduct. At this time switch $S'_2$ is turned ON at zero voltage (hence without switching losses) in order to by-pass the body diode and reduce the conduction losses.

Interval $t_c$

Figure 53C:
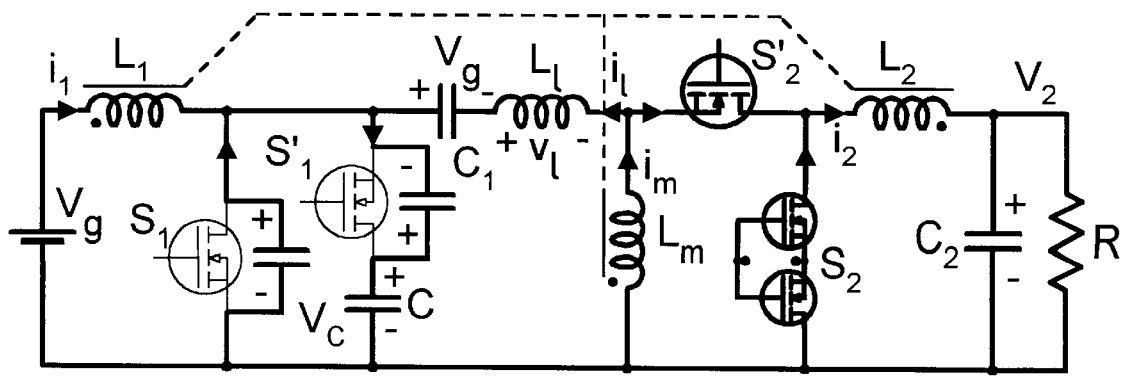

The currents $i_1$ and $i_l$ continue to charge the parasitic capacitor of $S_1$ and discharge the parasitic capacitor of $S'_1$ as in FIG. 53c. The voltage $v_l$ builds up further, which further decreases the magnitude of $i_l$. This interval is concluded when voltage on switch $S'_1$ reaches zero and the body diode of switch $S'_1$ starts to conduct as shown in interval $t_C$ in FIG. 54b. Now switch $S'_1$ can also be turned ON without switching loss, which concludes this interval.

Interval $t_d$

Figure 53D:
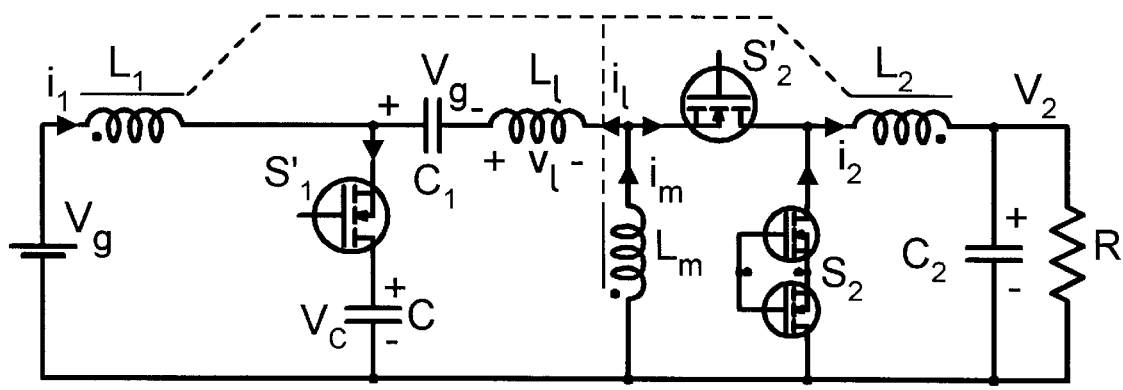

The voltage $v_l$ is now given by $V_C - V_g$ and thus it continues to decrease linearly as in FIG. 53d. At some point during this or the previous two subintervals it has become negative (initially it was $i_m$). When $i_l$ reaches the value of $i_m - i_2$ the current of switch $S_2$ becomes zero. The switch $S_2$ has to be turned OFF at this point.

Interval $t_e$

Figure 53E:
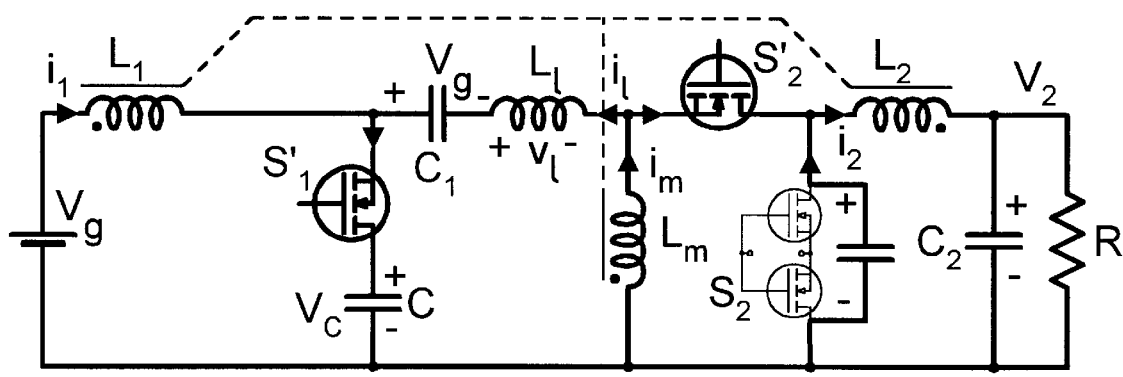

The current of switch $S_2$ which now becomes negative and charges parasitic capacitor of switch $S_2$ as per FIG. 53e with the waveforms shown in interval $t_e$ in FIG. 54b. The initial value of $i_l$ in this interval is also the final value after the D to D' transition has been completed. Thus, in order to charge the parasitic capacitor of $S_2$ to its final value ($V_C - V_g$) the current $i_l$ has to overshoot somewhat. This in turn causes the voltage on switch $S_2$ to overshoot. The result is an oscillation between $L_l$ and $C_{S2}$ which if not damped would continue indefinitely. If the inherent parasitic resistance associated with the oscillating elements does not sufficiently damp the oscillation, an additional R-C network can be connected in parallel with $L_m$. This particular connection of the R-C network is chosen because it also damps a similar oscillations at the end of D' to D transition. Once the oscillation dies out the $D'T_S$ interval is reached and the D to D' transition has been concluded.

The D' to D Transition

Figure 55A:
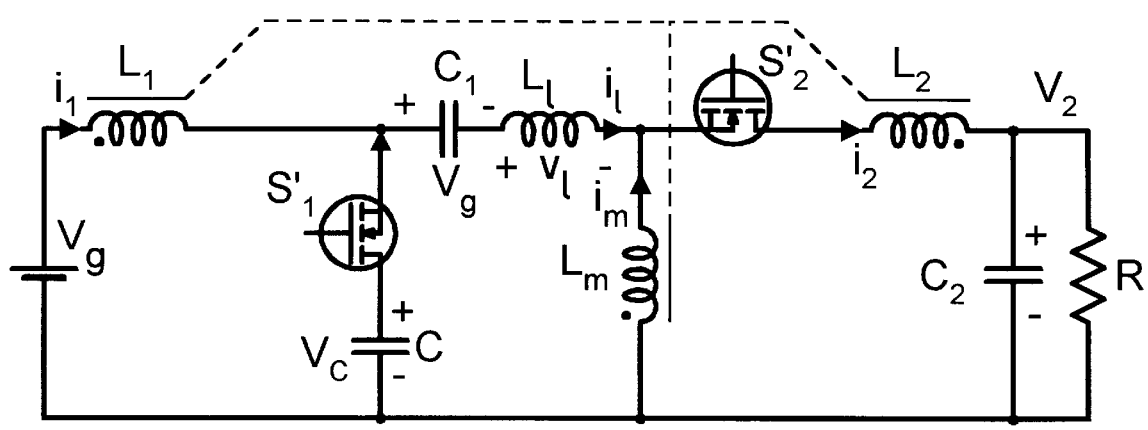
FIGS. 55a–e illustrate the five converter circuit models relevant for the $D'T_S$ to $DT_S$ transition in the case of soft-switching operation of converter in FIG. 46e when a leakage inductance of the isolation transformer is included.
Figure 55B:
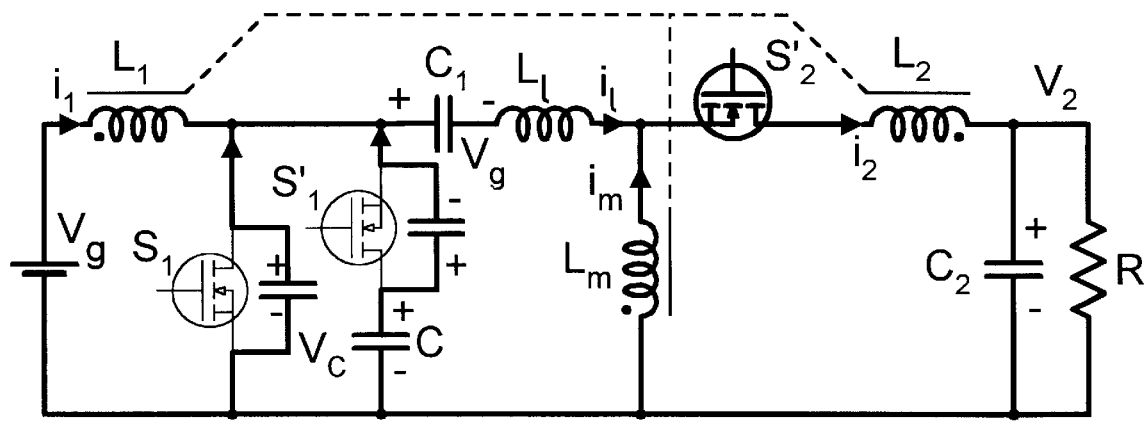
Figure 55C:
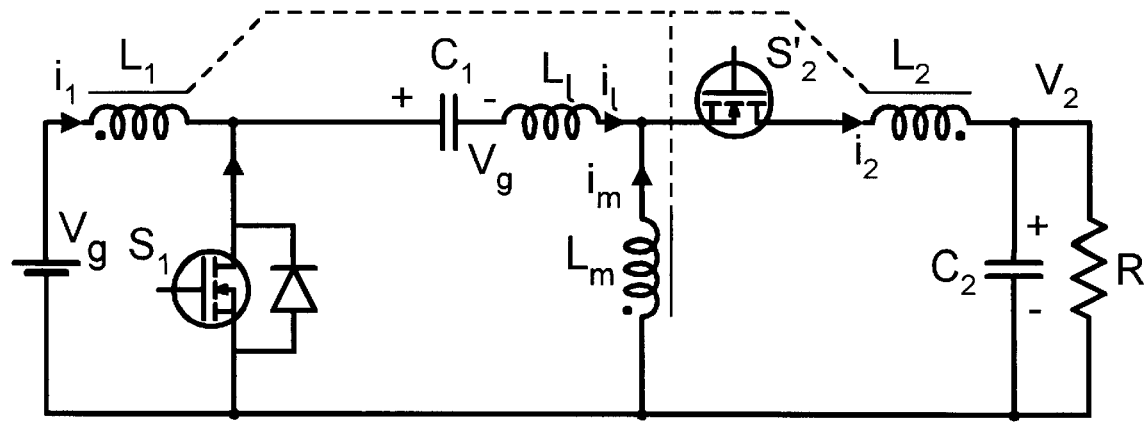
Figure 55D:
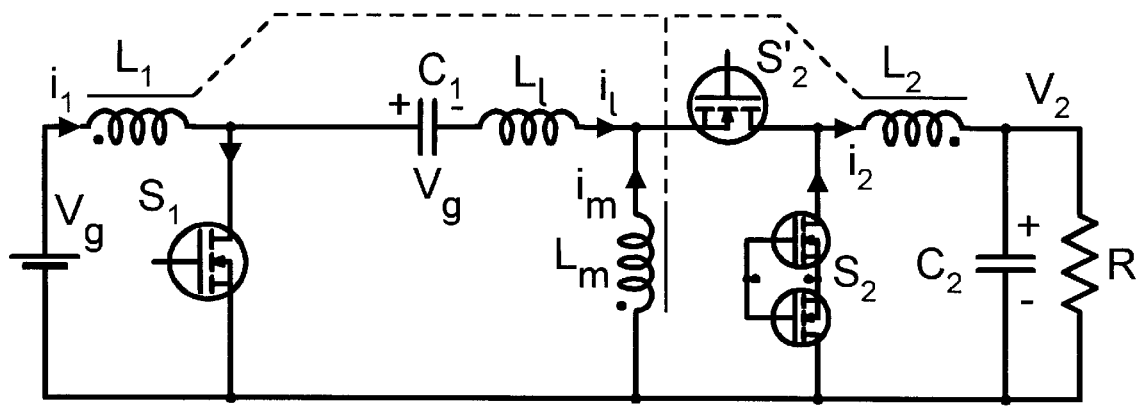
Figure 55E:
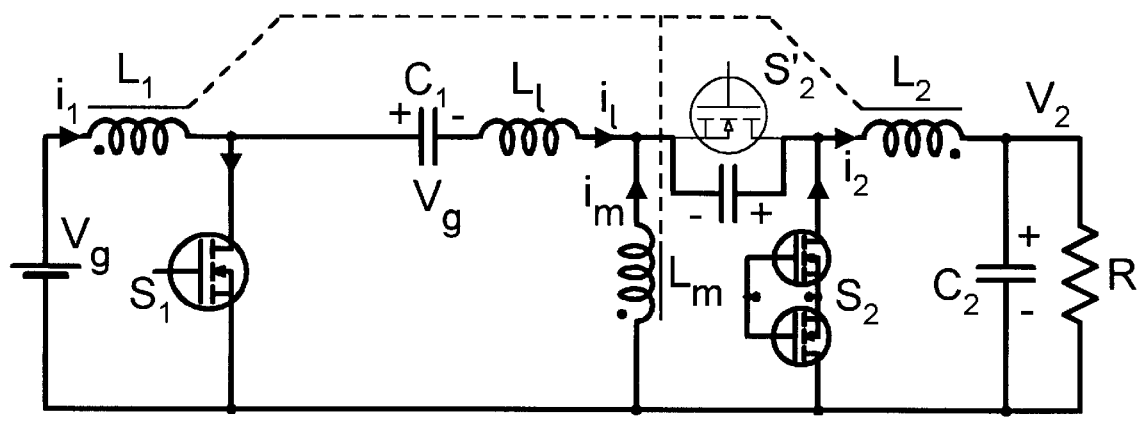
Figure 56A:
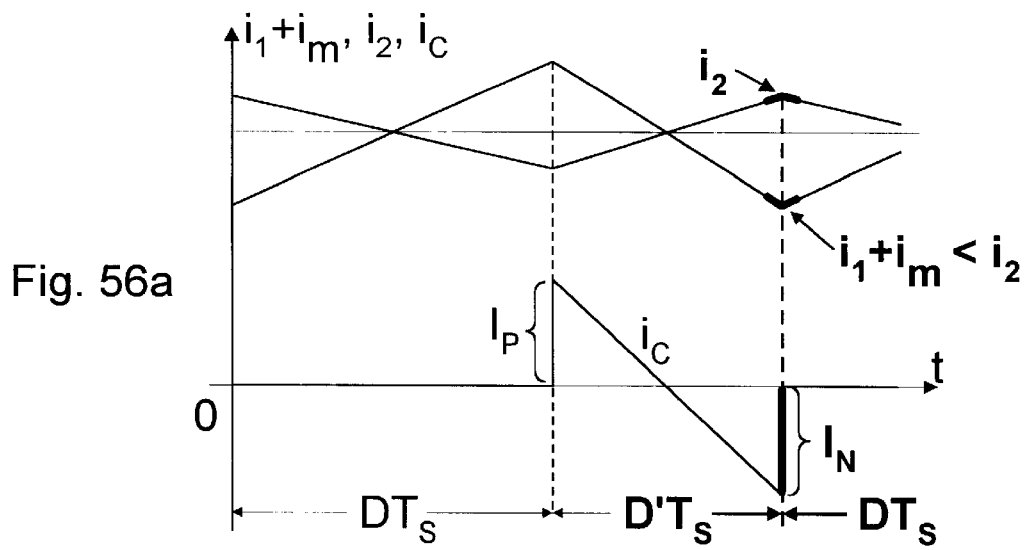
FIG. 56a is a graph of the inductor currents relation for $D'T_S$ to $DT_S$ transition in the converter of FIG. 46e
Figure 56B:
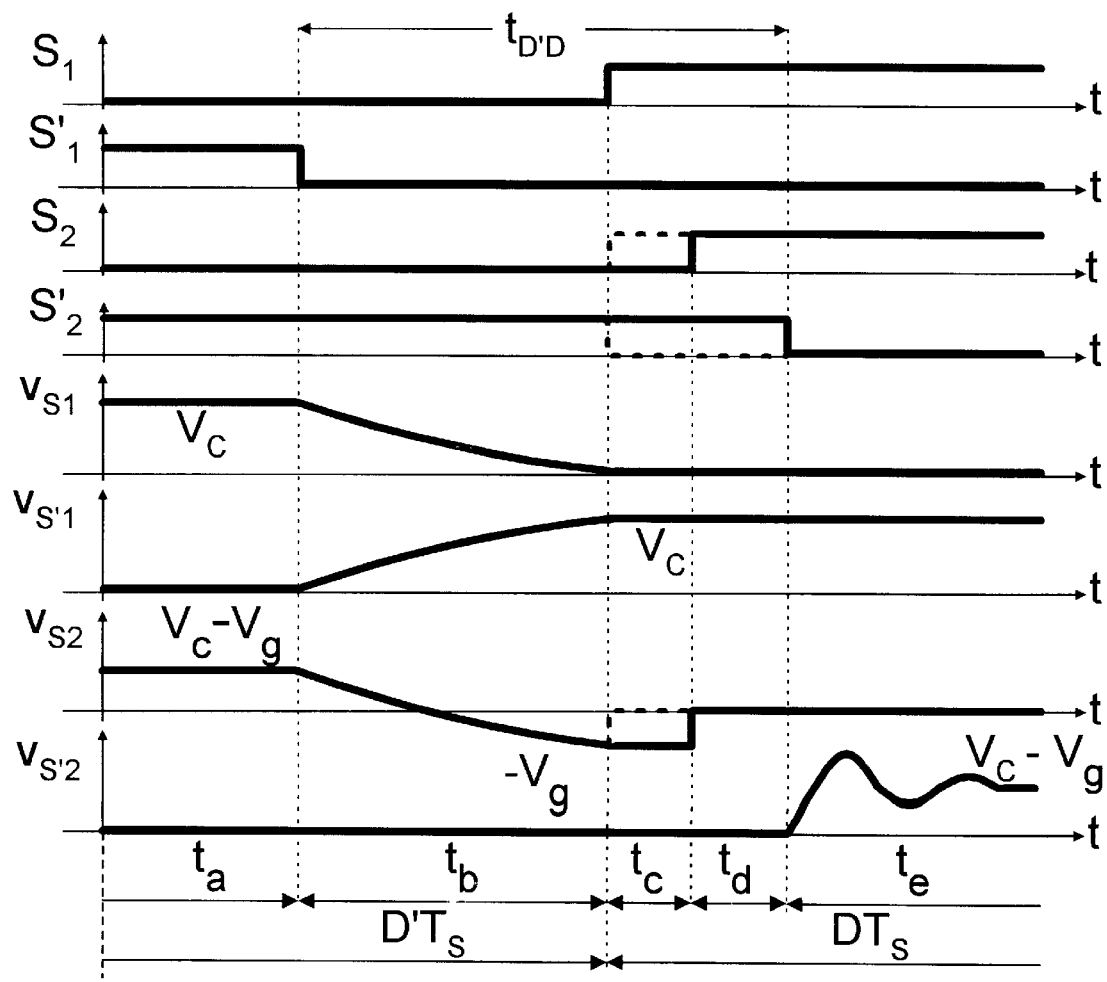
FIG. 56b is a graph of characteristic waveforms of switch drive signals and voltages for the $D'T_S$ to $DT_S$ transition in the case of soft-switching operation of converter in FIG. 46e when a leakage inductance of the isolation transformer is included.

For this transition, the five circuit models are shown in FIGS. 55a, b, c, d, e, and the corresponding waveforms in FIG. 56a and FIG. 56b. The five intervals in FIG. 56b correspond to the five circuits in FIGS. 55a–e. From FIG. 56a for this transition the following inequality holds:

$$i_1 + i_m < i_2 \quad (29)$$

Interval $t_a$

This interval, which belongs to the equivalent circuit in FIG. 55a represents the $D'T_S$ interval just before the transition starts. The corresponding waveforms are shown in FIG. 56b. $S_1$ and $S_2$ are OFF and $S'_1$ and $S'_2$ are ON. This interval ends and the D' to D transition is initiated when $S'_1$ is turned OFF.

Interval $t_b$

Based on the equivalent circuit for this interval shown in FIG. 55b, the difference of the currents $i_l - i_1$ is discharging the parasitic capacitor of switch $S_1$ and charging the parasitic capacitor of switch $S'_1$, as indicated in FIG. 56b interval $t_b$. This current is given by $i_2 - i_1 - i_m$ which has a positive value according to the above inequality. Compared with the D to D' transition the initial current $i_l$ is much lower, since it is only the algebraic sum of the AC (ripple currents) parts of total inductor currents. If $S_2$ is implemented with a current bidirectional switch this interval ends when the voltage $V_{S1}$ reaches $V_g$, that is, when $V_{S2}$ reaches zero and the body diode of $S_2$ starts to conduct. This condition can be improved by turning ON switch $S_2$ prematurely, which initiates a resonant process to assist the soft switching. In the case when switch $S_2$ is implemented as the four-quadrant switch or voltage bidirectional switch, the turning ON of the switch $S_2$ is intentionally delayed, which allows its voltage to become negative. This interval finally ends when voltage on switch $S_1$ reaches the zero level and the body diode of switch $S_1$ clamps all voltages on the current level. At this point switch $S_1$ can be turned ON.

The same observation holds here as made before for D' to D transition for symmetrical soft-switching during $t_b$ interval. The output switch $S_2$ implemented by the Voltage Bidirectional Switch allows the voltage across this switch to become negative and thus permits the complete discharge of the capacitor across input switch $S_1$ to zero. This would have not been possible if Current Bidirectional Switch were used to implement output switch $S_2$. In that case the capacitor of the input switch $S_1$ will be only partially discharged and clamped at $+V_g$ voltage and would have to be hard-switched with significant switching losses.

Interval $t_c$

The equivalent circuit belonging to this interval is shown in FIG. 55c, whereas the waveforms are shown in interval $t_C$ in FIG. 56b. Turning ON switch $S_2$ concludes this third interval $t_C$, which serves no particular purpose and is included only for better understanding of the transition. Therefore, this interval should be kept as short as possible and switches $S_1$ and $S_2$ can be turned on simultaneously. The turning ON of $S_2$ is a hard switching process. However, it occurs at the low voltage side and the only parasitic capacitor involved is its own.

Interval $t_d$

Now the circuit in FIG. 55d applies to the interval $t_d$ in FIG. 56b. Up to this point the current in the leakage inductance $L_l$ was constant at $i_2-i_m$ since no external voltage was applied across leakage inductance, whose voltage $v_l$ thus was zero. At this point voltage $v_l$ becomes $-V_g$ since all three switches $S_1$, $S_2$ and $S'_2$ are ON. This means that the current in the leakage inductance quickly decreases and becomes negative. When it reaches the level of $-i_m$ the current in $S'_2$ becomes zero. This is the latest moment to turn-OFF switch $S'_2$ in order to prevent conduction in the negative direction. Turning OFF switch $S'_2$ concludes this interval.

Interval $t_e$

The corresponding equivalent circuit for this interval is shown in FIG. 55e and the waveforms are found in interval $t_e$ in FIG. 56b. The current in $S'_2$ branch, which now is becoming negative is charging the capacitor of $S'_2$. Similar as in the final interval of the D to D' transition $i_l$ has to overshoot in order to charge the capacitance of $S'_2$. This again results in an oscillation between parasitic capacitor of switch $S'_2$ and leakage inductance $L_l$. The same R-C network as described above damps this ringing. Once the oscillation dies out the $DT_S$ interval is reached and thus the D' to D transition has been concluded.

It should be pointed out that in the case with leakage inductance the transition differs from the previously discussed symmetrical and asymmetrical soft-switching without leakage inductance. The D to D' transition resembles the asymmetrical transition except that now we observe only a fast single slope on the input switch voltage.

The D' to D transition is actually improved due to the presence of the leakage inductance. First, because the reverse recovery loss in the body diode of $S'_2$ is reduced as a result of the much lower current slope. Second, the $\frac{1}{2}CV^2$ losses due to the unavoidable hard-turn-ON of $S_2$ are limited to the parasitic capacitance of $S_2$. In the previous cases (symmetrical and asymmetrical soft-switching of the non isolated converter) both parasitic capacitances of $S_2$ and $S'_2$ were experiencing $\frac{1}{2}CV^2$ losses. The effective voltage is $V_g$ in every case.

EXPERIMENTAL VERIFICATION

Three prototypes were built to verify the performance of the present invention:

1. Soft switching DC Transformer converter of FIG. 46a with no galvanic isolation and with two MOSFET implementation of the four-quadrant Voltage Bidirectional Switch.
2. Soft switching DC Transformer converter of FIG. 46b with no galvanic isolation and with single P-channel MOSFET/diode implementation of the two-quadrant Voltage Bidirectional Switch.
3. Soft switching Isolated DC Transformer switching converter of FIG. 46d with galvanic isolation and with two MOSFET implementation of the four-quadrant Voltage Bidirectional Switch.

A number of tests were conducted to verify key performance features of the present invention. First, a number of tests were made to verify the three types of the soft switching mechanisms unique to this converter with VBS output switch as described in detail in specifications:

1. Symmetrical soft switching of the non-isolated converter of FIG. 46a;
2. Asymmetrical soft switching of the non-isolated converter of FIG. 46a;
3. Unique soft -switching performance of the isolated converter of FIG. 46d.

To clearly expose the outstanding efficiency improvements brought about by the soft-switching mechanisms described, the efficiency and waveform comparison is made with "hard-switching" counterparts over the wide range of operating switching frequencies from 100 kHz to 400 kHz. In particular, the soft-switching non-isolated converter of FIG. 46a is compared with its hard-switching counterpart, in which VBS output switch is replaced with CBS output switch and using hard-switching timing of FIG. 14c.

Then, the soft-switching of the isolated converter of FIG. 46d is tested. This clearly demonstrates that VBS switch implementation of FIG. 46d leads to almost ideal performance and full soft-switching for any operating duty ratio D. The comparison is then made with the same converter operating with D' to D transition intentionally in the "hard-switching" mode in order to clearly expose the efficiency advantages of the full soft switching operation and its effect on the low noise performance.

The Isolated DC converter prototype is demonstrated next to exhibit the outstanding zero-ripple input current characteristic over the wide operating range as well as near zero-ripple output current at one operating point and low ripple current at others.

The efficiency measurements of the off-line switching converter prototype are also included to confirm the high efficiency over the wide 2 to 1 input voltage range.

The attention is finally turned toward verifying the outstanding features of the DC Transformer, which in addition to reduced size and weight and increased efficiency, simultaneously provides an order of magnitude increased DC overload capability when compared with conventional converter solutions.

Soft Switching in Non-isolated DC Transformer Converter

The prototype of the soft-switching non-isolated DC Transformer switching converter of FIG. 46a was built for a nominal 50 W, 10V output. The input voltage was in the range of 13V to 20V depending on the type of the test employed. The constant switching frequency at discrete values of 100 kHz, 200 kHz, 300 kHz, and 400 kHz was used to test the hard-switching and soft-switching performance. The following component values were used for the breadboard prototype:

$S_1$ and $S'_1$ were IRF3710 (100V/28 mΩ); $S_2$ and $S'_2$ were SUP70N06–14 (60V/14 mΩ)

C=2×4.4 μF/100V; $C_1$=5×10 μF/50V; $C_2$=2200 μF/25V; DC Transformer had a volume of 0.83 in$^3$.

Symmetrical Soft Switching With Four-Quadrant VBS Switch

Figure 57A:
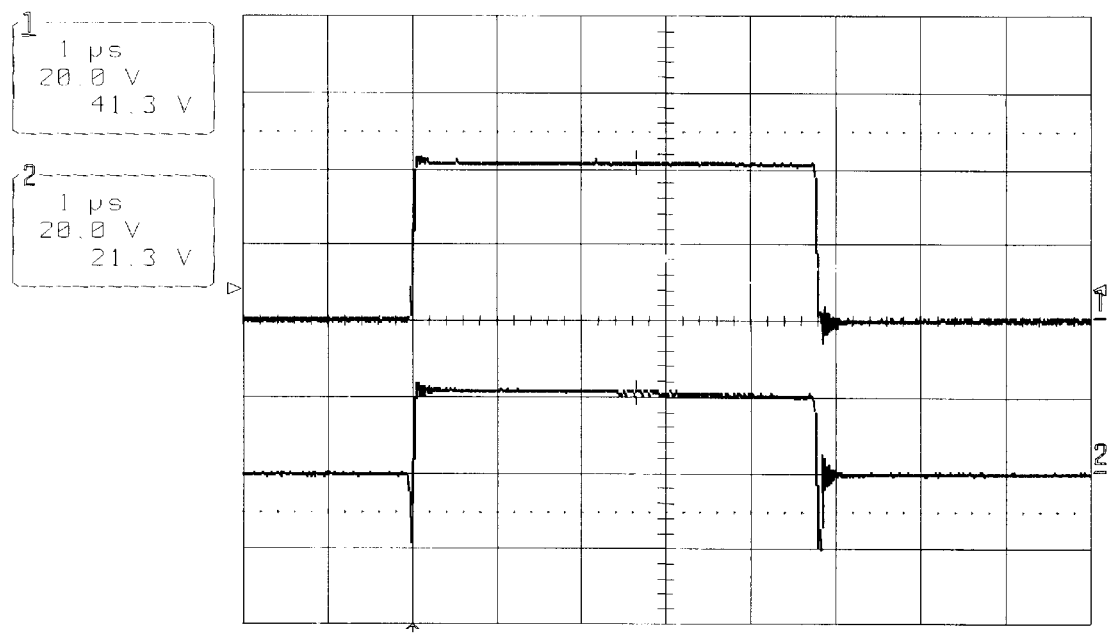
FIG. 57a shows oscilloscope traces of symmetrical soft-switching waveforms of the voltage of the input switch (top trace) and the voltage of the four-quadrant output switch (bottom trace) at 100 kHz switching frequency.
Figure 57B:
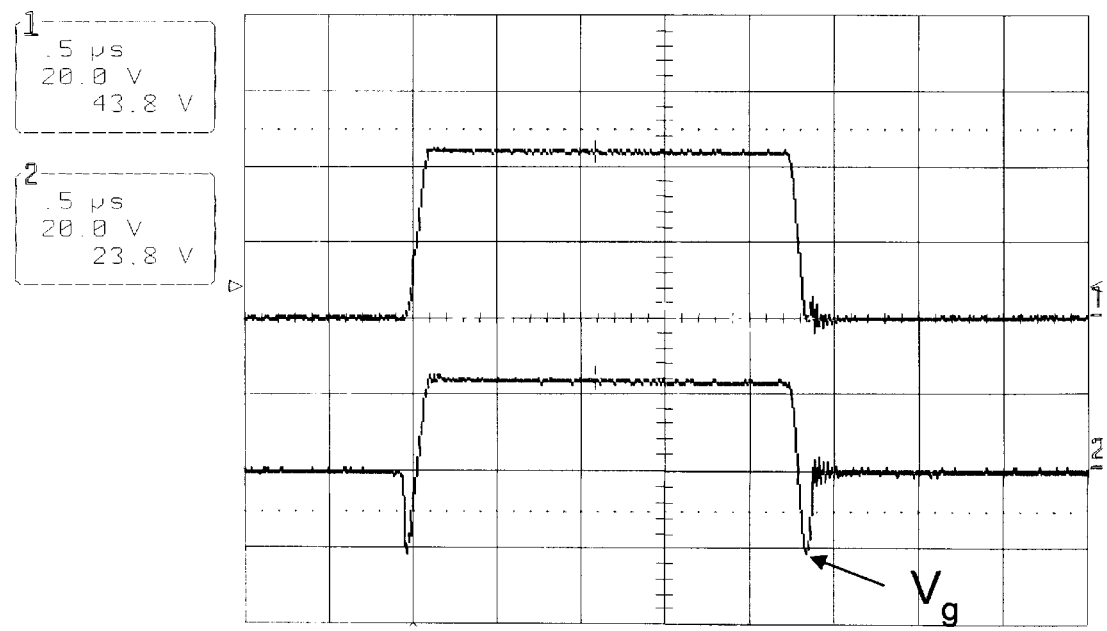
FIG. 57b shows the same corresponding voltage waveforms at 200 kHz.
Figure 57C:
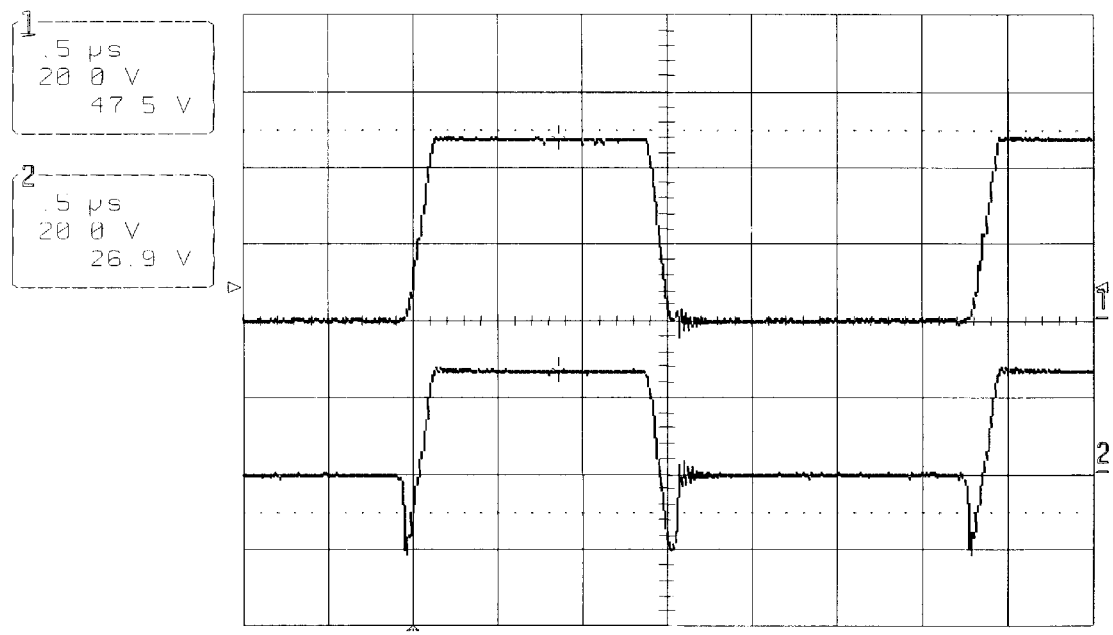
FIG. 57c shows the same corresponding voltage waveforms at 300 kHz.
Figure 57D:
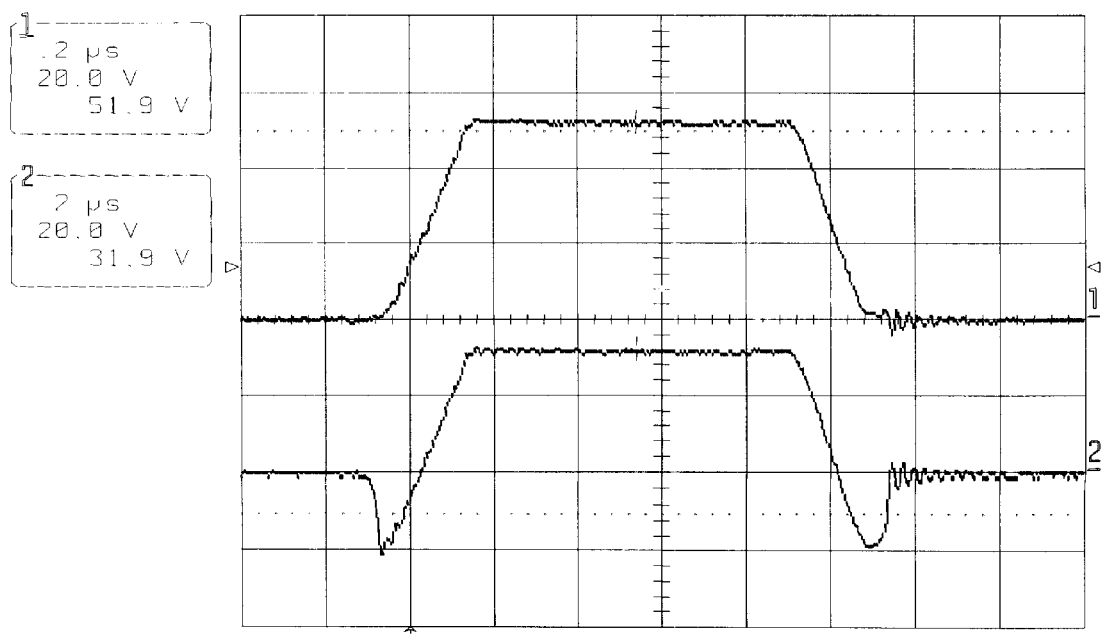
FIG. 57d shows the same corresponding voltage waveforms at 400 kHz switching frequency.

First the sequence and timing of switching drives is adjusted so that a symmetrical soft switching case is obtained, that is for D to D' transition, the output switch $S_2$ is turned OFF before input switch $S_1$ is turned OFF as described by waveforms of FIG. 48b. In FIG. 57a, the top trace shows the measured waveform of the voltage of the input switch, and the bottom trace the voltage of the output switch $S_2$ at 100 kHz. The corresponding waveforms at 200 kHz, 300 kHz, and 400 kHz are shown in FIGS. 57b, c, d, respectively, exhibiting the distinct symmetrical behavior for both switches as seen from the symmetrical leading and trailing edges in the voltage waveforms. As seen in FIG. 57a, b, c, d, the voltage across the input switch $S_1$ falls completely to zero thus enabling difficult to achieve zero voltage switching during D' to D transition. Additional experiments were conducting at other operating points and similar symmetrical soft switching waveforms observed, confirming zero switching loss performance at all operating points.

Note also the distinct negative voltage peaks of approximately 20V across the output switch VBS, which corresponds to input DC voltage of $V_g$=20V as predicted by the analysis. In addition, the D to D' transition clearly shows the two distinct subintervals in the voltage waveform across output switch $S_2$, first the very fast negative slope interval, followed by much slower positive slope due to AC ripple currents only. Note also how the voltage waveform transition at the edges are rounded and smooth even at 400 kHz switching frequency and free of usually high frequency ringing and spike noise associated with hard switching.

The efficiency was measured at each discrete frequency at the full 50 W power output and data are summarized in the following Table I:

TABLE I

| Switching frequency | 100 kHz | 200 kHz | 300 kHz | 400 kHz |
|---|---|---|---|---|
| Efficiency | 96.4% | 96.4% | 96.0% | 95.3% |

The above efficiency measurements did not include the gate drive losses in order to compare the efficacy of the soft-switching methods relative to the losses due to energy storage in parasitic drain-to-source capacitances of all switching devices. The measured data clearly show that the switching losses were practically eliminated, since over the wide range of switching frequencies of 4 to 1, the small efficiency degradation of approximately 1% is observed. It should also be noted that the magnetic design was optimized for 100 kHz switching frequency and the same size magnetic design used for higher frequencies. Yet design optimized for 400 kHz switching frequency could not only result in smaller core size, but due to lower mean length of winding turns in lower copper losses and some further efficiency improvements to practically make up for the noticed 1% efficiency degradation.

This high efficiency performance at high switching frequencies due to this type of soft switching is next compared with the efficiency dat$_a$ obtained on the same prototype but subjected to the straightforward timing of FIG. 14c which leads to hard switching such as shown next.

Hard Switching with Two-quadrant CBS Switch

Figure 58A:
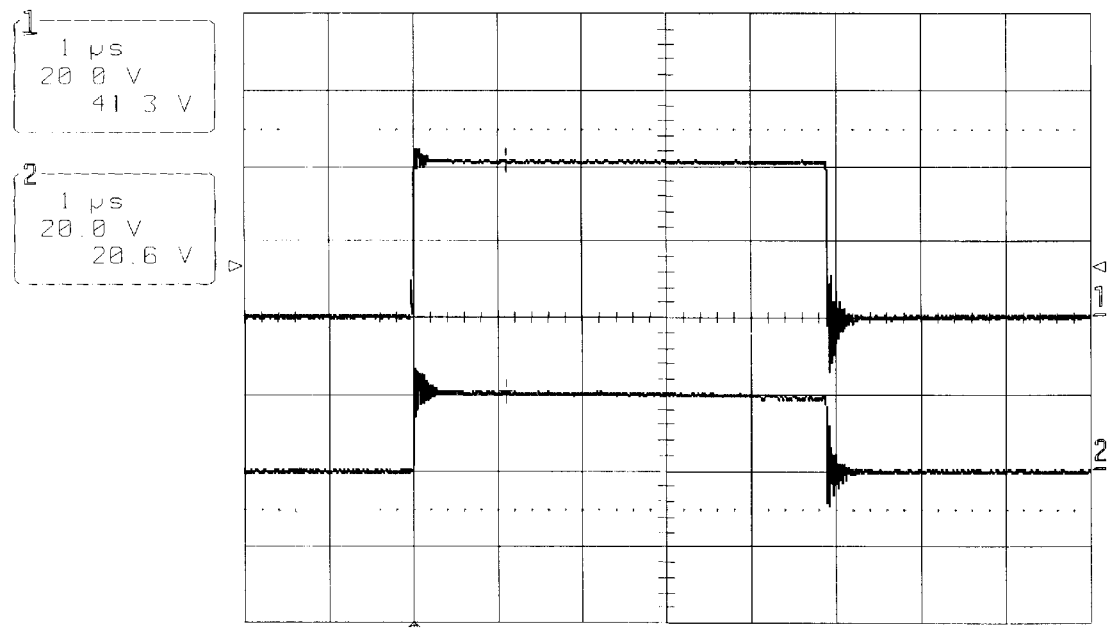
FIG. 58a shows oscilloscope traces of hard-switching waveforms of the voltage of the input switch (top trace) and the voltage of the two-quadrant current-bidirectional output switch (bottom trace) at 100 kHz switching frequency.
Figure 58B:
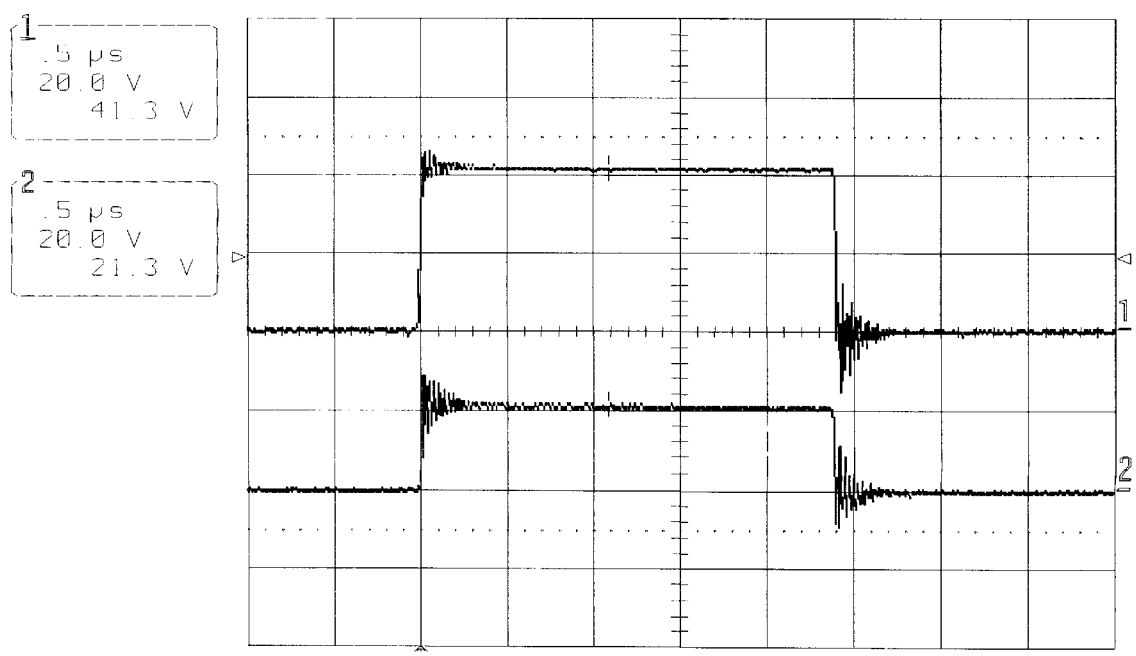
Figure 58C:
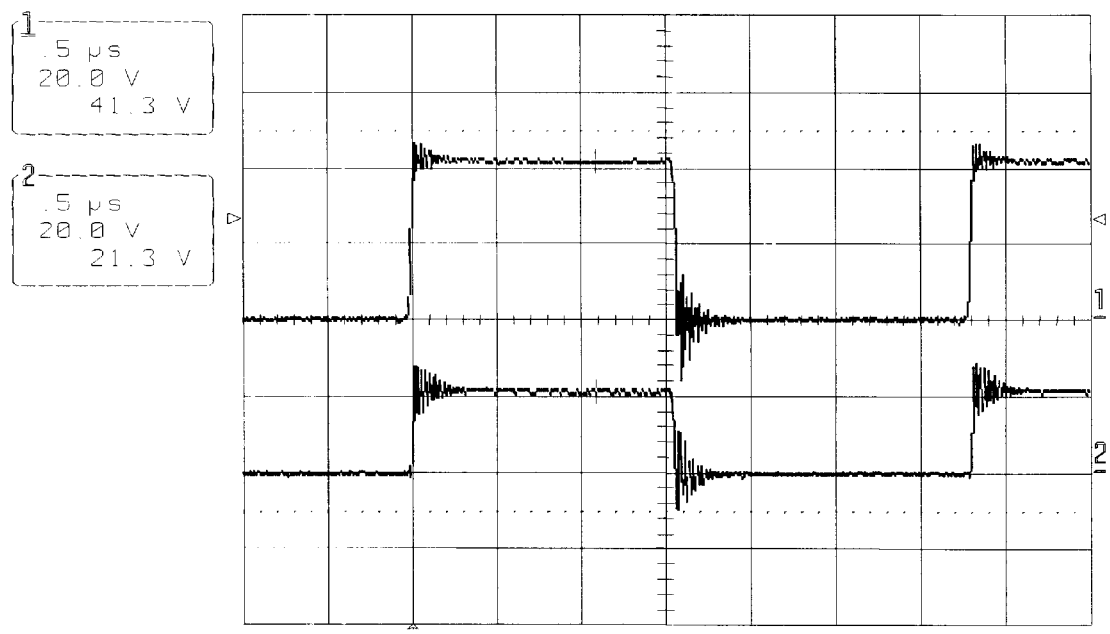
Figure 58D:
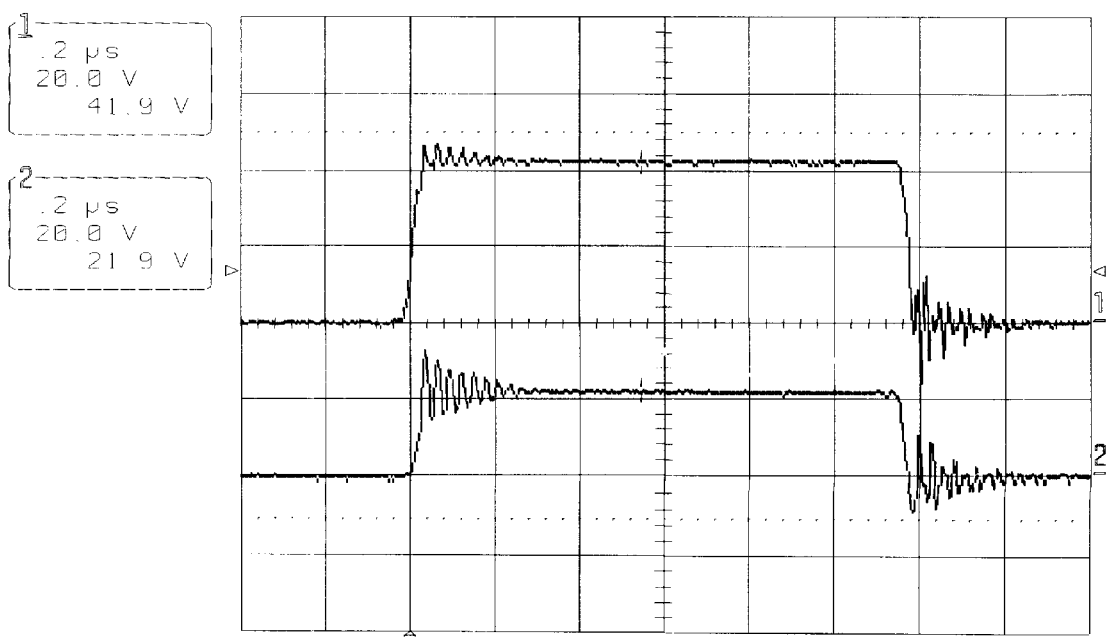

The same prototype is now modified to operate with the CBS output switch and with the straightforward drive timing of FIG. 14c, which leads to the hard-switching of both D to D' and D' to D transition and overall hard-switching performance. In FIG. 58a, the top trace shows the waveform of the voltage of the input switch, and the bottom trace the voltage of the output switch $S_2$ at 100 kHz. The corresponding waveforms at 200 kHz, 300 kHz, and 400 kHz are shown in FIGS. 58b, c, d, respectively. Note a high frequency ringing voltage at both rising and falling edges of the two voltage waveforms, which becomes more pronounced at high frequencies, hence leading to high EMI noise. Note that in the isolated case due to leakage inductance of the transformer this ringing and power loss would be even more pronounced. The comparison of the efficiencies at full 50 W power is even more striking as summarized in Table II:

TABLE II

| Switching frequency | 100 kHz | 200 kHz | 300 kHz | 400 kHz |
|---|---|---|---|---|
| Efficiency | 94.0% | 89.9% | 85.2% | 80.7% |

Note that initially at 100 kHz the efficiency is still very high at 94% due to the unique converter configuration and its efficient DC Transformer structure. However, as the switching frequency increases the efficiency decays rather abruptly to as low as 80.7% at 400 kHz due to switching losses on semiconductor devices. The efficiency degradation of almost 14% is then directly attributed to the absence of the above soft-switching implementation. This comparison is even conservative, since VBS switch in soft-switching case has higher conduction losses than the CBS switch in hard-switching case. Comparison of the actual losses at 400 kHz of the soft-switching and hard-switching performance is even more revealing: the efficiency of 95.3% translates into approximately five (4.85) times reduced losses compared to those incurred in hard switching case with 80.7% efficiency.

Asymmetrical Soft Switching

Figure 59A:
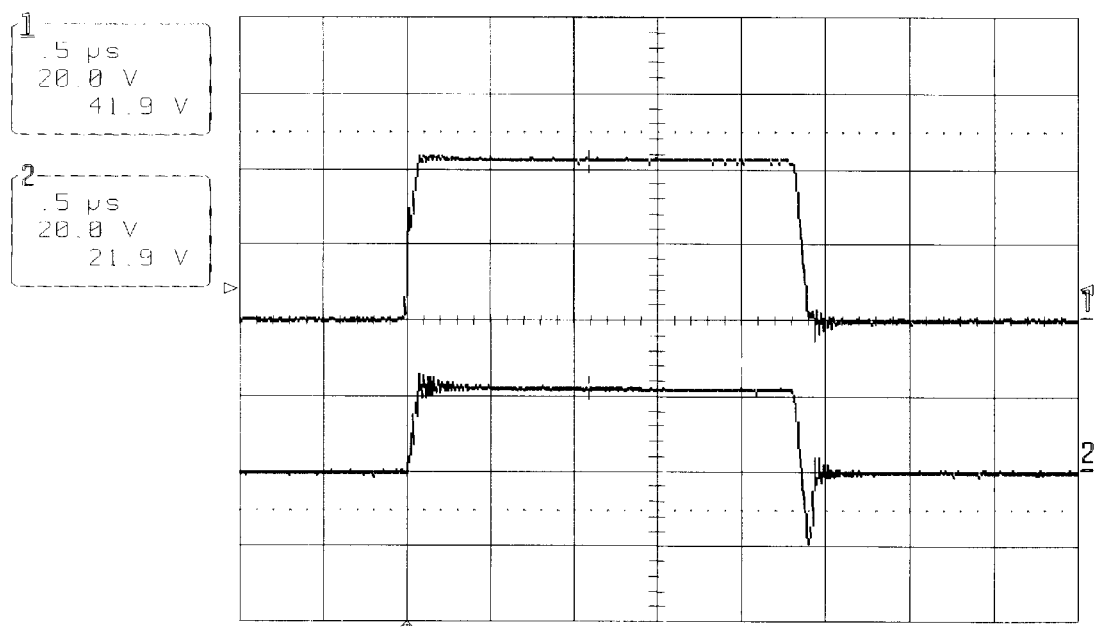
FIG. 59a shows oscilloscope traces of asymmetrical soft-switching waveforms of the voltage of the input switch (top trace) and the voltage of the four-quadrant output switch (bottom trace) at 200 kHz switching frequency and FIG. 59b shows the same corresponding voltage waveforms at 400 kHz switching frequency.
Figure 59B:
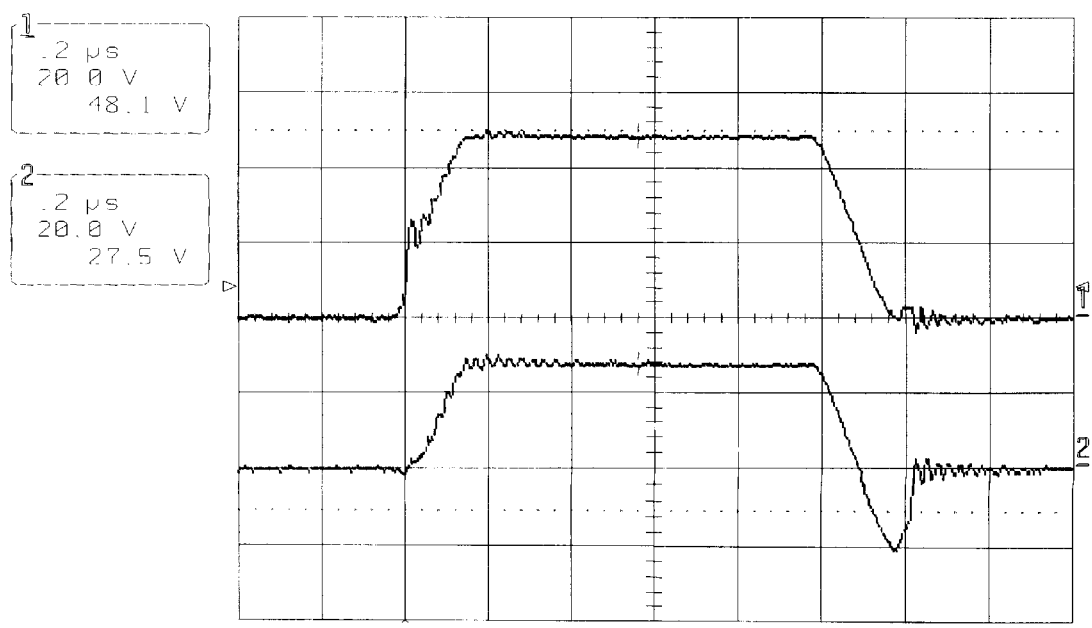

Now the timing of switching drives is modified so that an asymmetrical soft-switching case is obtained, that is for D to D' transition, the input switch $S_1$ is now turned OFF before output switch $S_2$ is turned OFF as shown by waveforms of FIG. 52b. The drive timing for the D' to D transition is the same as in the symmetrical soft switching case, that is the second transition is initiated by turning OFF complementary input switch $S'_1$ first. In FIGS. 59a, b, the top trace shows the waveform of the voltage of the input switch $S_1$, and the bottom trace the voltage of the output switch $S_2$ at the 200 kHz and 400 kHz switching frequencies respectively. Note the asymmetrical shape of the output switch voltage waveform, due to the absence of the negative peak of the D to D' transition present in symmetrical soft switching case. In addition, the voltage of input switch at D to D' transition has two distinct slopes, which further brings asymmetry to the waveforms. Note, however, that the falling slope of the input switch voltage during D' to D transition is the same as in symmetrical case, thus resulting in zero voltage switching and zero switching losses of the input switch at any operating point. In fact, zero voltage switching of complementary input switch during D to D' transition is also confirmed, leaving only output switch hard-switched during D' to D transition.

Symmetrical Soft Switching With Two-Quadrant VBS switch

Figure 60:
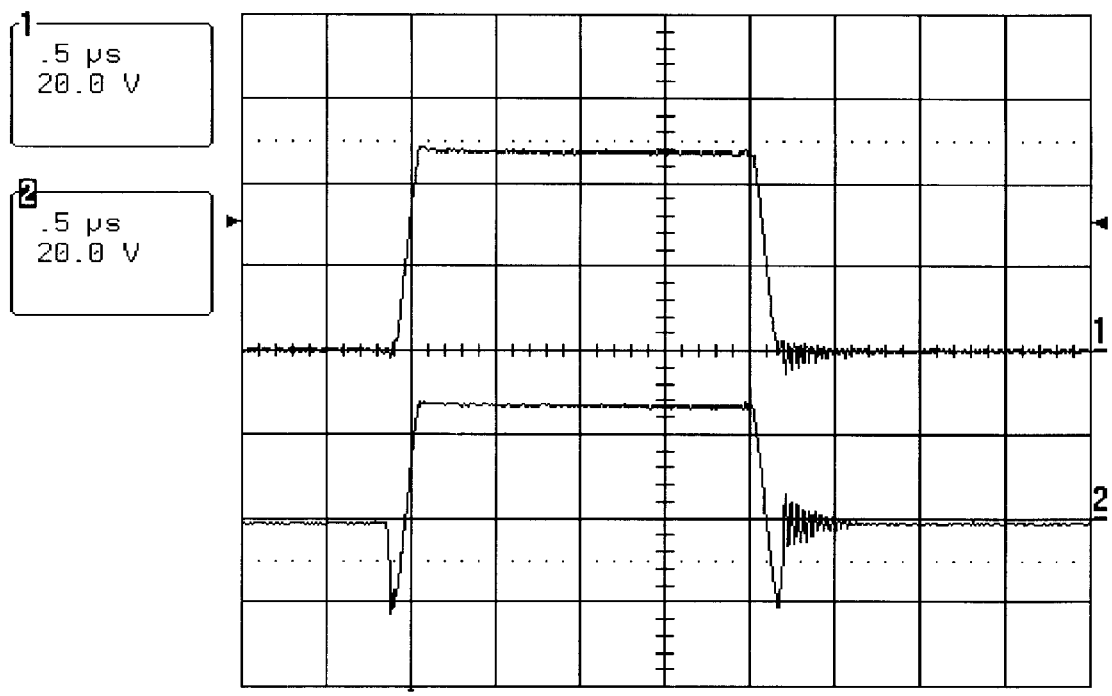
FIG. 60 shows oscilloscope traces at 200 kHz switching frequency of symmetrical soft-switching waveforms of the voltage of the input switch (top trace) and the voltage of the two-quadrant voltage-bidirectional output switch (bottom trace) consisting of series connection of P-channel MOSFET and Schotkey diode.

The output four-quadrant switch is now replaced with the two-quadrant VBS switch consisting of series connection of the P-channel MOSFET and diode as shown in FIG. 46b. The drive sequence and timing was adjusted for symmetrical soft-switching resulting in the symmetric soft-switching waveforms of FIG. 60. The four-quadrant switch implementation appears to be more efficient due to lower conduction losses at low output voltages.

Soft Switching Isolated DC Transformer Converter

The prototype of a practical off-line converter operating from a rectified AC line is built to test the soft switching Isolated DC Transformer switching converter. The input DC voltage from 210V to 450V is converted to an output DC voltage of 5V at a nominal power of 100 W and operating at switching frequency of 200 kHz. The components with following values were used for the converter of FIG. 39b:

C=47 nF; C$_1$=1 μF; C$_2$=3×1200 μF; Q$_1$⇒STU10NB80;
Q'$_1$⇒STP4NB80FP;
Q$_2$& Q'$_2$⇒STV160NF03L

The Isolated DC Transformer with a 27:1 step-down turns ration was built using the custom magnetic core configuration of FIG. 32 and using the Isolated DC Transformer switching converter configuration of FIG. 39b. The custom core with three magnetic legs was built using ferrite ferromagnetic material. Volume of the Isolated DC Transformer was 0.79 in$^3$.

Figure 61:
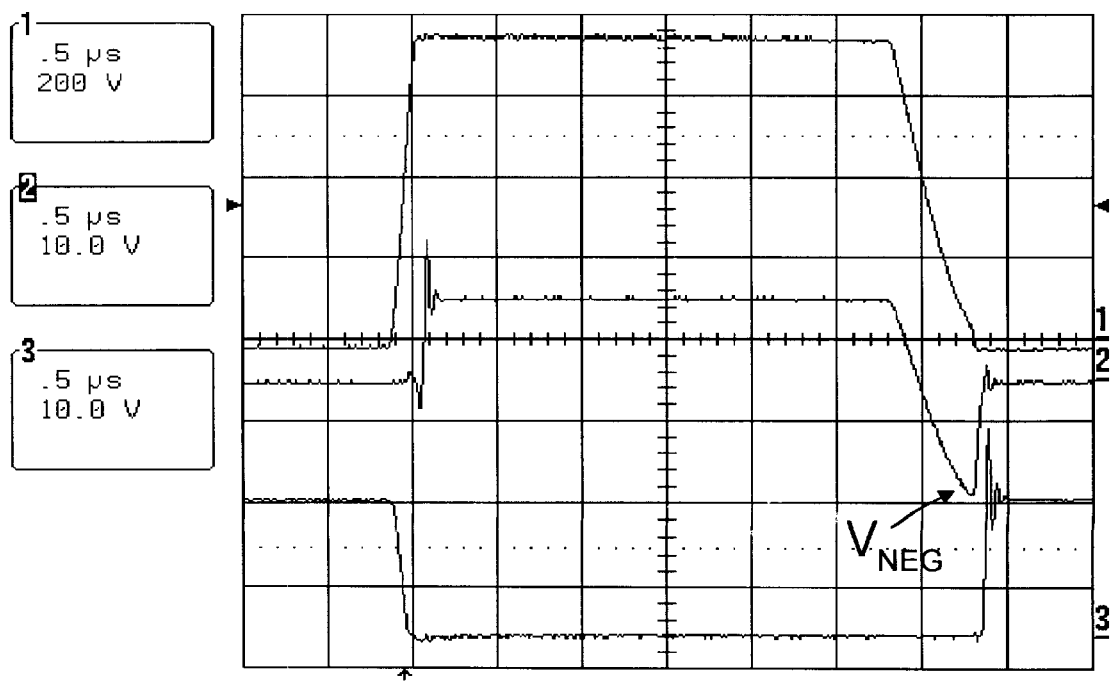
FIG. 61 shows oscilloscope traces of the soft-switching drain-to-source voltage waveforms of the input switch (top trace), output switch (middle trace), and complementary output switch (bottom trace) of the Isolated DC Transformer converter at 450V DC input voltage.
Figure 62A:
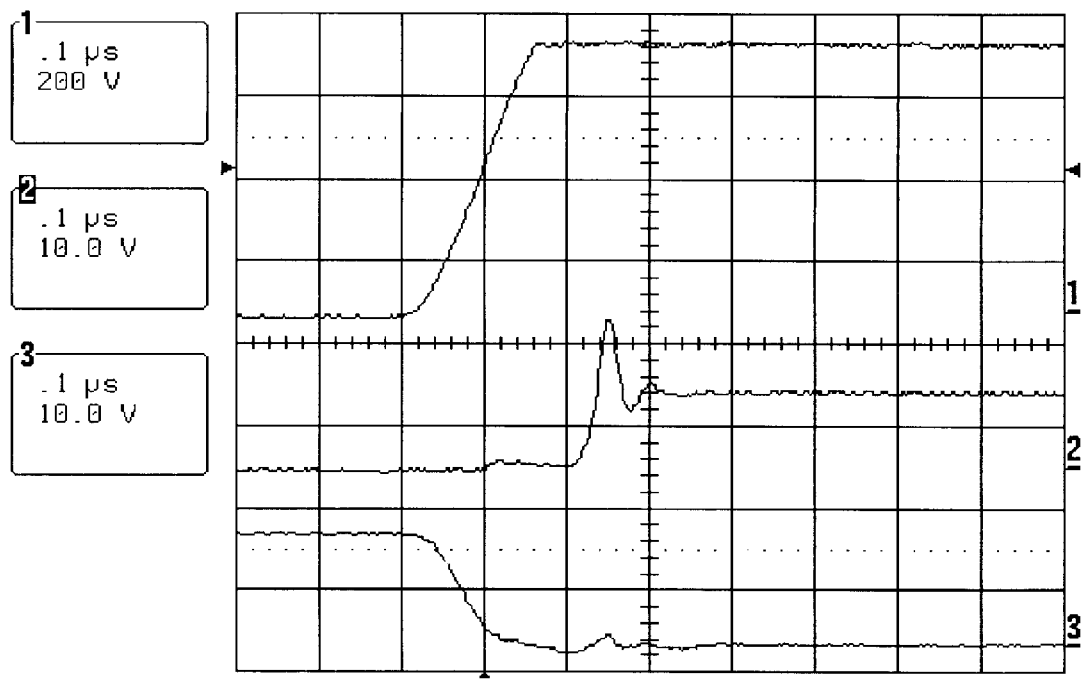
FIG. 62a shows oscilloscope traces with enlarged display of D to D' transition (leading edge) of the FIG. 61.
Figure 62B:
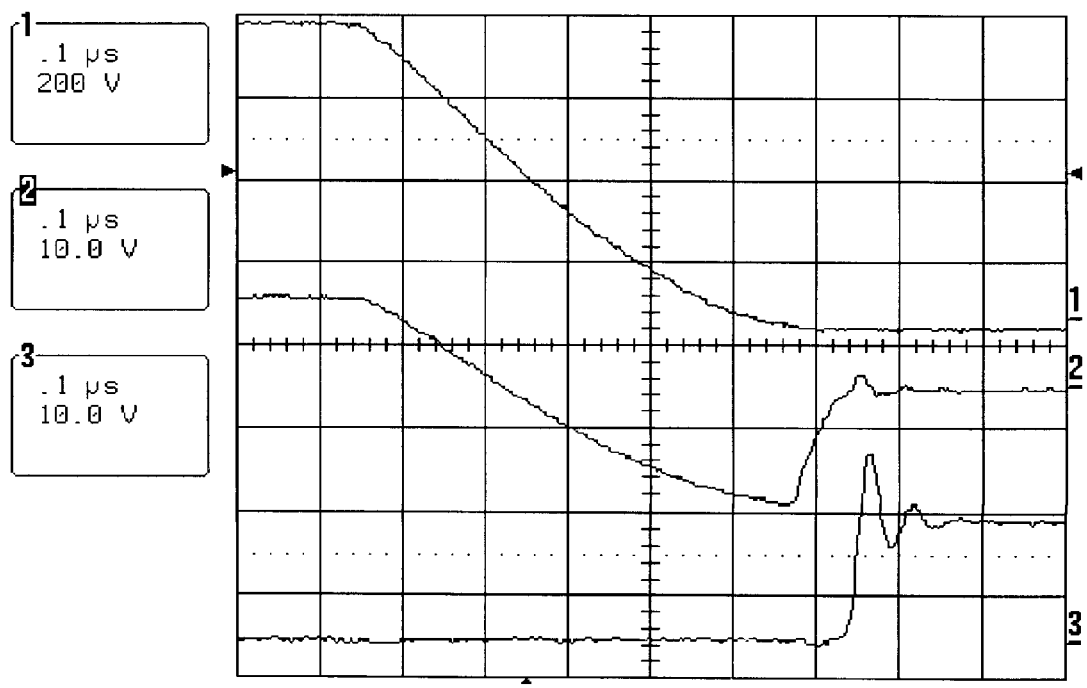
FIG. 62b shows oscilloscope traces with enlarged display of D' to D transition (trailing edge) of the FIG. 61.
Figure 63A:
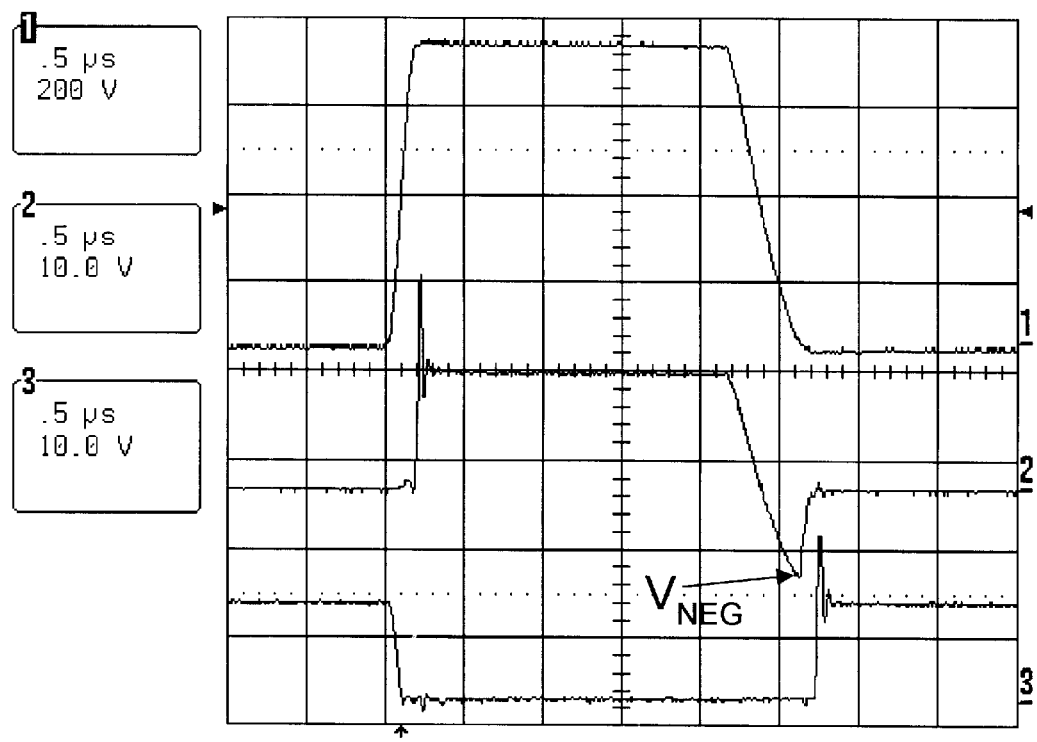
FIG. 63a shows oscilloscope traces of the soft-switching drain-to-source voltage waveforms of the input switch (top trace), output switch (middle trace), and complementary output switch (bottom trace) of the Isolated DC Transformer converter at 300V DC input voltage.
Figure 63B:
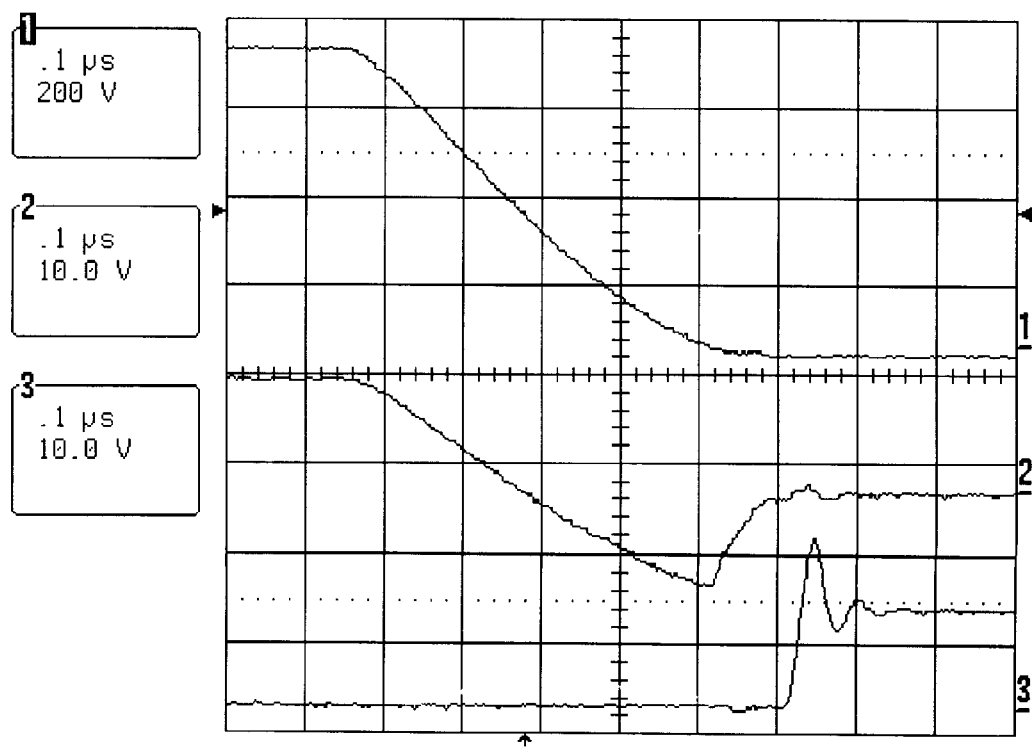

The correct drive sequence and timing for the isolated converter case in which the leakage inductance of the isolation transformer somewhat modifies behavior of the circuit, is like in the asymmetrical soft-switching case for D to D' transition initiated by turning the input switch OFF. The soft-switching performance of the Isolated DC Transformer converter is displayed in FIG. 61 for the operation with 450V DC input voltage. The top trace in this figure represents the drain-to-source voltage of the input switch S$_1$, the middle trace represents the drain-to-source voltage of the output switch S$_2$, and the bottom trace represents the drain-to-source voltage of the complementary output switch S'$_2$. FIG. 61 displays both transition edges, with D to D' transition edge marked by the fast voltage rise of input switch S$_1$. The overall appearance of the voltage on input switch and output switch resembles the some waveforms in the asymmetrical soft-switching in non-isolated converter with same minor differences. Note, for example, that D to D' transition is reduced to a single slope in comparison to the two distinct slopes of the D to D' transition in the asymmetrical soft-switching of FIGS. 59a, b. The leakage inductance of the transformer maintains the initial fast rise of the voltage on input switch of FIG. 59b (due to the peak input switch current), resulting in much shorter D to D' transition. Note from the bottom trace of FIG. 61 that the complementary output switch voltage is reduced to zero and switch is turned ON at zero voltage during D to D' transition as seen in the enlarged display of this transition in FIG. 62a. Similarly, the complementary input switch voltage drops to zero volts when input switch voltage reaches peak voltage and is also turned ON at zero voltage with zero switching losses. The enlarged display of the D' to D transition of FIG. 61 is shown in FIG. 62b. Note from both FIG. 61 and FIG. 62b, the slow falling edge of the input switch voltage waveform due to the dependence on AC ripple current only. The input switch voltage is reduced to zero and the switch is turned ON at zero voltage resulting in zero switching losses at D' to D transition. Note also the negative voltage peak of approximately 16.7V at the output switch in accordance to equation (26) for V$_g$=450V and n=27. This performance is also experimentally confirmed for any operating point as seen by the soft-switching waveforms of FIGS. 63a–b, obtained for 300V input DC voltage clearly resulting in full soft switching of the primary side high voltage devices and complementary output switch S'$_2$. Note the negative voltage peak of 11V on the output switch in accordance to equation (26) for V$_g$=300V. This switch is the only one which is turned ON with hard switching losses which takes place during D' to D transition. However, as seen from FIG. 61 and FIG. 62b, this negative voltage peak is only approximately 16.7V compared to 450V if the hard switching remains on the primary side with V$_g$=450V. The parasitic capacitance of the low voltage output devices (30V blocking voltage in this case) is C$_{S2}$=2950 pF. Since the hard switched voltage is also very low (16.7V) power loss is practically negligible and equal to $P_{LOSS}=\frac{1}{2}C_{S2}V_B^2 f_S$=82 mW. This, once again, confirms the importance of having the full soft switching of the high voltage switching devices on the high voltage primary side, and relatively insignificant switching losses due to low voltage output switching devices on the low voltage secondary side.

If the hard switching were taking place on the high voltage primary side with V$_g$=450V, and actual capacitances of switches:

C$_{Q1}$=350 pF and C$_{Q'1}$=95 pF so C$_{eq}$=445 pF the total switching losses calculated are P=9 W, which is a factor of 9/0.082=110 times larger than when the hard switching losses are on the secondary low voltage side. Thus, for a 100 W converter, partial soft-switching on the high voltage primary side with 9% efficiency reduction leads to negligible switching loss when hard switching is transferred to the low voltage secondary side.

Comparison with Hard Switching Operation

The efficiency with the four-quadrant VBS switch in soft-switching mode described above was measured to be 94.15%. To illustrate the critical importance of the usually very difficult D' to D transition, the drive sequence and timing of the switches were altered to result in hard switching of the D' to D transition only, which resulted in drastic reduction of efficiency to 87.9% as measured on the prototype. Note that the D to D' transition was still left in the soft-switching mode. The hard switching of this transition would not only result in additional large losses due to the energy stored on the leakage inductance, but the resulting large voltage spike noise could not be tolerated by circuit and would require higher voltage rating of the input switch than implemented in the prototype.

Input and Output Inductor Ripple Current Measurements

Figure 64:
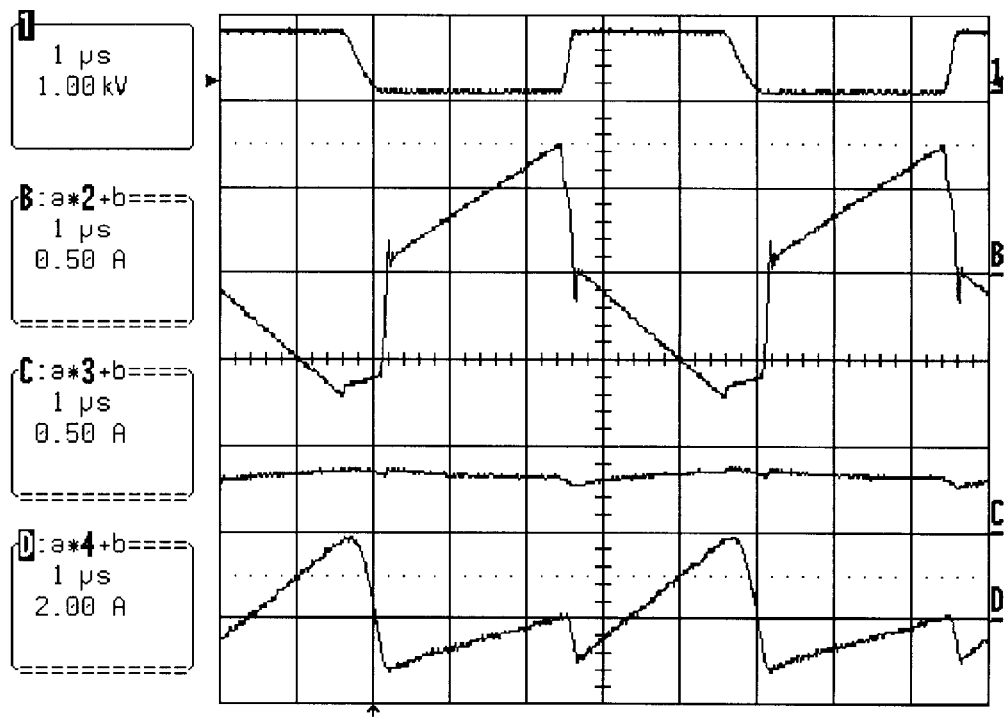
FIG. 64 shows oscilloscope traces of the following waveforms in the soft-switching Isolated DC transformer converter operating at 270V DC input voltage: top trace is the drain-to-source voltage of the input switch, second trace is the isolation transformer primary current, third trace is the input inductor current ripple, and the bottom trace is the output inductor current ripple.

First the ripple current performance was measured at two operating points. The waveforms shown are in the following order. Top trace is drain-to-source voltage of the main switch S$_1$. Second trace is the isolation transformer primary current, third trace is the input inductor current ripple at 0.5 A/div, and the bottom trace is output inductor current ripple at 2 A/div. FIG. 64 displays these waveforms obtained at 270V DC input voltage. The input inductor ripple current is only approximately only 100 mA peak-to-peak, hence it is practically zero-ripple current. The output inductor ripple current is also very small measuring approximately 3 A peak-to-peak. This is a quite low ripple current of 15% considering that the nominal DC load current is 20 A.

Efficiency Measurements

Figure 65:
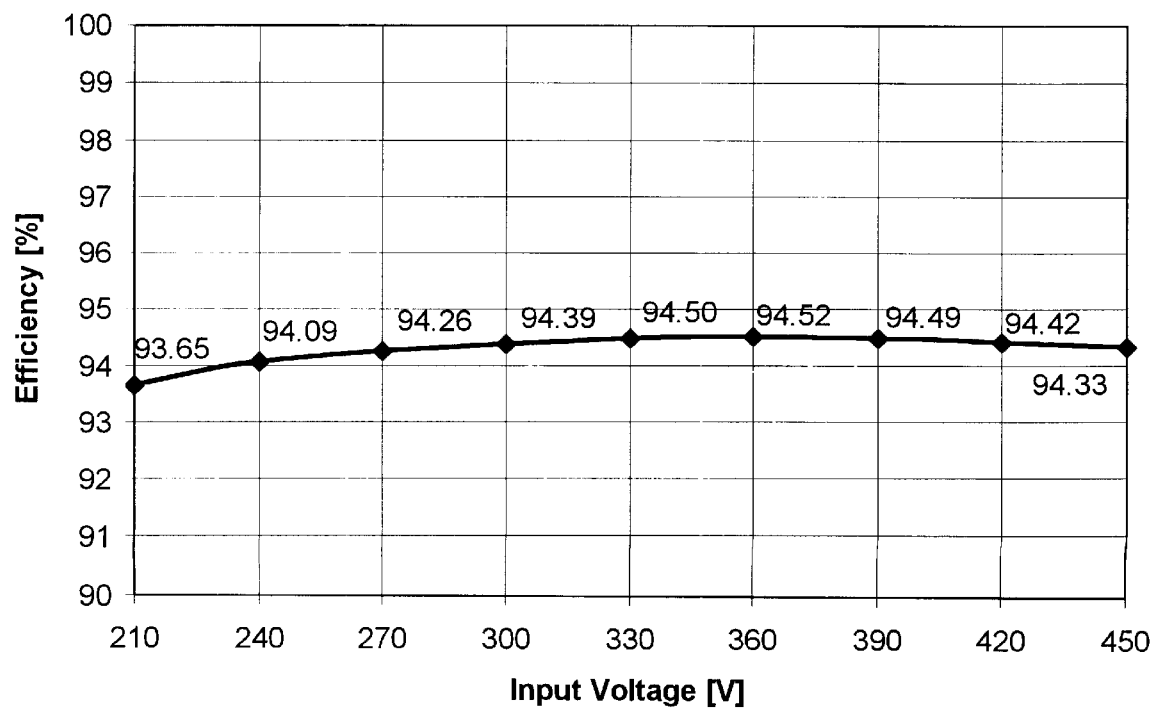
FIG. 65 is a graph of the efficiency of the experimental prototype over an input DC voltage range from 210V to 450V.

The efficiency measurements are taken over the operating range from 210V DC to 450V DC and the obtained dat$_a$ are displayed in FIG. 65. To highlight the performance of the converter itself, the efficiency measurement did not include the drive losses, but only power stage losses. Although the measurements were made for 100 W output power, due to its inherent high DC overload capability, the converter could be operated at 150 W continuously with only a slight drop of approximately 1% in efficiency. Note that efficiency is practically constant and very high over the wide voltage range from V$_g$=240V to V$_g$=450V. This efficiency measurement confirms two most important properties of the novel soft-switching technique:

1. Soft-switching is independent of the operating point and equally effective throughout the operating range;
2. Soft-switching losses are practically eliminated as verified by high overall efficiency.

This extremely effective soft-switching for the first time allows additional increase of the switching frequency with only small decrease in efficiency. This in turn makes possible further significant size and weight reduction of the converter while preserving overall efficiency and low temperature rise.

Overload Current Test—Asymmetrical Soft Switching

Figure 66A:
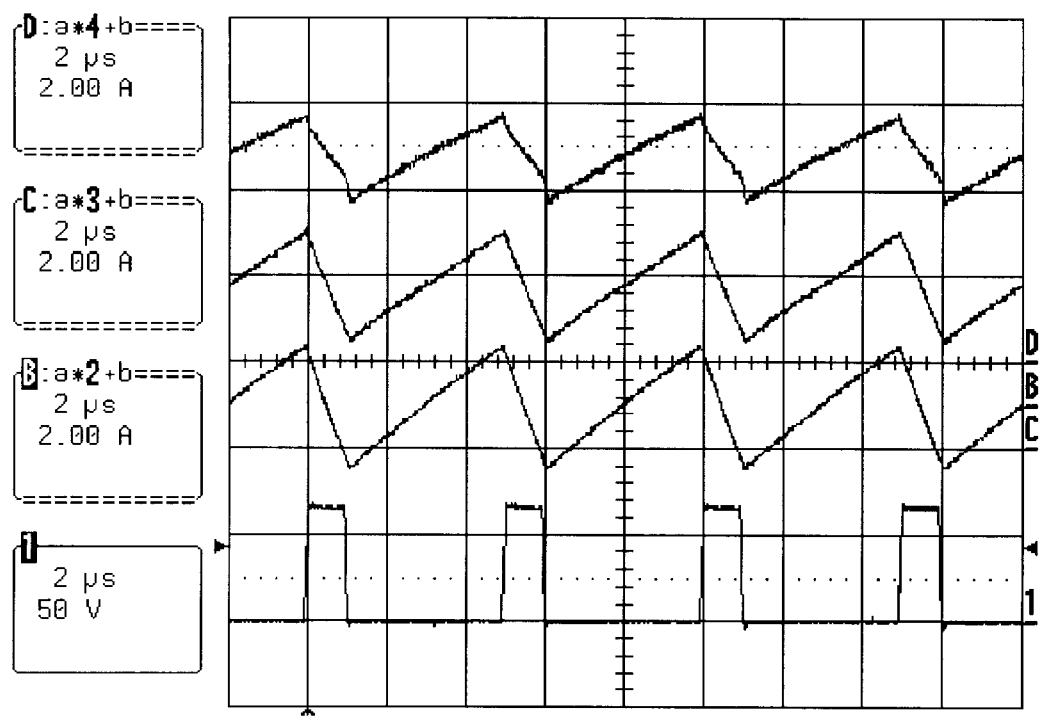
FIG. 66a shows oscilloscope traces of the three inductor current waveforms measured on the prototype of a 50 W, 20V to 10V converter with a DC Transformer and at 5 A nominal load current.

For the DC overload current tests the asymmetrical soft switching was employed with proper drive sequence and timing of the switches. In order to test the large overload capability, first the DC Transformer was built with 6 mil gap in inductor leg of the UU-like magnetic core structure. The converter was adjusted to operate at a nominal duty ratio of D=0.8 and an output current of 5 A at 10V, hence the input voltage of approximately 13V. The ripple currents of the three inductors under these nominal conditions are shown in FIG. 66a with 2 µs/div time scale (top trace is output inductor current, second trace is input inductor current and third trace is middle inductor current). Note that the output inductor ripple current due to still present AC voltage mismatch is 2 A peak-to-peak, while ripple currents of $i_1$ and $i_m$ are less than 3 A peak-to-peak respectively.

The efficiency was measured to be 95.45% under these nominal conditions and 5 A load current. Note that the breadboard prototype design was built for the purpose of testing the overload current capability and not to optimize efficiency since the state-of-the-art components, such as lowest ON-resistance devices were not used.

Figure 66B:
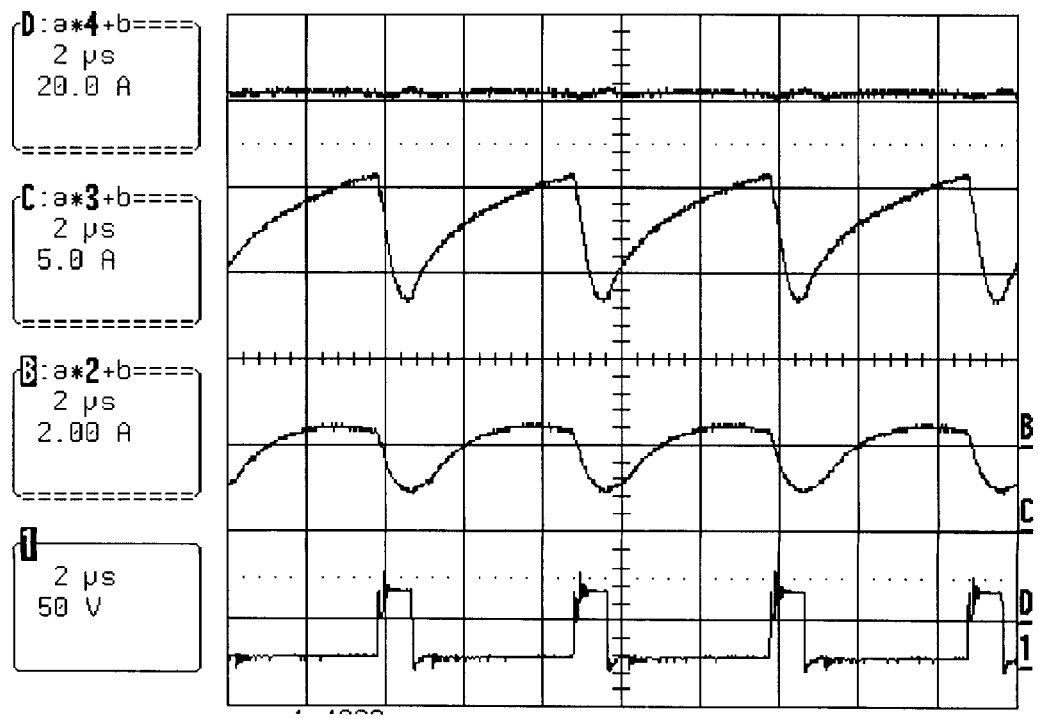
FIG. 66b shows oscilloscope traces of the three inductor currents under the same condition as in FIG. 66a except output is subjected to a large pulsed overload of 118 A load current for 2 ms at 1 Hz repetition rate.
Figure 66C:
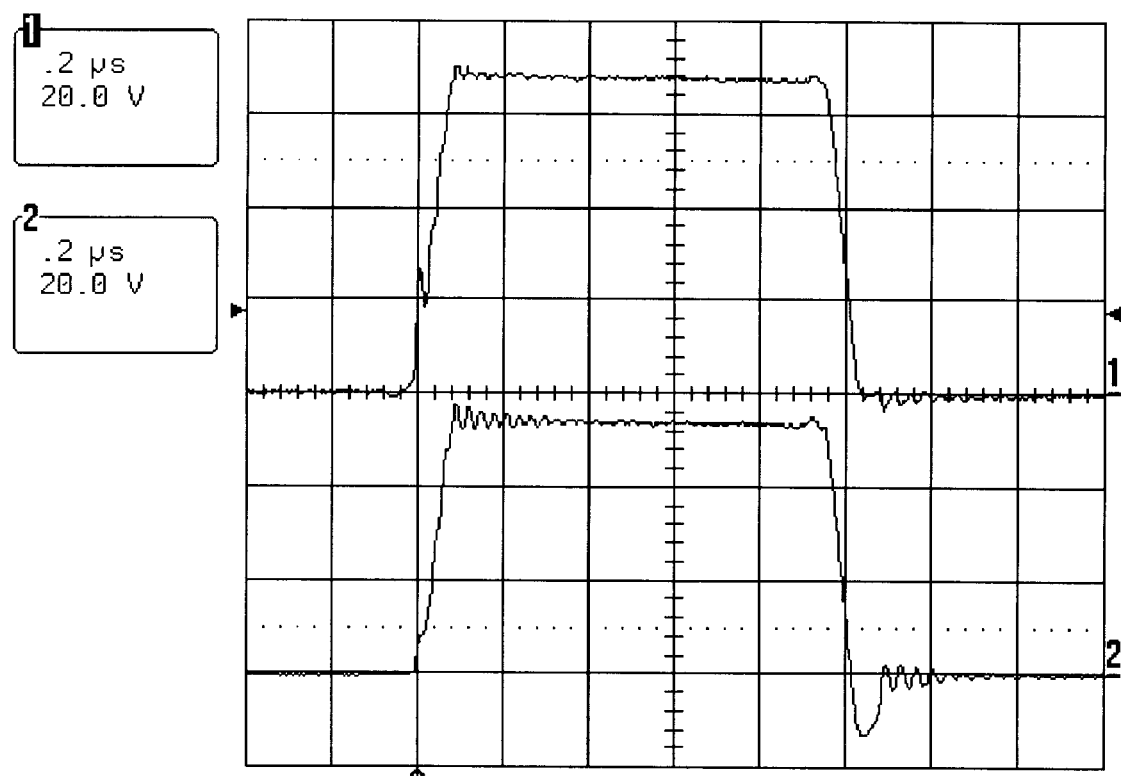
FIG. 66c shows voltage waveforms of the input switch and output switch confirming the soft-switching operation of the experimental converter used for overload current test.

The prototype design was then subjected to a large pulse overload current using pulse frequency of 1 Hz and pulse duration (overload duration) of 2 ms to test the overload current capability. As seen in FIG. 66b (2 µs/div time scale), the overload capability of 122 A was verified for an effective overload capability in excess of 24 times. FIG. 66c displays the characteristic negative voltage of the trailing edge of the output switch voltage, confirming that the converter was operating in the soft-switching mode for this overload current test.

To put the magnitude of this overload in perspective, let us compare this design with another one in which the DC Transformer is not used, but two separate magnetic cores were used: one for combining input inductor and middle inductor into a single core of FIG. 24a, and another separate magnetic core with corresponding air gap as in FIG. 24c for the output inductor with its DC bias. The two separate magnetic cores would each have to support 5 times 120 A or 600 ampere-turns, thus, to avoid saturation, each core must have a total air-gap of 120 mils or 3 cm (!), based on the 2 mil per 10 DC ampere-turns air-gap criteria, which would lead to DC flux density of 0.25 T (tesla). At such an air-gap, ferromagnetic material might as well be completely left out since it contributes practically nothing to raise the inductance level beyond that of an air-core coil. As a result, the AC ripple currents in all windings would be huge and impractical. Yet the DC Transformer of the present invention was capable of supporting over 24 times output DC current overload with all ripple currents still at the same level as with the nominal 5 A load current.

CONCLUSION

Even a cursory look at the present state-of-the-art switching DC-to-DC converters, regardless of their power, reveals that the magnetic components dominate both the overall size and weight of the converters, and contribute more than half of the total losses.

Almost all attempts in the past to reduce the size of the magnetic components, and thus overall converter size and weight resulted in an inordinate increase of switching frequency. While increase in switching frequency initially allows a smaller size of magnetic components, the much increased power losses in magnetic components (core losses, skin effect and proximity effect) as well as switching and drive losses of semiconductor devices, lead quickly to diminishing returns: the increased losses demand a larger size and weight of the heat-sinks for heat dissipation in order to reduce the components temperature rise to acceptable levels. In the end, the overall size of the converter is hardly reduced despite smaller magnetics. Thus, the successful solution must offer both a large reduction in size of the magnetic component and substantial improvement in efficiency at moderate and high switching frequencies.

The present invention fulfills both of these requirements. The new magnetics of the DC Transformer, in conjunction with the special switching circuitry, enables all of the otherwise separate magnetic components of the converter to be combined onto a single common magnetic core in an unprecedented way. Very detrimental large DC bias currents present in each magnetic winding and hence their corresponding large DC fluxes are processed in such a way that the total DC flux in the common magnetic core is reduced to zero for any operating duty ratio D. The large air-gap considered heretofore as an inevitable part of switching converter magnetics is eliminated entirely in the new DC Transformer. What seemed unavoidable in the past, namely the detrimental storage of the DC energy in the air-gaps previously always present, was also completely eliminated. The resulting magnetic structure behaves like an AC transformer with no DC flux bias at all, hence the switching converter operates with corresponding size reduction and efficiency improvements. Furthermore, due to automatic DC ampere-turns cancellation, the new DC Transformer has been demonstrated to easily operate with tremendous DC overload capability, which is an order of magnitude larger than the nominal load current.

Another aspect of the present invention is the implementation of special soft-switching techniques, which turns ON all switching devices except one at zero voltage, hence no switching losses, while only one switching device on the low-voltage secondary side experiences hard-switching, but at very low voltages and thus produces negligible switching losses. This very effective soft-switching results in further improvement of the efficiency and reduction in size of the converter as well as in much reduced radiated EMI noise and low stresses on semiconductor switching devices, thus increasing converter reliability. For the first time, size and weight of converter can be further reduced by increase of the switching frequency without degradation of already achieved extremely high efficiency. Moreover, despite its simple implementation using only proper drive sequence and timing of the four switching devices, switching losses due to parasitic drain-to-source capacitances of all switching devices is practically eliminated in the isolated converter and such high efficiency performance maintained throughout the whole operating range.

The new converter with its unique DC Transformer structure and special soft-switching operation has resulted in unexpected and surprising result, namely the substantial reduction of the magnetic components in size and weight with concurrent dramatic efficiency improvement and increase of overload capability as demonstrated by the experimental prototype of the isolated 450V to 5V, 100 W converter with 94.5% efficiency. For comparison, the present state-of-the-art converters operate below 88% efficiency and have power losses, which are 200% to 300% higher than the power losses of the present invention.

Finally, the present invention provides additional performance improvements, such as zero-ripple current at the input over a wide operating range, as well as zero ripple current at the output for a limited operating range, which contribute to reduced conducted EMI noise.

Although the particular embodiments of the invention have been described and illustrated herein, it is recognized that modifications may readily occur to those skilled in the art. Consequently, it is intended that the claims be interpreted to cover such modifications and equivalents thereof.

What is claimed is:

1. A switching DC-to-DC converter for providing power from a DC voltage source connected between an input terminal and a common input terminal to a DC load connected between an output terminal and a common output terminal, said converter comprising:

an input inductor winding, a middle inductor winding, and an output inductor winding, placed on a common magnetic core to form an effective DC Transformer, and each winding having one dot-marked end and another unmarked end whereby any AC voltage applied to said middle inductor winding induces AC voltages in said input and output inductor windings so that all three AC voltages are in phase at dot-marked ends of said input, output and middle inductor windings;

said input inductor winding connected at a dot-marked end thereof to said input terminal to form an input winding of a DC Transformer;

said output inductor winding connected at a dot-marked end thereof to said output terminal to form an output winding of said DC Transformer;

said middle inductor winding connected at a dot-marked end thereof to said common input terminal and said common output terminal to enable said DC Transformer operation;

an input capacitor, having one end connected to an unmarked end of said input inductor winding and another end of said input capacitor connected to an unmarked end of said middle inductor winding;

an input switch with one end connected to said common input terminal and another end connected to said unmarked end of said input inductor;

an output switch with one end connected to said common output terminal and another end connected to an unmarked end of said output inductor winding;

a complementary output switch, having one end connected to said unmarked end of said output inductor winding and another end of said complementary output switch connected to said unmarked end of said middle inductor winding;

a branch comprised of a complementary input switch and an auxiliary capacitor connected in series;

switching means for keeping both said input switch and said output switch closed for a duration of time interval $DT_S$ and, keeping both said complementary input switch and said complementary output switch closed for a duration of complementary time interval $D'T_S = (1-D)T_S$, where D is a duty ratio and D' is a complementary duty ratio within one complete and controlled switch operating cycle $T_S$;

means for connecting the ends of said branch to said converter whereby during said complementary time interval, current through said branch is equal to the sum of input inductor current flowing into said dot-marked end of said input inductor winding and middle inductor current flowing into said dot-marked end of said middle inductor winding reduced by output inductor current flowing out of said dot-marked end of said output inductor winding;

wherein said input switch, said complementary input switch, and said complementary output switch are semiconductor current bidirectional switching devices, capable of conducting the current in both directions while in an ON state, and sustaining voltage in one direction while in an OFF state;

wherein said output switch is a semiconductor voltage bidirectional switching device, capable of conducting the current while in an ON state, and sustaining voltage in both directions, while in an OFF state;

wherein said switching devices turn ON and OFF at high switching frequency;

wherein a DC-to-DC voltage conversion ratio of said converter depends linearly on said operating duty ratio D;

wherein at any duty ratio D, both said input inductor DC current and said middle inductor DC current flow into said dot-marked ends of their respective windings, whereas said output inductor DC current flows out of said dot-marked end of said output inductor winding;

wherein at any duty ratio D, the sum of said DC currents of said input inductor and said middle inductor is equal to the magnitude of said DC current of said output inductor;

wherein said DC Transformer includes an equal number of turns for said input, output, and middle inductors and, at any operating duty ratio D, DC ampere-turns of said input inductor current and said middle inductor current are positive and generate positive DC fluxes which add together, while DC ampere-turns of said output inductor current are negative and generate negative DC flux to result in net zero DC flux in said common magnetic core, and wherein said common magnetic core has no air-gap;

whereby said net zero DC flux in said common magnetic core enables full utilization of the magnetic core material to generate maximum inductances of said input, middle, and output inductors and said converter has current overload capability several times higher than nominal load current, and whereby said DC Transformer combines said input inductor winding, said output inductor winding, and said middle inductor winding to obtain unique and effective DC-to-DC power transfer from said input inductor to said output inductor with substantially reduced energy storage within said common magnetic core of said DC Transformer, thereby reducing size and weight of said converter by reducing said common magnetic core size and weight while simultaneously increasing efficiency and overload capability of said converter, and providing reduction of electromagnetic interference.

2. A switching converter as defined in claim 1, wherein said switching means includes electronically controlling operation of said semiconductor switches whereby two transitions D to D' and D' to D are obtained during each successive switch operating cycle $T_S$, in which said output switch and said complementary input switch are both OFF during said transition intervals wherein said transition intervals are short compared to said switch operating cycle;

wherein switch timing by said switching means of respective switches is as follows:

said first transition D to D' is initiated by turning said output switch OFF and, when voltage on said complementary output switch is reduced to zero, said complementary output switch is by said switching means turned ON at zero voltage for zero switching losses while said input switch is simultaneously turned OFF, and said first transition continues until the voltage on said complementary input switch reduces to zero, at which instant said complementary input switch is also turned ON by said switching means at zero voltage for zero switching losses, and said second transition D' to D is initiated by turning said complementary input switch OFF and when voltage on said input switch is reduced to zero, said input switch is by said switching means turned ON at zero voltage for zero switching losses while said complementary output switch is simultaneously turned OFF, and then with significantly reduced voltage on the said output switch, the said output switch is turned ON for much reduced switching losses for accomplishing a full soft switching cycle, and whereby this soft switching cycle is based on the fundamental property of said converter configuration in which said auxiliary capacitor during said complementary time interval D'$T_s$ carries only AC current necessary and sufficient to complete both soft-switching transitions with zero switching losses on said input switch, complementary input switch, and complementary output switch and much reduced switching losses on said output switch, for any operating duty ratio D, and whereby both soft switching transitions are independent of the DC load current and dependent only on said auxiliary capacitor AC current, thus resulting in equal transition intervals and symmetrical voltage waveforms across said output switch hence termed "symmetrical" soft switching, and whereby voltage stress on said semiconductor devices is significantly reduced and efficiency of said converter is significantly increased while electromagnetic interference is reduced, and whereby switching frequency can be significantly increased for further reduction of the converter's size and weight without negative impact on converter's overall efficiency.

3. A soft-switching converter as defined in claim 2, wherein said DC Transformer has a single-loop, UU-like magnetic core;

wherein said input inductor and said middle inductor are placed side-by-side on one leg of said single-loop, UU-like magnetic core;

wherein said output inductor is placed on the opposite leg of said single-loop, UU-like magnetic core;

whereby leakage inductance between said input inductor winding and said middle inductor winding caused by deliberate side-by-side positioning of said windings along one leg of said single-loop, UU-like magnetic core provides substantially reduced and near zero-ripple current in said input inductor, and whereby leakage inductance between said output inductor winding and said middle inductor winding caused by deliberate positioning of said windings on opposite legs of said single-loop, UU-like magnetic core provides substantially reduced ripple current in said output inductor.

4. A soft-switching converter as defined in claim 3, wherein a small air-gap is positioned on said one leg of said single-loop, UU-like magnetic core with said output inductor winding to provide an effective AC voltage divider between leakage and magnetizing inductances of said output inductor, and wherein said effective AC voltage divider enables better matching of AC voltages on said input inductor, said middle inductor, and said output inductor, whereby, for one particular duty ratio D, said output inductor DC current has a negligible current ripple.

5. A soft-switching converter as defined in claim 4, including a separate external inductor connected in series with said output inductor to reduce ripple in current from said output inductor and said output inductor number of turns is adjusted for better matching of AC voltages of said output inductor, said input inductor, and said middle inductor, whereby said external inductor has inductance an order of magnitude smaller than inductance of said output inductor and has to support an order of magnitude lower AC voltage than said output inductor, thereby resulting in an order of magnitude smaller core size and weight, and substantially lower power losses than said DC Transformer.

6. A soft-switching converter as defined in claim 4, including a separate leakage magnetic leg with no windings and a large air-gap in a magnetic flux path with said single-loop magnetic core, wherein said large air-gap is adjusted to provide said output inductor current with a negligible ripple at a particular duty ratio D, whereby said leakage magnetic leg substantially increases the leakage inductance between said output inductor winding and said input and middle inductor windings, and provides reduction of ripple in said output inductor current, and by adjusting said output inductor number of turns for better matching of AC voltages on said input, middle and output inductor windings, said output inductor ripple current is reduced.

7. A soft-switching converter as defined in claim 2, wherein said DC Transformer has a multiple-loop, EE-like magnetic core;

wherein said input inductor and said middle inductor are placed side-by-side on the center leg of said multiple-loop, EE-like magnetic core;

wherein said output inductor winding is split into two windings connected in series so that their respective AC voltages are in phase and add, and each winding of said split output inductor has the same number of turns as said output inductor;

wherein each winding of said split output inductor winding is placed on a separate outer magnetic leg of said multiple-loop, EE-like magnetic core, and whereby leakage inductance between said input inductor winding and said middle inductor winding caused by deliberate side-by-side positioning of said windings along said center leg of said multiple-loop, EE-like magnetic core provides substantially reduced and near zero-ripple current in said input inductor, and whereby leakage inductances between said split output inductor windings and said middle inductor winding caused by deliberate positioning of said split output inductor windings on separate outer legs of said multiple-loop, EE-like magnetic core provide substantially reduced ripple current in said output inductor.

8. A soft-switching converter as defined in claim 7, wherein small air-gaps are positioned on each of said outer legs of said multiple-loop, EE-like magnetic core with said split output inductor windings to provide the effective AC voltage dividers between leakage and magnetizing inductances of respective said split output inductor windings;

wherein said AC voltage dividers enable better matching of AC voltages on said input, said middle, and said output inductor, and whereby, for one particular duty ratio D, said output inductor DC current has a negligible current ripple.

9. A switching converter as defined in claim 1, wherein said switching means includes electronically controlling operation of said semiconductor switches whereby two transitions D to D' and D' to D are obtained during each successive switch operating cycle $T_S$, wherein said transition intervals are short compared to said switch operating cycle;

wherein switch timing by said switching means of respective switches is as follows:

said first transition D to D' is initiated by turning said input switch OFF and, when voltage on said complementary output switch is reduced to zero, said complementary output switch is by said switching means turned ON at zero voltage for zero switching losses while said output switch is simultaneously turned OFF and said first transition continues until the voltage on said complementary input switch reduces to zero, at which instant said complementary input switch is also turned ON by said switching means at zero voltage for zero switching losses, and said second transition D' to D is initiated by turning said complementary input switch OFF, and when voltage on said input switch is reduced to zero, said input switch is by said switching means turned ON at zero voltage for zero switching losses while said complementary output switch is simultaneously turned OFF, and then with significantly reduced voltage on the said output switch, the said output switch is turned ON for much reduced switching losses for accomplishing a full soft switching cycle, and whereby this soft switching cycle is based on the fundamental property of said converter configuration in which said auxiliary capacitor during said complementary time interval D'$T_S$ carries only AC current necessary and sufficient to complete both soft-switching transitions with zero switching losses on said input switch, complementary input switch, and complementary output switch and much reduced switching losses on said output switch, for any operating duty ratio D, and whereby D to D' transition is dependent on both the DC load current and said auxiliary capacitor AC current, while the D' to D transition is dependent only on said auxiliary capacitor AC current, thus resulting in unequal transition intervals with asymmetrical voltage waveform across said output switch and hence termed "asymmetrical" soft switching, and whereby voltage stress on said semiconductor devices is significantly reduced and efficiency of said converter is significantly increased while electromagnetic interference is reduced, and whereby switching frequency can be significantly increased for further reduction of the converter's size and weight without negative impact on converter's overall efficiency.

10. A soft-switching converter as defined in claim 9, wherein said DC Transformer has a single-loop, UU-like magnetic core;

wherein said input inductor and said middle inductor are placed side-by-side on one leg of said single-loop, UU-like magnetic core;

wherein said output inductor is placed on the opposite leg of said single-loop, UU-like magnetic core;

whereby leakage inductance between said input inductor winding and said middle inductor winding caused by deliberate side-by-side positioning of said windings along one leg of said single-loop, UU-like magnetic core provides substantially reduced and near zero-ripple current in said input inductor, and whereby leakage inductance between said output inductor winding and said middle inductor winding caused by deliberate positioning of said windings on opposite legs of said single-loop, UU-like magnetic core provides substantially reduced ripple current in said output inductor.

11. A soft-switching converter as defined in claim 10, wherein a small air-gap is positioned on said one leg of said single-loop, UU-like magnetic core with said output inductor winding to provide an effective AC voltage divider between leakage and magnetizing inductances of said output inductor, and wherein said effective AC voltage divider enables better matching of AC voltages on said input inductor, said middle inductor, and said output inductor, whereby, for one particular duty ratio D, said output inductor DC current has a negligible current ripple.

12. A soft-switching converter as defined in claim 11, including a separate external inductor connected in series with said output inductor to reduce ripple in current from said output inductor and said output inductor number of turns is adjusted for better matching of AC voltages of said output inductor, said input inductor, and said middle inductor, whereby said external inductor has inductance an order of magnitude smaller than inductance of said output inductor and has to support an order of magnitude lower AC voltage than said output inductor, thereby resulting in an order of magnitude smaller core size and weight, and substantially lower power losses than said DC Transformer.

13. A soft-switching converter as defined in claim 11, including a separate leakage magnetic leg with no windings and a large air-gap in a magnetic flux path with said single-loop magnetic core, wherein said large air-gap is adjusted to provide said output inductor current with a negligible ripple at a particular duty ratio D, whereby said leakage magnetic leg substantially increases the leakage inductance between said output inductor winding and said input and middle inductor windings, and provides reduction of ripple in said output inductor current, and by adjusting said output inductor number of turns for better matching of AC voltages on said input, middle and output inductor windings, said output inductor ripple current is reduced.

14. A soft-switching converter as defined in claim 9,
wherein said DC Transformer has a multiple-loop, EE-like magnetic core;
wherein said input inductor and said middle inductor are placed side-by-side on the center leg of said multiple-loop, EE-like magnetic core;
wherein said output inductor winding is split into two windings connected in series so that their respective AC voltages are in phase and add, and each winding of said split output inductor has the same number of turns as said output inductor;
wherein each winding of said split output inductor winding is placed on a separate outer magnetic leg of said multiple-loop, EE-like magnetic core, and
whereby leakage inductance between said input inductor winding and said middle inductor winding caused by deliberate side-by-side positioning of said windings along said center leg of said multiple-loop, EE-like magnetic core provides substantially reduced and near zero-ripple current in said input inductor, and
whereby leakage inductances between said split output inductor windings and said middle inductor winding caused by deliberate positioning of said split output inductor windings on separate outer legs of said multiple-loop, EE-like magnetic core provide substantially reduced ripple current in said output inductor.

15. A soft-switching converter as defined in claim 14,
wherein small air-gaps are positioned on each of said outer legs of said multiple-loop, EE-like magnetic core with said split output inductor windings to provide the effective AC voltage dividers between leakage and magnetizing inductances of respective said split output inductor windings;
wherein said AC voltage dividers enable better matching of AC voltages on said input, said middle, and said output inductor, and
whereby, for one particular duty ratio D, said output inductor DC current has a negligible current ripple.

16. A switching DC-to-DC converter as defined in claim 1,
wherein said middle inductor comprises an autotransformer;
wherein a dot-marked end of a winding of said autotransformer is connected to said common input terminal and said common output terminal, an unmarked end of said winding of said autotransformer is connected to said another end of said complementary output switch, and a tapped end of said winding of said autotransformer is connected to said another end of said input capacitor;
wherein said winding of said autotransformer is placed on said common magnetic core with said input inductor winding and said output inductor winding to form a DC Transformer;
wherein ratio of number of turns of said winding of said autotransformer to number of turns between dot-marked end and tapped end of said winding of said autotransformer provides additional scaling of DC-to-DC voltage conversion ratio of said converter;
wherein said input inductor winding has the same number of turns as said number of turns between dot-marked end and tapped end of said winding of said autotransformer, and said output inductor winding has the same number of turns as said winding of said autotransformer, whereby at any operating duty ratio D, zero DC flux is obtained in said common magnetic core;
wherein said common magnetic core has no air-gap, whereby said zero DC flux in said common magnetic core enables full utilization of the magnetic core material to generate maximum inductances of said input and output inductors and said autotransformer thereby providing said converter with current overload capability several times higher than nominal load current, and
whereby said DC Transformer combines said input inductor winding, said output inductor winding, and said winding of said autotransformer to provide increased conversion ratio between said input DC voltage source and said DC load and unique and effective DC-to-DC power transfer from said input inductor to said output inductor with substantially reduced energy storage within said common magnetic core of said DC Transformer, thereby reducing size and weight of said converter by reducing said common magnetic core size and weight while simultaneously increasing efficiency and converter overload capability, and providing reduction of electromagnetic interference.

17. A switching converter as defined in claim 1,
wherein one end of said input capacitor is connected to said common input terminal and another end of said input capacitor is connected to said common output terminal;
wherein said dot-marked end of said middle inductor winding is connected to said common output terminal, and
wherein said unmarked end of said middle inductor winding is connected to said unmarked end of said input inductor.

18. A switching converter as defined in claim 1,
wherein said output switch is comprised of a series connection of a MOSFET-like device and a Current Rectifier (diode);
whereby said output switch is a voltage bidirectional switch which operates as a two-quadrant switch and has reduced conduction losses due to the low conduction losses of said MOSFET-like device.

19. A switching converter as defined in claim 1,
wherein said output switch is comprised of two N-channel MOSFET-like devices having a source terminal of one MOSFET-like device connected to a source terminal of another MOSFET-like device (back-to-back connection) and gate terminals of said MOSFET-like devices connected together;
wherein a drain terminal of one MOSFET-like device is connected to said common output terminal and a drain terminal of another MOSFET-like device is connected to said unmarked end of said output inductor winding;
whereby said output switch is both voltage bidirectional and current bidirectional and operates as a four-quadrant switch with significantly reduced current conduction losses compared to two-quadrant voltage bidirectional switch implementation due to the low conduction losses of said two MOSFET-like devices.

20. An isolated switching DC-to-DC converter for providing power from a DC voltage source connected between an input terminal and a common input terminal to a DC load connected between an output terminal and a common output terminal, said converter comprising:
an input inductor winding, an isolation transformer with primary and secondary windings, and an output inductor winding, placed on a common magnetic core to form an effective Isolated DC Transformer, and each winding having one dot-marked end and another unmarked end whereby any AC voltage applied to said primary winding of said isolation transformer induces AC voltages in said secondary winding of said isolation transformer and said input and output inductor windings so that all four AC voltages are in phase at dot-marked ends of said input inductor winding, said output inductor winding and said primary and secondary windings of said isolation transformer;

said input inductor winding connected at a dot-marked end thereof to said input terminal to form an input winding of said Isolated DC Transformer;

said output inductor winding connected at a dot-marked end thereof to said output terminal to form an output winding of said Isolated DC Transformer;

said primary winding of said isolation transformer connected at a dot-marked end thereof to said common input terminal to enable said Isolated DC Transformer operation;

said secondary winding of said isolation transformer connected at a dot-marked end thereof to said common output terminal to enable said Isolated DC Transformer operation;

an input capacitor connected between an unmarked end of said input inductor winding and an unmarked end of said primary winding of said isolation transformer;

an input switch with one end connected to said common input terminal and another end connected to said unmarked end of said input inductor;

an output switch with one end connected to said common output terminal and another end connected to an unmarked end of said output inductor winding;

a complementary output switch, having one end connected to said unmarked end of said output inductor winding and another end of said complementary output switch connected to an unmarked end of said secondary winding of said isolation transformer;

a branch comprised of a complementary input switch and an auxiliary capacitor connected in series, wherein one end of said branch is connected to dot-marked end of said primary winding of said isolation transformer and another end of said branch is connected to said unmarked end of said input inductor;

switching means for keeping both said input switch and said output switch closed for a duration of time interval $DT_S$ and, keeping both said complementary input switch and said complementary output switch closed for a duration of complementary time interval $D'T_S = (1-D)T_S$, where D is a duty ratio and D' is a complementary duty ratio within one complete and controlled switch operating cycle $T_S$;

wherein said input switch, said complementary input switch, and said complementary output switch are semiconductor current bidirectional switching devices, capable of conducting the current in both directions while in an ON state, and sustaining voltage in one direction while in an OFF state;

wherein said output switch is a semiconductor voltage bidirectional switching device, capable of conducting the current while in an ON state, and sustaining voltage in both directions, while in an OFF state;

wherein said switching devices turn ON and OFF at high switching frequency;

wherein said primary winding and said secondary winding are tightly coupled for reduced leakage between said primary winding and said secondary winding;

wherein a DC-to-DC voltage conversion ratio of said converter depends linearly on said operating duty ratio D;

wherein turns ratio of said secondary winding to said primary winding of said isolation transformer provides additional scaling of DC-to-DC voltage conversion ratio of said converter;

wherein at any duty ratio D, said input inductor DC current and said primary and secondary windings DC currents flow into said dot-marked ends of their respective windings, whereas said output inductor DC current flows out of said dot-marked end of said output inductor winding;

wherein said input inductor winding has the same number of turns as said primary winding of said isolation transformer, and said output inductor winding has the same number of turns as said secondary winding of said isolation transformer, whereby at any operating duty ratio D, net zero DC flux is obtained in said common magnetic core;

wherein said common magnetic core has no air-gap;

whereby said net zero DC flux in said common magnetic core enables full utilization of the magnetic core material to generate maximum inductances of said input and output inductors and said isolation transformer thereby providing said converter with current overload capability several times higher than nominal load current, and whereby said Isolated DC Transformer combines said input inductor winding, said output inductor winding, and said primary and secondary windings of said isolation transformer to provide a galvanic isolation between said input DC voltage source and said DC load and unique and effective DC-to-DC power transfer from said input inductor to said output inductor with substantially reduced energy storage within said common magnetic core of said Isolated DC Transformer, thereby reducing size and weight of said converter by reducing said common magnetic core size and weight while simultaneously increasing efficiency and converter overload capability, and providing reduction of electromagnetic interference.

21. An isolated switching converter as defined in claim 20, further including a leakage inductance of said isolation transformer effectively connected in series with said input capacitor, wherein said switching means includes electronically controlling operation of said semiconductor switches whereby two transitions D to D' and D' to D are obtained during each successive switch operating cycle $T_S$, wherein said transition intervals are short compared to said switch operating cycle;

wherein switch timing by said switching means of respective switches is as follows:

said first transition D to D' is initiated by turning said input switch OFF and, when voltage on said complementary output switch is reduced to zero, said complementary output switch is by said switching means turned ON at zero voltage for zero switching losses, and said first transition continues while the voltage on said complementary input switch reduces to zero, at which instant said complementary input switch is also turned ON by said switching means at zero voltage for zero switching losses, and said first transition continues until the current of said output switch is reduced to zero at which instant said output switch is turned OFF, and said second transition D' to D is initiated by turning said complementary input switch OFF and, when voltage on said input switch is reduced to zero, said input switch is by said switching means turned ON at zero voltage for zero switching losses, while said output switch is simultaneously turned ON with much reduced switching losses accomplishing a soft switching cycle, and said second transition continues until the current of said complementary output switch is reduced to zero at which instant said complementary output switch is turned OFF, and whereby both soft switching transitions result in zero switching losses on said input switch, said complementary input switch, and said complementary output switch and much reduced switching losses on said output switch, for any operating duty ratio D, and whereby D to D' transition is dependent only on DC load current while D' to D transition is dependent only on said auxiliary capacitor AC current, thus resulting in the D to D' transition much shorter than D' to D transition, and whereby said leakage inductance substantially reduces duration of said D to D' transition and does not effect said D' to D transition, and whereby voltage stress on said semiconductor devices is significantly reduced and efficiency of said converter is significantly increased while electromagnetic interference is reduced, and whereby switching frequency can be significantly increased for further reduction of the converter's size and weight without negative impact on converter's overall efficiency.

22. An isolated soft-switching converter as defined in claim 21, wherein said Isolated DC Transformer has a single-loop, UU-like magnetic core;

wherein said input inductor and said isolation transformer are placed side-by-side on one leg of said single-loop, UU-like magnetic core;

wherein said output inductor is placed on the opposite leg of said single-loop, UU-like magnetic core;

whereby leakage inductance between said input inductor winding and said isolation transformer windings caused by deliberate side-by-side positioning of said windings along one leg of said single-loop, UU-like magnetic core provides substantially reduced and near zero-ripple current in said input inductor, and whereby leakage inductance between said output inductor winding and said isolation transformer windings caused by deliberate positioning of said windings on opposite legs of said single-loop, UU-like magnetic core provides substantially reduced ripple current in said output inductor.

23. An isolated soft-switching converter as defined in claim 22, wherein a small air-gap is positioned on said one leg of said single-loop, UU-like magnetic core with said output inductor winding to provide an effective AC voltage divider between leakage and magnetizing inductances of said output inductor, and wherein said effective AC voltage divider enables better matching of AC voltages on said input inductor, said isolation transformer, and said output inductor, whereby, for one particular duty ratio D, said output inductor DC current has a negligible current ripple.

24. An isolated soft-switching converter as defined in claim 23, including a separate external inductor connected in series with said output inductor to reduce ripple in current from said output inductor and said output inductor number of turns is adjusted for better matching of AC voltages of said output inductor, said input inductor, and said isolation transformer, whereby said external inductor has inductance an order of magnitude smaller than inductance of said output inductor and has to support an order of magnitude lower AC voltage than said output inductor, thereby resulting in an order of magnitude smaller core size and weight, and substantially lower power losses than said Isolated DC Transformer.

25. An isolated soft-switching converter as defined in claim 23, including a separate leakage magnetic leg with no windings and a large air-gap in a magnetic flux path with said single-loop magnetic core, wherein said large air-gap is adjusted to provide said output inductor current with a negligible ripple at a particular duty ratio D, whereby said leakage magnetic leg substantially increases the leakage inductance between said output inductor winding, said input inductor winding, and said isolation transformer windings, and provides reduction of ripple in said output inductor current, and by adjusting said output inductor number of turns for better matching of AC voltages on said input inductor, said output inductor, and said isolation transformer, said output inductor ripple current is reduced.

26. An isolated soft-switching converter as defined in claim 21, wherein said Isolated DC Transformer has a multiple-loop, EE-like magnetic core;

wherein said input inductor and said isolation transformer are placed side-by-side on the center leg of said multiple-loop, EE-like magnetic core;

wherein said output inductor winding is split into two windings connected in series so that their respective AC voltages are in phase and add, and each winding of said split output inductor has the same number of turns as said output inductor;

wherein each winding of said split output inductor winding is placed on a separate outer magnetic leg of said multiple-loop, EE-like magnetic core, and whereby leakage inductance between said input inductor winding and said isolation transformer windings caused by deliberate side-by-side positioning of said windings along said center leg of said multiple-loop, EE-like magnetic core provides substantially reduced and near zero-ripple current in said input inductor, and whereby leakage inductances between said split output inductor windings and said isolation transformer windings caused by deliberate positioning of said split output inductor windings on separate outer legs of said multiple-loop, EE-like magnetic core provide substantially reduced ripple current in said output inductor.

27. An isolated soft-switching converter as defined in claim 26, wherein small air-gaps are positioned on each of said outer legs of said multiple-loop, EE-like magnetic core with said split output inductor windings to provide the effective AC voltage dividers between leakage and magnetizing inductances of respective said split output inductor windings;

wherein said AC voltage dividers enable better matching of AC voltages on said input inductor, said output inductor, and said isolation transformer, and whereby, for one particular duty ratio D, said output inductor DC current has a negligible current ripple.

28. An isolated soft-switching DC-to-DC converter as defined in claim 21, further including additional secondary windings and separate output circuits for separate DC load outputs;

wherein said isolation transformer includes said additional secondary windings for said additional DC load outputs;

wherein each of said separate output circuits have a configuration with connections identical to the configuration and connections of an output circuit of said isolated switching DC-to-DC converter;

wherein each of said separate output circuits is connected between said additional secondary windings of said isolation transformer and said DC load outputs in an identical way as said output circuit of said isolated switching DC-to-DC converter is connected between said secondary winding of said isolation transformer and said output DC load;

wherein said primary winding, said secondary winding, and said additional secondary windings of multiple-output isolation transformer are placed on said common magnetic core with said input inductor winding, said output inductor winding, and output inductor windings of said separate output circuits for said DC load outputs to form a multiple-output Isolated DC Transformer;

wherein said switching means keeps said input switch, said output switch, and each output switch of said separate output circuits closed for a duration of time interval $DT_S$ and keeps said complementary input switch, said complementary output switch, and each complementary output switch of said separate output circuits closed for a duration of complementary time interval $D'T_S=(1-D)T_S$, where D is a duty ratio and D' is a complementary duty ratio within one complete and controlled switch operating cycle $T_S$;

wherein said switching means includes electronically controlling operation of said semiconductor switches whereby two transitions D to D' and D' to D are obtained during each successive switch operating cycle $T_S$, wherein said transition intervals are short compared to said switch operating cycle;

wherein switch timing by said switching means of respective switches is as follows:

said first transition D to D' is initiated by turning said input switch OFF and, when voltages on said complementary output switches are reduced to zero, said complementary output switches are by said switching means turned ON at zero voltage for zero switching losses, and said first transition continues while the voltage on said complementary input switch reduces to zero, at which instant said complementary input switch is also turned ON by said switching means at zero voltage for zero switching losses, and said first transition continues until the currents of said output switches are reduced to zero at which instant said output switches are turned OFF, and said second transition D' to D is initiated by turning said complementary input switch OFF and, when voltage on said input switch is reduced to zero, said input switch is by said switching means turned ON at zero voltage for zero switching losses, while said output switches are simultaneously turned ON with much reduced switching losses accomplishing a soft switching cycle, and said second transition continues until the currents of said complementary output switches are reduced to zero at which instant said complementary output switches are turned OFF, and whereby both soft switching transitions result in zero switching losses on said input switch, said complementary input switch, and said complementary output switches and much reduced switching losses on said output switches, for any operating duty ratio D, and whereby D to D' transition is dependent only on DC load currents while D' to D transition is dependent only on said auxiliary capacitor AC current, thus resulting in the D to D' transition much shorter than D' to D transition, and whereby said leakage inductance substantially reduces duration of said D to D' transition and does not effect said D' to D transition, and whereby voltage stress on said semiconductor devices is significantly reduced and efficiency of said converter is significantly increased while electromagnetic interference is reduced;

wherein said primary winding, said secondary winding, and said additional secondary windings on said common magnetic core are tightly coupled for reduced leakage between said primary winding, said secondary winding, and said additional secondary windings;

wherein turns ratios of said additional secondary windings to said primary winding of said multiple-output isolation transformer provide additional scaling of DC-to-DC voltage conversion ratio of said converter for each said additional DC load respectively;

wherein each additional output inductor winding for each said additional DC load has the same number of turns as respective said additional secondary winding of said multiple-output isolation transformer, whereby at any operating duty ratio D, zero DC flux is obtained in said common magnetic core;

wherein said common magnetic core has no air-gap, whereby said zero DC flux in said common magnetic core enables full utilization of the magnetic core material to generate maximum inductances of said input and output inductors and said multiple-output isolation transformer, thereby providing said converter with current overload capability several times higher than sum of nominal load currents of said DC load output and each said additional DC load output, and whereby said multiple-output Isolated DC Transformer combines said input inductor winding, said output inductor winding, and said primary and secondary windings of said multiple-output isolation transformer to provide galvanic isolation between said input DC voltage source, said DC load, and said additional DC loads and in addition an unique and effective DC-to-DC power transfer from said input inductor to said output inductor and said additional output inductors with substantially reduced energy storage within said common magnetic core of said multiple-output Isolated DC Transformer, thereby reducing size and weight of said converter by reducing said common magnetic core size and weight while simultaneously increasing efficiency and converter overload capability, and providing reduction of electromagnetic interference.

29. An isolated switching converter as defined in claim 20,
wherein one end of said branch is connected to said dot-marked end of said primary winding of said isolation transformer and another end of said branch is connected to said unmarked end of said primary winding of said isolation transformer.

30. An isolated switching converter as defined in claim 20,
wherein one end of said branch is connected to said dot-marked end of said input inductor and another end of said branch is connected to said unmarked end of said input inductor.

31. An isolated switching converter as defined in claim 20,
wherein one end of said branch is connected to said dot-marked end of said input inductor and another end of said branch is connected to said unmarked end of said primary winding of said isolation transformer.

32. An isolated switching converter as defined in claim 20,
wherein one end of said input capacitor is connected to said common input terminal;
wherein said dot-marked end of said primary winding of said isolation transformer is connected to another end of said input capacitor;
wherein said unmarked end of said primary winding of said isolation transformer is connected to said unmarked end of said input inductor, and
wherein one end of said branch is connected to said dot-marked end of said primary winding of said isolation transformer and another end of said branch is connected to said unmarked end of said primary winding of said isolation transformer.

33. An isolated switching converter as defined in claim 20,
wherein one end of said branch is connected to said unmarked end of said secondary winding of said isolation transformer and another end of said branch is connected to said output terminal.

34. An isolated switching converter as defined in claim 20,
wherein one end of said complementary output switch is connected to said common terminal;
wherein said dot-marked end of said secondary winding of said isolation transformer is connected to another end of said complementary output switch;
wherein said unmarked end of said secondary winding of said isolation transformer is connected to another end of said unmarked end of said output inductor, and
wherein one end of said branch is connected to said unmarked end of said secondary winding of said isolation transformer and another end of said branch is connected to said dot-marked end of said secondary winding of said isolation transformer.

35. An isolated switching DC-to-DC converter as defined in claim 20,
wherein said output switch is comprised of a series connection of a MOSFET-like device and a Current Rectifier (diode);
whereby said output switch is a voltage bidirectional switch which operates as a two-quadrant switch and has reduced conduction losses due to the low conduction losses of said MOSFET-like device.

36. An isolated switching DC-to-DC converter as defined in claim 20,
wherein said output switch is comprised of two N-channel MOSFET-like devices having a source terminal of one MOSFET-like device connected to a source terminal of another MOSFET-like device (back-to-back connection) and gate terminals of said MOSFET-like devices connected together;
wherein a drain terminal of one MOSFET-like device is connected to said common output terminal and a drain terminal of another MOSFET-like device is connected to said unmarked end of said output inductor winding;
whereby said output switch is both voltage bidirectional and current bidirectional and operates as a four-quadrant switch with significantly reduced current conduction losses compared to two-quadrant voltage bidirectional switch implementation due to the low conduction losses of said two MOSFET-like devices.

37. An isolated switching converter as defined in claim 20, further comprising means for connecting the ends of said branch to said converter preserving galvanic isolation whereby during said complementary time interval, current through said branch is AC current;
whereby substantially zero DC flux in said common magnetic core enables full utilization of the magnetic core material providing said converter with current overload capability several times higher than nominal load current, and
whereby said Isolated DC Transformer combines said input inductor winding, said output inductor winding, and said primary and secondary windings of said isolation transformer to provide a galvanic isolation between said input DC voltage source and said DC load and unique and effective DC-to-DC power transfer from said input inductor to said output inductor with substantially obviated DC energy storage within said common magnetic core of said Isolated DC Transformer, thereby reducing size and weight of said converter by reducing said common magnetic core size and weight while simultaneously increasing efficiency and converter overload capability, and providing reduction of electromagnetic interference.

38. An isolated switching converter as defined in claim 37, further including a leakage inductance of said isolation transformer effectively connected in series with said input capacitor,
wherein said switching means includes electronically controlling operation of said semiconductor switches whereby two transitions D to D' and D' to D are obtained during each successive switch operating cycle $T_S$, wherein said transition intervals are short compared to said switch operating cycle;
wherein switch sequence and timing by said switching means of respective switches is as follows:
said first transition D to D' is initiated by turning said input switch OFF and, when voltage on said complementary output switch is reduced to substantially zero, said complementary output switch is by said switching means turned ON at substantially zero voltage for substantially zero switching losses, and said first transition continues while the voltage on said complementary input switch reduces to substantially zero, at which instant said complementary input switch is also turned ON by said switching means at substantially zero voltage for substantially zero switching losses, and said first transition continues until the current of said output switch is reduced to substantially zero at which instant said output switch is turned OFF, and said second transition D' to D is initiated by turning said complementary input switch OFF and, when voltage on said input switch is reduced to substantially zero, said input switch is by said switching means turned ON at substantially zero voltage for substantially zero switching losses, while said output switch is simultaneously turned ON with much reduced switching losses accomplishing a lossless switching cycle, and said second transition continues until the current of said complementary output switch is reduced to substantially zero at which instant said complementary output switch is turned OFF, and whereby both lossless switching transitions result in substantially zero switching losses on said input switch, said complementary input switch, and said complementary output switch and much reduced switching losses on said output switch, for any operating duty ratio D, and whereby D to D' transition is dependent only on DC load current while D' to D transition is dependent only on said branch AC current, thus resulting in the D to D' transition much shorter than D' to D transition, and whereby said leakage inductance substantially reduces duration of said D to D' transition and does not effect said D' to D transition, and whereby voltage stress on said semiconductor devices is significantly reduced and efficiency of said converter is significantly increased while electromagnetic interference is reduced, and whereby switching frequency can be significantly increased for further reduction of the converter's size and weight without negative impact on converter's overall efficiency.

39. An isolated switching converter as defined in claim 38, wherein said Isolated DC Transformer has a single-loop, UU-like magnetic core;

wherein said input inductor and said isolation transformer are integrated side-by-side on one leg of said single-loop, UU-like magnetic core;

wherein said output inductor is integrated on the opposite leg of said single-loop, UU-like magnetic core;

whereby leakage inductance between said input inductor winding and said isolation transformer windings caused by deliberate side-by-side positioning of said windings along one leg of said single-loop, UU-like magnetic core reduces current ripple in said input inductor substantially to zero, and whereby leakage inductance between said output inductor winding and said isolation transformer windings caused by deliberate positioning of said windings on opposite legs of said single-loop, UU-like magnetic core reduces current ripple in said output inductor substantially to zero.

40. An isolated switching converter as defined in claim 39, wherein a small air-gap is positioned on said one leg of said single-loop, UU-like magnetic core with said output inductor winding to provide an effective AC voltage divider between leakage and magnetizing inductances of said output inductor, and whereby, for one particular duty ratio D, said output inductor DC current has a substantially zero current ripple.

41. An isolated switching converter as defined in claim 40, including a separate external inductor connected in series with said output inductor to reduce current ripple in said output inductor, and whereby said external inductor has inductance an order of magnitude smaller than inductance of said output inductor and has to support an order of magnitude lower AC voltage than said output inductor, thereby resulting in an order of magnitude smaller core size and weight, and substantially lower power losses than said Isolated DC Transformer.

42. An isolated switching converter as defined in claim 40, including a separate leakage magnetic leg with no windings and another air-gap in its magnetic flux path, wherein said another air-gap is adjusted to provide said output inductor current with a substantially zero current ripple at a particular duty ratio D, whereby said leakage magnetic leg substantially increases the leakage inductance between said output inductor winding, said input inductor winding, and said isolation transformer windings, and provides reduction of current ripple in said output inductor current over the range of said input source voltage, by adjusting said output inductor number of turns for better matching of AC voltages on said input inductor, said output inductor, and said isolation transformer, said output inductor current ripple is reduced.

43. An isolated switching converter as defined in claim 38, wherein said Isolated DC Transformer has a multiple-loop, EE-like magnetic core;

wherein said input inductor and said isolation transformer are integrated side-by-side on the center leg of said multiple-loop, EE-like magnetic core;

wherein said output inductor winding is split into two windings connected in series so that their respective AC voltages are in phase at dot-marked ends and add, and each winding of said split output inductor has the same number of turns as said output inductor;

wherein each winding of said split output inductor winding is placed on a separate outer magnetic leg of said multiple-loop, EE-like magnetic core, and whereby leakage inductance between said input inductor winding and said isolation transformer windings caused by deliberate side-by-side positioning of said windings along said center leg of said multiple-loop, EE-like magnetic core reduces current ripple in said input inductor to substantially zero over the range of said input source voltage;

whereby leakage inductances between said split output inductor windings and said isolation transformer windings caused by deliberate positioning of said split output inductor windings on separate outer legs of said multiple-loop, EE-like magnetic core reduces current ripple in said output inductor.

44. An isolated switching converter as defined in claim 43, wherein small air-gaps are positioned on each of said outer legs of said multiple-loop, EE-like magnetic core with said split output inductor windings to provide the effective AC voltage dividers between leakage and magnetizing inductances of respective said split output inductor windings;

whereby, for one particular duty ratio D, said output inductor DC current has a substantially zero current ripple.

45. An isolated switching DC-to-DC converter as defined in claim 38, wherein said isolation transformer is a multiple-output isolation transformer integrated on said common magnetic core to form a multiple-output Isolated DC Transformer;

wherein said means for connecting the ends of said branch to said converter preserves galvanic isolation of said multiple-output isolation transformer whereby during said complementary time interval, current through said branch is AC current;

wherein turns ratios of said secondary windings to said primary winding of said multiple-output isolation transformer provide additional scaling of DC-to-DC voltage conversion ratio of said converter;

wherein each output inductor winding for each of multiple DC loads has the same number of turns as respective secondary winding of said multiple-output isolation transformer, whereby for range of operating duty ratio D, substantially zero DC flux is obtained in said common magnetic core;

whereby said substantially zero DC flux in said common magnetic core provides said converter with substantial current overload capability.

46. A method for power conversion comprising:

providing an input and complementary input switch being controllable semiconductor CBS (Current Bidirectional Switch) switches, each said CBS switch having an anti-parallel diode and parallel capacitance;

providing an output switch being controllable semiconductor VBS (Voltage Bidirectional Switch) switch having a parallel capacitance, and a complementary output switch being a semiconductor current rectifier having a parallel capacitance;

controlling an ON-time and an OFF-time of said controllable semiconductor switches regulating an output load voltage, each said controllable semiconductor switch being turned ON or OFF during natural and forced transition intervals which are short relative to said ON-time and OFF-time;

providing a negative current in a branch with said complementary input controllable semiconductor CBS switch during said forced transition interval;

controlling sequence and timing of turn-ON and turn-OFF signals for said controllable semiconductor switches during said natural transition interval, recycling charge among said capacitances of said controllable semiconductor switches and turning ON said complementary input controllable semiconductor CBS switch substantially losslessly at substantially zero voltage for any range of source voltages and load currents;

controlling sequence and timing of turn-ON and turn-OFF signals for said controllable semiconductor switches over said forced transition interval, said negative current recycling charge among said capacitances of said controllable semiconductor switches, turning ON said input controllable semiconductor CBS switch substantially losslessly at substantially zero voltage and simultaneously turning ON said output controllable semiconductor VBS switch at negative voltage across its capacitance for any range of source voltages and load currents;

integrating three inductor windings on a common magnetic core into a DC Transformer;

subjecting said inductor windings to AC voltages in phase at dot-marked ends of said inductor windings;

subjecting two of said inductor windings to DC currents flowing into said dot-marked ends thereof, thereby to generate a DC flux in one direction in said common magnetic core;

subjecting a third of said inductor windings to DC current flowing out of said dot-marked end thereof, thereby to generate a DC flux in opposite direction in said common magnetic core;

providing a selected number of turns for each of said inductor windings to produce substantially equal volts-per-turn and substantially zero total DC flux in said common magnetic core for a range of magnitudes of said three DC currents and for a range of magnitudes of said substantially equal volts-per-turn, whereby substantially obviating DC energy storage in said DC Transformer.

47. A method for power conversion as defined in claim 46 wherein said complementary output switch is a controllable semiconductor CBS switch having an anti-parallel diode and a parallel capacitance, said complementary output controllable semiconductor CBS switch being turned ON and OFF as a synchronous rectifier to reduce conduction losses by bypassing said anti-parallel diode.

48. A method as defined in claim 47 wherein said common magnetic core is a single-loop, UU-like magnetic core further comprising:

integrating said two inductor windings on one leg of said UU-like magnetic core side-by-side to provide substantially higher leakage inductance between said two inductor windings, reducing ripple current in one of said two inductor windings substantially to zero over the range of said substantially equal volts-per-turn;

integrating said third inductor winding on the opposite leg of said UU-like magnetic core to provide substantially higher leakage inductance between said third inductor winding and said two inductor windings reducing ripple current in said third inductor winding substantially to zero over the range of said substantially equal volts-per-turn.

49. A method as defined in claim 48 further including a small air-gap in said opposite leg of said single-loop, UU-like magnetic core, providing an effective AC voltage divider between leakage and magnetizing inductances of said third inductor winding further reducing current ripple in said third inductor winding.

50. A method as defined in claim 49 further including a separate small external inductor connected in series with said third inductor winding further reducing current ripple in said third inductor winding.

51. A method as defined in claim 49 further including a separate leakage magnetic leg with an additional air-gap in its magnetic flux path further reducing current ripple in said third inductor winding.

52. A method as defined in claim 47 wherein said common magnetic core is a multiple-loop, EE-like magnetic core further comprising:

integrating said two inductor windings side-by-side on the center leg of said multiple-loop, EE-like magnetic core;

splitting said third inductor winding into two windings having the same number of turns as said third inductor winding;

integrating said split inductor windings onto two outer magnetic legs of said multiple-loop, EE-like magnetic core;

connecting said split inductor windings in series having their respective AC voltages in phase at dot-marked ends of said split inductor windings;

reducing current ripples in said split inductor windings and in one of said two inductor windings over the range of said substantially equal volts-per-turn.

53. A method as defined in claim 52 further including small air-gaps in each of said outer legs of said multiple-loop, EE-like magnetic core, having effective AC voltage dividers to reduce current ripple in said split inductor windings.

54. A method as defined in claim 47 wherein one of said two inductor windings is replaced with an autotransformer windings, substantially obviating DC energy storage in a DC Transformer.

55. A method for power conversion as defined in claim 46 wherein one of said two inductor windings is replaced with an isolation transformer windings, substantially obviating DC energy storage in an Isolated DC Transformer.

56. A method for power conversion as defined in claim 55 wherein said complementary output switch is a controllable semiconductor CBS switch having an anti-parallel diode and a parallel capacitance, said complementary output controllable semiconductor CBS switch being turned ON and OFF as a synchronous rectifier to reduce conduction losses by bypassing said anti-parallel diode.

57. A method as defined in claim 56 wherein said common magnetic core is a single-loop, UU-like magnetic core further comprising:

integrating said two inductor windings on one leg of said UU-like magnetic core side-by-side to provide substantially higher leakage inductance between said two inductor windings, reducing ripple current in one of said two inductor windings substantially to zero over the range of said substantially equal volts-per-turn;

integrating said third inductor winding on the opposite leg of said UU-like magnetic core to provide substantially higher leakage inductance between said third inductor winding and said two inductor windings reducing ripple current in said third inductor winding substantially to zero over the range of said substantially equal volts-per-turn.

58. A method as defined in claim 57 further including a small air-gap in said opposite leg of said single-loop, UU-like magnetic core, providing an effective AC voltage divider between leakage and magnetizing inductances of said third inductor winding further reducing current ripple in said third inductor winding.

59. A method as defined in claim 58 further including a separate small external inductor connected in series with said third inductor winding further reducing current ripple in said third inductor winding.

60. A method as defined in claim 58 further including a separate leakage magnetic leg with an additional air-gap in its magnetic flux path further reducing current ripple in said third inductor winding.

61. A method as defined in claim 56 wherein said common magnetic core is a multiple-loop, EE-like magnetic core further comprising;

integrating said two inductor windings side-by-side on the center leg of said multiple-loop, EE-like magnetic core;

splitting said third inductor winding into two windings having the same number of turns as said third inductor winding;

integrating said split inductor windings onto two outer magnetic legs of said multiple-loop, EE-like magnetic core;

connecting said split inductor windings in series having their respective AC voltages in phase at dot-marked ends of said split inductor windings;

reducing current ripples in said split inductor windings and in one of said two inductor windings over the range of said substantially equal volts-per-turn.

62. A method as defined in claim 61 further including small air-gaps in each of said outer legs of said multiple-loop, EE-like magnetic core, having effective AC voltage dividers to reduce current ripple in said split inductor windings.

63. A method as defined in claim 56 wherein said isolation transformer is a multiple-output isolation transformer, whereby substantially obviating DC energy storage in a multiple-output Isolated DC Transformer.

64. A method for substantially obviating DC energy storage in a common magnetic core resulting in a DC Transformer, comprising:

integrating three inductor windings on said common magnetic core;

subjecting said inductor windings to AC voltages in phase at dot-marked ends of said inductor windings;

subjecting two of said inductor windings to DC currents flowing into said dot-marked ends thereof, thereby to generate a DC flux in one direction in said common magnetic core, and subjecting a third of said inductor windings to DC current flowing out of said dot-marked end thereof, thereby to generate a DC flux in opposite direction in said common magnetic core;

selecting turn numbers for each of said inductor windings to produce substantially equal volts-per-turn and substantially zero total DC flux in said common magnetic core for a range of magnitudes of said three DC currents and for a range of magnitudes of said substantially equal volts-per-turn.

65. A method as defined in claim 64 wherein said common magnetic core is a single-loop, UU-Like magnetic core further comprising:

integrating said two inductor windings on one leg of said UU-like magnetic core side-by-side to provide substantially higher leakage inductance between said two inductor windings, reducing ripple current in one of said two inductor windings substantially to zero over the range of said substantially equal volts-per-turn;

integrating said third inductor winding on the opposite leg of said UU-like magnetic core to provide substantially higher leakage inductance between said third inductor winding and said two inductor windings reducing ripple current in said third inductor winding substantially to zero over the range of said substantially equal volts-per-turn.

66. A method as defined in claim 65 further including a small air-gap in said opposite leg of said single-loop, UU-like magnetic core, providing an effective AC voltage divider between leakage and magnetizing inductances of said third inductor winding further reducing current ripple in said third inductor winding.

67. A method as defined in claim 66 further including a separate small external inductor connected in series with said third inductor winding further reducing current ripple in said third inductor winding.

68. A method as defined in claim 66 further including a separate leakage magnetic leg with an additional air-gap in its magnetic flux path further reducing current ripple in said third inductor winding.

69. A method as defined in claim 64 wherein said common magnetic core is a multiple-loop, EE-like magnetic core further comprising:

integrating said two inductor windings side-by-side on the center leg of said multiple-loop, EE-like magnetic core;

splitting said third inductor winding into two windings having the same number of turns as said third inductor winding;

integrating said split inductor windings onto two outer magnetic legs of said multiple-loop, EE-like magnetic core;

connecting said split inductor windings in series having their respective AC voltages in phase at dot-marked ends of said split inductor windings;

reducing current ripples in said split inductor windings and in one of said two inductor windings over the range of said substantially equal volts-per-turn.

70. A method as defined in claim 69 further including small air-gaps in each of said outer legs of said multiple-loop, EE-like magnetic core, having effective AC voltage dividers to reduce current ripple in said split inductor windings.

71. A method as defined in claim 64 wherein one of said two inductor windings is replaced with an autotransformer windings, substantially obviating DC energy storage in a DC Transformer.

72. A method as defined in claim 64 wherein one of said two inductor windings is replaced with an isolation transformer windings, substantially obviating DC energy storage in an Isolated DC Transformer.

73. A method as defined in claim 72 wherein said common magnetic core is a single-loop, UU-like magnetic core further comprising:

integrating said two inductor windings on one leg of said UU-like magnetic core side-by-side to provide substantially higher leakage inductance between said two inductor windings, reducing ripple current in one of said two inductor windings substantially to zero over the range of said substantially equal volts-per-turn;

integrating said third inductor winding on the opposite leg of said UU-like magnetic core to provide substantially higher leakage inductance between said third inductor winding and said two inductor windings reducing ripple current in said third inductor winding over the range of said substantially equal volts-per-turn.

74. A method as defined in claim 73 further including a small air-gap in said opposite leg of said single-loop, UU-like magnetic core, providing an effective AC voltage divider between leakage and magnetizing inductances of said third inductor winding further reducing current ripple in said third inductor winding.

75. A method as defined in claim 74 further including a separate small external inductor connected in series with said third inductor winding further reducing current ripple in said third inductor winding.

76. A method as defined in claim 74 further including a separate leakage magnetic leg with an additional air-gap in its magnetic flux path further reducing current ripple in said third inductor winding.

77. A method as defined in claim 72 wherein said common magnetic core is a multiple-loop, EE-like magnetic core further comprising;

integrating said two inductor windings side-by-side on the center leg of said multiple-loop, EE-like magnetic core;

splitting said third inductor winding into two windings having the same number of turns as said third inductor winding;

integrating said split inductor windings onto two outer magnetic legs of said multiple-loop, EE-like magnetic core;

connecting said split inductor windings in series having their respective AC voltages in phase at dot-marked ends of said split inductor windings;

reducing current ripples in said split inductor windings and in one of said two inductor windings over the range of said substantially equal volts-per-turn.

78. A method as defined in claim 77 further including small air-gaps in each of said outer legs of said multiple-loop, EE-like magnetic core, having effective AC voltage dividers to reduce current ripple in said split inductor windings.

79. A method as defined in claim 72 wherein said isolation transformer is a multiple-output isolation transformer, whereby substantially obviating DC energy storage in a multiple-output Isolated DC Transformer.

80. A method for substantially lossless switching comprising:

providing an input and complementary input switch being controllable semiconductor CBS switches, each said CBS switch having an anti-parallel diode and parallel capacitance;

providing an output switch being controllable semiconductor VBS switch having a parallel capacitance, and a complementary output switch being a semiconductor current rectifier having a parallel capacitance;

controlling an ON-time and an OFF-time of said controllable semiconductor switches regulating an output load voltage, each said controllable semiconductor switch being turned ON and OFF during natural and forced transition intervals which are short relative to said ON-time and OFF-time;

providing a negative current in a branch with said complementary input controllable semiconductor CBS switch during said forced transition interval;

controlling sequence and timing of turn-ON and turn-OFF signals for said controllable semiconductor switches during said natural transition interval, recycling charge among said capacitances of said controllable semiconductor switches and turning ON said complementary input controllable semiconductor CBS switch substantially losslessly at substantially zero voltage for any range of source voltages and load currents;

controlling sequence and timing of turn-ON and turn-OFF signals for said controllable semiconductor switches over said forced transition interval, said negative current recycling charge among said capacitances of said controllable semiconductor switches, turning ON said input controllable semiconductor CBS switch substantially losslessly at substantially zero voltage and simultaneously turning ON said output controllable semiconductor VBS switch at negative voltage across its capacitance for any range of source voltages and load currents.

81. A method for substantially lossless switching as defined in claim 80 wherein said complementary output switch is a controllable semiconductor CBS switch having an anti-parallel diode and parallel capacitance, said complementary output CBS switch being turned ON and OFF as a synchronous rectifier to reduce conduction losses by bypassing said anti-parallel diode.

82. A method for substantially obviating DC energy storage in a common magnetic core resulting in a DC Transformer, comprising:

integrating three inductor windings on said common magnetic core;

subjecting said three inductor windings to AC voltages in phase at dot-marked ends of said inductor windings;

subjecting two of said three inductor windings to DC currents flowing into said dot-marked ends thereof, thereby to generate a DC flux in one direction in said common magnetic core, and subjecting a third of said three inductor windings to DC current flowing out of said dot-marked end thereof, thereby to generate a DC flux in opposite direction in said common magnetic core, resulting in subtraction of said DC fluxes in said common magnetic core;

providing a selected number of turns for each of said three inductor windings to produce substantially equal volts-per-turn and substantially reduce total DC flux in said common magnetic core for a range of magnitudes of said three DC currents and for a range of magnitudes of said substantially equal volts-per-turn.

* * * * *